Figure 1:
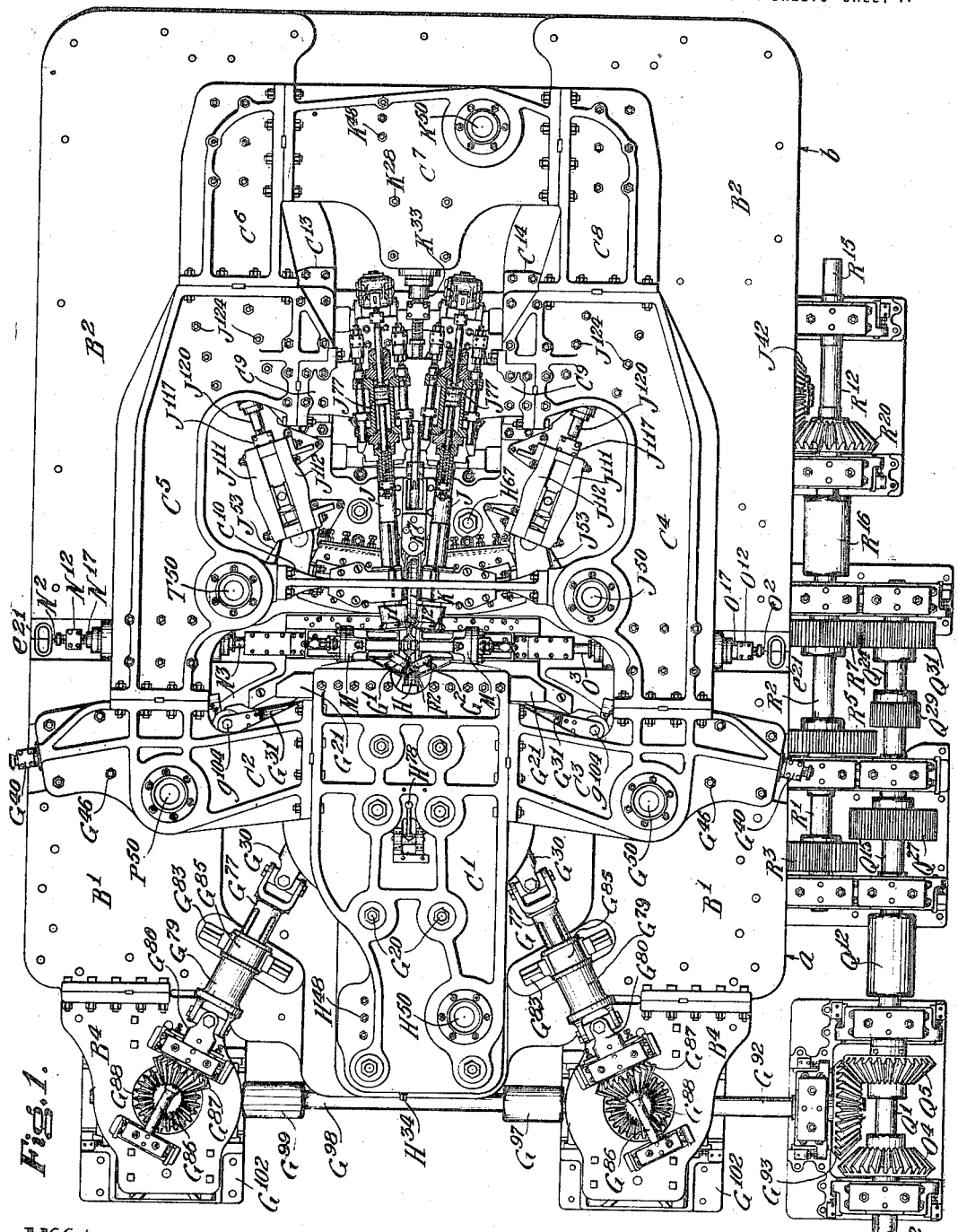

L. F. DIETER.
METHOD OF AND APPARATUS OR MILL FOR ROLLING OR FORMING CAR WHEELS OR OTHER CIRCULAR BODIES.
APPLICATION FILED JUNE 15, 1911.

1,243,050.

Patented Oct. 16, 1917.
21 SHEETS—SHEET 1.

Witnesses.
J. A. L. Becker.
Paul W. Dieter.

Inventor.
Louis F. Dieter.

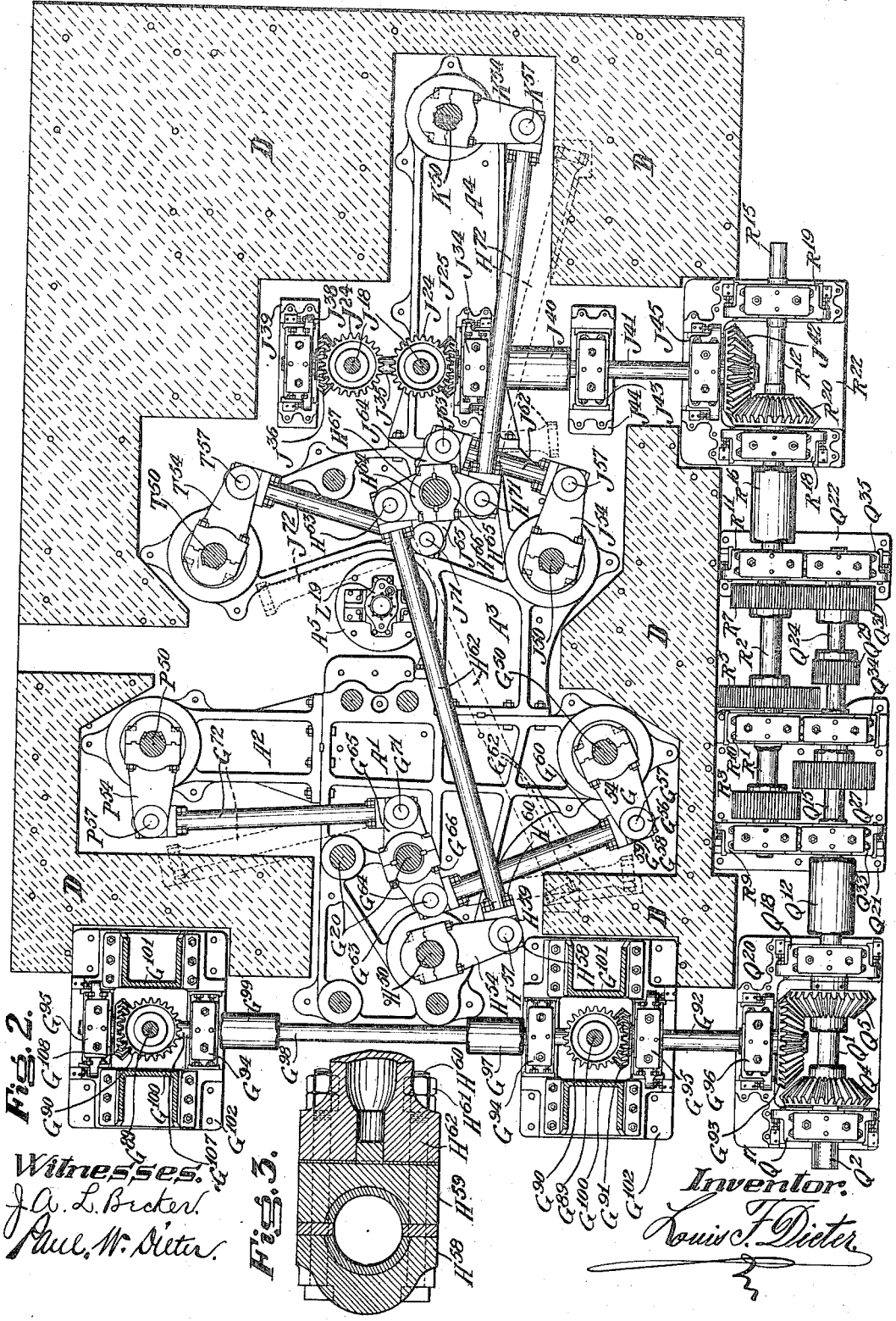

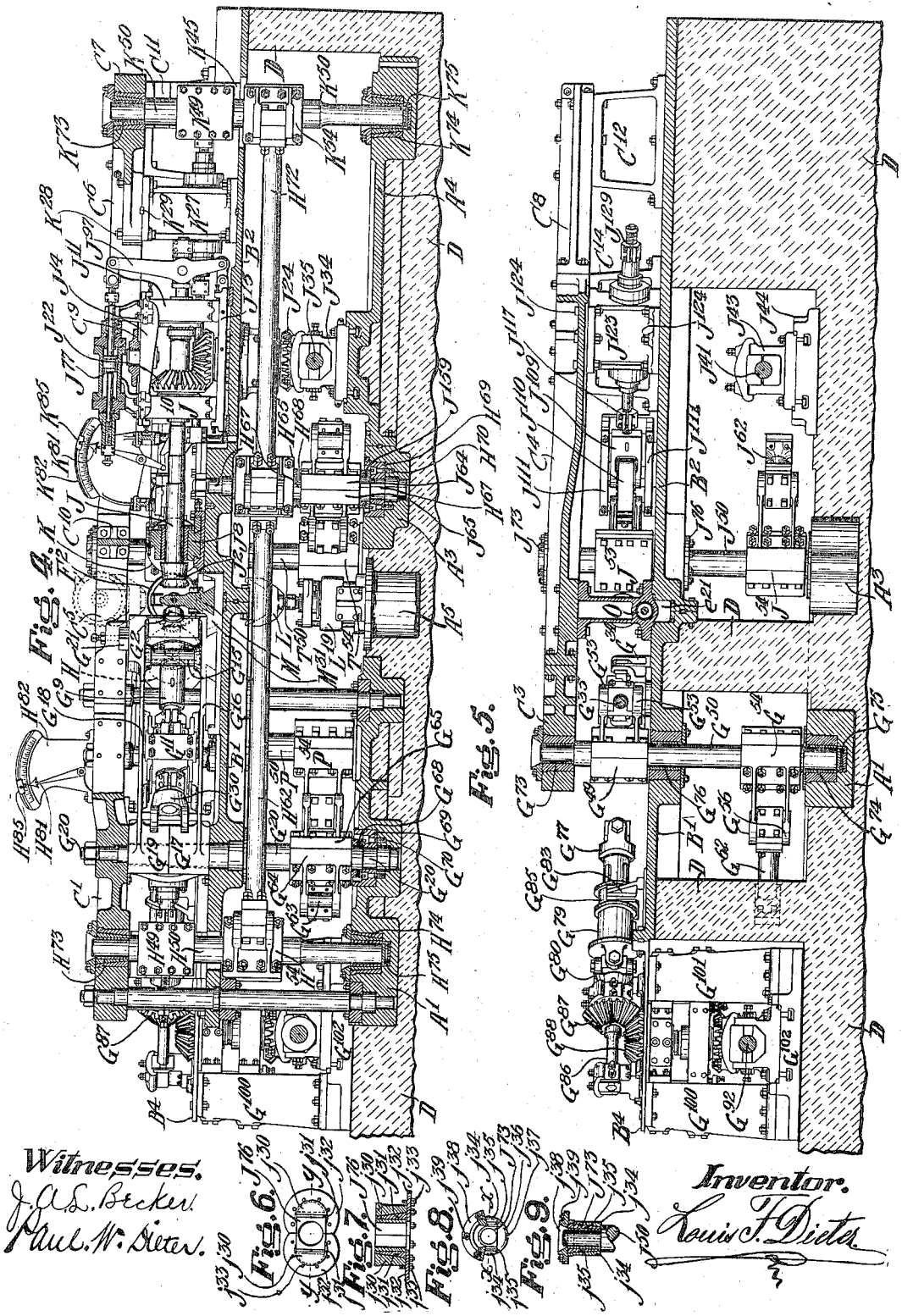

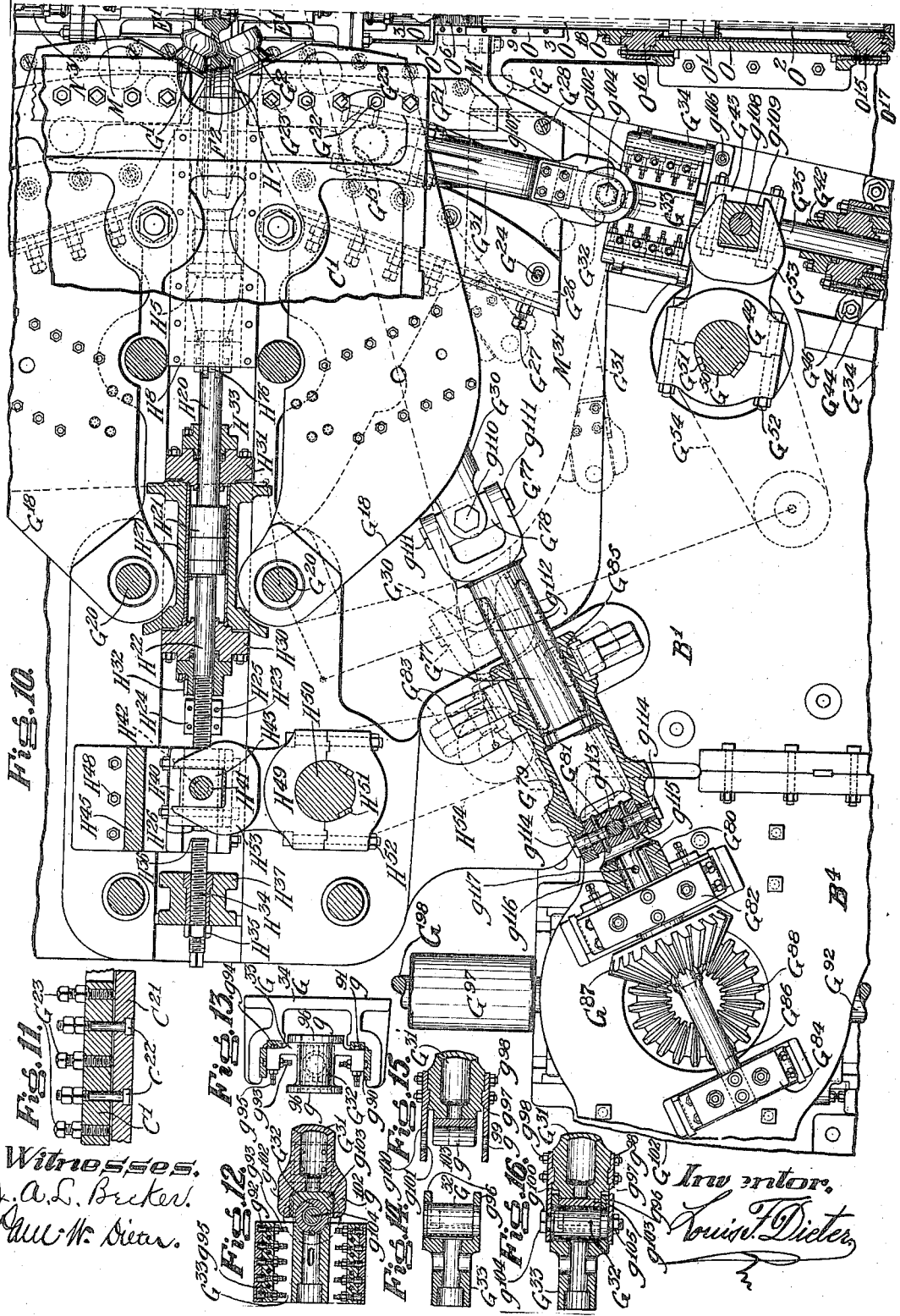

L. F. DIETER.
METHOD OF AND APPARATUS OR MILL FOR ROLLING OR FORMING CAR WHEELS OR OTHER CIRCULAR BODIES.
APPLICATION FILED JUNE 15, 1911.
1,243,050.
Patented Oct. 16, 1917.
21 SHEETS—SHEET 5.
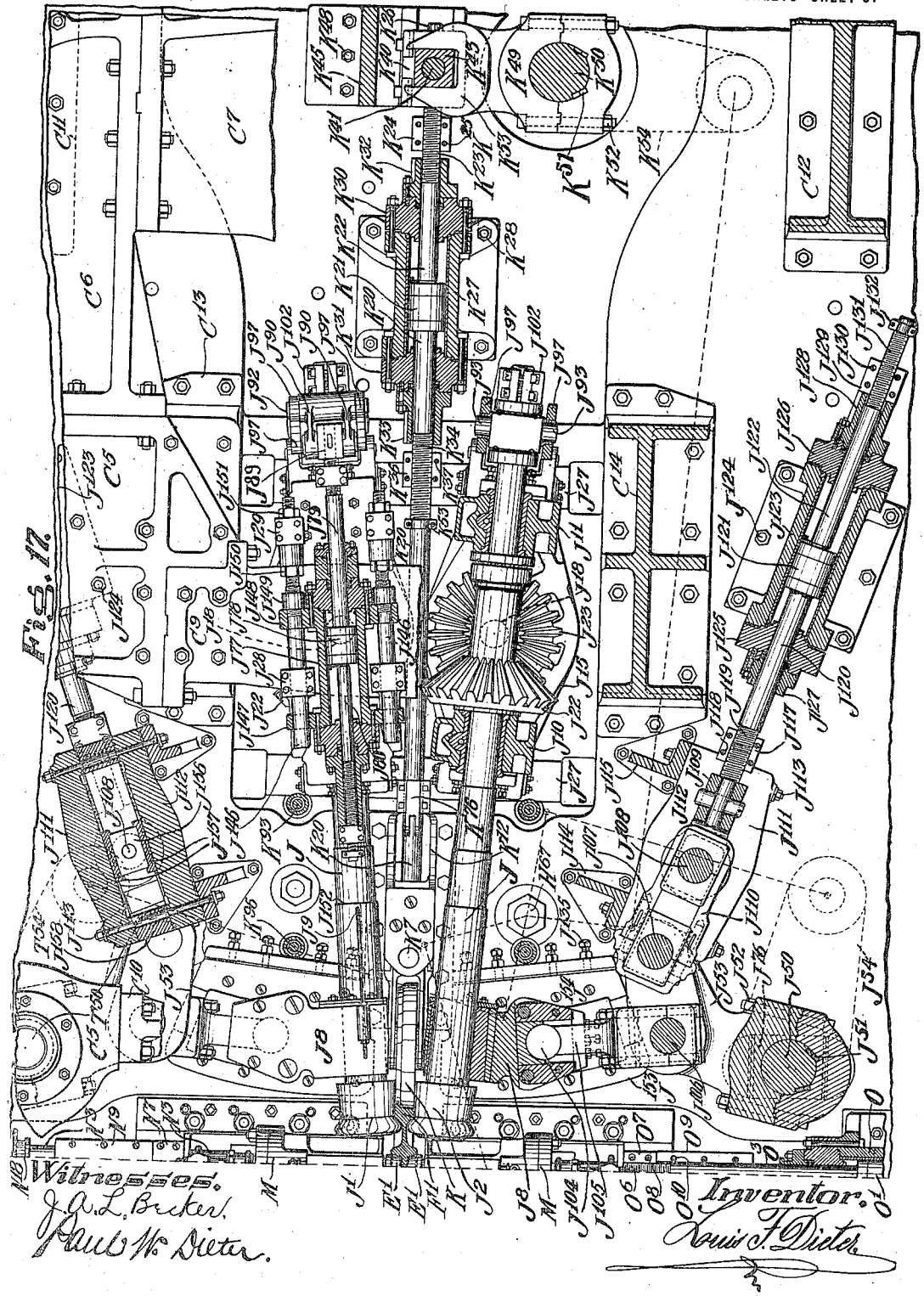

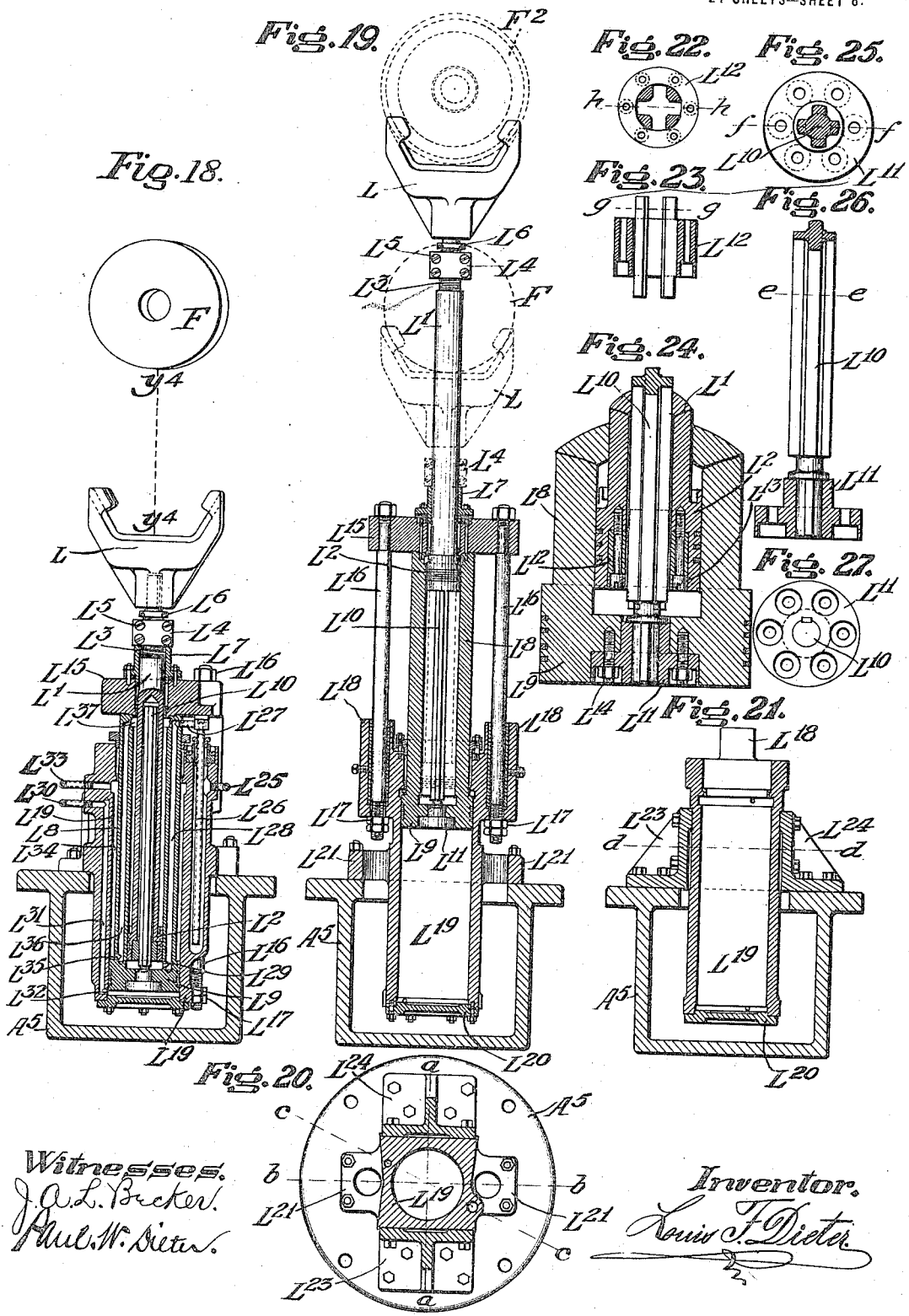

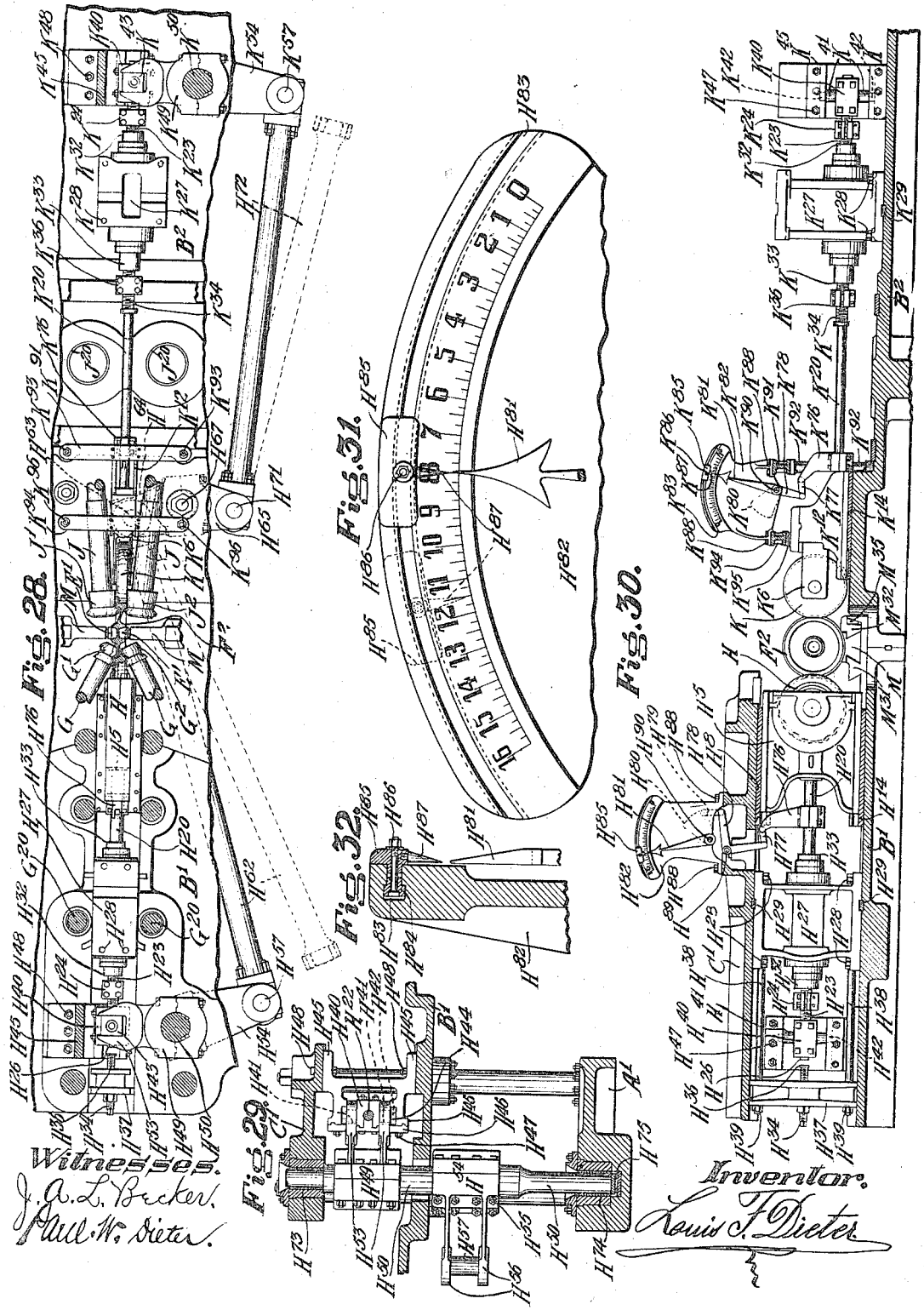

L. F. DIETER.
METHOD OF AND APPARATUS OR MILL FOR ROLLING OR FORMING CAR WHEELS OR OTHER CIRCULAR BODIES.
APPLICATION FILED JUNE 15, 1911.
1,243,050. Patented Oct. 16, 1917.
21 SHEETS—SHEET 8.
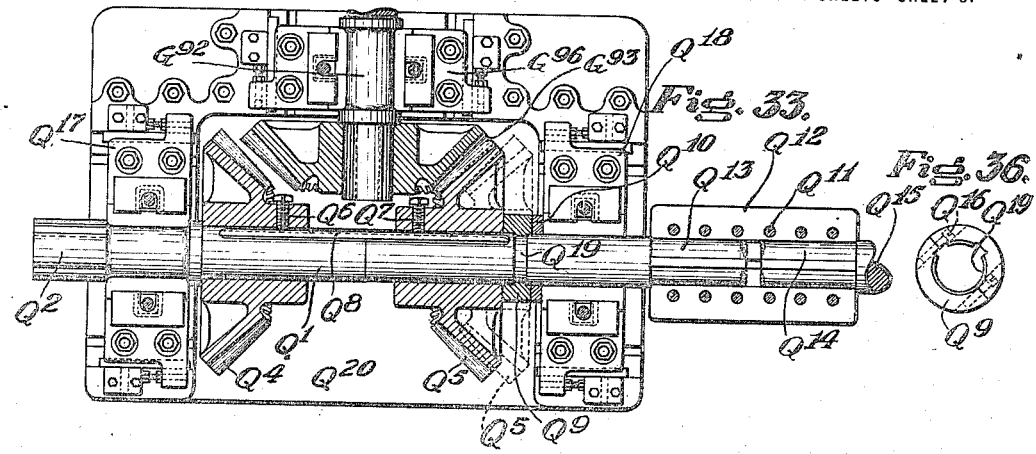
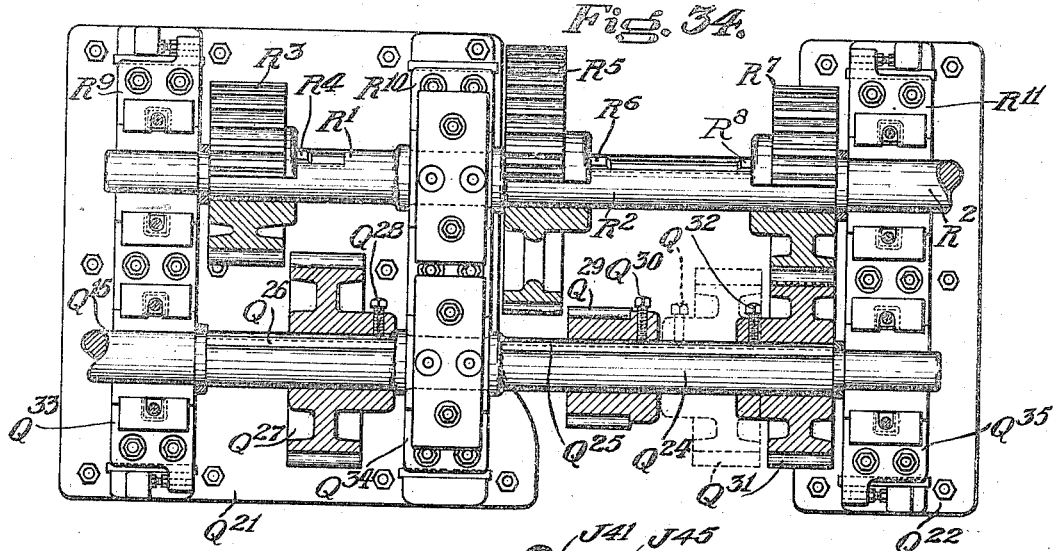
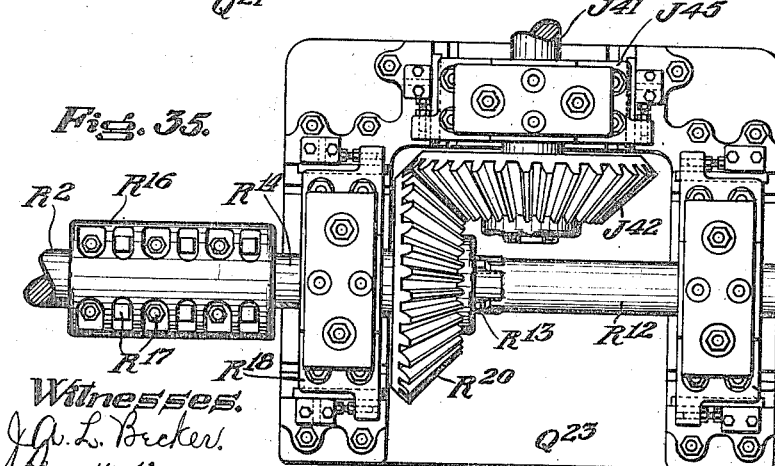
Witnesses.
Inventor.
Louis F. Dieter.

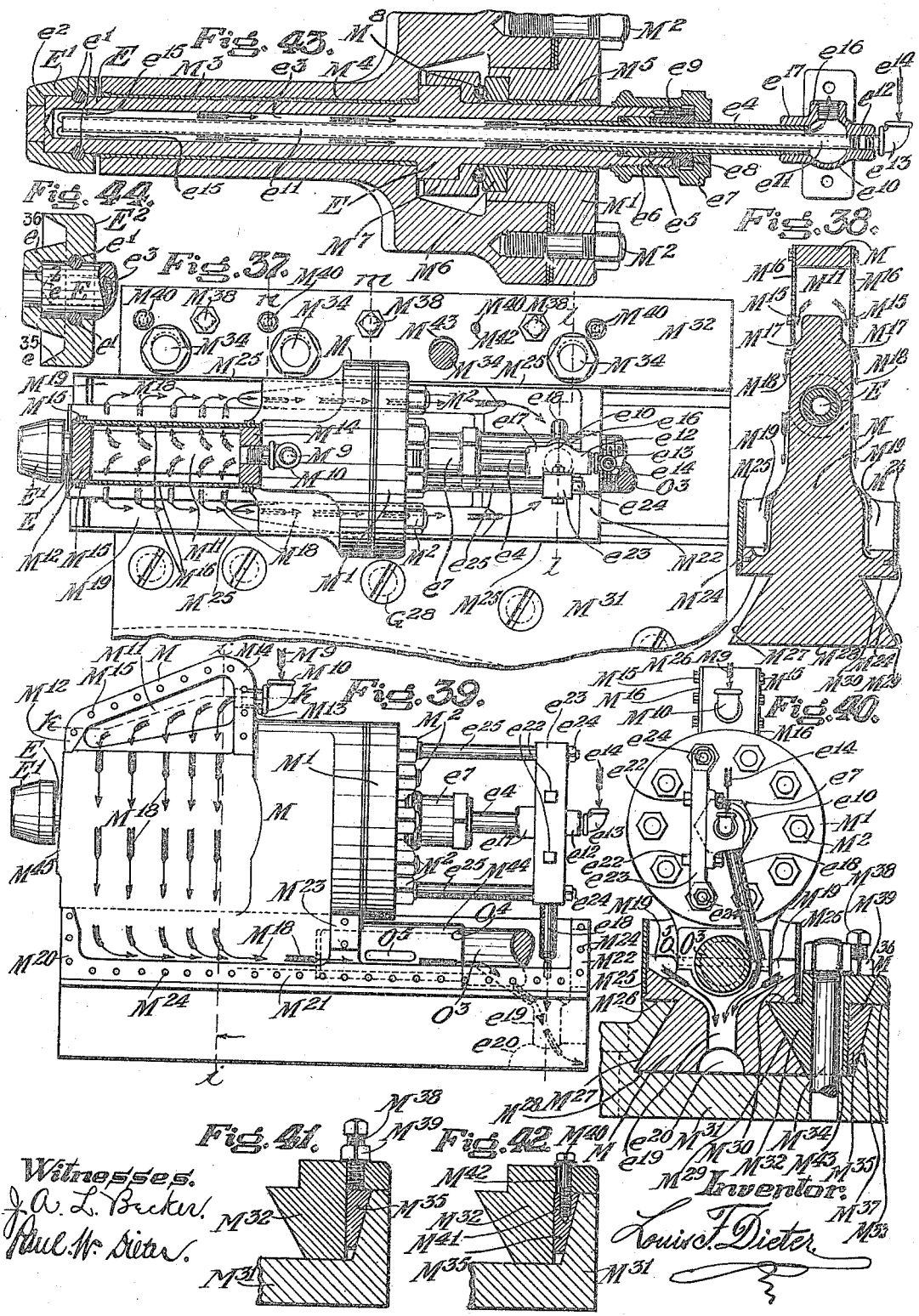

L. F. DIETER.
METHOD OF AND APPARATUS OR MILL FOR ROLLING OR FORMING CAR WHEELS OR OTHER CIRCULAR BODIES.
APPLICATION FILED JUNE 15, 1911.
1,243,050.
Patented Oct. 16, 1917.
21 SHEETS—SHEET 10.
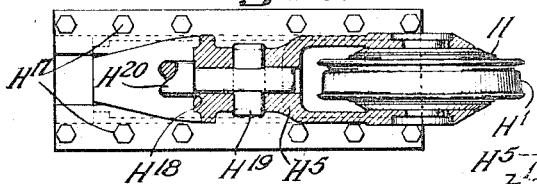
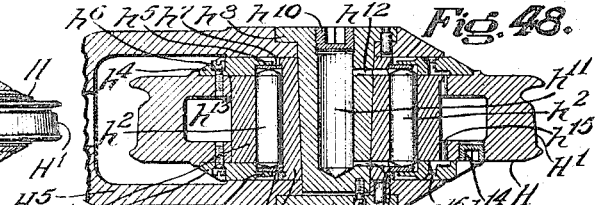
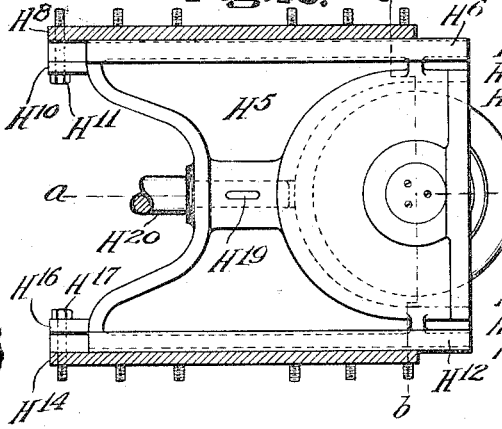
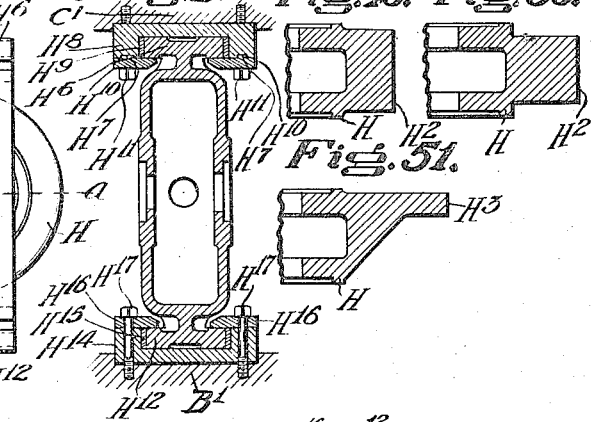
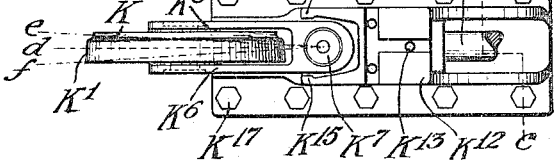
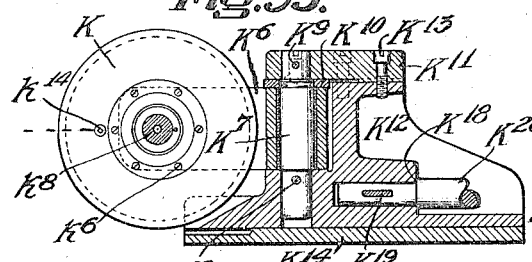
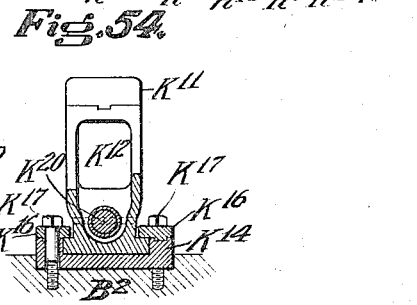
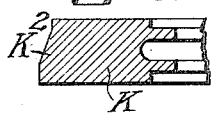
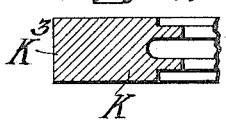
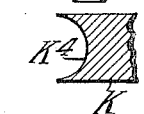
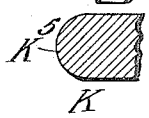
Witnesses.
J. A. L. Becker.
Paul W. Dieter.
Inventor:
Louis F. Dieter

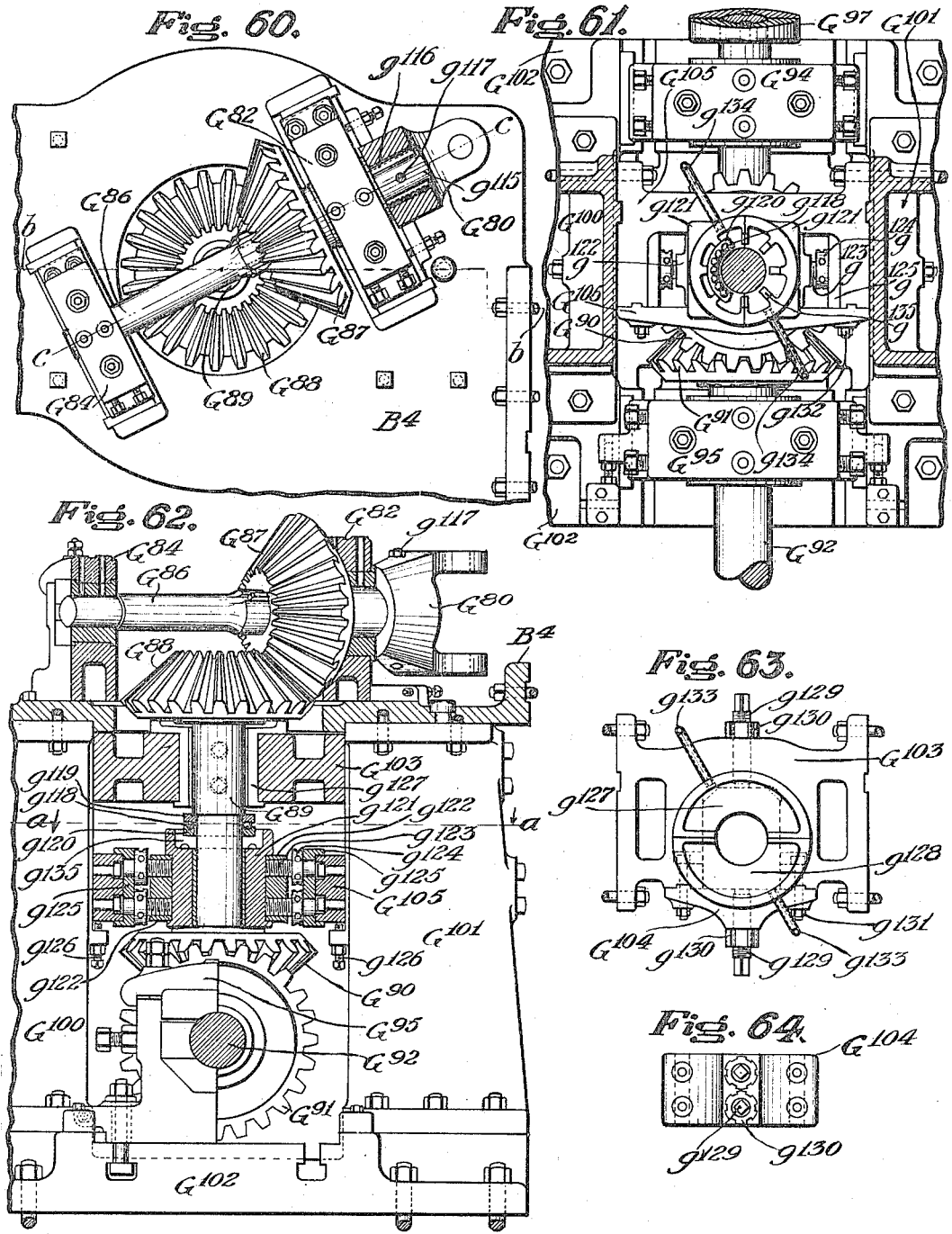

L. F. DIETER.
METHOD OF AND APPARATUS OR MILL FOR ROLLING OR FORMING CAR WHEELS OR OTHER CIRCULAR BODIES.
APPLICATION FILED JUNE 15, 1911.
1,243,050.
Patented Oct. 16, 1917.
21 SHEETS—SHEET 12.
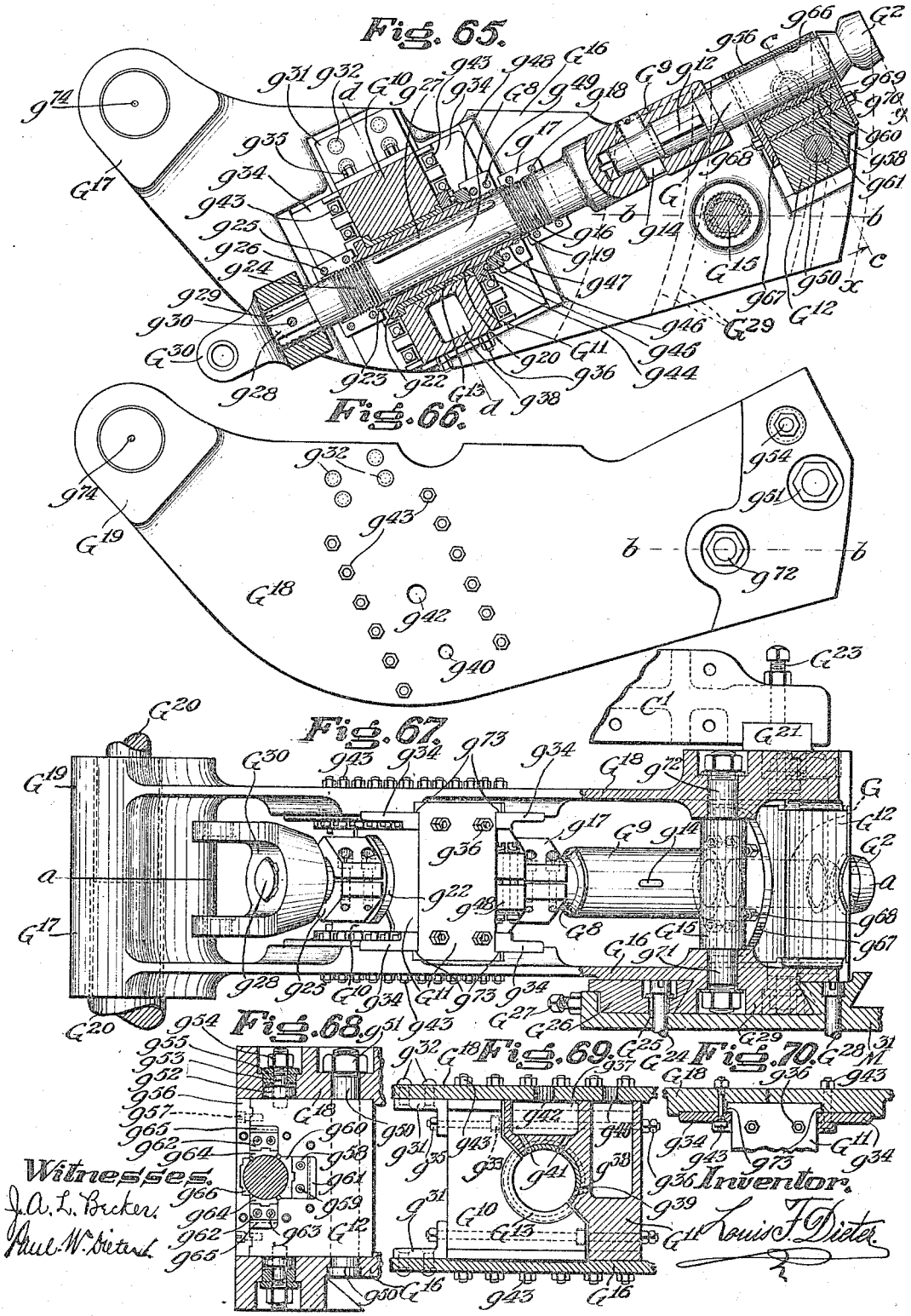

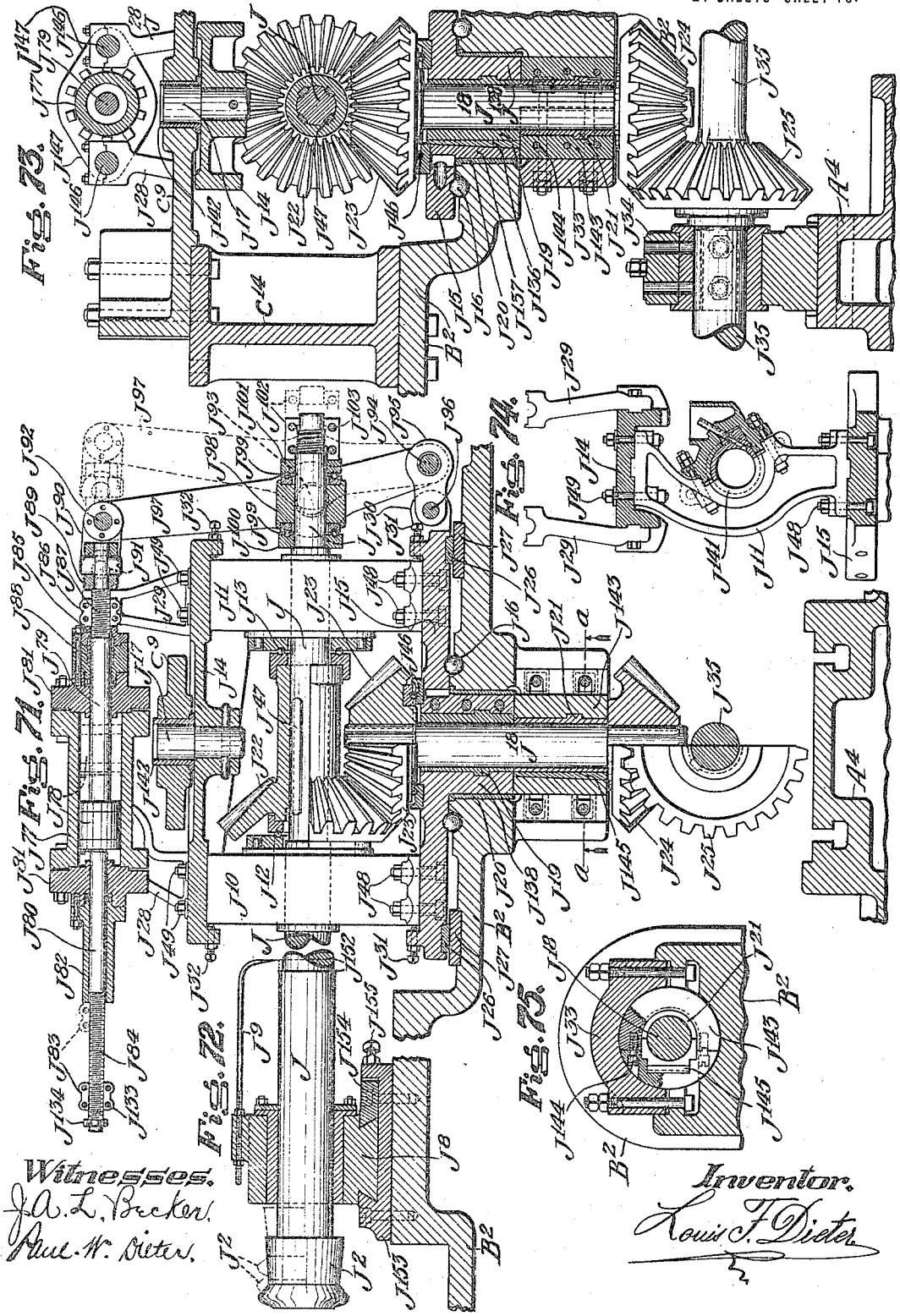

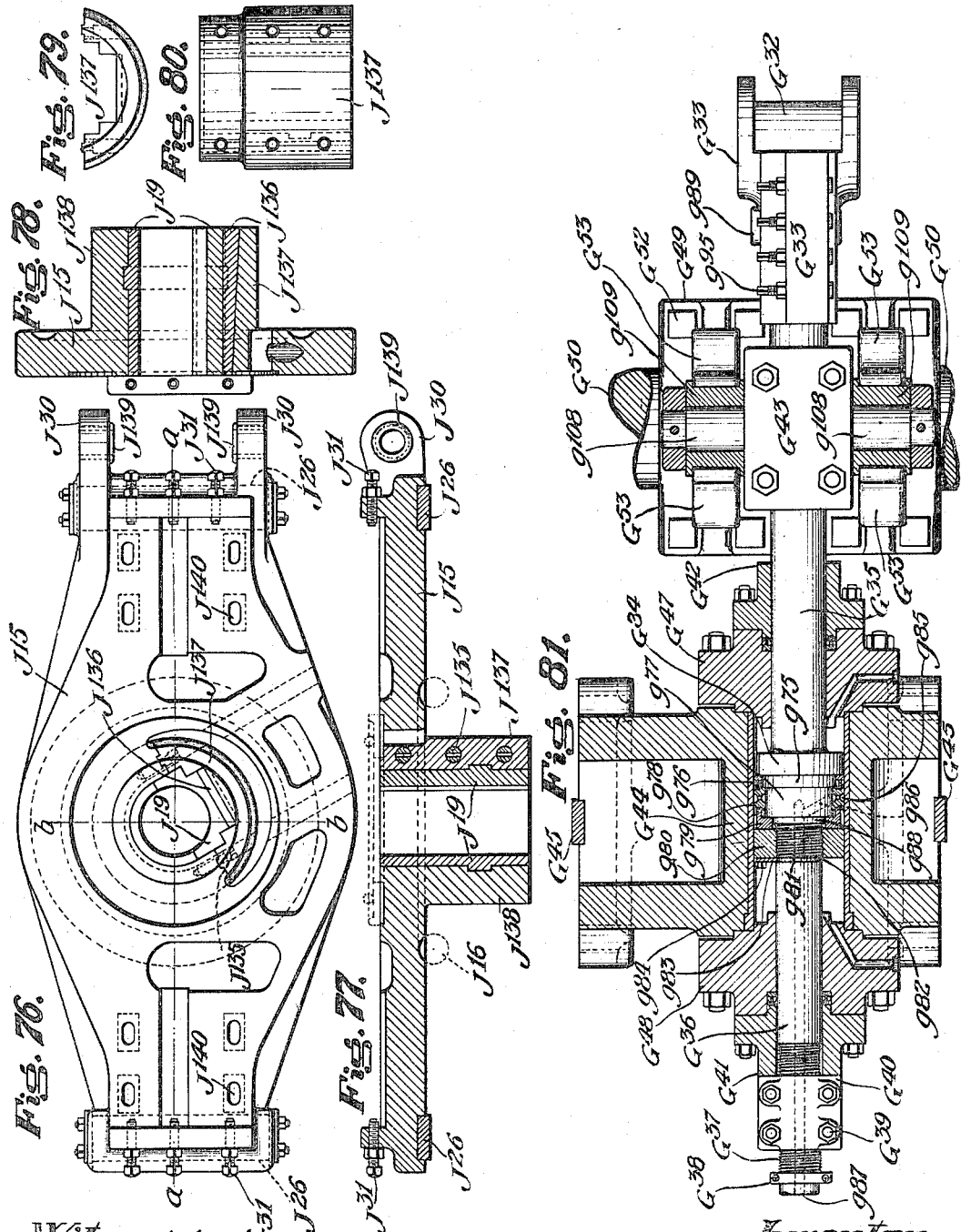

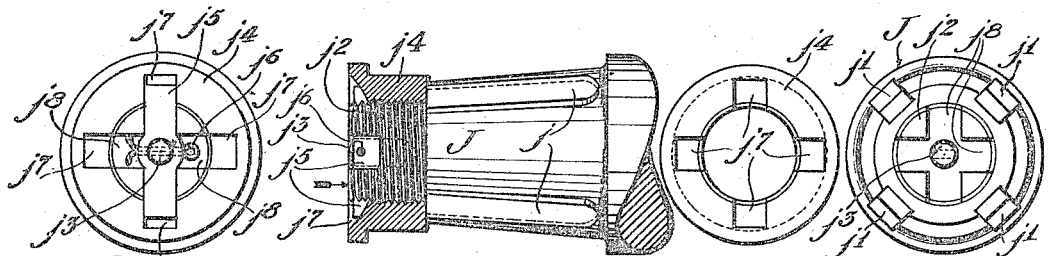
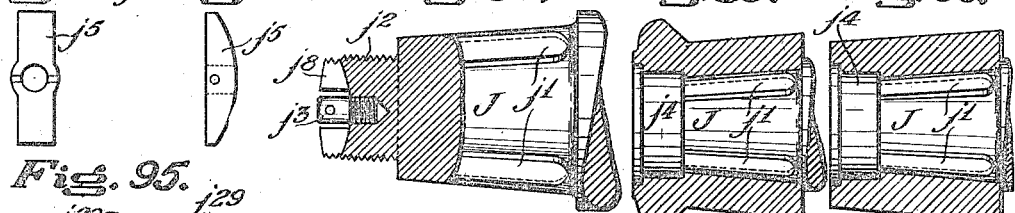
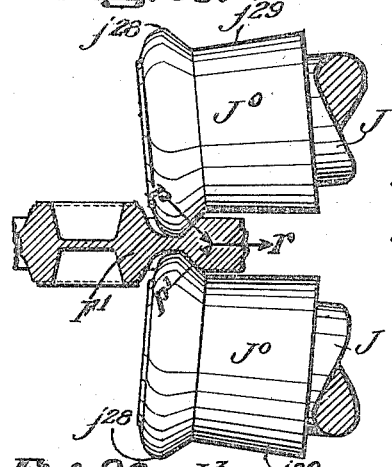
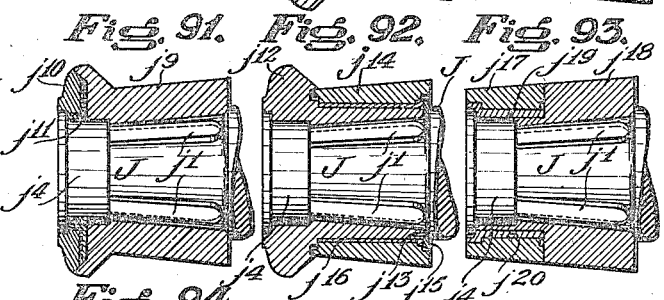
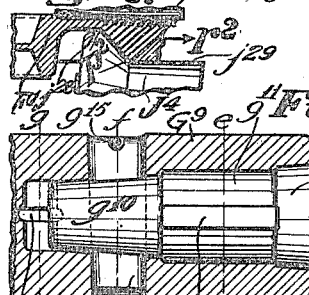
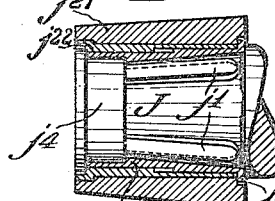
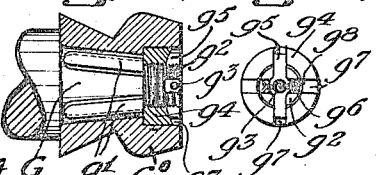
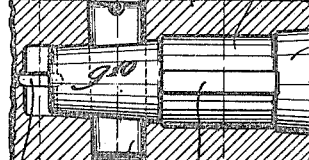
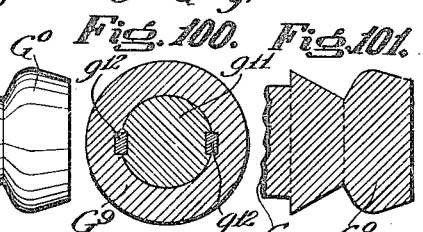

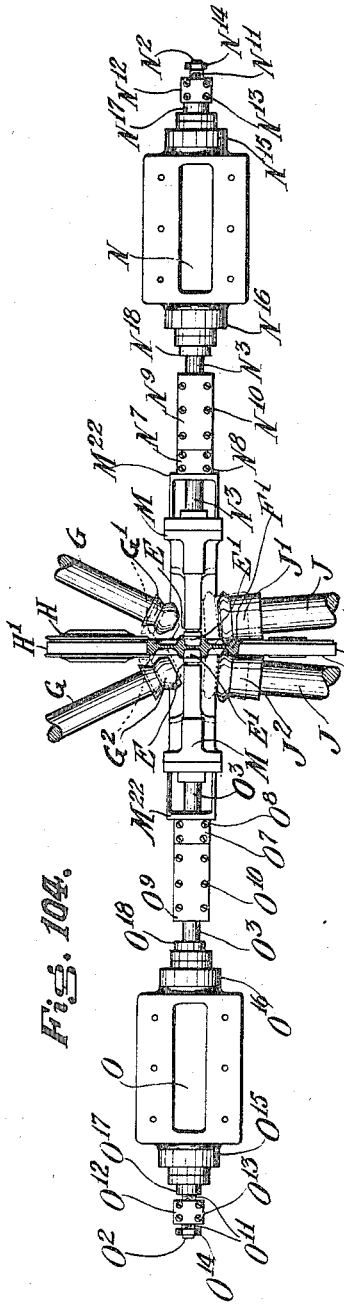
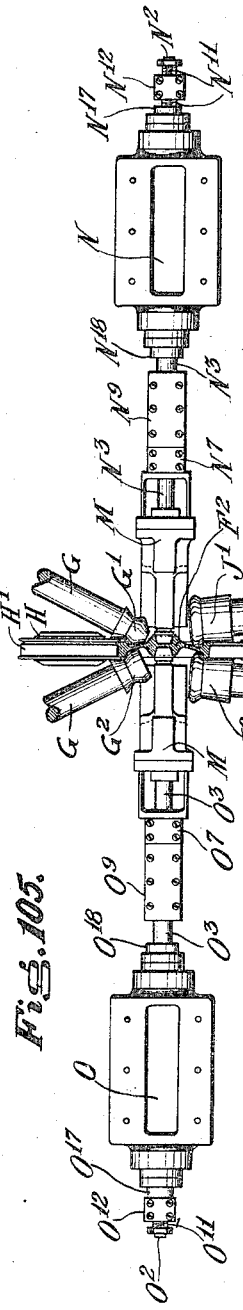
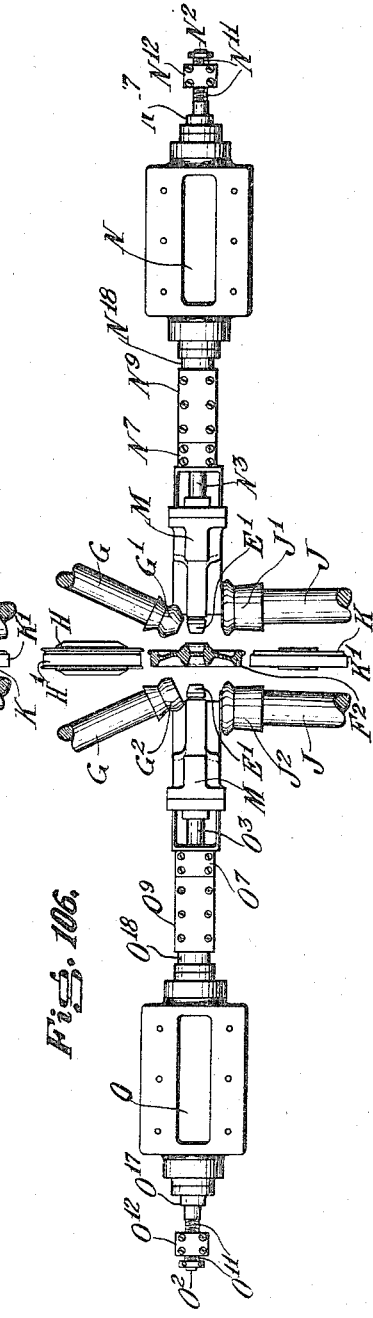

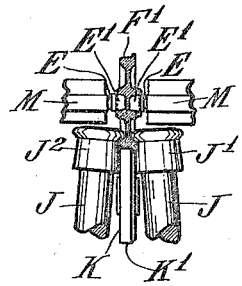
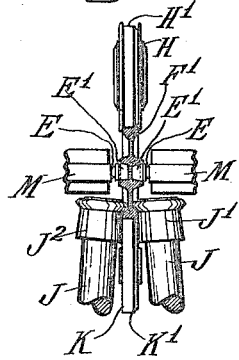
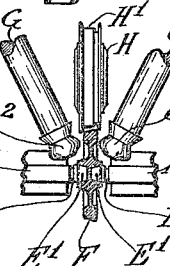
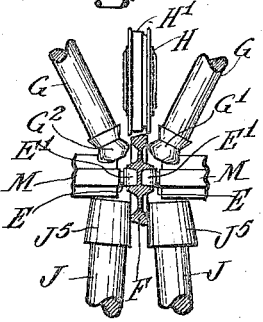
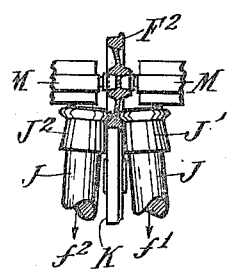
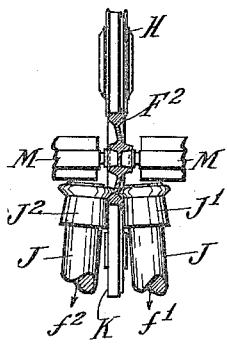
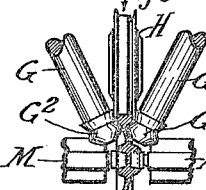
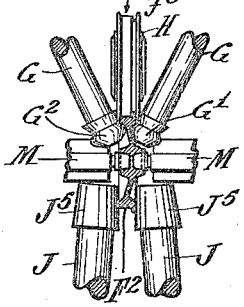
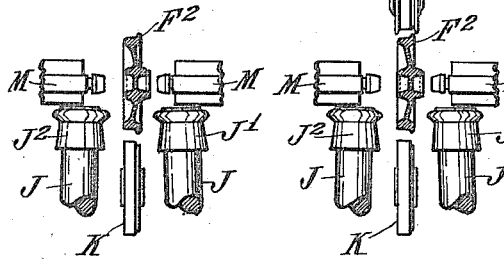
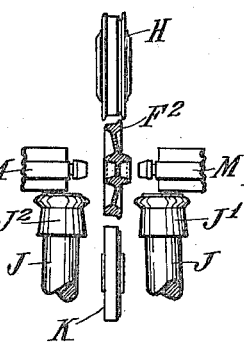
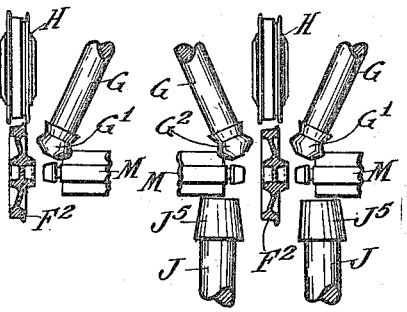
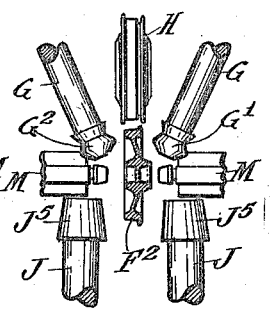

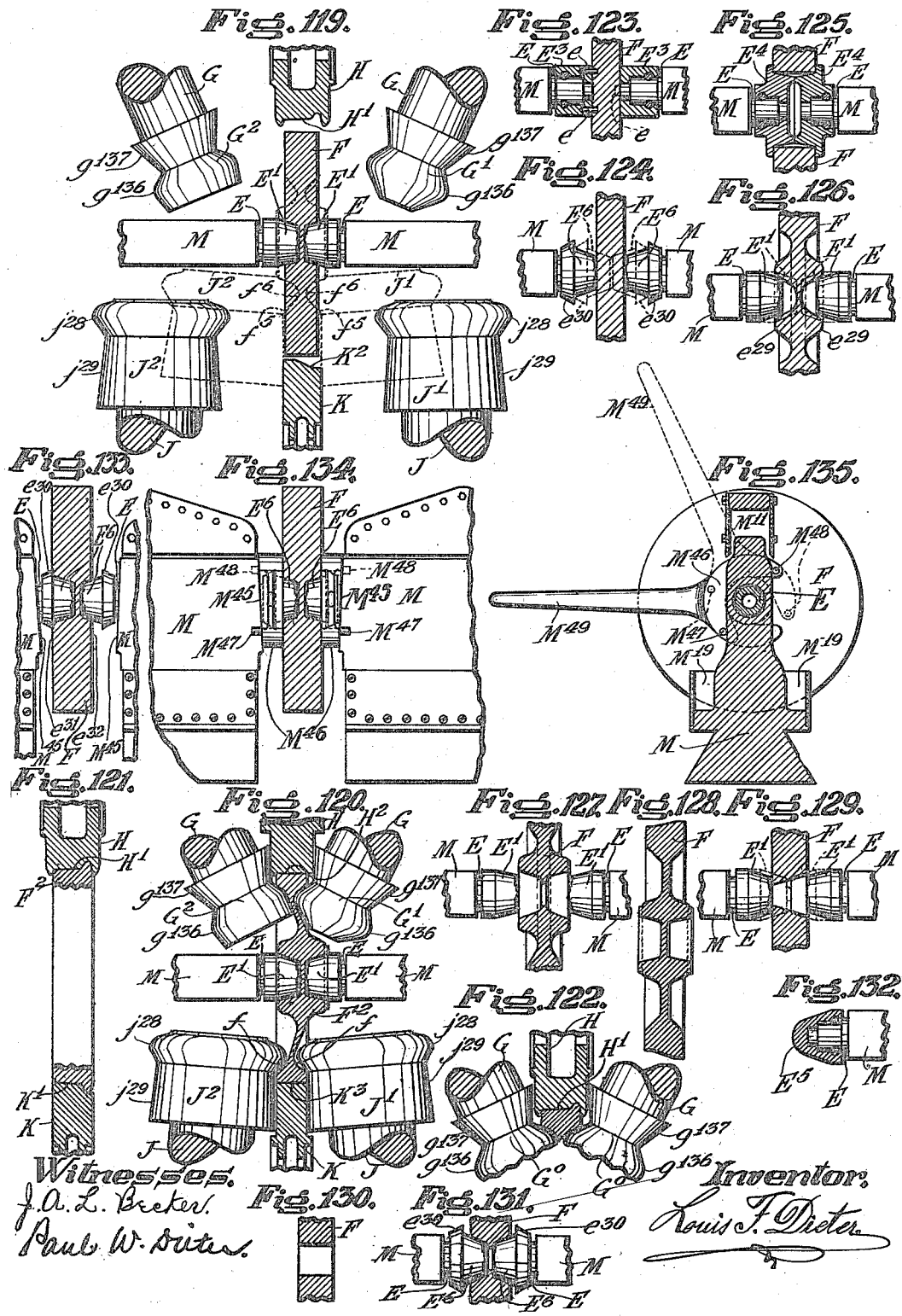

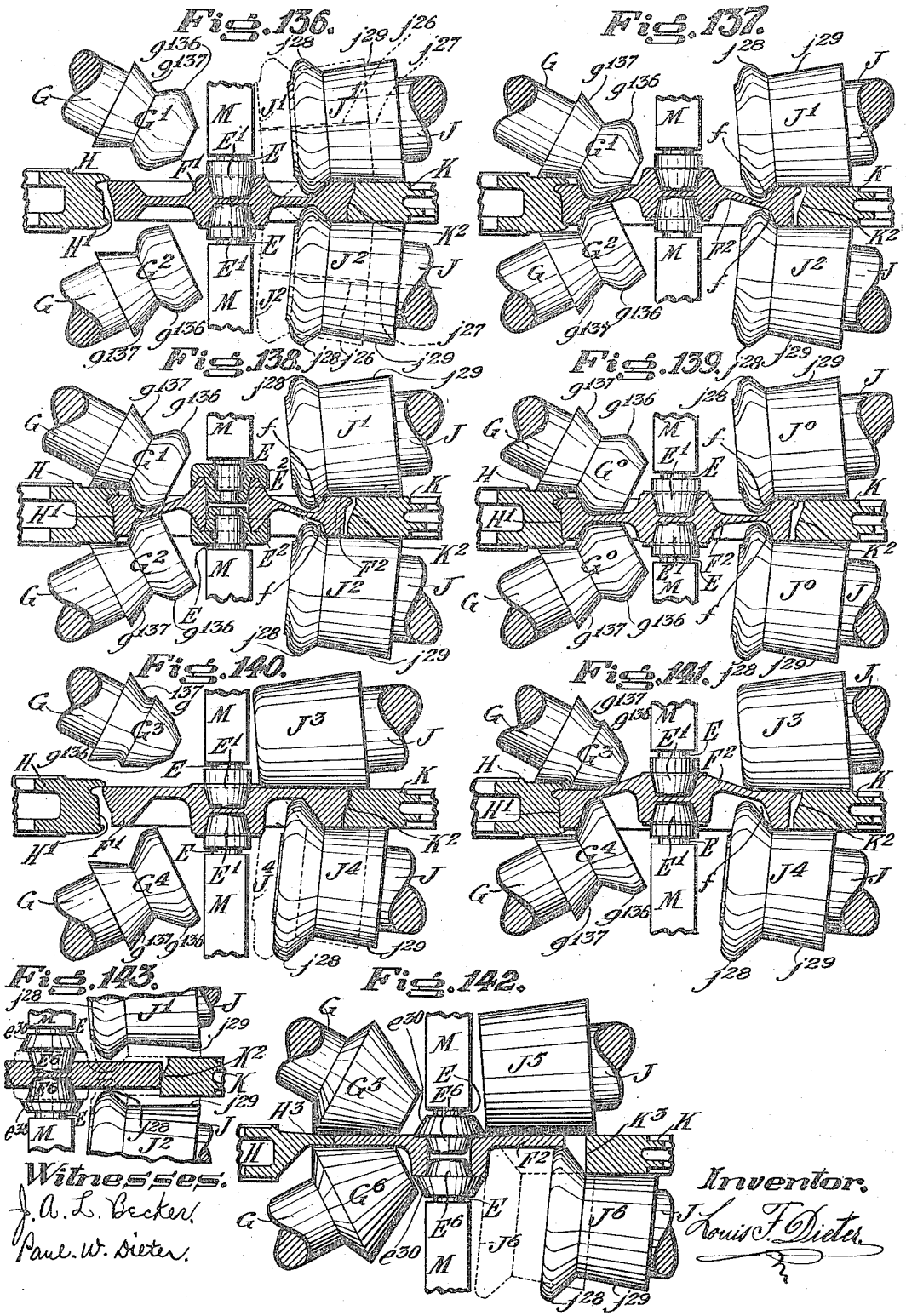

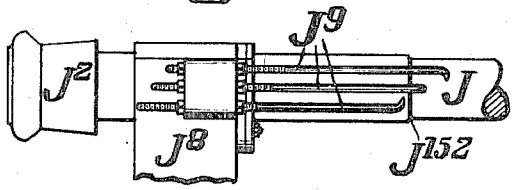
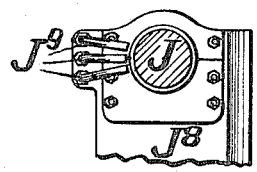
Fig. 144.    Fig. 145.
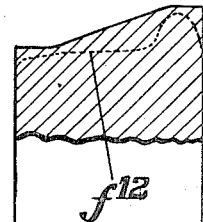 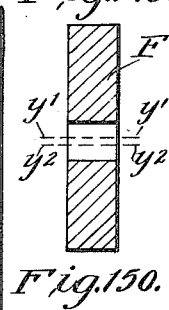 
Fig. 146.   Fig. 147.   Fig. 148.
Fig. 149.   Fig. 152.
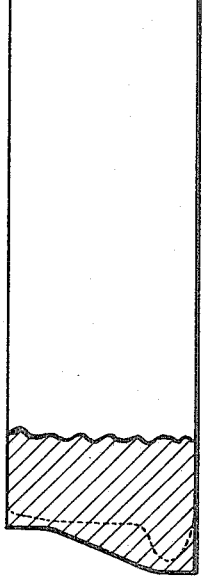 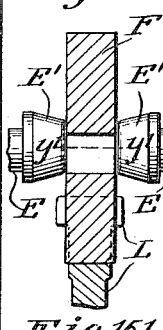 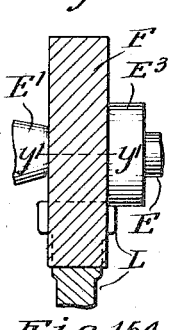
Fig. 150.   Fig. 153.
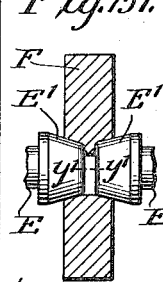 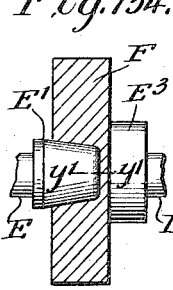
Fig. 151.   Fig. 154.

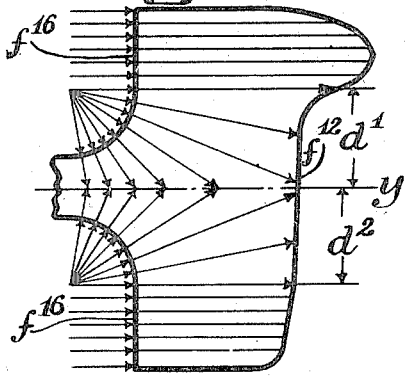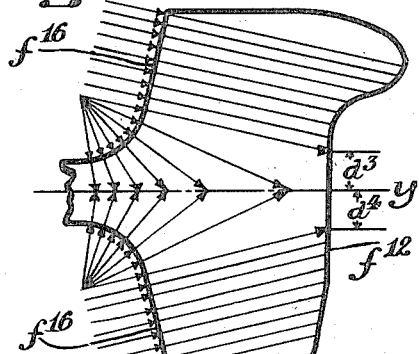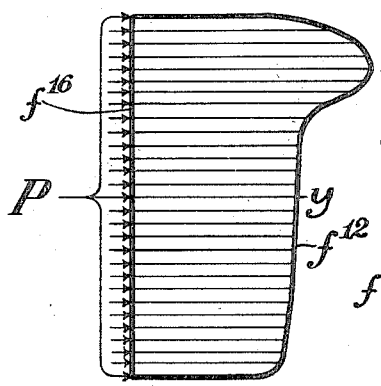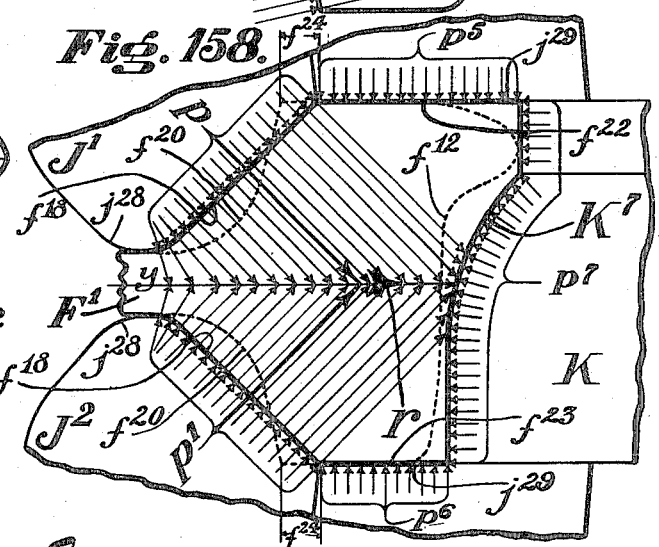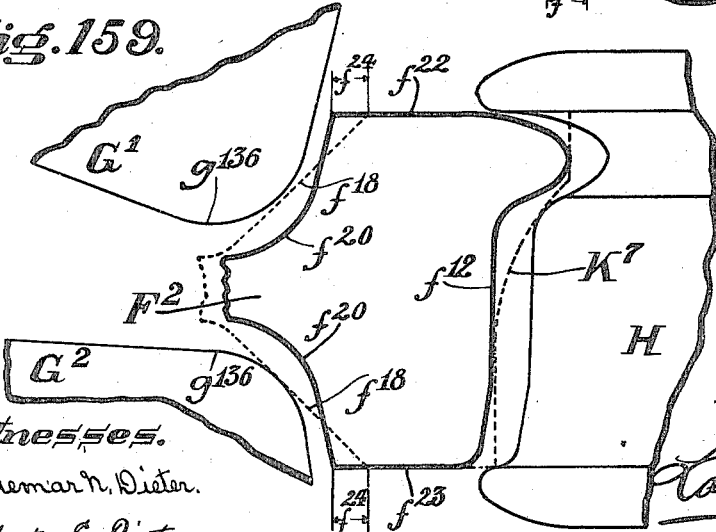

UNITED STATES PATENT OFFICE.

LOUIS F. DIETER, OF BUFFALO, NEW YORK.

METHOD OF AND APPARATUS OR MILL FOR ROLLING OR FORMING CAR-WHEELS OR OTHER CIRCULAR BODIES.

1,243,050.   Specification of Letters Patent.   Patented Oct. 16, 1917.

Application filed June 15, 1911. Serial No. 633,343.

*To all whom it may concern:*

Be it known that I, LOUIS F. DIETER, a citizen of the United States, residing at Buffalo, in the county of Erie and State of New York, have invented a novel and useful Method of and Apparatus or Mill for Rolling or Forming Car-Wheels or other Circular Bodies, of which the following is a specification, accompanied by twenty-one sheets of drawings.

My invention relates to a novel and useful method or process for the manufacture or the making of rolled car-wheels, disk-wheels or other circular bodies from properly heated ingots, blooms, blanks or other work-pieces as hereinafter more fully shown and described, and to rolling mills, particularly for the rolling of car-wheels, or similar bodies.

My invention further relates to the manufacture or the making of rolled car-wheels, rolled disk-wheels or other similar bodies in a manner different from that embodied in any previous process or methods, and to novel and useful means or devices and to novel and useful apparatus or mill wherein said means or devices are systematically arranged for rolling or forming such bodies, and such means or devices and apparatus or mill constructed in accordance with my invention involves a departure from mills of this character or kind heretofore used for rolling car wheels.

This invention is also described or partly described in and such features thereof not herein claimed are claimed in the following applications, viz.: Application for patent filed October 10, 1916, Serial No. 124,921; application for patent filed November 20, 1916, Serial No. 132,372; application for patent filed November 22, 1916, Serial No. 132,815; and application for patent filed January 10, 1917, Serial No. 141,558.

Objects of my invention are, to provide a novel method of centering or of piercing and centering properly heated ingots, blooms, blanks or other work-pieces and therefrom rolling and dishing car-wheels, disk-wheels, pipe-flanges or other similar bodies or articles; to provide and to arrange novel means or devices whereby may be carried out the various performances required in carrying out the centering or the piercing and centering and the rolling and the dishing, undishing and redishing processes, in rolling or forming such bodies or articles by my novel method, and which novel means or devices are embodied and systematically arranged in my novel apparatus or mill as herein shown in one form and described and which are; for instance; a novel centering or piercing and centering device whereby the ingot, bloom, blank or other work-piece is centered or pierced and centered in the center or approximately in the center of its outer portion or periphery, as hereinafter fully described; a novel device for cooling the piercers or work-supporting centers and their axles during the operation and thereby cooling the surface or surfaces of the center portion of the ingot, bloom, blank or other work-piece which are in direct contact with said piercers or work-supporting centers; a novel device for cooling the herein named work supporting heads or supporting heads which support said axles with their piercers or work supporting centers and with the work-piece and thereby cooling also the axles of said piercers or work supporting centers; a novel device by which the center portion of the work-piece, if so desired, is also put into a clamped condition laterally between the piercers or work supporting centers, as hereinafter more fully described, and by which the work-piece or its center portion can be moved axially while the same in said clamped condition is operated on; a novel edging and web-rolling device whereby the metal in the work-piece is caused to flow in the proper direction, as hereinafter more fully described; a novel web and inner rim or web; finishing rolling device; a novel tread or face rolling device; a novel tread or face finishing-rolling device; a novel device for supporting each of said tread or face rolls on a roller-bearing provided with efficient lubrication device; a novel device for supporting the herein named tread or face rolling roll and permitting lateral movement to said roll; a novel indicating device indicating the progressing or diminishing diameters of the work-piece, wheel or other article during the rolling process and also indicating when the wheel or other article is rolled to its finished diameter; a novel dishing, undishing, and redishing device, which device is adapted to be brought into action while the wheel or other work-piece is revolving or is rolled at its marginal or rim-portion; a novel raising, lowering and retaining device for putting the ingots, blooms, blanks or other work-pieces into the apparatus or mill and for removing the finished wheel or other finished article from the apparatus or mill and for retaining the properly heated ingot, bloom, blank or other work-piece in such position which brings the outer portion or periphery of said work-piece coaxial with the piercers or work supporting centers while centered or pierced and centered; a novel device to each set of the herein named web finishing rolls, to the herein named edging and web-rolling rolls and to the herein named tread or face rolls by which the said rolls in each of said sets may be moved either together or independent of each other, as hereinafter more fully described; a novel indicating device by which the radial position of the herein named edging and web rolling rolls from the center of the work-piece is indicated, or by which such rolls may be set to any desired radial position from the center of the work-piece, all while in operation; a novel device to each roll to enable such roll to be adjusted as desired; a novel device to each roll to adjust or limit as desired, the forward and the return movements of each roll, for moving positively each roll into and out of operative position and for retaining each roll in or out of operative position with the work-piece or wheel or other article; a novel device by which the herein named edging and web rolling rolls in addition to their lateral movement may also be axially shifted or moved at each side of the work-piece in a direction radial thereof, forward and backward as desired, which movements may be limited as desired; a novel device by which the herein named edging and web rolling rolls are moved at both sides of the work-piece laterally and each in a circular path having its center on the center line of the shaft of its roll and a proper distance back from the roll; a novel device by which the herein named web finishing rolls are moved at both sides of the work-piece each in a circular path having its center a proper distance away from the axis of the roll and its shafts and a proper distance back from the roll and by which the roll may be pulled back into such position away from the work-piece that will make it easy and convenient for inspection of the parts or to remove or exchange the rolls or to remove the shafts, &c.; a novel device for driving the herein named web finishing rolls and the herein named edging and web rolling rolls which enables the main driving gears and their shafts to be located below the floor and out of the way; a novel driving device by which the herein named web finishing rolls or the herein named edging and web rolling rolls may be run in either direction and may also be run at various speeds relative to each other and by which either set of said rolls may be disconnected from the main driving shaft of the apparatus or mill; also whereby this method and the said devices the cost of operation in the manufacture or the making of car wheels or other articles is enormously reduced, the product cheapened, the output increased, and the rim, flange and tread portions of car wheels made much stronger and much more durable.

A further object of my invention is to provide a method and an apparatus or mill whereby all the various performances required in the rolling or forming of car wheels, disk wheels or any other similar articles from ingots, blooms, blanks or other work-pieces, may either be all performed with one heat in one operation of the apparatus or mill, or, each of such performances or steps entering into the operation may be done singly or separately; as for instance, the ingots, blooms, blanks or other work-pieces may only be centered or pierced and centered and then removed from the apparatus or mill and stocked, to be rolled in the apparatus or mill at some future time; or, the ingots, blooms, blanks or other work-pieces may be rolled to such form or shape as may preliminarily be desired and then removed from the apparatus or mill and stocked, to be rolled and dished to their desired finished form or shape in the apparatus or mill at some future time; or, car wheels, disk wheels or any other similar articles which may not be required to be dished or wherein the dishing may be required to be done at some future time, may be completely rolled to their proper form or shape in the apparatus or mill without the dishing; or, car wheels, disk wheels or any other similar articles which were previously finished in the apparatus or mill, or which were previously finished by any other method and means but which were not dished, may be put into the apparatus or mill and therewith dished to any desired dish, and if so required may also be rolled true after the dishing is done.

A further object of my invention is to provide a novel method and means whereby in the centering or piercing and centering process, the piercers or work supporting centers may either be forced to equal depths at both sides of the ingot, bloom, blank or other work-piece, or may be made purposely to penetrate the ingot, bloom, blank or other work-piece more at the one side than at the other.

A further object of my invention is to provide a novel method and means whereby during the rolling process, the metal in the ingot, bloom, blank or other work-piece, may be made to flow either toward the center or hub-portion or toward the peripheral or rim portion thereof within the latter and peripheral thereto.

A further object of my invention is to provide a novel method and continually and automatically acting clamping means to prevent the work-piece from becoming loose between its supporting means. For instance, the metal in a properly heated work-piece is very soft in comparison with the metal when in its normal or cold condition and therefore it does not have the required resistance which is absolutely necessary for firmly supporting the work-piece and on which account the work-piece will become loose on its supporting means during the operating process against the work-piece if the work-piece would be centrally supported or held by means of screws or similar mechanism. To avoid this, I put the work-piece automatically into a continually clamped condition between its supporting means by applying constant pressure acting continually and automatically against the opposite ends of the hub or against the opposite sides of the center portion of the work-piece and thereby, the work-piece or wheel at its hub or center portion, while supported by the piercers or centers, is also automatically put into clamped condition, which prevents said hub or center portion from becoming loose on its supporting means and from being forced out of its true axial or central and desired lateral positions with respect to the marginal or rim portion of the work-piece or wheel during the rolling or operating processes, &c., and said constant clamping force or constant clamping pressure automatically and continually remains during said operating process. This constant clamping force or pressure is also retained when moving the work-piece or its hub or center portion axially in either direction while the same is so supported and so firmly clamped, all as hereinafter fully described.

A further object of my invention is to provide a novel method and means for rolling or forming the inner peripheral face or faces of the rim portion of the work-piece or wheel sufficiently inclined outwardly toward the outer peripheral face of the work-piece or wheel so that during the rolling or forming of the rim portion to rudimentary form the metal is caused to flow in the proper direction to assure compression of the metal in the rim portion to uniform or to practically uniform density, as for instance described with reference to Figs. 95, 96, and 158 and, for simultaneously therewith rolling the lateral sides of the rim to desired lateral thickness and the total peripheral face of the rim to beaked or rudimentary form, as and for the purpose described for instance with reference to the Figs. 146, 147 and 148 and diagrammatically illustrated in Figs. 158 and 159, thereby said metal in the rim and adjacent web portion is formed as and for the purpose abovesaid and at the same time is rolled simultaneously on all its surfaces by rolls situated in a plane passing laterally through said rim and web portion and, thereby compressing said metal on all its surfaces simultaneously to uniform and maximum density, or practically so, and at the same time the rim portion is rolled to said rudimentary form; the so rudimentarily formed rim portion being then rolled in the same apparatus or mill with the same heat to finished form, whereby its metal is still further condensed.

A further object of my invention is to provide a method and an apparatus or mill by which the properly heated ingot, bloom, blank or other work-piece may be centered or pierced and centered and therefrom and with the same heat a car-wheel or other circular article may be completely formed, and by which the time required in so forming car-wheels or other articles is much lessened and the cost of the making such wheels or other articles is enormously reduced.

A further object of my invention is to provide a method and an apparatus or mill wherein means or devices are systematically arranged, whereby a properly heated ingot, bloom, blank or other work-piece of proper thickness and volume and either pierced, centered or solid, or previously formed by any method and means into any form or shape such for instance as herein disclosed, or similar thereto, may be taken into the apparatus or mill and therein during one operation may be centered or pierced and centered in the center of its outer portion or periphery and completely rolled and be either dished or be not dished into the form or shape of a car wheel or other article, and then the so finished rolled car wheel or other article removed from the apparatus or mill; and, whereby the piercers or work-supporting centers remain on their axles in the apparatus or mill and are not removed with the finished car wheel or other finished article.

A further object of my invention is to provide a method and an apparatus or mill wherein means or devices are systematically arranged, whereby during the rolling process, the diameter of the ingot, bloom, blank or other work-piece may either be increased, decreased or may remain about the same, as the case may be; and, whereby may be formed the hub-portion, the web portion, the rim-portion, and the flange and tread-portion of a car wheel or other article by rolling and during rolling be also formed into either dished or undished form; and whereby car wheels or other articles may be rolled to a true circle of the desired diameter and width; and whereby the finished car wheel or other finished article after being bored and fitted or forced to the axle or shaft, may be practically balanced.

A further object of my invention is to provide a method and an apparatus or mill wherein means or devices are systematically arranged, whereby worn car wheels may be rerolled or reworked and dished, undished or redished either to their original form and diameter or to other circular or similar form and to a diameter either smaller or larger than the diameter of the worn wheel; and whereby may also be so rerolled or reworked and dished, undished or redished any other previously formed wheel or other previously formed body or article; and whereby the central hole or bore of such worn car wheel or other body may either be reduced or be made larger so that the same may be rebored to the diameter of its original bore or may be made larger.

A further object of my invention is to provide a method and an apparatus or mill wherein means or devices are systematically arranged, whereby car wheels, disk wheels, pipe flanges or other circular or similar bodies or articles may be rolled and dished either with use of all the rolls, or only with use of the herein named edging and web rolling rolls and the tread or face rolling roll; or, only with use of the herein named edging and web rolling rolls, tread or face rolling roll and tread or face finishing roll; or, only with use of the herein named web finishing rolls and tread or face finishing roll; or, only with use of the herein named web finishing rolls, tread or face finishing roll and the herein named edging and web rolling rolls; and, wherein the rolls and their various devices or means for operating them, are so arranged for carrying out the rolling with either all the rolls, or only with such above-said rolls, and which arrangement is also so provided for the purpose that said apparatus or mill consists actually of two mills made in one and of which each one of said mills may be operated and used separately or independently of the other mill, which other mill will not, in such case, be used, and wherein said two mills are located one at each side of the work-supporting centers and dishing-device; and wherein one of said mills is herein named the roughing mill or the roughing side of the apparatus or mill, although car wheels, disk-wheels, pipe flanges or other articles may be rolled therewith to the finish, and consists of the herein named edging and web rolling rolls and tread or face roughing roll, and, the other of said two mills is herein named the finishing mill or finishing side of the apparatus or mill and consists of the herein named web finishing rolls and tread or face finishing roll, and, wherein the centering or the piercing and centering and the work supporting and dishing device and also the raising, lowering and retaining device are all located at the center and between said two mills and may all be used with either of said two mills or with the whole apparatus or mill, as the case may be.

A further object of my invention is to provide a method and means whereby the piercers or work-supporting centers are removably attached to their axles, and whereby the ingot, bloom, blank or other work-piece or wheel, &c., together with said piercer or work supporting centers and axles is revolubly supported during the rolling and dishing processes and after which processes said piercers or work-supporting centers are entirely removed from the finished wheel or other finished article, which is then removed from the apparatus or mill; and, whereby said piercers or work-supporting centers may be exchanged for any other formed or shaped piercers or work-supporting centers, and which work-supporting centers may either be of male or of female form, or may be formed and used also, as for instance, a female die for compressing for instance the hub-portion of car wheels or other articles and thereby may make its previously formed hole or bore smaller in diameter.

A further object of my invention is to provide a novel method and means whereby the mandrel of each of the herein named web finishing rolls is removably fastened to the socket portion end of its driving shaft, and whereby said rolls may either be formed in one piece with said mandrel or be removably fastened to such mandrel.

A further object of my invention is to provide a novel method and means whereby each of the herein named edging and web rolling rolls is removably fastened or attached to the end of its shaft, and whereby each of said rolls may either be removably fastened or attached to its shaft in such a way that the whole roll may be driven by its shaft or that only part of the roll may be driven by its shaft and the other part of the roll be permitted to turn loose, or the whole roll may not be driven but be permitted to turn loose on a journal removably attached to the end of its shaft.

A further object of my invention is to provide a novel method and means whereby the ingot, bloom, blank or other work-piece for a flanged car wheel at its peripheral surface may also during the rolling process be first beaked or rolled partly conical, as hereinafter fully explained, and where out of such beaked or conical shape is then rolled the flange and tread of the car wheel, and by which process the metal at the flange, tread and rim-part of the car wheel is made much stronger and much more durable.

Further objects of the invention will hereinafter appear.

In the accompanying drawings, Figure 1 is a plan view of one form of my novel apparatus or mill for carrying out my invention with the cylinders of the shifting mechanism shown in central section and with the indicator dials for the tread or face rolls removed, showing also in central section a flanged car wheel rolled and dished with the rolls at the end of the rolling and dishing process. Fig. 2 is a sectional plan view of that part of the apparatus or mill below the main bed-plate. Fig. 3 is an enlarged horizontal section showing one of the ends of one of the pressure equalizing rods and the manner of connecting the same to one of the rocking cranks. Figs. 4 and 5 are sectional side elevations looking in the direction of the arrows $a$ and $b$ Fig. 1. Figs. 6 to 9 inclusive, are details of bearings to vertical shafts. Fig. 10 is an enlarged sectional plan view of part of the finishing side of my apparatus or mill, showing in central section one half of a flanged car wheel rolled and dished with the finishing rolls and the piercers or work-supporting centers in their position at the end of the dishing and rolling process. Figs. 11 to 16 inclusive, are details of parts of the said finishing side of the apparatus or mill. Fig. 17 is an enlarged sectional plan view of part of the roughing side of my apparatus or mill, showing in central section one half of an ingot, bloom or other work-piece having been rolled in the apparatus or mill or otherwise given the shape of an undished flanged car wheel as shown, and with the herein named edging and web rolling rolls, the tread or face rolling roll and the piercers or work-supporting centers in the positions they assume at the beginning of the dishing process. Figs. 18 to 27 inclusive, show in details the raising, lowering and retaining device. Figs. 28 to 32 inclusive, show details and arrangement of the pressure, moving and equalizing device for the tread or face rolls and also show details and arrangement of the device for indicating the diameters of the work-piece or wheel during the rolling process. Figs. 33 to 36 inclusive, are enlarged sectional plan views showing the novel arrangement of the main driving shaft and gears. Figs. 37 to 44 inclusive are enlarged sections, views, and details of my novel work-supporting device with their piercers or work-supporting centers and the novel cooling devices and also showing its connection to the pressure moving device. Figs. 45 to 51 inclusive, show in details the tread or face finishing roll and its supporting head and connections therewith. Figs. 52 to 59 inclusive, show in enlarged details the tread or face rolling roll and its supporting head and connections therewith. Figs. 60 to 64 inclusive, show in details part of the driving mechanism for the web finishing rolls of the finishing side of the apparatus or mill. Figs. 65 to 70 inclusive, show details of one of the oscillating supporting frames for the shaft of one of the web finishing rolls. Figs. 71 to 80 inclusive, show in details one of the oscillating frames, the manner of supporting, guiding, positioning and shifting one of the shafts having an edging and web rolling roll, the gage or indicator for the rolls and the driving mechanism for said shaft. Fig. 81 shows details of the pressure cylinder for one of the web finishing rolls, and also part of its connections to the equalizing pressure device. Figs. 82 to 94 inclusive, are details concerning the connections, &c., of the edging and web rolling rolls with the ends of their shafts. Figs. 95 and 96 illustrate the flow of the metal in the outer or rim portion of a work-piece during the rolling process as hereinafter fully described and also show some of the various shapes of the edging and web rolling rolls in position against the work-piece. Figs. 97 to 103 inclusive, are details concerning the connections of the web finishing rolls with their shafts. Figs. 104 to 106 inclusive, illustrate with part of my novel apparatus or mill, my novel method and devices or means for centering or for piercing and centering, for rolling, and for dishing, for instance, flanged car wheels; therein an ingot, bloom, blank or other work-piece may be centered or pierced and centered, and rolled and dished with the use of all the rolls of the apparatus or mill as herein shown and described; and, Figs. 107 to 118 inclusive, illustrate modifications of my method and of my apparatus or mill. Fig. 119 shows a blank pierced and centered with the piercers or work-supporting centers having for instance the form as shown and therewith held in position ready to be rolled; therein are also shown the rolls in the position they will occupy during the time the ingot, bloom, blank or work-piece is put into the apparatus or mill or when the finished wheel or other article is removed. Fig. 120 shows for instance, a finished disk-wheel such as used for tired car wheels, rolled and dished by my novel method in the apparatus or mill, and with the rolls and piercers or work-supporting centers in the position they occupy at the end of the rolling and dishing processes. Fig. 121 shows the flange and tread portion of a car wheel, rolled with the tread or face finishing roll provided with the rolling surface as shown and with tread or face rolling roll provided with the rolling surface, as shown. Fig. 122 is another illustration of rolling with the finishing rolls. Fig. 123 shows for instance, the center part of a blank for an article which should not have a large impression or hole, and flat work-supporting centers provided with pins as shown are used. Fig. 124 shows for instance, the center part of a blank in position ready to be pierced and centered. Fig. 125 shows also only part of a blank or other work-piece which is provided with a big hole as shown, for such work the piercers or work supporting centers will be exchanged for the centers shown. Fig. 126 shows the center or hub-part of the body of an ingot, bloom or other work-piece having the form or shape as shown, and in position to be centered or pierced and centered. Fig. 127 shows the center or hub-part of a work-piece about to be centered or pierced and centered. Fig. 128 shows, for instance, an ingot, bloom or other work-piece having the form or shape shown or having been rolled to the form or shape shown. Fig. 129 for instance, shows the center-part of a blank provided with a conical hole as shown and in position ready to be centered or pierced and centered. Fig. 130 shows the center part of a blank provided with a cylindrical hole, and in Fig. 131 is shown the said blank centered or pierced and centered. Fig. 132 shows for instance another form of the piercers or work-supporting centers. Figs. 133 to 135 inclusive, illustrate my novel method and part of the device or means for centering or for piercing and centering ingots, blooms, blanks or other work-pieces. Figs. 136 to 143, illustrate a few more various examples of rolling and rerolling car wheels of various forms or shapes, for rolling pipe flanges or like articles and for forming the center or hub-part of wheels or other articles by my novel method and devices or means with my apparatus or mill; therein are also shown, for instance, some more various shapes of the rolls and work-supporting centers. Figs. 144 and 145 show three gage rods, for each of the edging and web rolling roll shafts. Fig. 144 is a plan view of Fig. 72 with the exception that in Fig. 72 one gage rod only is shown. Fig. 145 is an end view of Fig. 144 with the shaft shown in section. Figs. 146, 147 and 148, show the flange and tread portions of car wheels and are diagrammatic views illustrating several ways of "beaking." Figs. 149, 150 and 151, illustrate more fully the centering or piercing and centering of an ingot, bloom, blank or other work-piece, and the use therein of said raising, lowering and retaining device, hereinafter fully described. Figs. 152, 153 and 154, illustrate more fully the centering or piercing and centering of an ingot, bloom, blank or other work-piece, at one side only, and the use therein of said raising, lowering and retaining device, hereinafter fully described. Figs. 155 to 159 inclusive are sections of the rim portion of car wheels illustrating diagrammatically the flow of metal caused by various forms of rolls, hereinafter fully described.

Similar characters of reference indicate corresponding parts throughout the several views.

$A^1$ $A^2$ $A^3$ and $A^4$ are the lower bed or base plate parts, forming the lower sole or base bed plate part, rigidly bolted together as shown and embedded into concrete foundations D and rigidly bolted thereto. $A^5$ is the foundation-box supporting the herein named raising, lowering and retaining device, and is also embedded into said concrete foundation and bolted thereto as shown. $B^1$ and $B^2$ are main bed-plate parts, forming the main base or bed-plate (each of said $B^1$ and $B^2$ may consist of several parts) rigidly bolted together and partly supported by the walls of said concrete foundation D and by uprights, as shown. The side $B^1$ of the bed-plate is for the herein named finishing mill or finishing side of the apparatus or mill, and the side $B^2$ of the bed-plate is for the herein named roughing mill or roughing side of the apparatus or mill. $B^4$ $B^4$ are the upper plates of the frame-work for the shafts and gears, connecting the lower driving shaft with the upper shafts of the herein named finishing side of the apparatus or mill, these upper plates are also rigidly fastened to the main bed plate part $B^1$ as shown in the Figs. 1 and 5. $C^1$ to $C^{10}$ inclusive, are upper bed plate parts, forming the upper part of the bed plate and serving also as tie-plates or tie-connections and are rigidly fastened together, and to the parts $C^1$ $C^2$ and $C^3$ are rigidly fastened the upper ends of the uprights and also the upper sides of the pressure cylinders of the mechanism of the herein named finishing mill or finishing side of the apparatus or mill; and to the parts $C^4$ $C^5$ $C^6$ $C^7$ $C^8$ and $C^9$ are rigidly fastened the upper sides of the pressure cylinders, the bed plate connecting parts and the frame work supporting the upper trunnions of the herein named oscillating frames of the driving and the shifting mechanism for the herein named edging and web rolling rolls, of the herein named roughing mill or roughing side of the apparatus or mill. The part $C^{10}$ may more particularly be termed a "tie-piece" and it is rigidly fastened as shown to the tie-plates $C^4$ and $C^5$. $C^{11}$ and $C^{12}$ are parts connecting main bed plate part $B^2$ to the upper bed plate parts $C^6$ and $C^8$. $C^{13}$ and $C^{14}$ are parts connecting the main bed plate part $B^2$ to the upper bed plate parts $C^4$ $C^5$ and $C^9$. D are the foundations and its walls as shown, supporting the apparatus or mill, and as herein shown are conveniently formed of concrete, but any other suitable construction and material other than shown and described may be used for said foundation and its walls. E are partly hollow spindles or axles with cooling device, named herein the work supporting axles, these axles also serving other purposes as hereinafter fully described. At one end of said axles are removably fastened thereto the herein named piercers or work-supporting centers. These piercers or work supporting centers also serve other purposes, as is hereinafter fully described. $E^1$ $E^2$ $E^3$ $E^4$ $E^5$ and $E^6$ show, for instance, different shapes of the herein named piercers or work supporting centers, there being practically no limit to the shape that said piercers or centers may have.

F, $F^1$ and $F^2$ represent the work-piece, from some of the many various forms or shapes it may have when put into the apparatus or mill to some of the many various forms or shapes which the finished article or product may have; as for instance, F represents the ingot, bloom, blank or other work piece in a few of the many various forms or shapes it may have when put into the apparatus or mill, either solid, as for instance, F in Figs. 123 and 124; or previously formed or pierced, as for instance, F in Figs. 129 and 130; or having a central hole, as for instance, F in Figs. 125, 127, 129 or 130; or as $F^2$ in the Figs. 138 or 142; or previously formed into form or shape, as for instance, F in Figs. 113, 116, 126, 127 or 128; or previously cast into any suitable form or shape, as for instance, F in the Figs. 113, 116, 126, 127 or 128; or it may be a previously formed or rolled car wheel or other previously formed body, to be rerolled, as for instance, the work piece shown in dotted lines in the Fig. 138 which has been rerolled to the form or shape $F^2$ from the size therein indicated by said dotted lines. Such previously rolled or otherwise formed car wheel or other article to be rerolled or reworked in my apparatus or mill may also have any of the forms or shapes shown at $F^2$ in the Figs. 120, 137, 138, 139, 141 or 142; or as at $F^1$ in the Figs. 136 or 140. There are a good many forms or shapes that the ingot, bloom, blank or other work piece or previously finished article may have when put into my apparatus or mill, as will appear from the matter hereinafter more fully described; or as for instance $F^2$ which represents the finished article or finished product from my apparatus or mill, either dished or not dished.

G G are the shafts which have at their one end the herein named web finishing rolls, which are either removably fastened thereto or made integrally therewith, as shown, for instance, in the Figs. 65, 97, 98 and 101 and as will hereinafter be more fully described.

$G^0$ $G^0$ and $G^1$ $G^2$ and $G^3$ $G^4$ and $G^5$ $G^6$, for instance, are sets of different shapes of the herein named web finishing rolls. Each set may have the shape as, for instance, $G^0$ $G^0$ in Figs. 122 and 139, or each set of rolls or each roll of such set may have a different shape, as for instance, $G^1$ $G^2$ in Figs. 1, 10, 28, 104, 113, 116, 119, 120 and 136 to 138 inclusive; or as, for instance, $G^3$ $G^4$ in Figs. 140 and 141; or as, for instance, $G^5$ $G^6$ in Fig. 142. These rolls are interchangeable; that is, to roll wheels having the form or shape as shown, for instance, by $F^2$ in the Figs. 137 and 138, the set of rolls having shapes as $G^1$ $G^2$ are used, but to roll wheels having the form or shape as shown, for instance, by $F^2$ in Fig. 141, the said set of rolls $G^1$ $G^2$ are removed and the set of rolls having the shapes shown at $G^3$ $G^4$ in said Fig. 141 are put in place of said rolls $G^1$ $G^2$, and so on; that is, for every different shape or form the finished wheel or finished product may require there may also be used a set of rolls having a different shape or shapes. There are a great many other shapes or forms that the finished product and said web finishing rolls may have, as will appear from the matter hereinafter more fully described.

H is the herein named tread or face finishing roll, turning loose on a roller bearing and is interchangeable thereon as shown in the Fig. 48 and hereinafter more fully described; the peripheral or rolling face of this roll may have many different shapes, as for instance, $H^1$ in the Figs. 45, 48, 104, 110, 113, 116, 119, 121, 122 and 136 to 141 inclusive; or as $H^2$ in the Figs. 49, 50 and 120; or as $H^3$ in the Figs. 51 and 142. There are a great many other shapes the peripheral or rolling face of said tread or face finishing roll may have, as will appear from the matter hereinafter more fully described.

J J are the roll shafts which have at one end the herein named edging and web rolling rolls, these rolls are either removably attached to said shafts in such a way that the whole roll may be driven by the shaft, as shown, for instance, in Figs. 89 and 90; or only part of the roll may be driven by the shaft and the other part be permitted to turn loose, as shown, for instance, in Figs. 91, 92 and 93; or the whole roll may be permitted to turn loose on a journal removably fastened to said shaft, as shown, for instance, in Fig. 94, all of which will hereinafter be more fully described.

$J^0$ $J^0$ and $J^1$ $J^2$ and $J^3$ $J^4$ and $J^5$ $J^5$ and $J^5$ $J^6$ are, for instance, sets of the herein named edging and web rolling rolls of different shapes, each roll of a set may have the shape, as shown, for instance, at $J^5$ $J^5$ in Figs. 116 to 118 inclusive; or as J⁰ J⁰ in the Fig. 139; or each roll in a set may have a different shape as, for instance, J¹ J² in Figs. 1, 17, 28, 104, 107, 110, 119, 120, 136, 137, 138 and 143, or, as for instance, J³ J⁴ in Figs. 96 and 141, or as, for instance, J⁵ J⁶ in Fig. 142. These rolls are also interchangeable, as will be seen from Figs. 82 to 94 inclusive, and as will hereinafter be more fully described. There are a great many other shapes or forms that the herein named edging and web rolling rolls may have and also a great many other shapes or forms that the article to be rolled may have, as will appear from the matter hereinafter contained.

K is the herein named tread or face rolling roll turning loose on a roller bearing and is removably held thereon to permit of its being replaced by a roll of some other shape, as shown in Fig. 55 and hereinafter more fully described. The peripheral or rolling face of this roll may also have a great many different shapes, as for instance, K¹ in Figs. 17, 52, 55, 104, 107, 110 and 121; or, as for instance, K² in Figs. 56, 119 and 136 to 141 inclusive, and 143; or, as for instance, K³ in Figs. 57, 120 and 142; or, as for instance, K⁴ in the Fig. 58; or as K⁵ in Fig. 59. There is practically no limit to the shape that the peripheral or rolling face of said tread or face rolling roll may have, as will appear from the matter hereinafter more fully described.

*Raising, lowering and retaining device.*

In Figs. 18 to 27 inclusive, I have illustrated in details the herein named raising, lowering and retaining device, for taking the finished article or product out of the apparatus or mill and for putting the properly heated ingot, bloom, blank or other work piece into the apparatus or mill and retaining the same in such position wherein its outer portion or periphery is central or coaxial, or approximately coaxial, with the piercers or work supporting centers to permit of its being centered or pierced and centered in the center, or approximately in the center, of its outer portion or periphery with the said piercers or work supporting centers, and for lowering said device away from said work-piece, either after said work-piece is so centered or pierced and centered or during said centering or piercing and centering process, and for retaining said device in said lowered position away from said work-piece until said work-piece or said finished article or product is to be taken out of the apparatus or mill, as will hereinafter be more fully described. The said device consists mainly of a vertically disposed outer cylinder L¹⁹ with a piston L⁹ and piston rod L⁸, which piston and piston rod form a smaller cylinder, itself fitted with a piston L² having piston rod L¹ which is provided at its upper end with the head piece L. Fig. 19 is a sectional elevation on line $b—b$, Fig. 20 showing the device in its upper position and carrying, for instance, a finished car wheel F² shown in dotted lines to the height shown in the Fig. 4, when it is taken away by any suitable means, and another properly heated ingot, bloom, blank or other work piece put in place of it. The device with the newly placed ingot, bloom, blank or other work piece resting on said head piece L is then lowered by means of the said inner piston until it comes against an adjustable stop whereby the center or axis of said ingot, bloom, blank or other work piece F, shown in dotted lines, will be brought in line, or approximately in line, with the centers or axes of the piercers or work-supporting centers, which will then center or pierce and center said ingot, bloom, blank or other work-piece and support the same; then, either after said work-piece is so centered or pierced and centered or during said centering or piercing and centering process said outer piston of said device is then lowered to the position shown in Fig. 18, whereby said head L is lowered away from said work-piece F the distance for instance indicated by the dotted line Y⁴ Y⁴ in said Fig. 18 and is retained in said lowered position away from the work-piece until said work-piece or said finished article or product is to be taken out of the apparatus or mill; said piercers or work supporting centers will then remain in the ingot, bloom, blank or other work piece and will support said ingot, bloom, blank or other work piece and revolve with it until it is rolled to the form or shape of the car wheel or other article and either dished or not dished, as desired; then with the inner piston kept at its lower position, the said outer piston is again raised until it comes to the adjustable stop formed by L¹⁷ L¹⁷ and L¹⁸ L¹⁸, when it will be again in the middle position shown by dotted lines in Fig. 19, but this time instead of the said ingot, bloom, blank or other work piece F it will receive the finished wheel shown by dotted lines at F² or other article and with it will again be raised to the upper position shown in Fig. 19 and then said wheel F² is taken away and another properly heated ingot, bloom, blank or other work piece put in place of it, and so on.

In the said raising, lowering and retaining device, L is the said head piece which receives the ingot, bloom, blank or other work piece, retaining the same in the aforesaid position until centered, or pierced and centered and also receiving and delivering the so finished wheel or other article. This head piece may be made in various shapes and sizes such as may be required for different sizes and shapes of wheels or other articles, and therefore it is made so it can easily be pulled off from the end of the piston rod and replaced by another, but it is prevented from turning on its rod by a feather. $L^1$ $L^2$ are the inner piston rod and piston preferably made in one piece, the piston rod $L^1$ being provided near its end with a thread $L^3$ on which is placed a nut $L^4$ made in halves and fastened together and to the rod by screws $L^5$ as shown. When the inner piston $L^2$ is lowered and the nut $L^4$ comes against the stuffing box extension $L^7$, the inner piston $L^2$ with its rod $L^1$ and the head $L$ with its load thereon comes to a stop. The down stroke of the inner piston can be regulated by adjusting the nut $L^4$ on the rod $L^1$ and when said nut $L^4$ is moved to its uppermost position against the collar $L^6$, the inner piston will be permitted to travel to its lowermost position, in which position it is spaced a certain distance from the lower end wall of the cylinder. To prevent the inner piston $L^2$ with its rod $L^1$ and head $L$ from turning in its cylinder, a vertical ribbed rod $L^{10}$ is provided which is fastened with its end piece $L^{11}$ to the piston $L^9$, as shown in the Fig. 24. The inner piston $L^2$ has fastened to its lower end with the screws $L^{13}$ a guide collar or bushing $L^{12}$ shown in detail in the Figs. 22, 23 and 24; Fig. 22 being a section through $g$—$g$, Fig. 23, Fig. 23 a section through $h$—$h$, Fig. 22, and Fig. 24 a vertical section through the lower parts of the outer and inner pistons with their rods, showing the inner piston $L^2$ at its lowest position and also showing the lower part of said rod $L^{10}$ with its fittings and connections. Figs. 25, 26 and 27 are details of said rod $L^{10}$ with its end piece $L^{11}$ fastened thereto with key or by other means; Fig. 25 being a section through $e$—$e$, Fig. 26; Fig. 26 only shows the lower part of the ribbed rod with its end piece; Fig. 27 being a plan of the end piece $L^{11}$. The grooves formed by the ribs of said rod $L^{10}$ as shown, fit over the tongues formed on the inner side of said guide collar $L^{12}$ and thereby prevent the inner piston $L^2$ with its rod $L^1$ and head piece $L$ from turning in the bore of $L^8$. The piston rod $L^8$ with its bore for piston and rod $L^2$ $L^1$ has bolted to its upper end a cross-piece $L^{15}$ which is also provided with the regular packing-box for the rod $L^1$ and has fastened thereto the guide and stop rods $L^{16}$, $L^{16}$, which rods also prevent the said parts $L$, $L^1$, $L^2$, $L^8$ and $L^9$ with their said fittings from turning in the said outer cylinder $L^{19}$. Said rods $L^{16}$ $L^{16}$ have shoulders at their upper ends and are provided with thread and nuts as shown, wherewith these rods are rigidly fastened to the cross piece $L^{15}$, as shown. At their lower ends these rods $L^{16}$ $L^{16}$ are each provided with thread and lock-nuts $L^{17}$ as shown. The outer cylinder $L^{19}$ is provided at its upper end and at opposite sides with the lugs $L^{18}$ $L^{18}$ forming guide bearings for said rods $L^{16}$ $L^{16}$ and also forming stops for the upstroke of piston $L^9$ and by the means of said lock-nuts $L^{17}$ $L^{17}$ and the thread on the lower ends of these rods, the distance between said lock-nuts $L^{17}$ $L^{17}$ and said cross piece $L^{15}$ can be shortened or lengthened, whereby the upstroke of said piston $L^9$ can be made less or more, as may be required. The outer cylinder $L^{19}$, by means of its lugs $L^{21}$ $L^{21}$ and the side brackets $L^{23}$ and $L^{24}$ is rigidly bolted to the foundation box $A^5$ which supports the said device, as shown. Fig. 18 shows said head piece $L$ lowered away from said work-piece $F$ the distance for instance indicated by the dotted line $y^4$ $y^4$, and shows a vertical section through $c$—$c$, Fig. 20 showing said device with its inner and outer pistons in its lowest positions and also showing the ports for inlet and outlet. Fig. 20 is a section on $d$—$d$, Fig. 21, and Fig. 21 is a section on $a$—$a$, Fig. 20.

In said raising, lowering and retaining device; the medium, either steam, compressed air or liquid having sufficient pressure, may be used in operating the device, preferably compressed air. For raising the inner piston $L^2$, air enters through the pipe $L^{25}$ to the lower end of the hollow rod $L^{26}$ where it enters said hollow rod and then flows upward and through the short pipe connection $L^{27}$, thence into and downward through the port $L^{28}$, at the lower end of which it enters the cylinder for the inner piston $L^2$ through the port $L^{29}$ and forces the piston $L^2$ with its piston-rod $L^1$ and head-piece $L$ upward to the position shown in the Fig. 19. For raising the outer piston $L^9$, air enters through the pipe $L^{30}$ into and downward through the port $L^{31}$ and enters the outer cylinder $L^{19}$ through the port $L^{32}$, forcing the outer piston $L^9$ with the parts $L^8$, $L^{10}$, $L^{15}$, $L^{16}$, $L^{16}$, $L^1$ and $L$, upward to the position shown in Fig. 19. For the pull-back or lowering of the pistons $L^9$ and $L^2$, air of sufficient constant pressure, as for instance, from an accumulator or reservoir enters the pipe $L^{33}$ and into and down the circular space $L^{34}$ formed by the bore of the outer cylinder $L^{19}$ and the piston rod $L^8$ to the upper end of piston $L^9$ and from there through the port $L^{35}$ into and upward through the port $L^{36}$ and at its upper end through the port $L^{37}$ into the cylinder for the inner piston and to the upper end of said inner piston $L^2$. To lower the inner piston $L^2$, for instance from the position shown in Fig. 19 to the position shown in Fig. 18, the pressure inlet through L²⁵ is shut off and the outlet for the air from the lower end of said inner piston L² is opened, said outlet being connected to said pipe L²⁵, thus causing the lower end of piston L² to be relieved of its pressure and permitting the air to flow out gradually through said outlet while the said constant pressure on the other or upper end of said piston L² forces the said piston downward. To again raise said inner piston, said outlet is again closed and the pressure is again let into and through pipe L²⁵ to the lower end of the inner piston L² and while it forces said piston upward it also forces the air from the accumulator under its constant pressure on the upper end of said piston out through the said pipe L³³ and back into the said accumulator or reservoir. To lower the outer piston L⁹, for instance from the position shown in Fig. 19 to the position shown in Fig. 18, the air entering under pressure through pipe L³⁰ is shut off and the outlet for the air from the lower end of said outer piston L⁹ is opened, said outlet being connected to said pipe L³⁰, thus causing the lower end of piston L⁹ to be relieved of its pressure and permitting the air to flow gradually out through said outlet while the air from the accumulator acting against the other or upper end of said piston L⁹ forces the piston downward. To again raise said outer piston, said outlet is again closed and the pressure is again let into and through the pipe L³⁰ to the lower end of the piston L⁹ and while said pressure forces said piston upward, it also forces the air acting against the upper end of said piston under its said constant pressure out through pipe L³³ and back into the said accumulator or reservoir.

During the operation of the said raising, lowering and retaining device, there is continually a constant pressure on the upper ends of both pistons. When both pistons are up, that is, at the end of their adjusted upstrokes, as in the Fig. 19, the finished wheel or other finished article is taken from the head piece L and a new properly heated ingot, bloom, blank or other work piece put into place of it; then the inner piston L² is lowered to the position indicated by the dotted lines in Fig. 19, in which position the center or axis of the outer portion or periphery of the ingot, bloom, blank or other work-piece F is brought in line, or approximately in line, with the centers or axes of the piercers or work supporting centers and in said position said work-piece F is held by said head piece L to be centered or pierced and centered and then supported by said piercers or work supporting centers, and, either after said work-piece is so centered or pierced and centered or during said centering or piercing and centering process the outer piston L⁹ is lowered, both pistons and said head piece L being then in the position shown in Fig. 18 and in which position the said head piece L is lowered away from said work-piece F the distance for instance indicated by the line y⁴ y⁴ in said Fig. 18, and in which position said raising, lowering and retaining device with its said head-piece L is retained away from said work-piece until said work-piece or said finished article or product is ready to be taken out of the apparatus or mill, and then, when said work-piece or the finished wheel or other article is ready to be taken out of the apparatus or mill, the outer piston L⁹ is again raised until stopped by the nuts L¹⁷, L¹⁷ coming against the lugs L¹⁸, L¹⁸, when the head piece L is in proper position to let said work-piece or the finished wheel or other finished article on it, after which the inner piston is raised until the head piece L with the said work-piece or finished wheel F² or other finished article is again in the position shown in the Fig. 19, to be removed therefrom.

*Piercers or work-supporting centers, work-supporting heads; centering or piercing and centering device; dishing, undishing and redishing device; and a few rolling examples.*

The piercers or work-supporting centers revolubly or rotatably support the ingot, bloom, blank or other work piece and may have any suitable shape or form as for instance herein shown and described, and the piercers or work supporting centers with their axles and work-supporting heads and their pressure cylinders and connecting parts therewith for the centering or piercing and centering and dishing devices, are located one at each side of the work piece as shown, and the axes of both these piercers or work-supporting centers with their axles are in one line and are also in line with the axis of the work-piece, and the centers of both pressure cylinders are in one line and parallel with the axis of the work piece, and said work-supporting heads provided with the said axles and piercers or work-supporting centers are fixed during the rolling process but the axles and work-supporting centers will revolve with the work-piece, and during the piercing or centering process and during the process of removing said centers are moved longitudinally by their pressure cylinders, toward or away from each other or are moved as may be desired; and during the dishing process they are also moved longitudinally with the center or hub-part of the work piece, wheel or other article, as the case may be; at the herein named this side of the work piece indicated by the arrows a, b, Fig. 1 they are so moved by the one pressure cylinder O, and at the other side by the other pressure cylinder N, as shown.

*Piercers or work supporting centers and work supporting heads or supporting heads.*

With reference to Figs. 1, 10, 17 and 37 to 44 inclusive, and to Figs. 104 to 118 inclusive, showing the device for centering or for piercing and centering ingots, blooms, blanks or other work pieces, and for supporting said ingots, blooms, blanks or other work pieces and for putting said work-pieces at their hub or center portion while so supported by said piercers or work-supporting centers also into clamped condition laterally between said piercers or work supporting centers and keeping automatically said hub or center portion in said clamped condition by constant pressure during the rolling and dishing or undishing processes, &c., as hereinafter more fully described, and for dishing, undishing, &c., said work-pieces, wheels or other articles, as hereinafter more fully described. Figs. 37 to 44 inclusive show in details one of the said centering or piercing and centering and work supporting heads M M with its fittings of the said device. The said head M is named the work supporting head although it serves other purposes as will be observed from the following. Fig. 37 is a plan view with the cooling water inlet for said work supporting head M shown in section through $k-k$, Fig. 39. Fig. 38 is a section through $i-i$, Fig. 39; Fig. 39 is a side elevation with the plates $M^{10}$ and $M^{25}$ of one side of the water boxes removed. Fig. 40 is a sectional end view of Fig. 39 with lower part in section through $l-l$, Fig. 37, also showing part of the guide bearing $M^{31}$ firmly supporting said work supporting head M. Fig. 41 is a section through $m$ Fig. 37 showing the guide pressure plate $M^{32}$ and wedge adjusting arrangement with adjusting set screws $M^{38}$. Fig. 42 is a section through $n$, Fig. 37 showing the guide pressure plate $M^{32}$ and wedge adjusting arrangement with the wedge pull back screws $M^{40}$. Fig. 43 is an enlarged section through the water cooling arrangement for the axle E with their piercers or work supporting centers, also showing the parts connected therewith. The work supporting head M is provided as shown with an end-plate $M^1$ which is firmly bolted to M by the screws and nuts $M^2$ as shown. The said parts M and $M^1$ also form the supports for the bearings $M^3$ $M^4$ and $M^5$ for the herein named work supporting axle E. Said end plate $M^1$ also supports with its inner end as shown, the ball pressure plate $M^6$. Between the supporting head M and end plate $M^1$ the supporting axle E is partly enlarged in diameter, over which enlargement is fitted the other ball pressure plate $M^7$. Between these two pressure plates $M^6$ and $M^7$ are placed the balls $M^8$ sufficiently large in diameter and sufficient in number to safely resist the pressure during the centering or piercing and centering process of the ingots, blooms, blanks or other work pieces, and during the lateral clamping process of said work-pieces at their hub or center portion between said piercers or work supporting centers, and during the dishing process of the wheel or other article. These axles E E have at one end the said piercers or work supporting centers, as for instance, $E^1$ $E^1$ or $E^2$ $E^2$ or $E^3$ $E^3$ or $E^4$ $E^4$ or $E^5$ $E^5$ or $E^6$ $E^6$, &c., as for instance herein shown. These piercers or work supporting centers are removably fastened to one end of said axles E E by the shoulder $e^2$ and the pins $e^1$ $e^1$, as shown, or by any other suitable means. From the other end, each of said axles E E is provided with a central bore $e^3$, as shown, which bore is enlarged at its open end and into which is fitted a sleeve or pipe piece $e^4$ forming also a journal with said bore; said sleeve $e^4$ has its outer diameter near its end enlarged, as shown by $e^5$; said axle E at its open end has formed a thread $e^6$ over which is fitted a nut $e^7$ forming with the end of said axle E and with the gland $e^8$ a regular stuffing box; the pin $e^9$ revolves said gland $e^8$ with the said axle while said sleeve $e^4$ does not revolve. Said sleeve $e^4$ has at its outer end fitted thereto a T-shaped end connecting piece $e^{10}$ provided with the threaded end connecting parts $e^{12}$ $e^{16}$ and $e^{17}$; a pipe $e^{11}$ is screwed into the inner end of the connecting part $e^{12}$ and reaches within a short distance of the end of said bore $e^3$; an elbow $e^{13}$ is screwed into the outer end of $e^{12}$ and thereby connects the elbow $e^{13}$ with pipe $e^{11}$, as shown; the end of said sleeve $e^4$ is screwed into the end $e^{17}$; said sleeve $e^4$ surrounds said pipe $e^{11}$ and leaves a certain open space between said sleeve or pipe piece $e^4$ and pipe $e^{11}$. The parts $e^{10}$ and $e^{13}$, as shown in Fig. 43, are for the sake of illustration turned in a different position than they will have when in operation. When in operation they have the position shown in the Figs. 37, 39 and 40. The cooling water enters at arrow $e^{14}$, into and through elbow $e^{13}$ and pipe $e^{11}$ and then flows in the direction indicated by the arrows $e^{15}$ around the outside of said pipe $e^{11}$ into said T-shaped connection piece $e^{10}$ and from there through the short pipe $e^{18}$ screwed into the end $e^{16}$ and into and out through port $e^{19}$ and channel $e^{20}$ and from there through channels formed by parts of the bed-plate $B^1$ $B^2$, and at $e^{21}$ (Figs. 1 and 5) is taken away by any suitable means, such as pipes or channels, &c. The axle E with its said piercer or work-supporting center revolves with the work-piece, but said pipes $e^4$ and $e^{11}$ with their T-shaped end connecting piece $e^{10}$ does not revolve. Said connecting piece $e^{10}$ is fastened by the bolts $e^{22}$—$e^{22}$, as shown, to the cross piece $e^{23}$ which is held by the thread and nuts $e^{24}$ $e^{24}$ to the extensions $e^{25}$ $e^{25}$ of two of the said studs $M^2$, as shown. By the means shown, each of the said work-supporting axles E E with their piercers or work-supporting centers $E^1$ $E^1$ or $E^2$ $E^2$, &c., their journals $M^3$ $M^4$ and $M^5$ and the ball thrust bearing formed by the said parts $M^6$ $M^7$ and $M^8$ are practically kept cool and also take part of the heat away from the center or supporting portion of a heated work-piece to give to the supporting surface or the portion of the work-piece adjacent the supporting centers a greater or harder supporting resistance, and the flow of the water through the cold water inlet can easily be regulated by a valve for the inlet $e^{14}$ which may be placed near the elbow $e^{13}$. The cooling water for the outer sides of the said work-supporting head M enters, as indicated by arrow $M^9$, into and through the elbow $M^{10}$ and nipple $M^{13}$, thence into a water reservoir or box $M^{11}$ which is formed into the upper part of said head M with the sides $M^{12}$ and $M^{14}$ over which are fastened by means of screws $M^{15}$ the plates $M^{16}$ $M^{16}$ which close the two sides of said water box $M^{11}$, but at the lower end of said water box these plates $M^{16}$ $M^{16}$ leave openings $M^{17}$ $M^{17}$ extending to the total width of said water box and through which the cooling water flows down on the sides, as indicated by the arrows $M^{18}$, and flows into the lower water boxes or channels $M^{19}$ $M^{19}$ formed by and connected with said head M by the parts $M^{20}$, $M^{21}$, $M^{22}$ and $M^{23}$ and over which are fastened by means of the screws $M^{24}$ the plates $M^{25}$ $M^{25}$ as shown; from these lower water boxes $M^{19}$ $M^{19}$ the water then flows as indicated by the arrows into and out through said port $e^{19}$ and channel $e^{20}$ and through the before said channels formed by parts of the bed-plate $B^1$ $B^2$, and at $e^{21}$ (Figs. 1 and 5) is taken away by any suitable means such as pipes, channels, &c. By these means shown, the said work-supporting head M may practically be kept cool and thus assist in taking part of the aforesaid heat away from the supporting surface of the work-piece to give said supporting surface in contact with said piercers or work supporting centers a greater or harder supporting resistance, and the flow of water through the cold water inlet can easily be regulated by a valve for the inlet $M^9$ which may be placed near the elbow $M^{10}$.

The said work-supporting head M is also formed at its lower side with a guide or slide block forming bearings at $M^{26}$, $M^{27}$, $M^{28}$, $M^{29}$ and $M^{30}$, the sides $M^{26}$, $M^{27}$, and $M^{28}$ forming the bearings with the guide piece $M^{31}$, the sides $M^{29}$ and $M^{30}$ forming the bearings with the guide pressure plate $M^{32}$; the bolts $M^{34}$ reach through the slotted holes $M^{43}$ in said pressure plate $M^{32}$ and press the said guide pressure plate $M^{32}$ against the supporting sides $M^{28}$ and $M^{33}$ of the guide piece $M^{31}$, and when the said bolts $M^{34}$ are screwed up, said pressure plate $M^{32}$ is rigidly held therewith and practically forms one piece with said guide piece $M^{31}$. A wedge piece $M^{35}$ is placed between said pressure plate $M^{32}$ and said guide piece $M^{31}$, as shown, and with its vertical side $M^{36}$ forms bearing with said $M^{32}$ and with its inclined side $M^{37}$ forms bearing with said guide piece $M^{31}$. Set screws $M^{38}$ having lock nuts $M^{39}$, as shown, fit into tapped holes of said pressure plate $M^{32}$ and bear against said wedge piece $M^{35}$ as shown. Pull back screws $M^{40}$ with sufficiently long threads $M^{41}$ reach through the slotted holes $M^{42}$ in said pressure plate $M^{32}$, as shown, and are fitted into tapped holes of said wedge piece $M^{35}$ as shown. To adjust said guide bearing, the nuts on said bolts $M^{34}$ are sufficiently loosened and the screws $M^{40}$ backed up and then the wedge piece $M^{35}$ forced or moved downward by means of said screws $M^{38}$; then the nuts on said bolts $M^{34}$ are again screwed up or set up tight, and the screws $M^{40}$ are again screwed down to prevent the wedge piece $M^{35}$ from working downward; these screws $M^{40}$ are also placed there for the purpose of pulling the wedge upward in case it has been forced down too much during the adjustment by the set screws $M^{38}$.

Centering or piercing and centering, dishing and undishing device.

The said work supporting heads M M provided with the axles E E and their piercers or work supporting centers, for instance $E^1$ $E^1$, and their bearings are located one at each side of the work piece, and during the rolling process are fixed, but the piercers or work supporting centers and their axles will revolve with the ingot, bloom, blank or other work piece in their bearings of said work-supporting heads M M, and, during the piercing or centering, dishing or undishing, rolling and dishing or undishing processes, said work supporting heads M M are moved with their axles E E and piercers or work supporting centers; for instance $E^1$ $E^1$ and kept centrally and in line with the axis of the work piece, by means of the pressure cylinders O and N or by any other equivalent means, toward or away from each other and may also be moved together in either direction, or one of them may be retained in any position while the other is moved toward or away from the one so retained during the piercing or centering process and when removing the centers from the work piece or finished object, and during the rolling and dishing or undishing, dishing, undishing and redishing processes said centers are moved with the center or hub-part of the work piece, as the case may require and as and in the manner hereinafter fully described; at said this side of the work-piece one of said work-supporting heads M M is so moved by the pressure cylinder O, and at the other side of the work-piece the other work-supporting head M is so moved by the other pressure cylinder N as shown.

The said work-supporting heads M M are also formed each with a socket part $M^{44}$ which receives the one end of the piston rod of its coöperating pressure cylinder. To the part $M^{44}$ of said work-supporting head M, shown in detail in Figs. 37 to 44 inclusive, is attached the piston rod $O^3$ of the cylinder O by means of the shoulder $O^4$ and the key $O^5$, as shown in the Fig. 39. To the part $M^{44}$ of the other work-supporting head M at the other side of the work piece is attached the piston rod $N^3$ of the other cylinder N by similar means, as shown in said Fig. 39. The ends $M^{45}$ $M^{45}$ of said work supporting heads M M around the said axles E E are formed at an incline with the side of the work-piece, as shown in the Figs. 39 and 134, for the purpose hereinafter described.

With reference to the Figs. 1, 10, 17 and 37 to 43 inclusive and to Figs. 104 to 106 inclusive O is the said pressure cylinder for said work-supporting head M with its axle and piercer or work-supporting center located at said this side of the work-piece; and, N is the said pressure cylinder for said other work-supporting head M with its said axle and piercer or work supporting center, located at the other side of the said work piece. Cylinder O has a piston $O^1$ with a piston rod $O^3$ and a piston rod $O^2$, passing through the cylinder heads $O^{15}$ and $O^{16}$ (see Figs. 104 and 17) at both ends of the cylinder O. The piston rod $O^2$ at its outer end is provided with a long thread $O^{11}$ over which is fitted a threaded adjustable nut $O^{12}$ made in halves and firmly held together and to the piston rod by the screws $O^{13}$; this nut $O^{12}$ can be adjusted from one end to the other of said thread $O^{11}$. At the outer end of said thread is provided a safety stop collar $O^{14}$ which indicates the limit of adjustment of said nut $O^{12}$ toward the end of the piston rod and thereby prevents the piston from coming against the cylinder head $O^{16}$. The piston rod $O^3$ is provided at its outer end with the said shoulder $O^4$ and key $O^5$ and is firmly held thereby and connected with said work supporting head M, as shown in Figs. 39 and 40. From the outer end $M^{22}$ of said work supporting head M the piston rod $O^3$ is provided with a thread $O^6$ over which is fitted a threaded adjustable nut $O^7$ (Figs. 10, 17 and 104) made in halves and firmly held together and to the piston rod by the screws $O^8$ as shown; this nut $O^7$ can be adjusted from one end to the other end of said thread $O^6$, as may be required in adjusting the pull back stroke of the piston $O^1$ with its rods $O^2$ $O^3$; next to said nut $O^7$ the piston rod $O^3$ is also provided with a sleeve or distance piece $O^9$ which is also made in halves and firmly held together and to said piston rod by the screws $O^{10}$, as shown. This said sleeve $O^9$ is used for the following purpose: During the operation of the apparatus or mill, the required maximum pull back is reached when said sleeve $O^9$ comes against the end of the extension $O^{18}$ of the packing box gland. If for instance, the rolls are exchanged or for any other purpose it may be convenient to move said work supporting head M out of the way; then in such a case, the said sleeve $O^9$ will be removed and the said nut $O^7$ will then come against said part $O^{18}$, and the said supporting head M will be pulled back to the position indicated in the Fig. 10 by the dotted lines indicating part of said supporting head M. The details and description of the pressure cylinder N and its connecting parts for said other work supporting head M of the other side of the work piece, are similar to those described above, and the characters of reference N to $N^{18}$ inclusive, indicate the corresponding parts for O to $O^{18}$ inclusive. The said piercers or work supporting centers, for instance $E^1$ $E^1$, with their work supporting heads M M are operated by the said cylinders N and O with their said piston rods $N^2$ $N^3$ and $O^2$ $O^3$ in the following manner.

*Centering or piercing and centering.*

In order to increase, for instance in a car wheel, the density of the metal in its tread, flange and rim portion to its maximum and form said tread, flange and rim portion of metal of substantial uniform density and homogeneity to give to the tread, flange and rim portion its due maximum and uniform strength and its due maximum and uniform resistance to wear, it is also necessarily required that from the beginning of the rolling process, the outer portion or periphery of the ingot, bloom, blank, or other work-piece from which said wheel is to be formed, is coaxial, or practically so, with said piercers or work supporting centers, that is, the said ingot, bloom, blank or other work-piece is to be pierced and centered in the center, or practically in the center, of its outer portion or periphery.

By the words "centering or piercing and centering" used herein, I mean that, the ingot, bloom, blank or other work-piece is centered or pierced and centered by the apparatus or mill, by forcing, either one or both said piercers or work supporting centers by their pressure means hereinafter fully described, when its outer portion or periphery of said work-piece by means of said raising, lowering and retaining device is brought coaxial, or practically so, with said piercers or work-supporting centers, against and into said work-piece, and this herein means, said work-piece is centered or pierced and centered, because said piercing at the same time also centers said work-piece, because, at the beginning of said centering or piercing and centering process, the outer portion or periphery of said work-piece is then coaxial, or practically so, with said piercers or work supporting centers, that is, said piercers or work supporting centers are then in the center of the outer portion or periphery of said work-piece. It is of course understood that when a work-piece has previously been provided with an opening which is somewhat off center, the work-piece is positioned by the raising, lowering and retaining device to bring the peripheral face of said work-piece coaxial, or approximately coaxial, with the piercers or work-supporting center, regardless of the axis of said opening, and as an illustration of this, reference is had to Figs. 129, 149, 150 and 151, in each of which the hole in the work-piece is made smaller than the piercers or work-supporting centers and has its axis out of line with the axis of said piercers or centers. In said figures, and in Figs. 126, 130 and 131, the hub or center portion of the work-piece has been provided with a hole, which in actual practice is purposely smaller, for instance as shown, so that the work-piece can be positioned between said piercers or centers with its outer portion or peripheral face coaxial, or approximately coaxial, with said piercers or centers and in this position said work-piece is centered or pierced and centered, with said piercers or supporting centers, regardless of the axis of said hole. In Figs. 149, 150 and 151, which illustrate in a diagrammatical or explanatory manner the operation of centering or piercing and centering a work-piece, such for instance as shown in Figs. 129 and 131, and also the use, in said operation, of said raising, lowering and retaining device, I have shown a work-piece having for instance, the form as shown and being previously provided with a hole as shown in Fig. 149 and which work-piece being then centered or pierced and centered in the center, or practically in the center, of its outer portion or periphery with the piercers or work supporting centers $E^1$ $E^1$ having for instance the form as shown; in said figures the axis of said work-piece F, that is, the center line or axis of the outer portion or periphery of said work-piece F, is represented by the dotted line $y^1$ $y^1$ and when the outer portion or periphery of said work-piece is brought coaxial, or approximately coaxial, with the said piercers or work-supporting centers by means of said raising, lowering and retaining device, then said center line or axis $y^1$ $y^1$ is in line, or approximately in line, with the centers or axes of said piercers or work supporting centers $E^1$ $E^1$; Fig. 149, shows said work-piece F with its said hole which for instance is not in the center of the outer portion or periphery of said work-piece F; said center line or axis of the outer portion or periphery of said work-piece is indicated by the dotted line $y^1$ $y^1$, and the center line or axis of the hole is indicated by the dotted line $y^2$ $y^2$; Fig. 150, shows said work-piece F supported and held by the head piece L of said raising, lowering and retaining device and with said device said work-piece being brought and retained in the position shown and in which position the outer portion or periphery of said work-piece is coaxial, or practically so, with said piercers or work supporting centers $E^1$ $E^1$, then said piercers or work supporting centers by their pressure means hereinafter fully described, are moved toward and against said work-piece F as shown, then said piercers or work supporting centers are forced into the said work-piece F; Fig. 151, shows said work-piece F so centered or pierced and centered in the center, or practically in the center, of its outer portion or periphery with said piercers or work supporting centers $E^1$ $E^1$ having for instance the form as shown and therewith said work-piece F is then supported as shown and by the pressure means hereinafter fully described; the hub or center portion of said work-piece F, if so desired, is also automatically firmly clamped laterally between said piercers or work supporting centers $E^1$ $E^1$ for the purpose hereinafter set forth, said head piece L of said raising, lowering and retaining device, now being lowered by said device away from the work-piece. With reference to Fig. 123, I have hereinafter described the operation of centering or piercing and centering a work-piece at one side only, which operation is also illustrated in Figs. 152, 153 and 154, wherein is also shown more fully, the use of the raising, lowering and retaining device. In the Figs. 152, 153 and 154, I have more fully illustrated the centering or piercing and centering of an ingot, bloom, blank or other work-piece in the center of its outer portion or periphery at one of its sides only while its other side is laterally supported; in said figures the dotted line $y^1$ $y^1$ represent the center line or axis of the outer portion or periphery of said work-piece and when the outer portion or periphery of said work-piece is brought coaxial, or practically coaxial, with the said piercers or work-supporting centers, by means of said raising, lowering and retaining device, then said center line or axis $y^1$ $y^1$ is in line, or approximately in line, with the centers or axes of said piercers or work supporting centers; Fig. 152, shows a work-piece F having for instance the form as shown; Fig. 153, shows said work-piece F supported and held by the head piece L of said raising, lowering and retaining device and with said device said work-piece F being brought and retained in the position shown and in which position the outer portion or periphery of said work-piece is coaxial, or practically coaxial, with said piercers or work supporting centers $E^1$ $E^3$ having for instance the forms as shown and herein before referred to, then said piercers or work supporting centers by their pressure means hereinafter fully described, are moved toward and against said work-piece F as shown, then the one piercer or work supporting center $E^3$ having a large supporting surface at its end as shown, is retained in said position, then the said other piercer or work supporting center $E^1$ by its pressure means hereinafter fully described, is forced into the one side of said work-piece F; Fig. 154 shows said work-piece F so centered or pierced and centered in the center, or practically in the center of its outer portion or periphery at one of its sides only with one of said piercers or work supporting centers as $E^1$ having for instance the form as shown and its other side supported laterally by the other piercer or work supporting center $E^3$ having for instance the form as shown; said work-piece F is thus supported by said piercers or work supporting centers $E^1$ $E^3$ as shown and, by said pressure means hereinafter fully described the hub or center portion of said work-piece F, if so desired, is also automatically firmly clamped laterally between said piercers or work supporting centers for the purpose hereinafter set forth, said head piece L of said raising, lowering and retaining device, now being lowered by said device away from the work-piece.

For piercing and centering for instance, a properly heated blank F having the form or shape shown in the Fig. 119, the blank or work piece F is placed on the herein before described head piece L of the said raising, lowering and retaining device, and lowered to the position indicated in Fig. 19 by the dotted lines, which brings the outer portion or periphery of said blank F central, or practically so, with the said piercers or work supporting centers which will then be moved with the pressure in said cylinders N and O by their piston rods $N^3$ and $O^3$, &c., shown in Fig. 104, to the position shown, for instance, in Fig. 124 in which position the outer portion or periphery (not shown in said Fig. 124) of said blank or work-piece F is coaxial, or approximately coaxial, with said piercers or work-supporting centers; then the total pressure or force will be delivered to said piston rods $N^3$ and $O^3$ by their pistons, and thereby forcing or piercing for instance the centers $E^6$ $E^6$ or any other suitably formed piercers or work supporting centers, as for instance, $E^1$ $E^1$, &c., into the said blank or work piece F, as is indicated by the dotted lines for said centers $E^6$ $E^6$ in said Fig. 124, in which figure is shown only the center part of said blank or work piece F; or, in case that the thickness of the said blank or work piece is the same as is the length of the hub of the finished article, then in such case, the shoulders $e^{30}$ $e^{30}$ which are formed with said piercers or work supporting centers $E^6$ $E^6$ will come against the sides of said blank or work piece as for instance in the Fig. 133 wherein the shoulder $e^{30}$ of one of said piercers or work-supporting centers $E^6$ $E^6$ is against the one side $e^{31}$ of the blank or work-piece F shown in said Fig. 133. In the Fig. 123 is shown a blank or work-piece for an article which should not have such a large hole or impression; therein the blank or work-piece F is held only by the flat ends of the work-supporting centers $E^3$ $E^3$ and their pins $e$, as shown, or said pins $e$ may be used in one of said centers only, which pins in this case are pierced or forced into the blank or work-piece, as shown. In case that the work-piece is to be pierced or centered at one side only then one of the centers may have a form similar to $E^3$ with or without the pins $e$, as for instance shown in said Figs. 152, 153 and 154 and as herein before described, and the other center doing the piercing or centering may have any suitable form as for instance $E^1$, $E^2$, $E^5$ or $E^6$, &c. In the Fig. 125, the blank or work-piece has a large central hole and is supported by the centers $E^4$ $E^4$ as shown. In the Fig. 126, the ingot, bloom, or other work-piece F, at its center or hub part has the form as shown, and when the outer portion or periphery (not shown in Fig. 126) of said work-piece F is brought and retained coaxial, or approximately coaxial, with the piercers or work-supporting centers $E^1$ $E^1$ by means of said raising, lowering and retaining device, then said piercers or work-supporting centers $E^1$ $E^1$ are forced into said center or hub part as indicated by the dotted lines, and thereby center or pierce and center said work-piece F in the center, or approximately in the center, of its outer portion or periphery, and, in case that said piercers or work-supporting centers would have the form or shape as $E^6$ $E^6$, then in such case, said shoulders $e^{30}$ $e^{30}$ of said centers $E^6$ $E^6$ would come against the ends $e^{29}$ $e^{29}$ of the hub part of F in said Fig. 126, if the thickness between said ends $e^{29}$ $e^{29}$ is the same as is the length of the hub of the finished article. In each of the Figs. 127 and 128, the hub or center portion of the ingot, bloom or other work-piece F has the form or shape as shown, and when the outer portion or periphery (not shown in Fig. 127) of said work-piece F is brought and retained coaxial, or approximately coaxial, with the piercers or work-supporting centers $E^1$ $E^1$ by means of said raising, lowering and retaining device, then said piercers or work-supporting centers $E^1$ $E^1$ are forced into each side of said hub or center portion and thereby center or pierce and center said work-piece F, as and in the manner above described, and the hole or impression shown in said Figs. 127 and 128 may have any form or shape or have nearly the form of said piercers or work-supporting centers, for instance $E^1$, $E^5$ or $E^6$, &c. In the Fig. 129, the blank or work-piece F is provided with a central conical hole, as shown, and when the outer portion or periphery (not shown in Fig. 129) of said work-piece is, by the aforesaid means, brought and retained coaxial, or approximately coaxial, with the piercers or work-supporting-centers for instance $E^1$ $E^1$, then said piercers or work-supporting centers $E^1$ $E^1$, are forced from each side of said work-piece into said work-piece, as indicated by the dotted lines, and thereby center or pierce and center said blank or work-piece F in the center, or approximately in the center, of its outer portion or periphery. In Fig. 131, the blank or work-piece F has been provided with a central cylindrical hole as shown in Fig. 130, and when the outer portion or periphery (not shown in Fig. 131), of said work-piece is, by the aforesaid means, brought and retained coaxial, or approximately coaxial, with the piercers or work-supporting centers for instance $E^6$ $E^6$, then said piercers or work-supporting centers $E^6$ $E^6$, are forced from each side of the work-piece F into said work-piece, as shown in said Fig. 131, and thereby said blank or work-piece F is centered or pierced and centered in the center, or approximately in the center, of its outer portion or periphery, and, said shoulders $e^{30}$ $e^{30}$ formed on said centers, limit the lateral flow of the metal during the process of forming the hub. In the Fig. 138, is shown, for instance, a previously finished and worn wheel rerolled to the size and form of $F^2$, supported by the centers $E^2$ $E^2$, as shown. These centers, in such case, are forced over the outer diameter of the hub as shown and thereby may also reduce if so desired the bore of the wheel or other article, to a smaller diameter. In Fig. 44, I have shown in enlarged section, one of said piercers or work supporting centers $E^2$ $E^2$ having for instance the form as shown, the center portion $e^{36}$, either enters the hole loosely or will be forced into the hole or bore of the work-piece (as shown in Fig. 138), and the annular flange $e^{35}$ which is separated from said center portion $e^{36}$ by an intervening space, is forced over the outer peripheral part or diameter of the hub of the work-piece, for the purpose herein before set forth and as shown in the Fig. 138 and as hereinafter more fully described. In centering or in piercing and centering, for instance, a blank or work piece F as in the Figs. 133, 134 and 135, it will be possible that one of said piercers or work supporting centers, during the centering or piercing and centering process, penetrates or is forced into the one side of the blank or work piece F more than is the other forced into the other side of said blank or work piece F, as is illustrated by the Fig. 133; therein are shown for instance said piercers or work supporting centers $E^6$ $E^6$. To prevent such uneven penetration or piercing and to make the said piercers or work supporting centers penetrate or pierce the blank or work piece F to the same depth at both sides, as shown for instance in Fig. 134, or to have purposely one of said piercers or work supporting centers, for instance $E^6$ $E^6$, during the centering or piercing and centering process, penetrate or pierce the blank or work piece F more at one side than at the other, as for instance in said Fig. 133, I, as before said, incline the ends $M^{45}$ $M^{45}$ of said work supporting heads M M around said axles E E, that is, at an incline with the side of the work piece, as shown, and provide wedge shaped collars $M^{46}$ $M^{46}$ which are open at one side and fit over said piercers or work supporting centers, for instance $E^6$ $E^6$, and with their one flat side fitting to the sides of the blank or work piece F, and with their other or inclined sides fitting to the said inclined ends $M^{45}$ $M^{45}$ of said work supporting heads M M as shown. The said wedge shaped collars $M^{46}$ $M^{46}$ are each also provided with the stop pins $M^{47}$ and $M^{48}$, and with a handle $M^{49}$ as shown. In the operation for centering or for piercing and centering, each of said collars $M^{46}$ $M^{46}$ with its handle $M^{49}$ in an inclined or any other convenient position, such, for instance, as indicated by the dotted lines in the Fig. 135, is put over said piercers or work supporting centers as is indicated by the dotted lines of said parts $M^{46}$ to $M^{49}$ inclusive, then said collars are turned around said piercers or work supporting centers until their said stop pins $M^{47}$ $M^{47}$ and $M^{48}$ $M^{48}$ come against the sides of said work supporting heads M M, then each of said collars $M^{46}$ $M^{46}$ with its pins $M^{47}$ and $M^{48}$ and handle $M^{49}$ will be held by said pins $M^{47}$ and $M^{48}$ in the position as shown by the solid lines in the said Figs. 134 and 135, and in this said position, the centering or the piercing and centering process may begin, and in case that, the collar $M^{46}$ at one side of said blank or work piece is forced by said blank or work piece F against the said work supporting head M before the same is done at the other side, then in such case, owing to the additional surface obtained by said collar $M^{46}$ against said blank or work piece F, the resistance for penetration or piercing on this side of the blank or work piece may become several times the force required for penetrating or forcing said piercer or work supporting center into the proper depth of the other side of said blank or work piece; thereby said piercers or work supporting centers may be forced to equal depth at both sides of said blank or work piece F; then the said collars are again turned until their handles $M^{49}$ $M^{49}$ are again in the position indicated by the dotted lines for said handles and in such position the said collars will be removed, and owing to the wedge shaped form of said collars and to said inclined ends $M^{45}$, $M^{45}$ of said supporting heads M, M, said collars may easily be removed by their handles; and in case that said piercers or work supporting centers, should purposely penetrate said blank or work-piece more at the one side than at the other; then in such case, it is only required to give said collars $M^{46}$ $M^{46}$ the required different thicknesses; thereby said piercers or work-supporting centers may be forced more into the one side than into the other side of such blank or work-piece, such as for instance in said Fig. 133, and, in case that the thickness of the central or hub part of said blank or work-piece is the same as is the length of the hub of the finished article, then in such case, said shoulders $e^{30}$ $e^{30}$ of said piercers or work-supporting centers $E^6$ $E^6$, will serve for the same purpose as the said collars $M^{46}$ $M^{46}$. Thus as above described, the blank or work-piece at its hub or center portion is now firmly automatically clamped laterally and supported by said piercers or work-supporting centers, for instance $E^6$ $E^6$, in such a way that the said centers $E^6$ $E^6$ with their said axles E E will, as before described, revolve with the work-piece during the operation of the rolls against the work-piece; then the aforesaid raising, lowering and retaining device with its said head piece L is lowered away from the blank or work-piece the distance for instance indicated by the dotted line $y^4$ $y^4$ in Fig. 18 to the position shown in the said Fig. 18. The rolls, during the centering or piercing and centering process, are either in the positions shown in the Fig. 119 wherein are shown, for intsance, the piercers or work-supporting centers $E^1$ $E^1$, or are in the same position when the finished wheel or article is removed from the apparatus or mill, as for instance in Figs. 106, 109, 112, 115 or 118. When the heated work-piece is so supported on said piercers or work supporting centers, the hub or center portion of said work-piece is also automatically put into clamped condition laterally, that is, the hub or center portion of said work-piece is also automatically firmly clamped laterally between said piercers or work supporting centers and which automatic clamping is done by constant pressure in said cylinders N and O, and in this clamped condition said work-piece or its hub or center portion is also moved axially, with said supporting means while so supported and so clamped laterally, into any desired position between the side rolls, and it is also so moved as desired during the centering or piercing and centering process, and as hereinbefore and hereinafter described.

*Dishing, undishing and redishing, and a few rolling examples.*

In case that all the rolls of the apparatus or mill, that is, the rolls of the herein named roughing mill or roughing side of the apparatus or mill, and the rolls of the herein named finishing mill or finishing side of the apparatus or mill, are all used for rolling a wheel or other article, the rolling operation against the blank or work-piece may begin with the herein named edging and web rolling rolls and tread or face rolling roll and therewith may roll the blank or other work piece to either of the form or shape $F^1$, for instance, such as shown in either of the Figs. 17, 104, 107, 136 or 140, or to the form or shape $F^2$ in Fig. 142; but in case the finished article should be a dished car wheel having the form or shape shown, for instance, in the Figs. 1, 10, 28 and 106, the ingot, bloom, blank or other work piece having been rolled by the herein named edging and web rolling rolls, for instance $J^1$ $J^2$, and tread or face rolling roll K, to the form or shape $F^1$ shown in the Fig. 104, and with the said rolls in the position shown in said Figs. 17 and 104, the herein named web finishing rolls for instance $G^1$ $G^2$ and tread or face finishing roll H, may begin the finishing operation against the work piece $F^1$, and during said finishing operation the wheel may also be dished in the following manner:—With reference to the Figs. 104 to 106 inclusive; with the work piece $F^1$ supported on the piercers or work supporting centers for instance $E^1$ $E^1$ and with its hub or center portion automatically firmly clamped laterally between said piercers or work supporting centers and before the dishing commences; the piston rod $N^3$ of the cylinder N with one of the said work supporting heads M M with its said axle E and piercer or work supporting center $E^1$ now under constant and continuous pressure from said cylinder N, thereby causing the piercer or work supporting center $E^1$ to press automatically and continuously toward and against the hub or center portion of the said work-piece F, and the piston rod $O^3$ of the cylinder O with the other work sup porting head M and its axle E and piercer or work supporting center $E^1$ now under constant and continuous pressure from the cylinder O, thereby causing the other piercer or work supporting center $E^1$ to press automatically and continuously toward and against the hub or center portion of said work-piece $F^1$ at the other side of said work-piece $F^1$, will be in the position as shown in the Fig. 104, that is, the piston rods $N^2$ $N^3$ will be at the end of their desired forward stroke adjusted by said nut $N^{12}$, and said nut $N^{12}$ is at rest on the end of the said gland extension $N^{17}$ forming a stop for this purpose, and the sleeve $N^9$ is a certain distance away from the end of the said gland extension $N^{18}$, but the piston rods $O^2$ $O^3$ are not at the end of either of their adjusted forward or pull back strokes adjusted by said nut $O^{12}$ and said sleeve $O^9$; said nut $O^{12}$ is a certain distance away from the end of the said gland extension $O^{17}$ and the distance on the piston rod between said parts $O^{12}$ and $O^{17}$ equals the proper distance required for dishing the wheel, and the sleeve $O^9$ is also a certain distance from the end of the gland extension $O^{18}$, then the dishing may take place in the following manner:—While either any or all the driven rolls or all the rolls are in operation as described, the pressure in said cylinder N is gradually somewhat relieved or reduced, retaining therein however, the constant pressure required in said cylinder N to retain the aforesaid automatically clamped condition of the hub or center portion of said work-piece laterally between said piercers or work supporting centers $E^1$ $E^1$, thereby causing the pressure or force from the cylinder O to overcome the resistance of the piston rod $N^3$ and gradually moving the pistons $O^1$ and $N^1$ and their rods $O^2$ $N^2$ and $O^3$ $N^3$, with their said heads M M and with the center or hub part of the car wheel which by the means aforesaid is firmly held laterally in said automatically clamped condition and revolubly supported by the said piercers or work supporting centers $E^1$ $E^1$, into the position shown in Fig. 105, in which position the wheel is dished as shown, and in this position, if necessary or desired, the rolls may still be in operation for finishing and truing up the wheel to the form or shape shown at $F^2$ in Fig. 105, or, instead of so reducing the constant pressure in said cylinder N, said dishing can also be done in the same manner, by increasing the constant pressure in cylinder O so as to overcome the constant pressure in cylinder N, as hereinafter more fully described. During the dishing or rolling and dishing operation, the rim of the wheel or other article is supported by the rolls, as shown in Fig. 105. In the position shown in the Fig. 105, the nut $O^{12}$ of the rod $O^2$ will now be resting against the end of the said gland extension $O^{17}$ which forms a stop for this purpose, the sleeve $O^9$ will now be farther away from the end of the gland extension $O^{18}$, and the nut $N^{12}$ of the rod $N^2$ will now be a certain distance, that is the proper distance required for dishing, away from the end of the said gland extension $N^{17}$, the distance between the sleeve $N^9$ and end of gland extension $N^{18}$ will now be less. After the wheel or other article is completely dished and finished, then the rolls may be pulled back, as shown in Fig. 106 and the outer piston $L^9$ of the before described raising, lowering and retaining device, with the inner piston at its lower position, is then again raised from the position shown in the Fig. 18 to the position of said head piece L shown in dotted lines in the Fig. 19; then the said piston rods $O^3$ $N^3$ with their said connected parts, are pulled back into the positions shown in the Fig. 106; thereby placing the finished wheel $F^2$ or other finished article on the said head piece L of the said raising, lowering and retaining device, which is then again raised by the inner piston $L^2$ to the position shown in Figs. 4 and 19, when said finished wheel $F^2$ is taken away by any suitable means and another properly heated ingot, bloom, blank or other work piece put in place of it and lowered and centered or pierced and centered, &c., as above described. In the positions shown in the Fig. 106, the piston rods $O^2$ $O^3$ and $N^2$ $N^3$ are pulled back to their operating limit, that is, the sleeve $O^9$ is at rest against the end of gland extension $O^{18}$, forming a stop for this purpose, and the sleeve $N^9$ is at rest against the end of gland extension $N^{18}$, also forming a stop for this purpose.

In the modifications shown in the Figs. 107 to 118 inclusive, the pressure cylinders O and N with their rods shown in the Figs. 104 to 106 inclusive are not shown and only parts of the work supporting heads M M are shown with their axles E E and piercers or work supporting centers, for instance $E^1$ $E^1$, and with different arrangements and forms of rolls. The operations for putting in the ingot, bloom, blank or other work piece and removing the finished article and for centering or for piercing and centering the ingot, bloom, blank or other work piece and for dishing the wheel or other article, are also similar to those described for and illustrated by said Figs. 104 to 106 inclusive. In case that the article which may be desired to be rolled and dished by only such rolls as are shown in the said Figs. 107 to 118 inclusive, then in such case, the rolls not shown in these Figs. 107 to 118 inclusive, will not be used in the rolling or rolling and dishing of such article, and therefore may be omitted; or an apparatus or mill may be made without them. For instance; a wheel or other article is to be rolled and dished with only the rolls shown in Figs. 107 to 109 inclusive, and the dishing done with the same parts while either any or all the driven rolls or all the rolls shown in said Figs. 107 to 109 are in operation and done in the same manner as before described with reference to Figs. 104 to 106 inclusive, and in this case, Fig. 107 shows for instance, a car wheel ingot, bloom or blank centered or pierced and centered as before described and rolled on the before described piercers or work supporting centers, for instance $E^1$ $E^1$, with the herein named edging and web rolling rolls $J^1$ $J^2$ and tread or face rolling roll K to the shape $F^1$ shown in the Fig. 107. Fig. 108 shows said work piece $F^1$ dished and finished to the form or shape of the car wheel $F^2$, as shown. During the dishing or rolling and dishing process, the rim of this wheel or other article, is sufficiently supported by the said rolls $J^1$ $J^2$ and K, as shown, and the dishing process is the same as before described with reference to and illustrated in Figs. 104 to 106 inclusive. Fig. 109 shows the rolls and the piercers or work supporting centers pulled back and the finished wheel $F^2$ ready to be removed, as before described. A wheel or other article may be rolled and dished for instance, with only the rolls shown in Figs. 110 to 112 inclusive, and the dishing done with the same parts while either any or all the driven rolls or all the rolls shown in said Figs. 110 to 112 are in operation and done in the same manner as before described with the Figs. 104 to 106 inclusive; in this case, Fig. 110 shows, for instance, a car wheel ingot, bloom or blank, centered or pierced and centered as before described and rolled on the before described piercers or work supporting centers $E^1$ $E^1$, with the herein named edging and web rolling rolls $J^1$ $J^2$, tread or face rolling roll K and the herein named tread or face finishing roll H, to the form or shape $F^1$ shown in the Fig. 110; and Fig. 111 shows the said work piece $F^1$ dished and finished to the shape of the car wheel $F^2$, as shown. During the dishing or rolling and dishing process, the rim of this wheel or other article is sufficiently supported by the rolls $J^1$ $J^2$ and K, as shown, and the dishing process is the same as before described with reference to and illustrated in Figs. 104 to 106 inclusive; Fig. 112 shows the rolls and the piercers or work supporting centers, pulled back, and the finished wheel $F^2$ ready to be removed, as before described. A car wheel ingot, bloom or blank having the form or shape, for instance, shown at F in the Fig. 113, is to be rolled only at its rim, tread, flange and part of the web next to the rim, and dished with only the use of the rolls shown in the Figs. 113 to 115 inclusive; and the dishing done with the same parts while either any or all the driven rolls or all the rolls shown in said Figs. 113 to 115 are in operation and done in the same manner as before described with reference to Figs. 104 to 106 inclusive. In this case, Fig. 113 shows, for instance, such ingot, bloom or car wheel blank having, for instance, the form or shape shown at F, centered or pierced and centered as before described and ready to be so rolled on the before described piercers or work supporting centers, for instance $E^1$ $E^1$, with only the use of the herein named web finishing rolls, for instance $G^1$ $G^2$, and tread or face roll H, to the form or shape shown at $F^2$ before dished as shown in the Fig. 114, and, the Fig. 114 shows said car wheel blank, bloom or ingot dished and finished to the form or shape of the car wheel $F^2$ shown in the Fig. 114. During the dishing or rolling and dishing process, the rim of this wheel or other article is sufficiently supported by the rolls $G^1$ $G^2$ and H as shown, and the dishing process is the same as before described and illustrated by the Figs. 104 to 106 inclusive. Fig. 115 shows the rolls and the piercers or work supporting centers pulled back, and the finished wheel $F^2$ ready to be removed, as before described. A car wheel blank having the form or shape, for instance, as shown at F in the Fig. 116, is to be rolled only at its rim, tread, flange and part of the web next to the rim, and dished with only the use of the rolls shown in the Figs. 116 to 118 inclusive, and the dishing done with the same parts while either any or all the driven rolls or all the rolls shown in said Figs. 116 to 118 are in operation and done in the same manner as before described with reference to Figs. 104 to 106 inclusive. In this case, Fig. 116 shows, for instance, such ingot, bloom or car wheel blank having the form or shape shown at F, centered or pierced and centered as before described and ready to be so rolled on the before described piercers or work supporting centers, for instance $E^1$ $E^1$, with only the use of the herein named web finishing rolls, for instance $G^1$ $G^2$, the tread or face finishing roll H and the edging and web rolling rolls $J^5$ $J^5$ having the shape as shown (such rolls as $J^5$ $J^5$ may either be driven by their shafts J J or turn loose on bearings attached to the ends of said shafts J J), to the form or shape like $F^2$ before dished as shown in the Fig. 117; and Fig. 117 shows said car wheel blank F dished and finished to the form or shape of the car wheel $F^2$. During the dishing or rolling and dishing process, the rim of this wheel or other article is sufficiently supported by the rolls $G^1$ $G^2$ H and $J^5$ $J^5$, as shown, and the dishing process is the same as before described with reference to and illustrated in Figs. 104 to 106 inclusive. Fig. 118 shows the rolls and the piercers or work supporting centers pulled back and the finished wheel F² ready to be removed as before described.

From the foregoing it will now be observed that the piercers or work supporting centers revolubly or rotatably support the work-piece and that with the constant pressure in said cylinders N and O being operatively connected with said piercers or work supporting centers by the means before described, said piercers or work supporting centers are pressed or forced automatically by constant pressure in said cylinders toward and against the opposite ends of the hub or against the opposite sides of the center portion of the work-piece and thereby the work-piece or wheel at its hub or center portion while so supported by said piercers or work supporting centers, is also automatically put into clamped condition laterally between said piercers or work supporting centers, that is, by constant pressure in said cylinders the hub or center portion of the work-piece or wheel is also automatically firmly clamped laterally between said piercers or work supporting centers, to prevent said hub or center portion from being forced out of its true axial or central and desired lateral positions with the work-piece or wheel during the dishing or undishing, or the rolling and dishing or undishing, processes, and this said constant clamping force or constant clamping pressure automatically and continually remains during said processes and automatically retains the hub or center portion of said work-piece in its true axial or central position during any desired axial or lateral movement of the work-piece or of the hub or center portion of the work-piece or wheel during either of said processes, and while the work-piece or wheel is so supported by said piercers or work supporting centers and is also at its hub or center portion so automatically firmly clamped laterally between said piercers or work supporting centers, said work-piece or its hub or center portion is so automatically moved axially with its said piercers or work supporting centers during either of said processes, as may be desired; and, to cause said automatical axial movement during the operation while the work-piece or wheel at its hub or center portion in automatically clamped condition is dished, or undished, or rolled and dished or undished, or adjusted between the rolls, &c., it will only be required that, either the constant pressure in only one of said cylinders N or O is gradually somewhat reduced so as to cause said automatic axial movement as desired and as before described, or, the constant pressure in only one of said cylinders N or O is gradually somewhat increased so as to overcome the pressure in the other cylinder and thereby cause said automatic axial movement as desired.

In a dished wheel, the web, that is the part of a wheel between the hub part and the rim part, is in an inclined position, as for instance in the wheel F² shown in the Figs. 120, 137, 138 and 141, and in an undished wheel the web is in a straight position, as for instance in the undished finished wheel F² shown in the Fig. 139, and on this account, the said web is longer in the said dished position than in the said straight position, and, the extra length or difference between the length of the web of a dished and undished wheel has to be made up during the dishing process, and for instance, in case that a wheel has been finished by any means to the form or shape, as shown for instance at F² in Fig. 139, and, such wheel is to be dished to the form or shape, as shown for instance at F² in Fig. 137, and, in case such dishing would have to be done, for instance, in the usual manner or through pressure in dies, then in such dishing process, the said web would have to be lengthened by direct extension of the metal in the web in the direction from the hub to the rim part, and thereby will be required an immense force to do such dishing, and during such dishing process it will also be possible to twist the finished rim-part with its tread and flange and cause the wheel to be untrue and out of gage. All such difficulties are prevented with my method and device for dishing or for dishing and rolling, and the force or power required to do the dishing with my device will be very little, as can be easily observed from the following:—With reference to the Figs. 136 and 137 for instance; Fig. 136 illustrates an ingot, bloom, blank or other work piece rolled with the rolls J¹ J² and K to the form or shape F¹ as shown, the roll K having for instance the peripheral or rolling face K²; then with the rolls J¹ J² still in operation, the herein named finishing rolls G¹ G² and H, the roll H having for instance the peripheral or rolling face H¹, commence operating against the wheel, and the dishing may be commenced at the same time, and when completely rolled and dished, the rolls J¹ J² and G¹ G² and H may still operate against or on the wheel to its finish, whereby the wheel is made perfectly true and to balance, also to gage or gages, as shown for instance in the Fig. 137. The said necessary lengthening of the web during dishing is performed during the dishing process by rolling out with the herein named web finishing rolls, for instance, G¹ G² or G⁰ G⁰ or G⁴ as shown in the Figs. 137, 138, 139 and 141, the metal f f near the said inner rim part as indicated by the clearance between the inner rim part of the wheel and the said web reducing roll parts $j^{28}$ $j^{28}$ of the said rolls $J^1$ $J^2$ or $J^0$ $J^0$ or $J^4$, which metal was left there by said web reducing roll parts $j^{28}$ $j^{28}$ of the herein named edging and web rolling rolls $J^1$ $J^2$ or $J^0$ $J^0$ or $J^4$, as shown, and thereby adding during the dishing process by my method of dishing or dishing and rolling, sufficient metal to the web part and providing thereby the required metal for the said extra length to the web part, without producing such above described direct tension in the web. In dishing, for instance, wheels with the rolls shown in the Figs. 107 to 118 inclusive, the said metal for the said extra length of the web may be provided during the dishing process in the following manner: For the dishing or rolling and dishing with the rolls shown in the Figs. 107 to 112 inclusive, the rolls $J^1$ $J^2$ for instance are, during the dishing process, sufficiently moved by the device hereinafter described, against the inner side or sides of the rim in the direction shown by the arrows $f^1$ $f^2$ in the Figs. 108 and 111, and for the dishing or rolling and dishing with the rolls in the Figs. 113 to 118 inclusive, the roll H may, during the dishing process be sufficiently moved, by the device hereinafter described, against the tread and flange of the wheel in the direction shown by the arrows $f^3$ $f^3$ in the Figs. 114 and 117.

In forming or shaping the hub portion for instance of car wheels or other articles, which hub portion may be formed or shaped either before or after the piercing process or during the piercing process, the ends of the hub may become somewhat uneven, for instance similar to the ends $e^{29}$ $e^{29}$ of the hub part of the ingot, bloom or work-piece F shown in the Fig. 126, if rolled on piercers or work-supporting centers formed, for instance at $E^1$ $E^1$, and in cases where it is desired to prevent such, said piercers or work-supporting centers are also each formed as $E^6$ in Figs. 124, 131, 133, 134, 142 and 143; that is, with the shoulder $e^{30}$; such shoulders $e^{30}$ $e^{30}$ with proper diameter to suit the hub part, are formed and located on said piercers or work-supporting centers to suit the diameter and length of the hub of the finished article, and therewith, during the rolling process of forming the hub part, the lateral flow of the metal in the hub is limited, and thereby said ends of the hub may be formed flat and to the desired gage for the length of the hub; said edging and web rolling rolls may come in contact with or come close to said shoulders or flanges during the rolling process of forming the hub, as for instance in the Figs. 142 and 143. Car wheels or other articles after being finished with the apparatus or mill, are bored to suit their axles or shafts, and during such boring, the ends of the hub are generally faced or turned off the gage.

Undishing and redishing is done in similar manner as the dishing; in undishing, the dished object is placed on the centers and while so supported can be moved axially to suit the rolls and then undished while the object revolves.

Tread or face rolls.

The said tread or face rolls are both pressure rolls and consist of the herein named tread or face rolling roll K and the herein named tread or face finishing roll H, the latter being located between the herein named web-finishing rolls and having its axis parallel with the axis of the work-piece, that is, parallel with the axes of the said piercers or work-supporting centers; said tread or face rolling roll being located between the herein named edging and web rolling rolls, and when in central position between said rolls, the axis of the tread or face rolling roll will be parallel with the axis of the work piece, that is, parallel with the axes of the said piercers or work-supporting centers, and said tread or face rolling roll may also be used as a tread or face finishing roll, as herein more fully described. Said tread or face rolls with their rolling faces, during the rolling process, operate against the peripheral face of the work-piece, wheel or other article, either together or independently of each other, and are moved, either together or independently of each other, toward or away from the work-piece, wheel or other article, by pressure cylinders, one for each roll, or by any other suitable means, and either one or both rolls may also be retained at any suitable desired radial distance from the axis of the work piece during the rolling or operating process, as will now be shown and described for each roll.

Tread or face finishing rolls.

With reference to the Figs. 45 to 51 inclusive, illustrating in details the herein named tread or face finishing roll with its supporting slide head $H^5$; Fig. 45 is a section of the head $H^5$ through line $a$—$a$, Fig. 46 with the roll H; Fig. 46 is a side elevation of the head $H^5$ with its upper and lower guides $H^8$ and $H^{14}$ and with the roll H. Fig. 47 is a section through line $b$—$b$, Fig. 46, with the roll and center pin removed; Fig. 48 is an enlarged central section of the roll H with its connections and its peripheral face having, for instance, the shape $H^1$; Figs. 49 to 51 inclusive are parts of diametrical sections of the said roll H showing, for instance, a few more of the many different shapes the peripheral face of said roll may have, as $H^2$ and $H^3$. H is the said tread or face finishing roll and the peripheral face thereof, as before said and described, may have many different shapes, for instance as $H^1$ $H^2$ or $H^3$, or other shape.

The roll H is carried and supported by the said supporting or slide head $H^5$ as shown. Said slide head is formed at its upper side with a guide or slide block $H^6$ whereto is attached on each side a liner $H^9$ as shown which forms bearings with the guide piece $H^8$, and with the plates $H^{10}$ $H^{10}$ which are fitted with tongues and grooves $H^7$ $H^7$ with said guide piece $H^8$, as shown. Said guide piece $H^8$ and plates $H^{10}$ $H^{10}$ form the upper guide bearing which is fitted to the upper bed plate part $C^1$, as shown, and is firmly fastened thereto with the screws $H^{11}$, as shown; at the lower side this head $H^5$ is formed with a guide or slide block $H^{12}$ whereto are attached to its sides the liners $H^{15}$ $H^{15}$, as shown, and which is fitted to the lower guide piece $H^{14}$ and plates $H^{16}$ $H^{16}$, said guide piece $H^{14}$ and plates $H^{16}$ $H^{16}$ forming the lower guide bearing which is fitted to the main bed plate part $B^1$, as shown, and is firmly fastened therewith with the screws $H^{17}$, as shown. The roll H turns loose on a roller bearing, as shown. In said roller bearing, $h^1$ is the outer roller bearing ring whose outside is fitted close to the inner bore of the roll and turns therewith, and whose inner bore forms the bearing surface for the rollers; $h^2$ are the rollers of sufficiently large diameter and sufficient in number to safely resist the pressure or force during the rolling process; $h^3$ is the inner roller bearing ring, whose outside forms the bearing surface for said rollers $h^2$, and whose inner bore is fitted close to the center pin $h^8$ and does not turn; $h^8$ is the center pin fitted close to the head $H^5$ and held therein by the end plate $h^9$ and the screws and pins, as shown; $h^{11}$ is a central bore in said pin $h^8$ provided with the removably fitted cap $h^{10}$ and serving as a lubricating chamber and is connected with the roller bearing by the holes $h^{12}$ $h^{12}$; $h^{13}$ is an annular space formed inside of the roll with a removably fitted cap $h^{14}$ and also serves as a lubricating chamber and is connected with the surfaces between the end plates $h^4$ $h^4$ of the roll and the inner sides of the said head $H^5$ at each side thereof by the holes or channels $h^{15}$ and $h^{16}$, as shown. The rollers with their annular washers $h^7$ $h^7$ at their ends are retained endwise by the inner flanges $h^5$ $h^5$ of the annular end plates $h^4$ $h^4$ which are fitted to the sides of the roll, as shown, and fastened thereto by the screws, as shown.

The said tread or face finishing roll H with its said supporting or slide head $H^5$ is located between the said web finishing rolls, for instance $G^1$ $G^2$, and is moved in said guide or slide bearings $H^8$ and $H^{14}$ at right angles with the axis of the work piece, as shown, toward or away from the work piece, such as the case may require, by means of the pressure cylinder $H^{27}$, Figs. 10 and 28 and 30, or by any other suitable means. To the said head $H^5$ is attached the piston rod $H^{20}$ of said cylinder $H^{27}$ and it is firmly held and connected with said head $H^5$ by means of the shoulder $H^{18}$ and the key $H^{19}$, as shown in the Figs. 45 and 46. Said cylinder $H^{27}$ with its lower and upper sides is firmly fitted, with its lower side with the main bed plate part $B^1$ and with its upper side with the upper part of the bed plate part $C^1$, and is firmly fastened with said bed plates by the keys $H^{29}$ $H^{29}$ and screws or bolts $H^{28}$ as shown for instance in Fig. 30. The said pressure cylinder $H^{27}$ has piston $H^{21}$ with a rod $H^{20}$ and a rod $H^{22}$ passing through the cylinder heads $H^{30}$ and $H^{31}$ at both ends of cylinder $H^{27}$; the piston rod $H^{20}$ at its outer end is firmly attached to said head $H^5$ by means of the said shoulder $H^{18}$ and key $H^{19}$. The piston rod $H^{22}$ near its end $H^{26}$ is firmly fitted and fastened to the cross-head $H^{40}$ and from there the piston rod is provided, as shown in the Fig. 10, with a long thread $H^{23}$ over which is fitted a threaded adjustable nut $H^{24}$ made in halves and firmly held together and to the piston rod by means of screws $H^{25}$; this said nut $H^{24}$ can be adjusted from one end to the other end of said thread $H^{23}$ and with the end of the extension $H^{32}$ of the packing box gland forms a stop for the forward stroke of piston $H^{21}$, and by adjusting said nut $H^{24}$ forward or backward, as the case may require, the forward stroke of piston $H^{21}$ is regulated and thereby the limit of the forward movement of the tread or face finishing roll H is adjusted. At a suitable distance from the end $H^{26}$ of said rod $H^{22}$ is located an adjusting screw $H^{34}$ which is formed at its end with the enlargement $H^{36}$ forming a stop to limit the movement of the finishing roll H away from the work piece, and near its outer end is provided with a lock nut $H^{35}$. Said screw $H^{34}$ is firmly supported by the cross piece $H^{37}$ by means of the upper and lower distance rods $H^{38}$ $H^{38}$ and fastened therewith by the nuts $H^{39}$ $H^{39}$ as shown in the Fig. 30. The end $H^{36}$ of said screw $H^{34}$ forms with said end $H^{26}$ of the piston rod $H^{22}$ a stop for the pull back stroke of piston $H^{21}$, and by adjusting said screw $H^{34}$ forward or backward, as the case may require, the pull back stroke of said piston $H^{21}$ is regulated and thereby the limit of the return or pull back movement of the tread or face finishing roll H is adjusted.

The said cross head $H^{40}$ is formed at each of its lower and upper sides with a trunnion $H^{41}$ which is formed with the reduced end $H^{42}$; to which reduced end, see Fig. 29, is fitted a guide or slide block $H^{44}$ which is closely fitted to the bearing of the guide bracket $H^{45}$ provided with the side bearing plate $H^{46}$ which is bolted to said bracket $H^{45}$ by the screws $H^{47}$, as shown. Said guide bracket $H^{45}$ is fitted with its lower side to the main bed plate part $B^1$ and with its upper side to the upper bed plate part $C^1$, and is firmly fastened with said bed plates with the screws or bolts $H^{48}$ $H^{48}$, as shown. To said trunnions $H^{41}$ $H^{41}$ are fitted the pressure blocks $H^{43}$ $H^{43}$ (see also Fig. 10) which are closely fitted to the forked ends $H^{53}$ $H^{53}$ of the crank $H^{49}$ and form slide bearings therewith. The said crank $H^{49}$ has its hub part made in halves which are firmly held together and to the vertical shaft $H^{50}$ with the keys $H^{51}$ and bolts $H^{52}$ as shown. The said vertical shaft $H^{50}$ is formed at its upper end with a journal which is firmly supported in the bearing $H^{73}$ located in the upper bed plate part $C^1$, and at its lower end it is also formed with a journal which is firmly supported in the lower bearing $H^{74}$ located in the lower sole or base plate part $A^1$, and the total weight of said vertical shaft $H^{50}$ with its cranks $H^{49}$ and $H^{54}$ is supported by the ball thrust bearing $H^{75}$, as shown in the Figs. 4 and 29. To the lower part of said vertical shaft $H^{50}$ and between said main bed plate part $B^1$ and the lower sole or base plate part $A^1$ and near the lower side of main bed plate part $B^1$, is also firmly fitted and fastened the crank $H^{54}$ in the same manner as is said crank $H^{49}$. This said crank $H^{54}$ at the ends of its arms $H^{56}$ $H^{56}$, is provided with a journal pin $H^{57}$, to which is connected the rod $H^{62}$ with its end bearing which is made in halves, as at $H^{58}$ $H^{59}$, and which are held together and to the journal $H^{57}$ and to the rod $H^{62}$ by the bolts $H^{60}$ provided with lock nuts $H^{61}$, as shown in the Figs. 2 and 3. The said rod $H^{62}$ with its other end is connected to the journal pin $H^{63}$ of the loose rocking crank which consists of halves $H^{64}$ and $H^{65}$ which are held together and to the journal on the vertical shaft $H^{67}$ by the bolts $H^{66}$ as shown. The weight of said rocking crank with the rods $H^{62}$ and $H^{72}$ is supported by the ball thrust bearing $H^{68}$, as shown in the Fig. 4. The said vertical shaft $H^{67}$ is firmly fastened with its upper end to the main bed plate part $B^2$ by means as shown, and with its lower end is firmly fastened to the lower sole or base plate part $A^3$ by means of the collar $H^{69}$ which is made in halves and screws $H^{70}$, as shown. On the lower ball thrust bearing $J^{159}$ at the lower end of said vertical shaft $H^{67}$ is also located on said vertical shaft, the loose rocking crank which consists of the halves $J^{64}$ and $J^{65}$ which are held together and to the journal on said vertical shaft by the bolts as shown. On the upper side of said collar $H^{69}$ is located the said lower ball thrust bearing $J^{159}$ which supports the total weight of both said loose rocking cranks with their rods $H^{62}$ $H^{72}$ and $J^{62}$ $J^{72}$. To the journal pin $H^{71}$ of said rocking crank $H^{65}$ is connected the rod $H^{72}$, which with its other end is connected with the journal pin $K^{57}$ of the crank $K^{54}$ and firmly fastened to the vertical shaft $K^{50}$, to which shaft is also firmly fastened the crank $K^{49}$ by similar means as are the said cranks $H^{54}$ and $H^{49}$. The said crank $K^{49}$ (see also Fig. 17) is connected through the pressure blocks $K^{43}$ $K^{43}$ with the trunnions $K^{41}$ $K^{41}$ of the cross head $K^{40}$, in the same manner as is the connection with the crank $H^{49}$. Said cross head $K^{40}$ is similar to the cross head $H^{40}$ and is similarly guided in bearings of the guide bracket $K^{45}$; this guide bracket $K^{45}$ being fitted with its lower side to the main bed plate part $B^2$ and with its upper side to the upper bed plate part $C^7$ and firmly fastened with said bed plates with screws or bolts $K^{48}$, as shown. The said vertical shaft $K^{50}$ (see also Fig. 4) is formed at its upper end with a journal which is firmly supported in the bearing $K^{73}$ located in the upper bed plate part $C^7$, and at its lower end it is also formed with a journal which is firmly supported in the bearing $K^{74}$ located in the lower sole or base plate part $A^4$, and the total weight of said vertical shaft $K^{50}$ with its cranks $K^{54}$ and $K^{49}$ is supported by the ball thrust bearing $K^{75}$ as shown in the Fig. 4. The said cross head $K^{40}$ (see Fig. 17) is firmly attached near the piston rod end $K^{26}$ to piston rod $K^{22}$ of the pressure cylinder $K^{27}$ for the herein named tread or face rolling roll K.

*Tread or face rolling roll.*

The said tread or face rolling roll may also be used as a tread or face finishing roll. With reference to the Figs. 52 to 59 inclusive, illustrating in details the herein named tread or face rolling roll with its supporting arms $K^6$ $K^6$, Fig. 52 is a plan view of the Fig. 53 with the head plate $K^{11}$ removed and shows the roll K in its central position with respect to its range of movement laterally; Fig. 53 is a sectional side elevation, showing the roll in elevation; Fig. 54 is a sectional end view through c—c, Fig. 52, the roll being omitted; Fig. 55 is an enlarged central section of the roll K with part of its supporting arms $K^6$ $K^6$, the peripheral face of said roll K shown herein having the shape $K^1$; Figs. 56 to 59 inclusive are parts of diametrical sections of said roll K, showing for instance, a few more of the many shapes the peripheral or rolling face the roll K may have, as $K^2$ $K^3$ $K^4$ and $K^5$. K is the said tread or face rolling roll and the peripheral or rolling face thereof, as before described, may have many different shapes, for instances as $K^1$, $K^2$, $K^3$, $K^4$ or $K^5$, &c., or other shape. In rolling for instance car wheels, the lateral thickness or width of said face roll K, is the same as is the lateral thickness or width which the outer or rim portion of the car wheel is to have when finished, as is shown for instance in the Figs. 136 and 140, thereby, with said roll K formed as shown and as and for the purpose hereinafter described for instance with reference to the Figs. 136, 140, 146, 147 and 148, and with the inner rolling or operating portion of the web reducing roll part $j^{28}$ of the edging and web rolling rolls $J^1$, $J^2$ or $J^4$, &c., formed sufficiently conical, as and for the purpose hereinafter fully described for instance with reference to the Figs. 95, 96, 136, 140 and 158 and, with all said three rolls for instance $J^1$, $J^2$ and K situated in a plane passing laterally through the work-piece or car wheel at one side of its axis, that is to say, in a plane passing laterally through the opposite sides or ends and through the periphery of the work-piece at one side of its axis, and with said three rolls so moved and operated during the rolling or forming of the rim portion to rudimentary form as and for the purpose hereinafter described, I have also accomplished to roll or work continually during the said rolling or forming process the metal in the peripheral face and total rim portion of the work-piece or car wheel continually upon all its surfaces simultaneously with said three rolls for instance $J^1$, $J^2$ and K as before said and as shown for instance in said Figs. 136, 140 and 158 and which to my knowledge, together with the results obtained thereby, was never done or accomplished before in rolling car wheels, whereby the metal in said peripheral face and whole rim portion is uniformly condensed to its maximum and is also rolled smooth on all its surfaces to the desired form or shape without leaving a raised circular portion or fin which would have to be removed afterward by turning or other costly means, as hereinafter more fully described. The roll is carried at the ends of the fork shaped arms $K^6$ $K^6$; these arms $K^6$ $K^6$ at their other ends being formed with a bearing fitted over the journal pin $K^7$ as shown, on which journal pin $K^7$ the arms $K^6$ $K^6$ with the roll K are carried and supported and permitted to have lateral play, for instance such as is indicated from the dotted line $d$ in Fig. 52, which line is drawn as shown, at right angle to the axis of the roll K and from the axis of the pin $K^7$ through the center of the width of the roll's face, to the dotted radial lines $e$ or $f$, as shown. Such lateral swing or play is limited by the stops $K^{15}$ $K^{15}$ which are formed on the supporting head $K^{12}$ and during the rolling process, said arms $K^6$ $K^6$ will not be permitted to come against said stops $K^{15}$ $K^{15}$. During such rolling process, as for instance illustrated by the Fig. 136 and while the rolls $J^1$ $J^2$ shifting from their position indicated by their dotted lines until they reach the position shown by their solid lines, and owing to the shape of the peripheral or rolling face $K^2$ of said roll K being in this case wholly or partly conical as shown, the said roll K will be forced against the roll $J^2$, and as the distance between the peripheral faces of the edging roll parts $j^{29}$ $j^{29}$ of the edging and web rolling rolls $J^1$ $J^2$ may at such time be greater than the width of the face of said roll K, the roll K will be made to swing on said journal pin $K^7$ to a position between said radial dotted lines $d$ and $f$ in Fig. 52, and owing to said permitted lateral play, the arms $K^6$ $K^6$ will not receive any lateral bending action, but, if said arms $K^6$ $K^6$ would not be permitted such lateral play and would for instance be formed with the head $K^{12}$ in one piece, then in such case, said arms would also have to resist a lateral bending action which would have a tendency to bend or break such arms or their connections with the said head $K^{12}$, and, to prevent such lateral bending action, is the main purpose of said lateral play. Said journal pin $K^7$, with its lower end is fitted to the said supporting or slide head $K^{12}$ and is fastened thereto also with the pin $K^8$, and with its upper end is fitted to the head plate $K^{11}$ and is fastened thereto also with the pin $K^9$, as shown. Between the upper side of $K^6$ and the inner side of $K^{11}$, is placed on the pin $K^7$ a loose collar or washer $K^{10}$, by which the proper position of the roll K with the arms $K^6$ $K^6$ may be adjusted on said pin $K^7$; for instance, the said washer $K^{10}$ may be placed on the lower end of said arms $K^6$ $K^6$; or, for instance, two such washers, each only half the thickness of $K^{10}$ may be placed, one on the upper end and one on the lower end of said arms $K^6$ $K^6$; or, such thicknesses of washers as the case may require may be used in place of the one washer $K^{10}$. Said head plate $K^{11}$ is removably fitted to said head $K^{12}$ by tongues and grooves, as shown, and firmly fastened thereto with the screws $K^{13}$, as shown, thereby practically forming one piece with said head $K^{12}$. The said supporting or slide head $K^{12}$ is formed at its lower side with a guide or slide block, as shown, and therewith forming with the guide piece $K^{14}$ and its plates $K^{16}$ $K^{16}$ which are fitted to $K^{14}$ with tongues and grooves as shown, the guide bearing which is fitted to the main bed plate part $B^2$ as shown and firmly fastened therewith by the screws or bolts $K^{17}$ $K^{17}$ as shown. The said tread or face rolling roll K turns loose on a roller bearing, as shown. In said roller bearing, $k^1$ is the outer roller bearing ring, whose outside is fitted close to the inner bore of the roll and turns therewith and whose inner bore forms the bearing surface for the rollers; $k^2$ are the rollers of sufficiently large diameter and sufficient in number, to safely resist the pressure or force during the rolling process; $k^3$ is the inner roller bearing ring whose outside forms the bearing surface for said roller $k^2$ and whose inner bore is fitted close to the center pin $k^8$ and does not turn; $k^8$ is the center pin fitted closely into the bores at the ends of said arms $K^6$ $K^6$ and held therein by the end plate $k^9$ and the screws and pins, as shown; $k^{11}$ is a central bore in said pin $k^8$ provided with the removably fitted cap $k^{10}$ and serves as a lubricating chamber and is connected with the roller bearing by the holes $k^{12}$ $k^{12}$; $k^{13}$ is an annular space formed inside of the roll and provided with a removably fitted cap $k^{14}$ and also serves as a lubricating chamber and is connected with the surfaces between the end plates $k^4$ $k^4$ of the roll and the inner sides of the ends of said arms $K^6$ $K^6$ by the holes or channels $k^{16}$ $k^{16}$, as shown. The rollers with the annular washers $k^7$ $k^7$ at their ends are retained endwise by the inner flanges $k^5$ $k^5$ of the annular end plates $k^4$ $k^4$, which are fitted to the sides of the roll and to the sides of the outer roller bearing ring and are fastened to the roll by screws $k^6$, as shown.

The said tread or face rolling roll K with said arms $K^6$ $K^6$ and said supporting or slide head $K^{12}$ is located between the said edging and web rolling rolls, for instance $J^1$ $J^2$ and their shafts J J, and is moved in said guide or slide bearing $K^{14}$ at right angles with the axis of the work piece, as shown, forward or backward, as the case may require, by means of a pressure cylinder $K^{27}$, see for instance Figs. 17 and 28 to 30 inclusive, or by any other suitable means. To the said supporting or slide head $K^{12}$ is attached the piston rod $K^{20}$ of said cylinder $K^{27}$, which rod is firmly held and connected with said head $K^{12}$ by means of the shoulder $K^{18}$ and the key $K^{19}$, as shown in Fig. 53.

The said cylinder $K^{27}$ with its lower and upper sides is firmly fitted, with its lower side with the main bed plate part $B^2$ and with its upper side with the upper bed plate part $C^7$ and firmly fastened with said bed plates by keys $K^{29}$ $K^{29}$ and screws or bolts $K^{28}$, as shown for instance in the Figs. 4 and 30. Said pressure cylinder $K^{27}$ has a piston $K^{21}$ with a rod $K^{20}$ and a rod $K^{22}$ passing through the cylinder heads $K^{30}$ and $K^{31}$ at both ends of cylinder $K^{27}$. The piston rod $K^{20}$ at its outer end is connected with said head $K^{12}$ by means of the aforesaid shoulder $K^{18}$ and key $K^{19}$, and near the cylinder end is provided as shown in Fig. 17 with a long thread $K^{34}$, over which is fitted a threaded adjusting nut $K^{36}$ which is made in halves and firmly held together and to the piston rod by means of the screws $K^{37}$, as shown. The nut $K^{36}$ can be adjusted from one end to the other end of said thread $K^{34}$, and with the end of the extension $K^{33}$ of the packing box gland forms a stop for the pull back stroke of the piston $K^{21}$, and by adjusting said nut $K^{36}$ forward or backward, as the case may require, the pull back stroke of the piston $K^{21}$ is regulated and thereby the limit of the pull back movement of the tread or face rolling roll K is adjusted. The piston rod $K^{22}$ near its end $K^{26}$ is firmly fitted and fastened to the said cross head $K^{40}$, and from there, the piston rod is provided, as shown in Fig. 17, with a long thread $K^{23}$ over which is fitted a threaded adjustable nut $K^{24}$ which is made in halves and firmly held together and to the piston rod by means of screws $K^{25}$, as shown. The nut $K^{24}$ can be adjusted from one end to the other end of said thread $K^{23}$, and with the end of the extension $K^{32}$ of the packing box gland forms a stop $K^{32}$ for the forward stroke of the piston $K^{21}$, and by adjusting said nut $K^{24}$ forward or backward, as the case may require, the forward stroke of piston $K^{21}$ is regulated and thereby the limit of the forward movement of the tread or face rolling roll K is adjusted.

*Tread or face rolls; movement and pressure equalizing device by which said rolls may also be moved and operated against the ingot, bloom, blank or other work piece, either together or independently of each other.*

As before described and illustrated, for instance, in Figs. 2, 17 and 28, the herein named tread or face rolling roll K, through the said sliding head $K^{12}$, piston rod $K^{20}$, piston rod $K^{22}$, cross head $K^{40}$ and cranks $K^{49}$ and $K^{54}$, is connected with the rod $H^{72}$, loose rocking crank $H^{65}$ $H^{64}$, rod $H^{62}$, cranks $H^{54}$ and $H^{49}$, cross head $H^{40}$, piston rod $H^{22}$, piston rod $H^{20}$ and with said sliding head $H^5$ carrying the herein named tread finishing roll H; and thereby equalizing the movement and the pressure of said tread or face rolling roll and said tread or face finishing roll against the work piece; that is, with the rods $H^{62}$ and $H^{72}$ connected as shown, in Figs. 2 and 28, said tread or face rolls H and K may be moved toward or away from the work piece together, that is, each the same distance. For some rolls or articles it is required that each one of said rolls H and K be moved toward, against, or away from the work piece independently of each other; or, one of said rolls H or K may be used only, and in such cases, the said rods $H^{62}$ and $H^{72}$ will be disconnected, for instance; the one end of the rod $H^{62}$ be disconnected from the journal pin $H^{57}$ of the crank $H^{54}$ and swung on the journal $H^{63}$ into the position indicated by the dotted lines for $H^{62}$ and in this position the rod $H^{62}$ is supported at one end by the crank part $H^{64}$ and at the other end by a bracket (not shown) placed on the foundation wall D in Fig. 2; and, the end of the rod $H^{72}$ be disconnected from the journal pin $K^{57}$ of the crank $K^{54}$ and swung on the journal pin $H^{71}$ into the position indicated by the dotted lines for $H^{72}$ and in this position, the rod $H^{72}$ is supported at one end by the crank part $H^{65}$ and at the other end by a bracket (not shown) placed on the foundation wall D in Fig. 2. By this means, said tread or face finishing roll H and said tread or face rolling roll K, may be worked, either together or independently of each other.

*Tread or face rolls and device for indicating diameters of the blank, work piece or wheel during the rolling process.*

Between the said supporting or slide head $H^5$ and the said cylinder $H^{27}$, see for instance Figs. 30 to 32 inclusive, is attached to the piston rod $H^{20}$, the arm $H^{76}$ which with its upper end is connected to one arm of the bell crank $H^{78}$ by the link $H^{77}$, and the other arm of said bell crank $H^{78}$ is connected with the crank $H^{80}$ by the link $H^{79}$. Said bell crank $H^{78}$ is supported on journals at $H^{89}$; said crank $H^{80}$ which also serves as a balance weight is mounted on the shaft $H^{90}$ to whose outer end is fastened the pointer $H^{81}$; said shaft $H^{90}$ is turned forward and backward, as the case may be, in bearings formed with or attached to the dial piece $H^{82}$; this dial piece being supported by the upper bed plate part $C^1$ and fastened thereto by the screws $H^{88}$ as shown. Said dial piece $H^{82}$ at the face of its upper segmentally formed side is provided with a curved scale which may be graduated to any convenient scale; for instance, from 0 to 16 as shown. The Fig. 31 shows, on an enlarged scale, the upper part of the dial piece $H^{82}$ with the scale and indicator parts connected therewith; Fig. 32 shows the same in section. In case the piston with the rod $H^{20}$ is at its maximum pull back stroke, then the pointer $H^{81}$ will be at the beginning point of the graduations; that is, at the line 0, and when said piston with the rod $H^{20}$ is at its maximum forward stroke, then the pointer $H^{81}$ will be at the end of the graduations; that is, at the line 16; thus the position of the piston and of the roll H and also the diameter of the wheel or other article, can always be seen from the dial during the operation of rolling or at any other time. Near its said upper side the dial face is provided with a T-shaped groove $H^{83}$ to which is fitted the slide piece $H^{85}$ and the washer plate $H^{84}$ which is provided with bolt and nut $H^{86}$, as shown; said slide piece $H^{85}$ is also provided with the pointer $H^{87}$, as shown. This slide piece is used in the following manner:—In case the wheel or other article during the rolling process has reached its proper finished diameter, with the tread or face finishing roll H in such position, that the pointer $H^{81}$ is, for instance, in line with the line $11\frac{1}{2}$ on the scale, that is, half way between the lines 11 and 12 of the scale, then the pointer $H^{87}$ with its slide piece $H^{85}$ will be moved and set to such position and there fastened to the dial piece by the means of said washer plate $H^{84}$ and bolt $H^{86}$, as shown by the dotted lines for said $H^{85}$ $H^{87}$ in the said Fig. 31, and, all the wheels or other articles rolled to such diameter, may be rolled with the pointer $H^{87}$ set in line with said line $11\frac{1}{2}$ on said scale, and, when the tread or face finishing roll H reaches such position, the pointer $H^{81}$ will be in line with said pointer $H^{87}$, as is shown in the Fig. 30, and, in such position, any further movement of said tread or face finishing roll H, either forward or backward, will be stopped and the roll held in such position, either by the pressure in the cylinder $H^{27}$ or by the aforesaid adjustable stops $H^{24}$ $H^{32}$ or by $H^{26}$ $H^{36}$ as the case may be, or by any other suitable means.

At the end of said supporting or slide head $K^{12}$ for said arms $K^5$ $K^6$ and said tread or face rolling roll K, see for instance Fig. 30, is attached to the piston rod $K^{20}$ the arm $K^{76}$ which with its upper end is connected to the lever arm $K^{78}$ provided with the balance piece $K^{80}$, by the link $K^{77}$; said lever arm $K^{78}$ is mounted on the shaft $K^{90}$ to the outer end of which is fastened the pointer $K^{81}$; said shaft $K^{90}$ turns forward or backward, as the case may be, in bearings formed with or attached to the dial piece $K^{82}$. This dial piece is supported by the cross-pieces $K^{91}$ and $K^{94}$ and fastened thereto by the screws or bolts $K^{88}$, as shown. Said cross pieces $K^{91}$ and $K^{94}$, are supported at their ends by hollow columns $K^{92}$ $K^{92}$ and $K^{95}$ $K^{95}$, which are supported by the main bed plate part $B^2$ and fastened thereto by means of threaded rods $K^{93}$ $K^{93}$ and $K^{96}$ $K^{96}$ which pass through the center of said hollow columns and also through the ends of said cross pieces, as shown in the Figs. 28 and 30, and whereby said dial piece $K^{82}$ with its indicator parts is substantially supported by and fastened to said main bed plate part $B^2$. Said dial piece $K^{82}$ at the face of its upper segmentally formed side is provided with a curved scale graduated to any convenient scale, for instance from 0 to 16 as is shown in said Fig. 30. The T-shaped groove $K^{83}$ and the parts $K^{84}$, $K^{85}$, $K^{86}$ and $K^{87}$, are similar to the like parts in said Figs. 31 and 32 and as described for the indicator for the tread or face finishing roll H. In case that the piston rod $K^{20}$ is at its maximum pull back stroke, then the pointer $K^{81}$ will be at the beginning point of the graduations at the line 0 on the scale, and when said piston with the rod $K^{20}$ is at its maximum forward stroke, then the pointer $K^{81}$ will be at the end of the graduations at the line 16 of the scale; thus the position of the piston and of the roll K and also the diameter of the wheel or other article can always be seen from the dial during the rolling progress, or at any other time. The slide piece $K^{85}$ with pointer $K^{87}$ is used and adjusted in the same manner as explained above with reference to the tread or face finishing roll H, that is, in case the work piece or wheel or other article has reached its desired diameter during the rolling process, with the tread or face rolling roll K in such position that the pointer $K^{81}$ is, for instance, in the position shown in the Fig. 30, then in this case, the pointer $K^{87}$ with its slide piece $K^{85}$ will be moved and set in line with the pointer $K^{81}$ and there fastened to the dial piece $K^{82}$ by the means of said bolt $K^{86}$, as is shown in Fig. 30; and all the wheels or other articles rolled to such said diameter, may be rolled with the pointer so adjusted, and when the tread or face rolling roll K reaches such position, the pointer $K^{81}$ will be in line with said pointer $K^{87}$, as in the Fig. 30, and in such said position, any further movement of the tread or face rolling roll K, either forward or backward will be stopped and the roll firmly held in such position, either by the pressure in the cylinder $K^{27}$, or by the aforesaid adjustable stops $K^{24}$ $K^{32}$ or by $K^{36}$ $K^{33}$, as the case may be, or by any other suitable means.

*Web finishing rolls or finishing rolls.*

The said web finishing rolls are both positively driven side rolls and are oppositely located one at each side of the work piece, and when against the work piece, their shafts are inclined to each other, and during the rolling process, may operate against the web and inner rim part of the work piece or wheel or other article, either together or independently of each other, and are also moved either together or independently of each other, toward or away from the work piece or wheel or other article by pressure cylinders, one for each roll, or by any other suitable means; and, said web finishing rolls are also formed so that they may be made, if desired, to form with the tread or face finishing roll at each side thereof, a stop for their movement against the work piece or wheel or other article and thereby also assist in turning or driving the tread or face finishing roll by frictional contact, all of which will now be described.

Said web finishing rolls are located one at each side of the work piece, as for instance; $G^1$ $G^2$ in the Figs. 1 and 10; therein the web finishing roll $G^2$ is located at the said this side of the work piece, and the other web finishing roll $G^1$ is located at the other side of the work piece, and when said rolls are against the work piece, their shafts are inclined to each other, as for instance in said Figs. 1 and 10, and, the parts in connection with said roll $G^1$ at the other side of the work piece, are similar to like parts connected with the said roll $G^2$ at this side of the work piece.

In most cases, said web finishing rolls are formed for instance as $G^1$ and $G^2$ in the Figs. 136 to 138 inclusive, that is,—the part $g^{136}$ of each of said rolls $G^1$ $G^2$ is the herein named web finishing roll part, operating as shown on the web and inner rim part of the wheel or other article; and, the part $g^{137}$ of each of said rolls $G^1$ $G^2$ is as shown, not operating against the work piece, but in most cases may be permitted to press against the sides of the tread or face finishing roll H as shown, thereby forming a stop for said web finishing rolls at or near the work piece in the direction of their movements toward the work piece and thereby also assisting in turning or driving said tread or face finishing roll H by frictional contact therewith; or, such rolls are formed as for instance $G^3$ $G^4$ in the Figs. 140 and 141, wherein the roll $G^3$ is moved toward the work piece from the position shown in Fig. 140 to the position shown in Fig. 141, in which position said roll $G^3$ is retained during its operation against the work piece until the wheel is dished and finished, and the said roll $G^4$ with its said web finishing roll part $g^{136}$, in finishing and dishing this wheel, which has its rim and hub part extended on the one side of said wheel only, as shown, is operating and moved against the inner web and rim part of said wheel, as shown in said Fig. 141; or, such rolls are wholly formed conical, as for instance $G^5$ $G^6$ in the Fig. 142, wherein the roll $G^5$, during its operation against the work piece, is retained in position against the roll part $H^3$ of said tread or face finishing roll H, as shown, until the article is finished, while said other roll $G^6$ is operating and is moved against the work piece, and thereby finishing the article to the form or shape $F^2$, as shown in said Fig. 142.

With reference to Figs. 65 to 70 inclusive, illustrating in details, one of the herein named web finishing rolls mounted with its adjustable driving shafts G $G^8$ in the swinging or oscillating frame parts $G^{16}$ and $G^{18}$; Fig. 65 is in part a section through $a$—$a$, Fig. 67, showing the shaft in elevation, with the lower frame part $G^{16}$ in plan view; Fig. 66 is a plan view of the upper frame part $G^{18}$; Fig. 67 is a side elevation, partly in section through $b$—$b$, Figs. 65 and 66, and with part of the lower guide $M^{31}$ and part of the upper bed plate part $C^1$; Fig. 68 is a section through $c$—$c$, Fig. 65, showing the bearing parts in elevation; Fig. 69 is a section through $d$—$d$, Fig. 65, showing one-half of the bearing in elevation with the shaft $G^8$ and adjusting sleeve $g^{20}$ removed; Fig. 70 is an end view of Fig. 69 of the upper part of the bearing $G^{11}$ showing the connection with the upper frame part $G^{18}$ in section. $G^2$ is one roll of a set of the herein named web finishing rolls; such set of rolls may have, as before described, many different shapes, as for instance, $G^0$ $G^0$ or $G^1$ $G^2$ or $G^3$ $G^4$ or $G^5$ $G^6$ or may have any other suitable shape; and, each roll may be either formed in one piece with its said shaft G, or be removably attached thereto, for instance as shown in the Figs. 97, 98, 99 and 101; Fig. 101 shows one of the shafts formed in one piece with its roll and which roll has, for instance, the shape $G^0$, as shown, or any other suitable shape, and in the Figs. 98 and 99 is shown in detail, the means for removably fastening said web finishing rolls to the one end of their shafts G G. In said Fig. 98, is shown part of one of said shafts G G of which each is formed at its outer end with a shoulder and with a conical part and with a reduced end which is provided with a thread $g^2$ as shown. Said conical part is provided with the keys or feathers $g^1$, as shown, and said threaded end $g^2$ is provided with a lock nut $g^4$. This lock nut $g^4$ at its outer end is provided with grooves $g^7$, as shown, and corresponding with similar grooves $g^8$, as shown, in the end of said threaded end $g^2$, which threaded end is also provided with a pin $g^3$ which is firmly fastened to said threaded end $g^2$, as shown; into said grooves $g^7$ and $g^8$ and over said pin $g^3$ is fitted the lock piece $g^5$ which is held to said pin $g^3$ and to said grooves $g^7$ and $g^8$ by the split pin $g^6$, as shown; thereby said nut $g^4$ is prevented from turning in either direction on its shaft G. Each of the said interchangeable web finishing rolls, as for instance the roll $G^0$ in Fig. 98, fits over said conical part and over said feathers and is turned or driven from its shaft G by means of said feathers $g^1$, and is held to said end by the said lock nut $g^4$. In Fig. 98, the roll $G^0$ is shown as removably attached to its shaft G, and in Fig. 101 the roll $G^0$ is shown as formed in one piece with its shaft G. The said means for removably attaching said web finishing rolls to their shafts G G, as above described and shown by the Figs. 98 and 99, are similar to the means for removably attaching the herein named edging and web rolling rolls to the ends of their shafts J J, as is illustrated in Figs. 82 to 88 inclusive. The other end of each of said shafts G G is removably fitted into a socket part $G^9$ which is formed with its shaft $G^8$ at one end thereof, as shown, in the following manner with reference to the Figs. 97, 100, 102 and 103, which show the details thereof in an enlarged scale;—Fig. 97 is a longitudinal section through part of said socket part $G^9$ and shows the shaft parts and roll in elevation; Fig. 100 is a section through $e$—$e$ Fig. 97; Fig. 102 is a section through $g$—$g$ Fig. 97; and Fig. 103 is a section through $f$—$f$ Fig. 97. The end of shaft G which fits into said socket part $G^9$ is formed tapered or conical at $g^9$ and at $g^{10}$, and at $g^{11}$ is formed cylindrical as shown; a key $g^{14}$ being fitted and driven as shown, forces the conical parts $g^9$ $g^{10}$ of the shaft G into the conical bore of said socket, thereby holding said shaft G firmly central and in line with the axes of shaft $G^8$ and its socket part $G^9$. At the end of said key $g^{14}$ is a pin $g^{15}$ driven into holes of said socket part $G^9$, as shown, to prevent said key from working out. The cylindrical part $g^{11}$ of said shaft G may fit loose into the cylindrical bore part of socket $G^9$; said cylindrical part $g^{11}$ being provided with keys or feathers $g^{12}$, as shown, which fit into key ways formed in said cylindrical bore-part of said socket part $G^9$ and thereby said shaft with its roll is turned or driven from said shaft $G^8$. In said socket part $G^9$ at the end of said conical shaft part $g^{10}$ a slotted hole $g^{13}$ is provided as shown. To remove said shaft G from the socket part $G^9$, said pin $g^{15}$ and key $g^{14}$ are removed, and a key driven into said slotted hole $g^{13}$ and against the end of said conical shaft part $g^{10}$, will loosen the shaft from its socket, after which said shaft may easily be removed. Said shaft $G^8$ has one end $G^{30}$ of a universal coupling removably fitted to its other end $g^{28}$ by means of the keys or feathers $g^{29}$ and pin $g^{30}$, as shown in Fig. 65.

Said swinging frame parts $G^{16}$ and $G^{18}$ are formed at one of their ends with the hub parts $G^{17}$ $G^{19}$, as shown, which are provided with cylindrical bores having liners which form the bearings for the journals on their vertical shaft $G^{20}$, as shown, and the center or axis of said vertical shaft is indicated in Figs. 65 and 66 at $g^{74}$, and at the other end they are fitted to the bearing box $G^{12}$ as shown and firmly connected and fastened therewith, in the following manner:—Said box $G^{12}$ is provided at its lower and upper ends, each with a cylindrical extension $g^{52}$, to which is firmly fastened the stud $g^{53}$ provided with the nut $g^{54}$. Said end part of each of said parts $G^{16}$ and $G^{18}$ is provided with cylindrical bores leaving shoulders, as shown in Fig. 68; each of the bores having the smaller diameter fit close over said extension $g^{52}$, its washer $g^{55}$ having also a shoulder, as shown, is fitted with its hole over said stud $g^{53}$, and with its small outer diameter is fitted into said small bore, and with its shoulder is forced, by means of said stud $g^{53}$ and nut $g^{54}$, against the said shoulder of said bore as shown; thereby, the ends of said parts $G^{16}$ $G^{18}$ are there firmly fastened to the box $G^{12}$. A bolt $g^{50}$ formed at its lower end with a shoulder, as shown, and having at its upper end a threaded portion provided with the nut $g^{51}$, passes through the other holes in said ends of said parts $G^{16}$ and $G^{18}$ and through the bearing box $G^{12}$ as shown, and by means of said bolt $g^{50}$ and said nut $g^{51}$, said parts are also here firmly connected and fastened together as shown. This bearing box $G^{12}$ is provided with quarter bearings as shown in the following manner:—$g^{60}$ is an exchangeable liner, forming with its one side the bearing surface for shaft G and being fitted with its other side, as shown, to a piece $g^{58}$ which is provided with the lubricating chambers $g^{59}$ $g^{59}$. Said parts $g^{60}$ and $g^{58}$ are fitted with their other sides into said bearing box $G^{12}$ and are retained therein sidewise as shown, and between said piece $g^{58}$ and said box $G^{12}$ is fitted a wedge shaped piece $g^{61}$, as shown. If the part $g^{60}$ is worn so it needs adjustment, a sheet liner or liners of suitable thickness is put in between said part $g^{58}$ and said wedge $g^{61}$, and if said piece $g^{60}$ is worn out, it can easily be replaced by a new one. The two other quarter boxes, consisting of the exchangeable liners $g^{64}$, $g^{64}$, pieces $g^{62}$, $g^{62}$ and the wedge shaped pieces $g^{65}$, $g^{65}$ and their adjustments, are similar to the like parts $g^{60}$, $g^{58}$ and $g^{61}$ above described. Said bearing box $G^{12}$ is also provided and fitted as shown with the cap plate $g^{56}$ which is firmly held to said bearing box $G^{12}$ by the screws $g^{57}$, as shown, and an exchangeable liner $g^{66}$ forming with its one side the bearing surface for said shaft G and with its other side being fitted into said cap plate $g^{56}$, as shown, and held thereto by screws not shown. On the inner and outer ends of said bearing are fastened to said bearing box $G^{12}$, by means of the screws $g^{68}$ and $g^{70}$, the cover plates $g^{67}$ and $g^{69}$, as shown; said cover plates assisting in keeping said bearing parts in their position endwise. Near the center part, said frame parts $G^{16}$ and $G^{18}$ are formed as shown and are provided with the bearing box consisting of the halves $G^{10}$ and $G^{11}$ which are firmly held together and connected with said parts $G^{16}$ and $G^{18}$ in the following manner:—$g^{31}$ $g^{31}$ are angular pieces which are fastened to said parts $G^{16}$ $G^{18}$ by the rivets $g^{32}$ as shown; to said pieces $g^{31}$ $g^{31}$ is fastened the bearing box parts $G^{10}$ and $G^{11}$ by means of a sufficient number of bolts consisting each of the rod part $g^{33}$ provided at its ends with the nuts $g^{35}$, $g^{36}$, as shown, and at the inner sides of said part $G^{10}$, said rod part $g^{33}$ is formed with the enlargement, as shown. $g^{34}$, $g^{34}$, $g^{34}$, $g^{34}$ are clamping pieces oppositely arranged and are fitted with said parts $G^{16}$ $G^{18}$ and with said box parts $G^{10}$ $G^{11}$ as shown, and are firmly fastened to said parts $G^{16}$, $G^{18}$ and to the tongue shaped extensions $g^{73}$, $g^{73}$, $g^{73}$, $g^{73}$ formed with the upper and lower sides of said box parts $G^{10}$ $G^{11}$ by means of the bolts and nuts $g^{43}$, as shown. Said clamping pieces $g^{34}$, $g^{34}$, $g^{34}$, $g^{34}$ are supported at one end on the said frame parts $G^{16}$ $G^{18}$ and at their other end on the said tongue shaped extensions $g^{73}$, $g^{73}$, $g^{73}$, $g^{73}$, and with the bolts and nuts $g^{43}$ in sufficient number when screwed up, press and hold said tongue shaped extensions firmly with said frame parts $G^{16}$ and $G^{18}$, and thereby, said box parts $G^{10}$, $G^{11}$ through said tongue shaped extensions are firmly connected and held to said frame parts $G^{16}$ and $G^{18}$, and practically form one piece therewith. Said box part $G^{11}$ is provided with lubricating chambers $g^{37}$, $g^{38}$ which are connected with the journal part by the holes $g^{41}$, $g^{39}$. Said chambers $g^{37}$, $g^{38}$ may be refilled through the holes $g^{42}$, $g^{40}$ located in the upper frame part $G^{18}$, as shown. The cylindrical bore of the lining $G^{13}$ forms the bearing surface of the journal. $g^{20}$ is a sleeve which turns by means of the feathers $g^{27}$ as shown with the shaft $G^{8}$, and is supported with said shaft in said bearing $G^{13}$ of the box parts $G^{10}$ $G^{11}$. Said sleeve $g^{20}$ with its outer diameter forms said journal and with its inner diameter forms a sliding fit over said shaft $G^{8}$ and over said feathers $g^{27}$ which are fastened to said shaft $G^{8}$ and which shaft turns said sleeve $g^{20}$ in the said bearing $G^{13}$. Near one end, said sleeve $g^{20}$ is provided with a flange $g^{22}$ forming with the surface of its inner side a bearing surface with said liner $G^{13}$, as shown, and near the other end said sleeve $g^{20}$ is provided with a thread $g^{47}$ over which is fitted a threaded adjustable nut $g^{48}$ which is made in halves and firmly held together and to the sleeve $g^{20}$ by means of screws or bolts $g^{49}$ as shown. On the end of said box parts $G^{10}$ $G^{11}$ is located a ball pressure plate $g^{44}$, and another ball pressure plate $g^{46}$ is fitted to the end of said nut $g^{48}$ and to the sleeve $g^{20}$, as shown. Between these two pressure plates $g^{44}$ $g^{46}$ are placed balls $g^{45}$ sufficiently large in diameter and sufficient in number to safely resist the end pressure on said shaft $G^{8}$ during the rolling process. By these means, said sleeve $g^{20}$ is also prevented from sliding endwise in said bearing, and proper adjustment can always be made by said nut. At the outer side of said flange $g^{22}$, said sleeve $g^{20}$ is also formed with an extension $g^{23}$, as shown, and at a suitable distance from said coupling $G^{30}$, the shaft $G^{8}$ is also provided with a thread $g^{24}$ over which is fitted a threaded adjustable nut $g^{25}$ which is made in halves and firmly held together and to the shaft by means of screws or bolts $g^{26}$; the inner end of said nut $g^{25}$ being fitted over and against said extension $g^{23}$ of the sleeve $g^{20}$, as shown, and at its other end, said sleeve $g^{20}$ is also provided with the extension $g^{19}$. At a suitable distance from said socket part $G^{9}$, the shaft $G^{8}$ is also provided with a thread $g^{16}$ over which is fitted a threaded adjustable nut $g^{17}$ which is made in halves and firmly held together and to the shaft by means of screws or bolts $g^{18}$; the inner end of said nut $g^{17}$ being fitted over and against said extension $g^{19}$ of the sleeve $g^{20}$, as shown. By turning said nuts $g^{17}$ and $g^{25}$ on said shaft $G^8$ forward or backward, said shafts $G^8$ and $G$ with their said roll are shifted forward or backward, such as the case may require, and thereby said web finishing roll is also adjusted endwise. $G^{15}$ is a journal pin to which is connected the connection rod $G^{31}$ of the cross head $G^{33}$ of the pressure cylinder $G^{44}$. Said pin $G^{15}$ is formed at its lower end with the reduced cylindrical part $g^{71}$ having a threaded end provided with nut and washer as shown, and is fitted with said lower frame part $G^{16}$, as shown, and firmly connected and fastened therewith by means of said nut on the end $g^{71}$, and at its upper end it is formed with the reduced cylindrical part $g^{72}$ having a threaded end provided with nut and washer, as shown, and is fitted with the said upper frame part $G^{18}$ as shown, and is firmly connected and fastened therewith by means of said nut on said end $g^{72}$, as shown. As above described, a substantial frame is formed for said shafts $G^8$ and $G$, universal coupling $G^{30}$ and said web finishing roll by the said parts $G^{16}$ $G^{18}$ and $G^{10}$ $G^{11}$ and $G^{12}$ and said pin $G^{15}$ and by said vertical shaft $G^{20}$.

Said swinging or oscillating frame is supported at one end on said journals of its vertical shaft $G^{20}$ by the cylindrical bearings in its hub shaped ends $G^{17}$ $G^{19}$, and at its other and lower end it is firmly supported at the lower side of its lower frame part $G^{16}$ with the circular or segmentally shaped guide block $G^{29}$ formed thereon, by the circular or segmentally shaped guide bearing consisting of the parts $M^{31}$ and $G^{26}$ and which parts are held together to their proper adjustment with $G^{29}$ and $G^{16}$ and which are fitted and firmly held to the main bed plate part $B^1$, by the screws or bolts $G^{24}$ and $G^{28}$ in sufficient number and in the following manner:—Said circular or segmentally shaped guide block $G^{29}$ has the faces of its two curved sides also formed with a suitable incline, as shown for instance in Fig. 67, and it has said curved surfaces formed concentric with the axis of its said vertical shaft $G^{20}$, that is—concentric with said center $g^{74}$ indicated in the Figs. 65 and 66. $G^{26}$ is the adjustable pressure plate and $G^{24}$ are said bolts or screws passing through the slotted holes $G^{25}$ of the plate $G^{26}$ and through holes in said part $M^{31}$, as shown, and also through or into holes, not shown, of said bed plate part $B^1$, see also Fig. 10. Set screws $G^{27}$ in sufficient number are screwed against said part $G^{26}$ until properly adjusted, then said bolts or screws are firmly screwed up; and the said bolts or screws $G^{28}$ are passed through said guide piece $M^{31}$ and through or into the main bed plate part $B^1$, and thereby form also at this side of the guide block $G^{29}$, a substantial fastening of said piece $M^{31}$ with said bed plate part $B^1$. The upper side of the said upper frame part $G^{18}$ forms also a slide surface with the screw-pressure plate $G^{21}$, as shown; said pressure plate $G^{21}$, see also Figs. 10 and 11, being fitted into the end of the upper bed plate part $C^1$, as shown, and being held therein and adjusted by the set screws $G^{23}$, as shown, which screws when adjusted, properly press said plate $G^{21}$ against the said upper surface of said upper frame part $G^{18}$, as shown in the Fig. 67, thereby preventing any possible vibration of the said swinging or oscillating frame during the rolling process. Said plate $G^{21}$ is also held to its proper position by the bolts $G^{22}$, as shown in the Fig. 11.

Said web finishing rolls, when moved toward or away from the work piece, travel therefore, each in a circular path which has its center at $g^{74}$, as indicated on the Figs. 65 and 66; that is—the circular path described by each of said web finishing rolls is concentric with the axis of its vertical shaft $G^{20}$, as for instance illustrated by the circular dotted line $x$ which is drawn from said center $g^{74}$ in Fig. 65, and thereby the pressure of its roll against the work-piece, will also be in the direction of the path described from the said center $g^{74}$ which represents the axis of its said vertical shaft $G^{20}$, and thereby is also produced the proper direction of pressure against the work piece; and when the said rolls are pulled back, they will also be away from the work supporting head $M$ as indicated by the dotted lines for said part $M$ and for said roll $G^2$ in Fig. 10; these being the main purposes for locating said center $g^{74}$ a proper suitable distance away from the axis of its said web finishing roll shafts $G$ $G^8$. In case that the said rolls would be moved in the direction of a path described, for instance, with the same radius, but from a center located for instance on the axes of said shafts $G$ $G^8$, said roll would be moved in the direction of such path described from such a center located on the axes of said shafts as is illustrated, for instance, by the circular dotted line $y$ in said Fig. 65, and thereby would also produce an undesirable direction of pressure of said web finishing rolls against the work piece, and also would move the said rolls when pulled back, into the way of said work supporting head $M$; and to prevent such action, is as said, one of the main purposes of locating said center $g^{74}$ a proper suitable distance away from the axes of said web finishing roll shafts $G$ $G^8$ and a proper distance back from said roll, as for instance in Figs. 10, 65 and 66.

With reference to the Figs. 1, 10, 65 and 81, in which, Fig. 10 is a horizontal sectional plan view taken to one side of the center line of the aforesaid piercers or work supporting centers, of part of the herein named finishing mill or finishing side of the apparatus or mill, partly in section and partly in elevation as shown; Fig. 81 is a vertical section through the pressure cylinder for said web finishing roll with piston rods and connections in elevation, as shown. $G^{44}$ $G^{44}$ are the pressure cylinders, one for each roll, for swinging said frames with their web finishing rolls, one at each side of the work piece, toward or away from the work piece during the rolling process. Each of said pressure cylinders $G^{44}$ $G^{44}$ is firmly fitted with its lower side with the main bed plate part $B^1$ and with its upper side with the upper bed plate part, as shown, and is firmly fastened with said bed plates by the keys $G^{45}$ and screws or bolts $G^{46}$, as shown in Figs. 1, 10 and 81. Said pressure cylinder $G^{44}$, see also Fig. 81, has a piston part $G^{34}$ formed with the piston rod $G^{35}$ and with the piston rod $G^{36}$ which pass through the cylinder heads $G^{47}$ and $G^{48}$ at both ends of the cylinder $G^{44}$; said piston part $G^{34}$ being formed with the smaller cylindrical parts $g^{75}$, $g^{77}$ and $g^{88}$ and on said part $g^{75}$ is placed the regular packing pressure ring $g^{76}$, while on said part $g^{88}$ is placed the other packing pressure ring $g^{79}$. On said part $g^{77}$ between said rings $g^{76}$ and $g^{79}$ with their packings is placed a separating ring $g^{78}$ which is provided with annular grooves on its inner and outer diameters and holes $g^{85}$ connecting these annular grooves with each other, as shown. Next to said part $g^{88}$ the piston rod $G^{36}$ is provided with the thread $g^{81}$ over which is fitted the nut $g^{80}$; the packing for the piston end having the rod $G^{35}$, is placed between said parts $g^{76}$ and $g^{78}$, and the packing for the piston end having the rod $G^{36}$ is placed between said parts $g^{78}$ and $g^{79}$; the nut $g^{80}$ being screwed against said pressure ring $g^{79}$ and thereby making perfect packing joints for both ends of the piston and also keeping the said parts in their proper positions. At the outer end of said nut $g^{80}$ is formed into the rod $G^{36}$ a groove $g^{82}$; a retaining plate $g^{83}$ being fitted partly around said rod and nut into said groove $g^{82}$ and fastened to the outer side of said nut $g^{80}$ by screws $g^{84}$ as shown, thereby, said nut $g^{80}$ is prevented from becoming loose or coming off its rod. In case there should be any leak from either end of the piston, the water or any other pressure medium which may be used will pass through said annular grooves and said holes $g^{85}$ of said ring $g^{78}$ and into the hole $g^{86}$ to the central bore $g^{87}$ in said rod $G^{36}$ and from there it will escape at the outer end of said rod $G^{36}$, as shown, making any leak readily discernible.

Said piston rod $G^{36}$, at its outer end is provided with the collar $G^{38}$ which is firmly attached to the said end; and next thereto the said rod is provided with a long thread $G^{37}$ over which is fitted a threaded adjustable nut $G^{40}$ which is made in halves and is firmly held together and to the said rod by means of screws or bolts $G^{39}$. This nut can be adjusted from one end to the other of said thread $G^{37}$, and with the end of the extension $G^{41}$ of the packing box gland, forms a stop for the forward stroke of the piston, and by adjusting said nut $G^{40}$ forward or backward, as the case may require, the forward stroke of the piston is regulated and thereby the desired limit of the forward movement of the said web finishing roll toward the work piece is regulated. At its outer end said other piston rod $G^{35}$ is provided with the cross head $G^{33}$ which is firmly fastened thereto by the usual key $g^{89}$, and at suitable distance from said cross head $G^{33}$ another cross head $G^{43}$ is also fitted and firmly fastened to said rod $G^{35}$, as shown. The end of cross head $G^{43}$ forms with the end of the extension $G^{42}$ of the packing box gland, a stop at this end of cylinder, for the pull back stroke of said piston. With reference to Figs. 12 to 16 inclusive;—Fig. 12 is a horizontal central section through the cross head $G^{33}$ and through the end of connecting rod $G^{31}$, showing said parts connected; Fig. 13 is an end view of Fig. 12 of said cross head in its guide bearing which is formed with the guide bracket $G^{34}$ as shown; Fig. 14 is a vertical section of the cross head, showing its pin in elevation; Fig. 15 is a vertical section of the end of said connecting rod; and Fig. 16 is a vertical section of Fig. 12, showing the journal pin and connecting bolt in elevation. Said cross head $G^{33}$ is provided at each of its sides with adjustable guide or slide blocks $g^{90}$ and $g^{91}$, whereby said cross head $G^{33}$ is centrally guided with said piston rod $G^{35}$ in guide bearings formed with the guide bracket $G^{34}$, which guide bracket is fitted to the main bed plate part $B^1$ and is firmly fastened thereto with bolts $g^{106}$ as shown; said guide blocks $g^{90}$ and $g^{91}$ are held in their places endwise on said cross head $G^{33}$ by the dowel pins $g^{92}$ and $g^{94}$ of sufficient number and are adjusted by the set screws $g^{93}$ and $g^{95}$ which are set up against the ends of said dowel pins as shown in Figs. 12 and 13. Said cross head $G^{33}$ is also formed with the forked ends $g^{96}$ $g^{96}$ to which ends is firmly fastened the hollow journal pin $G^{32}$, as shown; the cross head end of said connecting rod $G^{31}$ is provided with the half bearing $g^{103}$ which is held in place sidewise and endwise by the side pieces $g^{102}$ $g^{102}$ which are formed with the end of said connecting rod $G^{31}$. Said half bearing $g^{103}$ forms the main pressure bearing with said journal pin $G^{32}$, as shown. On the upper and lower side, the end part of said connecting rod $G^{31}$ is also provided with the pull back pieces $g^{100}$ and $g^{97}$ which are fitted to the sides of said end parts, as shown, and firmly fastened thereto by the screws $g^{98}$, as shown; said pull back pieces $g^{100}$ and $g^{97}$ are provided with holes $g^{101}$ and $g^{99}$, as shown, and which holes are central with the axes of said half bearing $g^{103}$, and when connected, said part $g^{103}$ forms the main pressure bearing with $G^{32}$. Through said holes $g^{101}$ $g^{99}$ and through the central hole of said pin $G^{32}$ is put the connecting journal pin $g^{104}$ which is provided at its lower end with the nut $g^{105}$, as shown. The central hole of $G^{32}$ is provided with liners forming bearings with the journal parts of said connecting pin $g^{104}$, and which bearings receive the pressure due to the pull back of said web finishing roll with its said swinging or oscillating frame. The other end of said connecting rod $G^{31}$ is connected to the said journal pin $G^{15}$ of said swinging or oscillating frame and consists mainly of the bearing parts made in two pieces and held firmly together and to the journal pin $G^{15}$ and its rod $G^{31}$ by the bolts $g^{107}$. In case it is desired to swing the frame and its said roll into the position as indicated in Fig. 10 by the dotted lines for said roll $G^2$ and frame part $G^{18}$, it will only be necessary to remove the sleeve $O^9$ from the piston rod $O^3$ and then move the said head M into the position indicated by dotted lines, then remove said journal pin $g^{104}$ and swing the connecting rod $G^{31}$ on its journal $G^{15}$ to one side into the position shown by the dotted lines, and then swing said frame with all its parts thereon, by any suitable means, into the position shown by dotted lines. In such position of said frame, it will be easy and convenient to inspect and adjust the parts, or to remove or exchange the rolls, or if desired, to remove the shafts. In Fig. 10, the head M shown in dotted lines, is in a position for removing the shaft of the herein named edging and web rolling roll, but for removing the shaft G or its said web finishing roll, the said head M will again be moved sufficiently forward to let said shaft G with its roll pass over the said piston rod $O^3$. Said cross head $G^{43}$ is formed at its lower and upper sides with the trunnions $g^{108}$ $g^{108}$, to which are fitted the pressure blocks $g^{109}$ $g^{109}$ which are closely fitted to the ends $G^{53}$ $G^{53}$ of the crank $G^{49}$, forming slide bearings therewith. Said crank $G^{49}$ has its hub parts made in halves which are firmly held together and to its vertical shaft $G^{50}$ with the keys $G^{51}$ and bolts $G^{52}$, as shown. Said vertical shaft $G^{50}$, see Figs. 2, 5 and 10, is formed at its upper end with a journal which is firmly supported in the bearing $G^{73}$ located in the upper bed plate part $C^1$; and below said crank $G^{49}$, said vertical shaft $G^{50}$ has a journal which is firmly supported in the bearing $G^{76}$ located in the main bed plate part $B^1$. At its lower end said vertical shaft $G^{50}$ is also formed with a journal which is firmly supported in the bearing $G^{74}$ located in the lower sole or base plate part $A^1$. The total weight of said vertical shaft $G^{50}$ with its cranks $G^{49}$ and $G^{54}$ is supported by the ball bearing $G^{75}$, as shown. To said vertical shaft $G^{50}$ and above said bearing $G^{74}$ is also firmly fitted and fastened the crank $G^{54}$ in the same manner as said crank $G^{49}$. This crank $G^{54}$ at the ends of its arms $G^{56}$ $G^{56}$ is provided with a journal pin $G^{57}$, to which is connected the rod $G^{62}$ (see Fig. 2) with its end bearing made in the halves $G^{58}$ and $G^{59}$ and held together and to the journal $G^{57}$ and rod $G^{62}$ by the bolts $G^{60}$, as shown. The other end of said rod $G^{62}$ is connected to the journal pin $G^{63}$ of the loose rocking crank which consists of the halves $G^{64}$ and $G^{65}$ and which are held together and to the journal on its vertical shaft $G^{20}$ by the bolts $G^{66}$, as shown. The weight of said rocking crank with the rods $G^{62}$ and $G^{72}$ is supported by the ball thrust bearing $G^{68}$, as shown in the Fig. 4. The upper end of said vertical shaft $G^{20}$ is firmly fastened to the upper bed plate part $C^1$ by means as shown; at the middle part it is firmly fastened to the main bed plate part $B^1$ by means as shown; and with its lower end it is firmly fastened to the lower sole or base plate part $A^1$ by means of the collar $G^{69}$ made in halves, and screws $G^{70}$, as shown. Between said upper bed plate part $C^1$ and the main bed plate part $B^1$, said vertical shaft $G^{20}$ forms the before said journals for the bearings in the hub shaped parts $G^{17}$ and $G^{19}$ of the before described swinging or oscillating frame carrying the web finishing roll $G^2$ at the said this side of the work piece. The other vertical shaft $G^{20}$ having the journals for the bearings in the hub shaped parts $G^{17}$ and $G^{19}$ of the other oscillating or swinging frame carrying the other web finishing roll $G^1$ located at the other side of the work piece, is similarly fastened to the like bed plate parts as described for the vertical shaft $G^{20}$ at this side of the work piece. To the journal pin $G^{71}$ of said rocking arm $G^{65}$ is connected one end of the rod $G^{72}$ which has its other end connected with the journal pin $P^{57}$ of the crank $P^{54}$, which crank is firmly fastened to the vertical shaft $P^{50}$ and to which is also firmly fastened the other crank $G^{49}$ having connection with the piston-rod of the pressure cylinder for said other roll $G^1$ at the other side of the work-piece in the same manner as the crank $G^{49}$ connected to the piston-rod $G^{35}$ of the pressure cylinder for the roll $G^2$ at this side of the work-piece; and the whole pressure device just described for moving said roll $G^2$ toward and away from the work-piece, is as before said, similar to the device for moving said roll $G^1$ toward and away from the work-piece at the other side of the work-piece.

*Web finishing rolls or finishing rolls; movement and pressure equalizing device by which said rolls may be moved and operated against the work-piece or wheel either together or independently of each other.*

As above described and as illustrated in Figs. 1, 2, 4, 5 and 10; the herein named web finishing roll $G^2$ located at the said this side of the work-piece and connected with the parts described to the said crank $G^{54}$ on the vertical shaft $G^{50}$, is connected to the crank $P^{54}$ on the vertical shaft $P^{50}$ by means of the crank $G^{54}$, as shown in Fig. 2, the rod $G^{62}$, loose rocking crank $G^{64}$ $G^{65}$ and rod $G^{72}$, said shaft $P^{50}$ having thereon the said other crank $G^{49}$, and from said other crank $G^{49}$ it is connected with the other herein named web finishing roll $G^1$ located at the other side of the work-piece, by parts which, as before said, are similar to the like parts described for the roll $G^2$ at this side of the work-piece. The movement and pressure of said web finishing rolls against the work-piece is thereby equalized, that is for instance; with the rods $G^{62}$ and $G^{72}$ connected as shown in Fig. 2, the web finishing rolls $G^2$ and $G^1$ are moved toward or away from the work-piece at both sides thereof, each the same distance. For some articles, for instance as before described, it is required that each one of said rolls $G^2$ and $G^1$ be moved toward and away from the work-piece independently of each other; and in such case, the said rods $G^{62}$ and $G^{72}$ are disconnected from their journal pins $G^{57}$ and $P^{57}$ and swung on their other end journals $G^{63}$ and $G^{71}$ into the position indicated by the dotted lines for the rods $G^{62}$ and $G^{72}$, and in this position, said rods are supported at one of their ends by the said crank $G^{64}$ $G^{65}$ and at their other ends by brackets (not shown) on the foundation walls D, see Fig. 2.

Said web finishing rolls, as before described, are located one at this side and the other at the other side of the work piece, as shown, and by the means or device above described, said web finishing rolls may be moved, either together or independently of each other; or, they may be moved in such a manner that, for instance, any one of said web finishing rolls may be retained in any position between the limits of their range of movement and the other may be moved toward or away from the work piece, such as the case may require, during their operation against the work piece. For instance—the web finishing rolls $G^1$ $G^2$ in Figs. 136, 137 and 138, and the web finishing rolls $G^9$ $G^0$ in Fig. 139, may be moved together, that is, they may be moved toward or away from the work piece at both sides thereof, each the same distance; and, the web finishing rolls $G^3$ $G^4$ in the Figs. 140 and 141 and the web finishing rolls $G^5$ $G^6$ in Fig. 142, are moved independently of each other, as for instance in Figs. 140 and 141, wherein one of said rolls, the roll $G^3$ formed as shown, is moved toward the work piece $F^1$ into the position against the side of the tread or face finishing roll H, as shown in Fig. 141, and in this position, said roll $G^3$ during its operation against the work piece is retained or held while the other web finishing roll $G^4$ is moved as before described by its said cylinder $G^{44}$ toward and against the work piece and with its said web finishing roll part $g^{136}$ is operating against the inner sides of the web and rim parts, and therewith and with the said tread or face finishing roll H the wheel may be finished during the before described dishing process to the form or shape shown at $F^2$ in the Fig. 141; or, as for instance in Fig. 142, wherein one of said web finishing rolls, the roll $G^5$ formed wholly conical as shown, is moved toward the work piece and into the position against the side of the rolling part $H^3$ of the tread or face finishing roll H as shown, and in this position the said roll $G^5$ is retained or held during its operation against the work piece while the other web finishing roll $G^6$, which in this case is also formed wholly conical, is moved as before described, by its said cylinder $G^{44}$ toward the work piece, and therewith and with the said tread or face finishing roll H, the article may be finished to the shape or form $F^2$ shown in Fig. 142.

*Driving means for the web finishing rolls and for apparatus or mill.*

These web finishing rolls are driven as follows: For instance;—the said roll $G^2$, at the said this side of the work piece is connected with its said shafts G and $G^8$ to its said universal coupling part $G^{30}$ as shown in Fig. 65. The whole power to drive the apparatus or mill is connected to the end $Q^2$ of the shaft $Q^1$, see for instance Figs. 1 and 2. The other end of said shaft $Q^1$ is connected with the coupling $Q^{12}$ driving the herein named edging and web rolling rolls in the manner fully described hereinafter. Said shaft $Q^1$, see also Fig. 33, is supported in the bearings $Q^{17}$ and $Q^{18}$ which are adjustably fastened to the sole plate $Q^{20}$, by means as shown; and mounted on said shaft between said bearings $Q^{17}$ and $Q^{18}$ are the bevel gears $Q^4$ and $Q^5$ which are driven and held therewith by feathers $Q^8$ and set screws $Q^6$ and $Q^7$, as shown. The cross shaft $G^{92}$ is supported in adjustable bearings $G^{94}$, $G^{95}$ and $G^{96}$, as shown; and to one end of said shaft $G^{92}$ is fastened the bevel gear $G^{93}$ which in the Figs. 1, 2 and 33 is shown to be driven from the bevel gear $Q^5$. With said bevel gear $G^{93}$ are driven both web finishing rolls $G^2$ and $G^1$ as follows:—Between said bearings $G^{94}$ and $G^{95}$, the bevel gear $G^{91}$ is mounted on the shaft $G^{92}$ and driven thereby. Said bevel gear $G^{91}$ meshes with bevel gear $G^{90}$ and therewith drives the vertical shaft $G^{89}$, see Figs. 60 to 64 inclusive, in which, Fig. 60 is a plan view; Fig. 62 is a sectional elevation, partly section through $b$—$b$ and partly section through $c$—$c$ Fig. 60, showing only half of the bearing $G^{95}$ to expose half of the bevel gear $G^{91}$; Fig. 61 is a horizontal sectional plan through $a$—$a$ Fig. 62; Figs. 63 and 64 are details of the upper bearing box $G^{103}$ of the vertical shaft $G^{89}$. Said vertical shaft $G^{89}$ is supported in the bearings of the parts $G^{103}$ and $G^{105}$, which parts are fitted and firmly fastened to the housing sides $G^{100}$ and $G^{101}$, as shown. Said housing sides $G^{100}$ and $G^{101}$ are firmly supported by and firmly fastened with their lower ends to the sole plate $G^{102}$, and with their upper ends are fitted to and firmly fastened to said bed plate part $B^1$ which is fitted to and firmly fastened to the main bed plate part $B^1$ by the means shown. To the upper and lower ends of the vertical shaft $G^{89}$ the bevel gears $G^{88}$ and $G^{90}$ are fastened, as shown; the upper bevel gear $G^{88}$ meshing with bevel gear $G^{87}$ and thereby driving the upper horizontal shaft $G^{86}$, and when the said web finishing roll $G^2$ is in the position shown in Fig. 10, then said shaft $G^{86}$ is in line with the beforesaid shafts $G^8$ and $G$ of said web finishing roll $G^2$. The weight of said bevel gears $G^{88}$ and $G^{90}$ with their shaft $G^{89}$ is supported by the ball thrust bearing consisting of the upper pressure ring $g^{119}$ fitted against the shoulder of said shaft $G^{89}$, as shown, and turning therewith, and of the lower pressure ring $g^{120}$ fitted to the ribs $g^{135}$ as shown of the lower bearing box $g^{121}$ and supported thereby and not turning, and between said rings $g^{119}$ and $g^{120}$ are placed the balls $g^{118}$ as shown. Said upper part $G^{103}$ is fitted as shown with a cover plate or cap $G^{104}$ which is fastened thereto by the bolts $g^{131}$, as shown in Fig. 63. The bearing box parts $g^{127}$ and $g^{128}$ have dish-shaped lubricating pans at their upper ends, as shown, and are adjusted by the screws $g^{129}$ provided with the lock nuts $g^{130}$ as shown, and through pipes $g^{133}$ $g^{133}$ leading from any convenient point, said lubricating pans may be filled. Said lower part $G^{105}$, see Figs. 61 and 62, is fitted as shown with the cover plate or cap $G^{106}$ which is fastened thereto by bolts $g^{132}$, as shown. Said box parts $g^{121}$ $g^{121}$ have dished or cup-shaped lubricating pans at their upper ends which have said radial ribs $g^{135}$ formed therewith, as shown, and on which is supported said ball bearing, as shown. Said bearing box parts are adjusted by the screws $g^{123}$, as shown, said screws being fitted with their threaded ends into tapped holes in each of the inner pressure plates $g^{122}$ $g^{122}$ and with their other cylindrical ends they fit into holes in each of the outer pressure plates $g^{125}$ $g^{125}$. Between said threaded and cylindrical ends said screws are formed partly with an enlarged diameter which is provided with holes as shown, for inserting a pin wrench for turning said screws and thereby adjusting said bearing. Through pipes $g^{134}$ $g^{134}$ leading from any convenient point, said lubricating pans may be filled. The vertical adjustment of said shaft $G^{89}$ with its bevel gears $G^{88}$ and $G^{90}$ is made by raising or lowering said part $G^{105}$ by means of set screws $g^{126}$, as shown. Said horizontal shaft $G^{86}$ is supported in the bearings $G^{84}$ and $G^{82}$ which are adjustably fastened to said part $B^4$, as shown. Said shaft $G^{86}$, at its inner end $g^{115}$, has the one end $G^{80}$ of its universal coupling fitted to said end $g^{115}$ by means of the feathers $g^{116}$ and the pin $g^{117}$, as shown. This coupling end $G^{80}$ is connected with the coupling end $G^{30}$ in the following manner;—With reference to the Fig. 10, a joint piece $G^{81}$ is provided with four journal pins set at an angle of ninety degrees to each other and having their reduced ends firmly fastened to said piece $G^{81}$, as shown; two of said four journal pins $g^{113}$ $g^{113}$ are connected with their journal part to the forked end of said end $G^{80}$ and the other two journal pins $g^{114}$ $g^{114}$ are connected with their journal part to the forked end of the other coupling part $G^{79}$, thereby connecting said coupling end $G^{80}$ with said coupling end $G^{79}$, as shown. Said part $G^{79}$ is formed partly cylindrical, with outer and inner diameters as shown, and has the extensions forming said forked end for said journal pins formed therewith, and at its other end are formed external shoulders between which is formed the cylindrical journal part $G^{85}$ whereby this end of said part $G^{79}$ is supported on a bearing in the bearing box $G^{83}$, which box is formed at its lower side with a sliding surface. The inner diameter of said part $G^{79}$ is partly formed with a cylindrical bore provided with key ways for the feathers $g^{112}$ which are fastened to the cylindrical part of said other coupling end $G^{77}$ as shown. Said coupling end $G^{77}$ is formed partly cylindrical and has formed with said cylindrical part, the extensions forming the forked end provided with the bearings for the journal part of the two journal pins $g^{111}$ $g^{111}$ which are fastened with their inner end parts to the joint piece $G^{78}$, to which joint piece $G^{78}$ are also fastened, the inner end parts of the two other journal pins $g^{110}$ $g^{110}$, which pins with their journal part are connected with the bearings located in the forked end of the said coupling end $G^{30}$. Said cylindrical part of said coupling end $G^{77}$ is provided with the said feathers $g^{112}$, as shown, and forms with the said cylindrical bore part and its key ways a sliding and driving connection as shown. In case that the said web finishing roll $G^2$ with its oscillating or swinging frame is pulled or swung on its journals into the said position indicated by the dotted lines for said parts $G^2$ and $G^{18}$ in the Fig. 10, the said universal coupling will be swung on its said journal pins into the position indicated by the dotted lines for said parts $G^{30}$ $G^{77}$ and $G^{79}$, and the said supporting bearing box $G^{83}$ which is supported on a sliding surface formed on the main bed plate part $B^1$ will also be swung by said journal part $G^{85}$ into the position as indicated by the dotted lines for said part $G^{83}$.

Near the outer end of said bearing $G^{94}$, see Fig. 2, the shaft $G^{92}$ is provided with the coupling $G^{97}$ which is connected with the coupling $G^{99}$ by the shaft $G^{98}$, and at its other end said coupling $G^{99}$ is connected to the shaft $G^{107}$ which is supported in the other bearings $G^{94}$ and $G^{95}$, as shown. Near the inner end of said other bearing $G^{95}$, the bevel gear $G^{108}$ is mounted on the shaft $G^{107}$ and driven thereby; said bevel gear $G^{108}$ driving the other bevel gear $G^{90}$ on the lower end of the other vertical shaft $G^{89}$, and from there, the connections to the other coupling end $G^{30}$ at the end of the shaft for the other web finishing roll $G^1$ at the other side of the work piece, are similar to the like connections above described for the web finishing roll $G^2$ at this side of the work piece, see for instance the Figs. 1 and 2.

During the final rolling process, for instance as in the Figs. 120, 137, 138, 139, 141 or 142, the conical shaped roll part $g^{137}$ of the said web finishing rolls $G^1$ $G^2$ or $G^0$ $G^0$ or $G^3$ $G^4$, or part of the wholly conical rolls $G^5$ $G^6$, may be permitted, as before said, to press against the sides of the said tread or face finishing roll H, thereby forming, at or near the work piece, a stop to limit the movement of said web finishing rolls against the work piece and also assist in turning or driving said tread or face finishing roll H. The final rolling process may also be done with the said web finishing rolls in the position, as shown for instance, in Fig. 122, that is, not coming against the sides of the tread or face finishing roll H, but instead coming to a stop when said hereinbefore described nut $G^{40}$ comes against the end of the aforesaid extension $G^{41}$ of the packing box gland of the pressure cylinder or cylinders $G^{44}$ as before described.

As above described, the web finishing rolls of the herein named finishing mill or finishing side of the apparatus or mill are driven by the bevel gear $G^{93}$ from the bevel gear $Q^5$ on the shaft $Q^1$; but, in case of rolling only with the herein named edging and web rolling rolls or the roughing side of the apparatus or mill, as before described and shown for instance by the Figs. 107 to 112, inclusive, then in such case, see Figs. 33 and 36, the collar $Q^9$ which is made in halves and held together and to the shaft $Q^1$ by means of screws $Q^{16}$, as shown, and fitted with the shaft $Q^1$ by the groove and tongue parts $Q^{19}$, as shown, is removed, and the bevel gear $Q^5$ is shifted against the loose collar $Q^{10}$ into the position indicated by the dotted lines. In such position, said bevel gear $G^{93}$ is disconnected from the main driving shaft $Q^1$, and the said finishing side of the apparatus or mill is thereby disconnected; and should it be desired for some work that the said web finishing rolls $G^1$ $G^2$ run in the opposite direction, the bevel gear $Q^4$ will be shifted to mesh with said bevel gear $G^{93}$, and a collar similar to said collar $Q^9$ but without the said tongue part is put between the collar formed on said shaft $Q^1$ and the hub of the bevel gear $Q^4$. The set screws $Q^6$ and $Q^7$ prevent the bevel gears $Q^4$ and $Q^5$ when in proper position from shifting on the shaft $Q^1$. Thereby said finishing side of the apparatus or mill with the said web finishing rolls, may be connected to or disconnected from the main driving shaft $Q^1$ of the apparatus or mill, or may be made to run in either direction.

Said shaft $Q^1$ with its outer end $Q^{13}$ is connected to the shaft $Q^{15}$ by the coupling $Q^{12}$ which is made in halves and is fitted to the end parts of its connecting shafts with feathers, as shown, and is firmly held together and to its shafts by the bolts $Q^{11}$, as shown. Figs. 33 and 36 inclusive, are enlarged details of the main driving shafts and gears. In Fig. 33, $Q^{15}$ is the end part of the shaft $Q^{15}$ in Fig. 34; and the shaft part $R^2$ in Fig. 34 is the shaft part for the end $R^2$ in Fig. 35. In the Fig. 33, $G^{92}$ is part of the aforesaid cross shaft driving the said web finishing rolls or the finishing side of the apparatus or mill. In the Fig. 35, $J^{41}$ is part of the cross shaft driving the herein named edging and web rolling rolls of the herein named roughing mill or roughing side of the apparatus or mill. In using all the rolls, that is the whole apparatus or mill, for rolling, the web finishing rolls and the edging and web rolling rolls, during the rolling process, at times operate against the work piece at the same time; therefore it is necessary that the peripheral rolling face of the rolls in contact with the work piece should have the proper peripheral velocity, and to obtain such for the various diameters of said rolls, the following described means are provided, by which for instance—the web finishing rolls may be retained at one speed, but the edging and web rolling rolls may be run at various speeds, thus may be given to the said rolls the said proper peripheral velocities; and by which, for the similar purpose before described for the web finishing rolls, said edging and web rolling rolls of the said roughing side of the apparatus or mill may also be connected to or disconnected from the main driving shaft of the apparatus or mill, or may also be run in either direction, such as may be desired. The said shaft $Q^1$ is connected by said coupling $Q^{12}$ with said shaft part $Q^{15}$ which is herein formed integrally with the shaft part $Q^{24}$ and together they are supported with their journals in the adjustable bearing boxes $Q^{33}$, $Q^{34}$ and $Q^{35}$ which are adjustably fastened to the sole plates $Q^{21}$ and $Q^{22}$, as shown. On said shaft parts $Q^{15}$ and $Q^{24}$ are mounted the spur gears $Q^{27}$, $Q^{29}$ and $Q^{31}$. The shaft part $R^1$ is herein formed integrally with the shaft part $R^2$ and together they are supported with their journals in the adjustable bearing boxes $R^9$, $R^{10}$ and $R^{11}$ which are adjustably fastened to the said sole plates $Q^{21}$ and $Q^{22}$, as shown. On said shaft parts $R^1$ and $R^2$ are mounted and firmly fastened by the keys $R^4$, $R^6$ and $R^8$, the spur gears $R^3$, $R^5$ and $R^7$, as shown; said shaft part $R^2$ being connected to the shaft $R^{12}$ by the coupling $R^{16}$, as shown. Said shaft $R^{12}$ with its journals is supported in the adjustable bearings $R^{18}$ and $R^{19}$ which are adjustably fastened to the sole plate $Q^{23}$, as shown. On said shaft $R^{12}$ is mounted and firmly fastened by the keys $R^{13}$, as shown, the bevel gear $R^{20}$ which meshes with the bevel gear $J^{42}$ fastened to the end of the said cross shaft $J^{41}$, and thereby drives the said edging and web rolling rolls or the roughing side of the apparatus or mill. Said shaft $R^{12}$ is fitted with its bevel gear $R^{20}$ reversible, that is,—said shaft may be turned end for end so that its end $R^{15}$ may be connected with the coupling $R^{16}$ instead of the end $R^{14}$ connected thereto as shown; and in such position, the bevel gear $R^{20}$ will mesh with the bevel gear $J^{42}$ on the other side thereof, that is,—between the bevel gear $J^{42}$ and the bearing $R^{19}$, and when in such position, the said edging and web rolling rolls or the roughing side of the apparatus or mill will be run in the opposite direction, and thereby said edging and web rolling rolls or the said roughing side of the apparatus or mill may be run in either direction, such as may be desired. The said shaft part $Q^{15}$, between the collars next to the bearings $Q^{33}$ and $Q^{34}$, is provided with the feathers $Q^{26}$, and the spur gear $Q^{27}$ has a sliding fit over said shaft part and over said feathers $Q^{26}$, as shown, and is held to its proper position endwise on its shaft by the screw $Q^{28}$; said gear $Q^{27}$, when shifted to the collar next the bearing $Q^{33}$, meshes with gear $R^3$ on shaft part $R^1$, and with the gear $Q^{31}$ in the position indicated by the dotted lines, will drive the shaft $R^1$ $R^2$ at one of the said various speeds, and with the gear $Q^{27}$ in the position shown, it is disconnected from the gear $R^3$. Between the collars next to the bearings $Q^{34}$ and $Q^{35}$ the shaft part $Q^{24}$ is provided with the feathers $Q^{25}$, and the gears $Q^{29}$ and $Q^{31}$ have a sliding fit over said shaft part and over said feathers $Q^{25}$, as shown, and are held to their proper positions endwise on their shaft by the screws $Q^{30}$ and $Q^{32}$, as shown. The gear $Q^{29}$, when shifted to the collar next the bearing $Q^{34}$, meshes with the gear $R^5$ on shaft part $R^2$, and with the gear $Q^{31}$ in the position indicated by the dotted line, will drive the shaft $R^1$ $R^2$ at another of the said various speeds, and with the gear $Q^{29}$ in the position shown, it is disconnected from the gear $R^5$. The gear $Q^{31}$, when shifted on its shaft part $Q^{24}$ to the position indicated by the dotted lines, is disconnected from the gear $R^7$ and thereby, the edging and web rolling rolls or the roughing side of the apparatus or mill, will be wholly disconnected from the main driving shaft, such as may be desired in the case of rolling only with the herein named web finishing rolls or with the finishing side of the apparatus or mill, as before described; and with the gear $Q^{31}$ in the position shown, meshes with the gear $R^7$ on the shaft part $R^2$ and it drives the shaft $R^1$ $R^2$ at another of said various speeds, and so on, in case that more gears than herein shown are put on said shafts. If, in addition to the gears shown on said shafts, more gears for other speeds are provided and kept on hand, and if other speeds are wanted, such gears can easily be put on said shafts in place of the gears, which may in such case be removed.

By the driving means above described, the roughing side of the apparatus or mill, having the said edging and web rolling rolls, may be either connected to or be disconnected from the main driving shaft $Q^1$ of the apparatus or mill for the purpose above described, or may be made to run in either direction, or at such various speeds, as and for the purpose above described.

*Edging and web rolling rolls, or edging and web reducing rolls.*

Said edging and web rolling rolls are both positively driven side rolls oppositely located one at each side of the work piece. When against the work piece, their shafts are inclined to each other, and during the rolling process they operate against the hub part, or the web part, or the inner rim part, and upon the edges of the rim of the work piece or wheel or other article; and, with their lateral moving device, may be moved laterally against the work piece or away from it, either together or independently of each other, by pressure cylinders, one for each roll for its said lateral movements, and with their shifting device may be moved in either direction, between the center or hub part and the rim part or periphery of the work piece or wheel, or other article, forward and backward, such as the case may require, by pressure cylinders, one for each roll for its said shifting device. Each of said edging and web rolling rolls is either removably attached to its shaft in such a way that the whole roll may be driven by its shaft or that only part of the roll may be driven by its shaft and the other part of the roll be permitted to turn loose; or, the whole roll may not be driven, but instead be permitted to turn loose on a journal which is removably attached to the end of its shaft; and said edging and web rolling rolls are formed so that during the rolling process they are against the opposite sides of the tread or face rolling roll and thereby they may also form with the tread or face rolling roll at each side thereof, a stop for their lateral movement against the work piece or wheel or other article, and thereby also assist in turning or driving said tread or face rolling roll; all of which will now be fully described.

Said edging and web rolling rolls, as said, are located, one at each side of the work piece, as for instance, $J^1$ and $J^2$ in the Figs. 1 and 17; therein, the said edging and web rolling roll $J^2$ is located at the said this side of the work piece and the other roll $J^1$ is located at the other side of the work piece. When said rolls are against the work piece, their shafts are inclined to each other, as for instance in the Fig. 17; and the parts in connection with the roll $J^1$ at the other side of the work piece are similar to like parts connected with the roll $J^2$ at this side of the work piece.

In most cases, the edging and web rolling rolls are formed, for instance, as $J^1$ and $J^2$, see Figs. 136 to 138 inclusive; that is, the part $j^{28}$ of such rolls $J^1$ $J^2$ is the web reducing roll part, which may however have any other desired suitable form or shape than herein shown, operating as shown on the web part, rim part and hub part of the work-piece, wheel or other article, that is, said web reducing roll parts $j^{28}$, $j^{28}$ of said rolls $J^1$, $J^2$ with their outer rolling or operating portions, are operating on the web and hub parts of the work-piece and form or shape the hub part as herein described, for instance with reference to the Figs. 119, 136 or 143, &c., and with their inner rolling or operating portions are operating on the web part and the inner peripheral faces of the rim of the work-piece and roll said inner faces sufficiently inclined toward the periphery of the work-piece, as and for the purpose herein fully described for instance with reference to the Figs. 95, 96, 136, 140 and diagrammatically illustrated in Fig. 158. The roll parts $j^{29}$, $j^{29}$ of said rolls $J^1$, $J^2$ are the edging roll parts, rolling or operating as shown upon the edges or opposite sides of the marginal or rim part of the work-piece, wheel or other article, and also rolling the metal or limiting the lateral flow of the metal therein between the roll parts $j^{28}$, $j^{28}$ of said rolls $J^1$, $J^2$ and the periphery of the work-piece. Said roll parts $j^{29}$ $j^{29}$ during the rolling process are against the opposite sides of the tread or face roughing roll K and thereby may also be permitted to press against the sides of the tread or face roughing roll as shown, thereby also forming a stop at or near the work piece to limit the movement of said edging and web rolling rolls toward the work piece, and therewith also assisting in turning or driving said tread or face rolling roll K; or such rolls may not have such web reducing part $j^{28}$, but be wholly formed conical as, for instance, the edging and web rolling rolls $J^5$ $J^5$ in Figs. 116 to 118 inclusive, wherein said rolls $J^5$ $J^5$ operate only upon the edges of the rim part of the wheel shown; and as in Fig. 140 wherein the work piece $F^1$ may have its hub part and its rim part formed with such rolls as shown, on the one side of the web part only. In said Fig. 140, the one edging and web rolling roll $J^3$ is formed wholly conical as shown, and the other edging and web rolling roll $J^4$ is formed similar to said rolls $J^1$ $J^2$, and with its said parts $j^{28}$ and $j^{29}$ the said roll $J^4$ operates on the hub part, web part, inner rim part and upon the edge of the rim part, as shown; and as in Fig. 142, wherein the one edging and web rolling roll $J^5$ is similar to the said roll $J^3$, and the other roll $J^6$ is similar to said rolls $J^1$ $J^2$, but the roll part $j^{28}$ of said roll $J^6$ is operating on the work piece only, as shown.

The shafts J J for said edging and web rolling rolls $J^1$ $J^2$ are supported by their journals in bearings located in the guide pieces $J^8$ $J^8$, one guide piece for each roll, see for instance Figs. 17 and 72 and in the housings $J^{10}$ and $J^{11}$ of each of said swinging or oscillating frames; and each of said shafts J J is driven by bevel gears $J^{22}$ and $J^{23}$, as shown, or by any other gears. Said edging and web rolling rolls $J^1$ $J^2$, through their pressure cylinders $J^{123}$ $J^{123}$, one for each roll as shown, are moved or swung toward or away from the work piece at each side thereof, on the bearings $J^{20}$ $J^{20}$, one for each roll and which are coaxial with the vertical shafts $J^{18}$ $J^{18}$. Each of said rolls $J^1$ $J^2$ is also shifted with its shaft J, in said bearings located in the said parts $J^8$ $J^{10}$ and $J^{11}$, forward and backward in the direction of the axis of its shaft J, by its coöperating pressure cylinder $J^{77}$, of which there are provided one for each roll, and which is located over the upper side of the said swinging or oscillating frame part $J^{14}$ as shown.

The rolling with the herein named edging and web rolling rolls may, in most cases, be commenced at or near the hub or central part of the ingot, bloom, blank or other work piece, as for instance indicated by the dotted lines for the edging and web rolling rolls in the Figs. 119, 136 and 143. In Fig. 143, the rolling may commence near the hub part, that is, a suitable distance from the hub part, and with the said edging and web rolling rolls in the positions indicated by the dotted lines for said rolls $J^1$ $J^2$; and from this position, the said rolls will be shifted by their said cylinders $J^{77}$ $J^{77}$ toward the center part to form the hub part until said rolls are in contact with the peripheral faces of the shoulders or flanges $e^{30}$, $e^{30}$ of the piercers or centers $E^6$, $E^6$ and thus form the hub as shown by the dotted lines thereof. During this hub forming process, said shoulders $e^{30}$, $e^{30}$ of the piercers or centers are also limiting the lateral flow of the metal in said hub portion, which metal during said process had been forced laterally outward against said shoulders $e^{30}$, $e^{30}$ and radially against said rolls $J^1$, $J^2$ and has thus formed the hub portion shown by the dotted lines, and from there said rolls $J^1$, $J^2$ are shifted by their said shifting cylinders $J^{77}$, $J^{77}$ away from the hub, over their starting point and toward the rim part of the work-piece until said rolls have reached the position shown for instance in the Fig. 136; or, during this process, said rolls $J^1$, $J^2$ may also be moved forward and backward as often as desired; and, when the rim portion of said work-piece is rolled with the rolls $J^1$, $J^2$ and K to the form for instance shown in the Fig. 136, then the peripheral face of the work-piece will have been rolled to a beaked or rudimentary form, as and for the purpose hereinafter described, for instance with reference to the Figs. 136, 140, 146, 147, 148 and 158, and the inner peripheral face or faces of the rim portion of the work-piece will have been rolled sufficiently inclined toward the peripheral face of the work-piece, as and for the purpose hereinafter fully described, for instance with reference to the Figs. 136, 140, 95, 96 and 158. By means of said cylinders $J^{123}$, $J^{123}$, during said process, said rolls $J^1$, $J^2$ are also swung on said bearings around said vertical shafts $J^{18}$ $J^{18}$, toward the work piece and toward the sides of the tread or face rolling roll K until said rolls $J^1$ $J^2$ have reached the positions, for instance, as shown in the Fig. 136, and the amount that each of the said rolls $J^1$ $J^2$ during said shifting process is also moved or swung toward the work piece as described, is indicated by the distance between the dotted lines $j^{26}$ and $j^{27}$ representing the axes of said rolls, that is $j^{26}$ for such roll when in the position shown therefor in the dotted lines, and $j^{27}$ for such said roll when in the position shown therefor in the solid lines. During the said process, said rolls $J^1$ $J^2$ will in most cases be permitted to come against the sides of the roll K, as shown or indicated by the dotted lines in said Fig. 143, and it can be observed from the distance which said lines $j^{26}$ and $j^{27}$ are apart in said Fig. 136, that the said rolls $J^1$ $J^2$ during said shifting process, shifted by said cylinders $J^{77}$ $J^{77}$, are continually guided somewhat away from the work piece and at the same time, through their cylinders $J^{123}$ $J^{123}$ are again continually moved somewhat toward the work piece, thereby forming smooth surfaces at right angles to the axis of the work piece; but through the action, during said shifting process, produced by such movements of each of said edging and web rolling rolls, in the said directions away from and again against the work piece, in forming a smooth surface or surfaces as the case may be, at right angles to the revolving axis of the work piece, the said pressure from the edging and web rolling rolls against the sides of the said roll K is reduced, which also reduces the sliding friction and the wear caused thereby on the sides of said roll K and on the end part of the said edging roll part $j^{29}$ of the said edging and web rolling rolls to minimum; and, in case that said shafts J J are much more inclined to each other than is shown in said Fig. 17, such inclination or angle may be made, for instance, as great as the inclination or angle formed by the shafts G G of the web finishing rolls $G^1$ $G^2$ shown in the Fig. 10, then in such case, said distance between said dotted lines $j^{26}$ and $j^{27}$ in Fig. 136, will also be greater, and, the advantages derived from each action during said shifting process produced by such movements of said edging and web rolling rolls, in the said direction away from and again against the work piece in forming such surface or surfaces on the work piece at right angles thereto, will be more appreciated by those skilled in the art.

Said edging and web rolling rolls, which as before described, may have many various shapes, as for instance the before described rolls $J^0$ $J^0$ or $J^1$ $J^2$ or $J^3$ $J^4$ or $J^5$ $J^5$ or $J^5$ $J^6$, or may have any other suitable shape; and each of the said edging and web rolling rolls may either be removably attached to its shaft J in such a way that the whole roll may be driven by its shaft J, as for instance in the Figs. 89 and 90, or only part of the roll may be driven by its shaft and the other part of the roll will be permitted to turn loose, as for instance in the Figs. 91, 92 and 93; or the whole roll may, instead of being driven, be permitted to turn loose on a journal removably fastened to its shaft, as for instance in the Fig. 94. Figs. 82 to 88 inclusive, show in details the means for removably fastening the roll parts or said rolls to the ends of their shafts J J. In said figures, Fig. 82 shows the end of said shaft J in elevation with the lock nut in section; Fig. 88 is in part, a central section through the threaded end, showing pin in elevation; Fig. 83 is in end view of Fig. 82; Fig. 84 is an outer end view of the lock nut; Fig. 85 is an outer end view of the shaft, with the lock nut removed; and Figs. 86 and 87 are plan view and side elevation of the lock piece; and, in said figures, is shown only part of said shaft J. Each of said shafts J J is formed at its outer end with a shoulder and with a conical part and a reduced end with a thread $j^2$, as shown; said conical part being provided with keys or feathers $j^1$, as shown, and said threaded end $j^2$ being provided with a lock nut $j^4$ which has at its outer end the grooves $j^7$, as shown, which correspond with similar grooves $j^8$ formed in the end of said threaded end $j^2$, and which threaded end is also provided with a pin $j^3$ which is firmly fastened to said threaded end, as shown. Into said grooves $j^7$ and $j^9$ and over said pin $j^3$ is fitted the lock piece $j^5$ which is held to said pin $j^3$ and said grooves $j^7$ and $j^8$ by the split pin $j^6$, as shown; said lock nut $j^4$ being thereby prevented from turning in either direction on its said shaft J. The said interchangeable roll parts or roll fit over said conical part and over said feathers $j^1$, as shown, and are turned or driven from its said shaft J by means of said feathers $j^1$ and also held to said end by said lock nut $j^4$. In the Figs. 89 to 94 inclusive, is shown the end part of the shaft J with the lock nut $j^4$ and said feathers $j^1$ in elevation and with the said roll or roll parts in central section. Figs. 89 and 90 show, for instance, two of such rolls, of which each is held to the end of its shaft J by the lock nut $j^4$ and driven by said feathers $j^1$, the rolls therein being shown in central section. It will be understood that any of the herein named edging and web rolling rolls having any suitable shape, may be fitted to its shaft J as shown by said Figs. 89 and 90. Fig. 91 shows, for instance, such a roll consisting of the parts $j^9$ and $j^{10}$ as shown; the part $j^9$ is driven by its shaft and the part $j^{10}$ provided with the liner $j^{11}$ is permitted to turn loose on the lock nut $j^4$ and on the end of the roll part $j^9$, as shown. Fig. 92 shows such roll consisting of the parts $j^{12}$ and $j^{14}$, as shown; the part $j^{12}$ is driven by its extension from the shaft, as shown, and the part $j^{14}$ is provided with the liner $j^{16}$ and is permitted to turn loose on the outer diameter of the said extension part of $j^{12}$ and is held in place by the annularly formed end washer $j^{15}$, as shown. Said washer $j^{15}$ turns with said extension part of $j^{12}$ by means of pins $j^{13}$ which are fastened to the end of said extension part of $j^{12}$, as shown. The Fig. 93 shows such roll consisting of the parts $j^{17}$ $j^{18}$, the part $j^{18}$ being driven by its shaft J and formed with the extension $j^{19}$, as shown, and the part $j^{17}$ being provided with the liner $j^{20}$ and permitted to turn loose on the outer diameter of said extension $j^{19}$, as shown. The Fig. 94 shows such roll consisting of the roll part $j^{21}$ and its liner $j^{22}$ fitted thereto, as shown, the journal part $j^{23}$, formed at one of its ends with the flange $j^{24}$ being fitted to the said shaft J and lock nut $j^4$, as shown, and being driven by its shaft J, thus permitting the whole roll to turn loose. It will be understood that any of the herein named edging and web rolling rolls having any suitable shape, may be constructed as shown in Figs. 91 to 94 inclusive.

With reference to the Figs. 2, 17 and 71 to 80 inclusive; in which: Fig. 2 shows the said main or lower driving gears and their connections to the vertical shafts $J^{18}$ $J^{18}$; and Fig. 17 is a horizontal sectional plan view taken to one side of the center line of the aforesaid piercers or work supporting centers, or part, of what I term, the roughing mill or roughing side of the apparatus or mill. In said Fig. 17, the parts connected with the roll $J^2$ at the said this side of the work piece, are shown in a horizontal sectional plan through the axis of the roll shaft J, and with said shaft and other parts located horizontally therewith in plan, and the parts connected with roll $J^1$ at the other side of the work piece are mostly shown in plan, with the shifting cylinder $J^{77}$ shown in horizontal central section and the upper cross head guides $J^{111}$ and $J^{112}$ shown in horizontal section. Figs. 71 and 72 taken together is a central sectional side elevation, showing mainly the device for shifting and driving the herein named edging and web rolling rolls, one for each of said rolls. Said Figs. 71 to 80 inclusive, are illustrations for the parts this side of the work piece having the roll $J^2$; and the parts for the other side of the work piece having the said roll $J^1$ are, as before said, similar to like parts at this side of the work piece and illustrated by the said Figs. 71 to 80 inclusive. The Fig. 73 is a central sectional end elevation through the extended axes of vertical shaft $J^{19}$. Fig.

74 is a sectional end view of housing $J^{11}$ with its connections, as shown. Fig. 75 is a sectional end view of the lower bearing through $a$—$a$ Fig. 71. Fig. 76 is an enlarged plan view of the lower oscillating frame part $J^{15}$ shown in Fig. 71. Fig. 77 is a vertical section through $a$—$a$ Fig. 76. Fig. 78 is a section through $b$—$b$ Fig. 76. Figs. 79 and 80 are end and side views of the removable trunnion part $J^{137}$ shown in Fig. 76.

Said edging and web rolling rolls with their shafts J J are driven, as before said, from the bevel gear $R^{20}$ driving the said bevel gear $J^{42}$ and shaft $J^{41}$, see Fig. 2; said shaft $J^{41}$ being supported in the adjustable bearings $J^{45}$ and $J^{43}$, as shown and connected to shaft $J^{35}$ with the coupling $J^{40}$, as shown. Shaft $J^{35}$ is supported in the adjustable bearings $J^{34}$ and $J^{38}$, as shown. To said shaft $J^{35}$ is keyed next to bearing $J^{34}$ the bevel gear $J^{25}$ meshing with one of the bevel gears $J^{24}$ $J^{24}$ keyed to the lower end of one of said vertical shafts $J^{18}$ $J^{18}$ and therewith driving the said shaft J having the said roll $J^{2}$ at this side of the work piece; and next to the bearing $J^{38}$ is keyed to said shaft $J^{35}$ the bevel gear $J^{36}$ meshing with the other bevel gear $J^{24}$ keyed to the lower end of the other vertical shaft $J^{18}$ and therewith driving the shaft J having the roll $J^{2}$ at the other side of the work piece. Each of said vertical shafts $J^{18}$ $J^{18}$, as in the Figs. 71 and 72, has keyed to its upper end, for instance, a bevel gear $J^{23}$ meshing with bevel gear $J^{22}$ and therewith driving the said roll shaft J with its roll $J^{2}$, as shown; said driving, instead of being done by bevel gears, may be done by any other suitable gears.

Each of said swinging or oscillating frames, on its lower trunnion consisting of the parts $J^{137}$ and $J^{138}$ and on its upper trunnion $J^{17}$, is swung forward and backward with its shaft J by its coöperating cylinder $J^{123}$, of which there is provided one cylinder for each roll. The lower oscillating frame part $J^{15}$, see Figs. 76 to 80 inclusive, is formed integrally with the trunnion part $J^{138}$ and to which is fitted the other trunnion part $J^{137}$, as shown, and is fastened thereto by the screws $J^{135}$, as shown. Said parts $J^{137}$ and $J^{138}$ form with their outer sides said lower trunnion for said oscillating frame and with their inner sides form the bearing box to which is fitted as shown, the bearing part $J^{19}$ made in halves, for the upper journal part of said vertical shaft $J^{18}$, and between the flat surfaces of said parts $J^{19}$ and $J^{137}$ is fitted the wedge shaped part $J^{136}$, as shown. In case the bearing $J^{19}$ requires adjustment after being worn, a sheet liner or liners may be put between said parts $J^{136}$ and $J^{19}$. Each of said oscillating frames, at its lower side of said lower frame part $J^{15}$ is mainly supported on the main bed plate part $B^{2}$ by a ball thrust bearing $J^{16}$, as shown, and near its outer ends and at its lower side, said part $J^{15}$ is provided with the slide bearing plates $J^{26}$ $J^{26}$, as shown, which form with the plates $J^{27}$ $J^{27}$ fitted to the main bed plate part $B^{2}$, as shown, a slide bearing and therewith also support said oscillating frame partly. The housings $J^{10}$ and $J^{11}$ are adjustably fastened with their lower ends to the said lower oscillating frame part $J^{15}$ by the bolts $J^{48}$ and adjusting set screws $J^{31}$, as shown; and with their upper ends they are adjustably fastened to the upper oscillating frame part $J^{14}$ by the bolts $J^{49}$ and adjusting set screws $J^{32}$, as shown. Said upper frame trunnion $J^{17}$ is fitted and fastened to the upper frame part $J^{14}$, as shown, and its axis is in line with the axis of said vertical shaft $J^{18}$. The cross piece $C^{9}$, see Fig. 1, with its one end is fitted and fastened to the upper bed plate part $C^{5}$, as shown, and is also fastened to the upper end of bracket $C^{13}$, which bracket is fastened to the main bed plate part $B^{2}$ with its lower end and supported thereby, as shown; and with its other end, said cross piece $C^{9}$ is fitted and fastened to the upper bed plate part $C^{4}$, as shown, and also to the upper end of bracket $C^{14}$, which bracket is fastened with its lower end to the main bed plate part $B^{2}$ and is supported thereby, as shown. Said cross piece $C^{9}$ is provided with two bearings $J^{142}$ $J^{142}$, one forming bearing for said trunnion $J^{17}$ on said oscillating frame for the said roll shaft J at the other side of the work piece, and the other forming bearing for the trunnion $J^{17}$ on the oscillating frame for said roll shaft J at this side of the work piece; as shown; and the upper ends of both said oscillating frames, by means of their trunnions $J^{17}$ $J^{17}$ are supported by said cross piece $C^{9}$ in its bearings $J^{142}$ $J^{142}$, as shown. Said main bed plate part $B^{2}$ is provided with the bearings $J^{20}$ $J^{20}$, one for each oscillating frame for its said described trunnion of the said lower oscillating frame part $J^{15}$ as shown. At the end of said bearings $J^{20}$ $J^{20}$, the main bed plate part $B^{2}$ is formed with an extension forming the bearing box parts for each of the lower journals of said vertical shafts $J^{18}$ $J^{18}$, each of which parts is fitted with a cap $J^{33}$ which is held thereto by the bolts, as shown. Each bearing part $J^{21}$ is made in halves and with its inner side forming bearing surface for the lower journal of its said vertical shaft $J^{18}$ and with its outer side formed as shown fitted to the inner sides of the collar $J^{143}$, as shown; said collar $J^{143}$ being made in two parts and held together by the screws $J^{144}$, as shown, and with its outer cylindrical shape which is central to the axis of its vertical shaft $J^{18}$ held to the cylindrical bore part of said extension of the main bed plate part $B^{2}$ by said cap $J^{38}$. Between the flat surfaces of said parts $J^{21}$ and $J^{143}$ is fitted the wedge shaped part $J^{145}$ as shown; and in case the bearing $J^{21}$ becomes worn and requires adjustment, a sheet liner or liners may be put between said parts $J^{21}$ and $J^{145}$. Said collar $J^{143}$ with its bearing $J^{21}$ may be turned into any desired position and may also be removed in case that the said upper bearing $J^{19}$ requires adjustment as before described.

Each of said shafts J J, between said housings $J^{10}$ and $J^{11}$, is provided with the feathers $J^{47}$, as shown, and each of said bevel gears $J^{22}$ $J^{22}$, one on each of said shafts J J, is formed at its inner end with a long hub, as shown, which has a sliding fit over its shaft J and over said feathers $J^{47}$, as shown. Between the inner sides of said housings $J^{10}$ and $J^{11}$ and the ends of said bevel gear $J^{22}$ are located the ball thrust bearings $J^{12}$ and $J^{13}$ as shown, whereby said bevel gear is kept in its proper position endwise between said housings $J^{10}$ and $J^{11}$ and in proper mesh with said bevel gear $J^{23}$, and any required adjustment endwise of said bevel gear $J^{22}$ is made by said adjusting set screws $J^{31}$ and $J^{32}$, which are located as shown.

Said housings $J^{10}$ and $J^{11}$ are each provided as shown in Fig. 74 for the housing $J^{11}$, with an adjustable bearing $J^{141}$, which is properly held to its shaft J and to its said housing $J^{11}$ by cap and bolts as shown. To the upper oscillating frame parts $J^{14}$ $J^{14}$, one for each said oscillating frames, are fitted and bolted to each the supporting brackets $J^{28}$ $J^{28}$ and $J^{29}$ $J^{29}$ for its shifting cylinder $J^{77}$, as shown; the upper ends of said brackets $J^{28}$ $J^{28}$ and $J^{29}$ $J^{29}$ being made in halves and held together with screws, as shown, and being provided with cylindrical bores, as shown; the said upper end halves of the said brackets $J^{29}$ $J^{29}$ are shown removed in Fig. 74.

Each of said shifting cylinders $J^{77}$ $J^{77}$, of which one is provided for each roll, has formed at opposite sides with its end flanges, the parts $J^{147}$ $J^{147}$ and $J^{148}$ $J^{148}$, each provided with a hole or bore as shown, see also Figs. 17 and 73; the rods $J^{146}$ $J^{146}$, one at each side of its cylinder $J^{77}$, are firmly held thereto, at one of their ends. Each rod is held by its bores in one of said flange parts $J^{147}$ $J^{147}$ and at the other end of the cylinder by its bore in one of said flange parts $J^{148}$ $J^{148}$ and by the nut $J^{149}$ on the threaded part of said rod $J^{146}$, as shown, whereby said rods $J^{146}$ $J^{146}$ form with said cylinder $J^{77}$ practically one piece. Said cylinder by its said rods $J^{146}$ $J^{146}$ is firmly held and supported by said supporting brackets $J^{28}$ $J^{28}$ and $J^{29}$ $J^{29}$. At and near its other end said rods $J^{146}$ $J^{146}$ are each formed with long threads, as shown, over which are fitted to each of said rods, the nuts $J^{150}$ and $J^{151}$, one against each end of its supporting brackets $J^{29}$. The position of said shifting cylinder $J^{77}$ can be adjusted endwise by these nuts $J^{150}$ $J^{150}$ and $J^{151}$ $J^{151}$.

Each of said edging and web rolling rolls is provided with one of said shifting cylinders $J^{77}$ $J^{77}$ as for instance shown in the Figs. 1, 17, 71 and 72, and with reference to the said Figs. 17, 71 and 72, the shifting cylinder $J^{77}$ shifts with the double lever $J^{97}$ $J^{97}$ the said roll shaft J with its edging and web rolling roll $J^2$ endwise to the position shown, for instance by the dotted lines in Figs. 71 and 72. Said cylinder $J^{77}$ has a piston $J^{78}$ with a piston rod $J^{79}$ and a piston rod $J^{80}$ passing through the cylinder heads $J^{81}$ $J^{81}$ at both ends of the cylinder $J^{77}$. The piston rod $J^{80}$ at its outer end has firmly fastened thereto the collar $J^{134}$ and from there is provided with a long thread $J^{84}$, over which is fitted a threaded adjustable nut $J^{83}$ which is made in halves and is firmly held together and to the piston rod by the screws $J^{133}$, as shown. This nut can be adjusted from one end to the other end of said thread $J^{84}$, and with the end of the extension $J^{82}$ of the packing box gland forms a stop for the piston stroke from this end of the cylinder, and by adjusting said nut $J^{83}$ forward or backward, such as the case may require, the forward stroke of the piston is regulated and thereby the desired limit of the forward shifting movement of the said edging and web rolling roll is regulated, that is,—the desired shifting movement of said roll away from the center part and toward the rim part or periphery of the work piece, wheel or other article is adjusted. To the other end of the piston rod $J^{79}$, the cross head $J^{89}$ is fastened with a key, as shown, and from there said piston rod is provided with a long thread $J^{87}$ over which is fitted the threaded adjustable nut $J^{86}$ which is made in halves and firmly held together and to the piston rod by means, as shown. This nut $J^{86}$ can be adjusted from one end to the other of said thread $J^{87}$, and with the end of the extension $J^{85}$ of the packing box gland forms a stop for the piston stroke from this end of the cylinder, and by adjusting said nut $J^{86}$ forward or backward such as the case may require, the return stroke of the piston is regulated and thereby the desired limit of the return shifting movement of the said edging and web rolling roll is regulated; that is, the desired shifting movement of said roll toward the center or hub part of the work piece, wheel or other article is adjusted. Said cross head $J^{89}$, at both its outer sides is formed with trunnions $J^{91}$ $J^{91}$; links $J^{90}$ $J^{90}$, are connected with one of their ends to said trunnions $J^{91}$ $J^{91}$, and with their other ends with the journal pin $J^{92}$ as shown, said links being located at the upper ends of said double lever $J^{97}$ $J^{97}$ and connecting the upper ends of said double lever $J^{97}$ $J^{97}$ with the cross head $J^{89}$ as shown. Lugs $J^{30}$ $J^{30}$ are formed in one piece with said lower oscillating frame part $J^{15}$ at one end thereof, as shown, and are provided with the bearings $J^{139}$ $J^{139}$ for the journal pin $J^{96}$ of the link $J^{95}$; at its other end said link $J^{95}$ is provided with a bearing for the journal pin $J^{94}$. At each of the outer sides of said link $J^{95}$, the end parts of said journal pin $J^{94}$ are fitted and fastened to the lower ends of said double lever $J^{97}$ $J^{97}$, as shown, said double lever consisting of the like parts or levers $J^{97}$ $J^{97}$ as shown in the said Figs. 17 and 71. The said roll shaft $J$ at its outer end is provided with a thread over which is fitted the threaded adjustable nut $J^{102}$ which is made in halves and is firmly held together and to the shaft $J$ by the screws $J^{103}$, as shown. On said shaft $J$ and between said nut $J^{102}$ and the shoulder of the reduced end journal part of shaft $J$, are fitted to said reduced end journal part the cross head $J^{98}$ and the ball thrust bearings $J^{99}$ $J^{99}$. Said cross head $J^{98}$ is formed at two of its opposite sides with the journals or trunnions $J^{93}$ $J^{93}$, whereby said cross head $J^{98}$ is connected with the double lever $J^{97}$ $J^{97}$, as shown. Said cross head does not revolve with shaft $J$ and any end play or wear is taken out or adjusted by said nut $J^{102}$. Said roll shaft $J$ is as before said, supported in the bearings of said guide piece $J^8$ and in the bearings of said housings $J^{10}$ and $J^{11}$, and is shifted with said double lever $J^{97}$ $J^{97}$ by said shifting cylinder $J^{77}$ in the bearings of the said parts $J^8$, $J^{10}$ and $J^{11}$ and in said bevel gear $J^{22}$, forward and backward, such as the case may require.

Each of said guide pieces $J^8$ $J^8$, one for each roll, see Fig. 72, is formed at its upper side with a lug to which is lengthwise adjustably attached the gage rod $J^9$, as shown, or two or more such gage rods may each be so adjustably attached to such lug or lugs, as shown, for instance, in Figs. 144 and 145, in which figures three such gage rods are shown. At its one end, said gage rod $J^9$ is formed with a long thread which is provided with the nuts as shown, and its other pointed end is bent down, as shown. Each of said shafts $J$ $J$ is provided with a circumferential mark or shoulder $J^{152}$ as shown. In the Figs. 71–72, the roll $J^2$ is shown in position with the said adjustable nut $J^{86}$ against the end $J^{85}$ of said extension of said packing box at the lever end of cylinder $J^{77}$, and the dotted lines show said roll when moved into such position with the said adjustable nut $J^{83}$ against the end $J^{82}$ of the extension of said packing box at the other end of cylinder $J^{77}$, as is shown by the dotted lines for said nut $J^{83}$, and therein, the position of said double lever $J^{97}$ $J^{97}$ is also shown by the dotted lines. When the gage rod $J^9$ is adjusted, for instance, to its commencement position shown in Figs. 71–72, then in such case, the roll $J^2$ is shifted until said mark or shoulder $J^{152}$ on said shaft $J$ has reached the point of said gage $J^9$, as illustrated by the dotted lines for $J^{152}$, and in said position, the roll $J^2$ will be in the position indicated by the dotted lines for part of said roll $J^2$, and in which position, the operation of the said roll $J^2$ against the work piece may commence. Said gage rod $J^9$ can also be adjusted to any desired position between said shifting limits from the center of the work piece, at which the shifting operation of said roll against the work piece may be retained or may be stopped, and which position of said roll or rolls will be indicated by the said means with said adjustable gage rod or gage rods $J^9$, or $J^9$ $J^9$, one for each roll; and, in case it should be so desired that each one of such positions of said roll or rolls, that is, the position for starting and for stopping the shifting operation of said roll or rolls against the work piece should each be indicated, then in such case, another adjustable gage rod similar to $J^9$ will be attached next to said rod $J^9$ to each of said guide pieces $J^8$ $J^8$ in a similar manner as is rod $J^9$ attached thereto, as shown; and thereby, two gage rods, each similar to rod $J^9$, will be provided for each one of said edging and web rolling rolls. For instance, with reference to Fig. 143, in which the operation of the said rolls $J^1$ $J^2$, which are shown only partly in said Fig. 143, against the blank or work piece F commenced with the said rolls $J^1$ $J^2$ in the position shown and before described, the rolls $J^1$ $J^2$ in this case have been set to the position shown by the points of said gages $J^9$ $J^9$ and said mark $J^{152}$ on each of said shafts $J$ $J$. Said nuts on said gage rods $J^9$ $J^9$ can be adjusted to the ends of the thread forward or backward, such as the case may require; thereby, the points of said gage rods $J^9$ $J^9$ can be adjusted to any desired position of said edging and web rolling rolls between their shifting limits.

Said edging and web rolling rolls may be shifted also independently of each other; for instance in such a way that any one of said rolls may be retained in any position between their shifting limits and the other of said rolls, while operating on the work piece, may be shifted forward and backward, such as the case may require, as for instance illustrated in Figs. 140 to 142 inclusive. In Fig. 140, one of said rolls, the roll $J^3$ formed wholly conical, is retained in the position shown, and therein, the work piece during the rolling process is pressed against said roll $J^3$ with practically the same pressure with which the other roll $J^4$ may be pressed or held laterally against the work piece, and under this pressure, the roll J³ is operating against the whole side, from the center or hub part of the work piece, as shown; and the other roll J⁴ during the rolling process, is also shifted by its cylinder J⁷⁷, as before described, and with its said web reducing part j²⁸ operates as before described on the web, hub, and inner rim parts, and with its said edging roll part j²⁹ operates as before described upon the edge of the rim part of the work piece F¹. When the roll J⁴ has reached the position, as for instance shown in Fig. 140, then the said roll J³ is shifted by its said cylinder J⁷⁷ and is moved by its other cylinder J¹²³ somewhat toward the work piece, until said roll J³ has reached the position shown in said Fig. 141, when the dishing and finishing of the finished wheel F² shown in said Fig. 141 will commence; and, in Fig. 142, the one roll J⁵, which is formed wholly conical, is retained in the position shown, and therein the work piece, during the rolling process, is pressed against said roll J⁵ with practically the same pressure with which the other roll J⁶ may be pressed or held laterally against the work piece, and under this said pressure, the said roll J⁵ is operating against the whole side, from the center or hub part to the periphery of the work piece as shown, and the other roll J⁶ during the rolling process is also shifted by its said cylinder J⁷⁷, as before described, and is operating only with its said web reducing roll part J²⁸ against the work piece, as shown; and the total pressure, during the rolling process against such rolls as J³ or J⁵, which are retained in such position, as shown in Fig. 140 or 142, is practically the same pressure with which said rolls J⁴ or J⁶ may be pressed or held laterally against the work piece, and not more.

From the above it will be seen that, with the herein named edging and web rolling rolls formed as herein shown and, with the inner rolling or operating portions of the web reducing roll parts j²⁸, j²⁸ of said edging and web rolling rolls J¹, J², &c., formed sufficiently conical, as and for the purpose herein fully described with reference for instance to the Figs. 95, 96, 136, 140 and 158, an efficient rolling action is obtained, which also during the formation of the web part toward the rim part, causes the metal to flow in the proper directions; that is to say, toward the rim part, within the latter, and peripheral thereto. The lateral flow of the metal is limited by the roll parts j²⁹ j²⁹ of the edging and web rolling rolls, and when this lateral flow of the metal is thus arrested, the continued flow thereof will be peripheral to the rim. It will be observed that the radial flow of the metal is limited by the rolling surface of the tread or face rolling roll K, and when the radial flow is thus arrested, the continued flow of the metal will be peripheral to the rim, as for instance illustrated in Figs. 95, 96, 136 and 158. From this and from the matter described below with reference to said Figs. 95, 96, 136, 158 and 159 and with reference to other figures herein shown, it is to be observed that the metal, when being rolled from the blank or other work-piece into a wheel or other article, is, especially in the tread and flange or rim portion, not expanded radially thereby producing incipient cracks in the tread and flange portions of the rim, but is truly rolled and increases in density with increased working, thus giving to the metal both its due maximum strength and maximum resistance to wear. In other words, this method of rolling produces the same effect in the metal of the rim portion as if the web portion of the wheel were not in existence and the rim portion rolled its total width on its inner peripheral surface or surfaces as is done on its outer peripheral surface consisting of the tread and flange. In Fig. 95 are shown such edging and web rolling rolls, for instance J⁰, J⁰ rolling or forming the web and rim parts of the work-piece F¹ central with the hub part, as shown, and therein, with the inner rolling or operating portions of said web reducing roll parts j²⁸, j²⁸ of the edging and web rolling rolls for instance J⁰, J⁰ formed sufficiently conical as for instance shown and as and for the purpose hereinafter more fully described, the centers of the pressures caused by said so conically formed inner rolling or operating portions of said web reducing roll parts j²⁸, j²⁸ of said rolls J⁰, J⁰ are illustrated as acting at the centers of the lengths of said conically formed inner rolling or operating portions and at right angles thereto against the work-piece, as is indicated by the arrows $p$ and $p^1$ of said center pressures, and the resultant pressure $r$ from said pressures $p$ and $p^1$ is therein indicated in the direction shown by the arrow for said resultant pressure $r$, and the actual flow of the metal will be in a lateral, radial and peripheral direction, that is, toward the rolls J⁰ J⁰ and peripheral to the rim and in a radial and peripheral direction, that is toward the periphery of the work-piece in the direction of the arrow $r$ against the face rolling roll K (which roll K is not shown in said Fig. 95) and from there the metal will flow peripheral to the rim, and said lateral flow of metal is limited by said edging roll parts j²⁹ j²⁹ of said rolls J⁰ J⁰ from where the metal will flow peripheral to the rim, and the said radial flow of metal is limited by the rolling surface of the said tread or face rolling roll K, (which roll K is not shown in said Fig. 95) from where the metal will flow peripheral to the rim; and in Fig. 96, are shown parts of such edging and web rolling rolls for instance $J^3$ and $J^4$, forming the web and rim parts of the partly shown work-piece $F^1$ which is to have its hub and rim parts formed at one side as shown and as before described with reference to Fig. 140. With the inner rolling or operating portion of the web reducing roll part $j^{28}$ of the edging and web rolling roll $J^4$ formed sufficiently conical, as for instance shown in said Fig. 96 and as and for the purpose hereinafter more fully described, the total pressure $p^2$ caused by the so sufficiently conically formed inner rolling or operating portion of the web reducing roll part $j^{28}$ of the roll $J^4$ acts the total length of said conically formed inner rolling or operating portion and at right angles thereto against the work-piece, as indicated by the arrows $p^2$ for said total pressure, thereby causing the metal to flow against the face of said roll $J^3$ in the direction indicated by said arrows $p^2$, and as the metal in the work piece cannot flow in said direction beyond the face of said roll $J^3$, it will practically flow in a lateral, radial and in a peripheral direction; that is, in a lateral direction against the roll part $j^{29}$ of said roll $J^4$ and in a radial direction in the direction of the arrow $r^2$ against the face rolling roll K (which roll K is not shown in said Fig. 96) from where it will flow peripheral to the rim, that is, toward and against the roll $J^3$ and toward and against the roll part $j^{29}$ of the roll $J^4$ from where it will flow peripheral to the rim, and said radial flow of metal is limited by the rolling surface of the tread or face rolling roll K, which roll K is not shown in said Fig. 96, and from there the metal will flow peripheral to the rim.

Figs. 155 to 159 inclusive show sections of the rim portion of car wheels illustrating diagrammatically the flow of metal caused by various forms of rolls, and therein the pressures caused by the rolls against the surfaces of the metal in contact with the rolls are assumed to be uniformly distributed at said surfaces, as indicated by the arrows pointing against said surfaces and the direction of the flow of metal from said arrows toward the inner region of the rim portion is indicated by the pressure lines of said arrows. The flow of metal illustrated by pressure lines parallel to each other indicates a uniform compression of metal. The flow of metal illustrated by diverging pressure lines indicates that said uniformly distributed pressures at said surfaces in contact with the rolls are becoming less toward the inner region and peripheral face of the rim portion, and therefore the metal in those portions of the rim having said diverging lines is not condensed to the same degree as is the metal in the portions having parallel pressure lines and which degree of condensing becomes less and less as the distances between said diverging lines become greater; and if the rim is not rolled at its outer peripheral face simultaneously with the rolling of its inner peripheral faces, the metal will be extended instead of being compressed and thereby producing the incipient cracks in the tread or outer peripheral face of the rim hereinbefore referred to. The finished peripheral face of the car wheel is indicated by $f^{12}$ and the outline of each of said sections is shown in heavy lines. In the Figs. 155, 156 and 157 the center line of the rim and adjacent web portion is indicated by $y$, and said inner face or faces of the rim portion in contact with the rolls are indicated by $f^{16}$. In Fig. 155, the portions of the rim in which the metal is not properly condensed is indicated by the distances $d^1$, $d^2$ occupied by said diverging lines. In Fig. 156 the portions of the rim in which the metal is not properly condensed is indicated by the distances $d^3$, $d^4$ occupied by said diverging lines. The rolling of the rim portion as and in the manner described with reference to Figs. 155 and 156 does not properly work the metal in the rim and therefore forms a rim, which during the rolling process has already been weakened where its strength is needed and of which the tread will wear out quickly and shorten the life of such wheel, all of which may be observed on present wheels in actual use. In Fig. 157 is illustrated a section of a tire having for instance no web, such as used for some tired car wheels. From this figure is can easily be observed that the metal in such objects having a straight inner face without a web as shown, can be rolled to practically uniform density as indicated by the parallel pressure lines for the total pressure P; and, the metal in the rim portion of car wheels and similar objects having each a web formed integral with the rim, can be rolled in accordance with my invention to practically uniform and maximum density, as can be done with rims having no web portion.

Therefore and in order to produce said effects or results in the metal of the rim portion of the work-piece or car wheel as hereinbefore described with reference to Figs. 95 and 96, and to entirely avoid the improper working of the metal described with reference to Figs. 155 and 156, I form the inner rolling or operating portion of the web reducing part $j^{28}$ of each of said edging and web rolling rolls for instance $j^1$, $j^2$, sufficiently conical, so that the face of said conically formed portion is sufficiently inclined from its lateral apex toward the inner end of its roll; that is to say, so that when for instance, the web reducing parts $j^{28}$, $j^{28}$ of said rolls $J^1$, $J^2$ are against the finished web, then said face of said conically formed portion of each of said parts $j^{28}$, $j^{28}$ is sufficiently inclined from the side of the web outwardly in the direction away from the axis of the work-piece, as for instance in Figs. 95, 96, 136, 140 and 158. Said inclination of each of said web reducing parts $j^{28}$, $j^{28}$ I therefore form sufficiently large enough so as to roll the inner peripheral faces of the rim portion sufficiently inclined outwardly toward the peripheral face of the work-piece so that during the rolling or forming of the rim portion for instance to the rudimentary form shown in the Figs. 136, 140 and 158 the metal is caused to flow in the proper directions to assure compression of the metal in said rim portion to uniform or to practically uniform density, as is distinctly shown and diagrammatically illustrated in Fig. 158. In Figs. 158 and 159 is diagrammatically illustrated and distinctly shown the result of the rolling or forming of the rim of a car wheel in accordance with my invention hereinbefore described with reference to Figs. 136 to 139 and to Figs. 95 and 96, &c. Fig. 158 distinctly shows what is meant by the herein used words "sufficiently conical" or "sufficiently inclined" and therein is shown said rim portion rolled for instance to the rudimentary form shown in the Fig. 136, and therein is also shown in dotted lines said rim portion rolled to finished form, and the pressures $p$, $p^1$ are the same described with reference to Fig. 95; the pressure lines for each of said pressures $p$, $p^1$ being parallel to each other in the directions of the arrows and at right angles to said inclined faces of said roll parts $j^{28}$, $j^{28}$. The said pressures $p$, $p^1$ from said sufficiently inclined faces of said roll parts $j^{28}$, $j^{28}$ thus applied during the rolling or forming of said inner rim portion have rolled said inner faces $f^{18}$, $f^{18}$ of the so rudimentarily formed rim portion sufficiently inclined, as distinctly shown by the pressure lines for each of said pressures $p$, $p^1$, which caused the metal during said rolling or forming of the rim portion to flow in the proper directions to be compressed to uniform density, as distinctly illustrated by said parallel pressure lines for each of said pressures $p$, $p^1$, while at the same time the pressures $p^5$, $p^6$ against the lateral sides of the rim from the edging roll parts $j^{29}$, $j^{29}$ of said rolls $J^1$, $J^2$ have caused the metal to flow into the inner region of the rim in the direction of the arrows of the pressure lines for said pressures $p^5$, $p^6$ and have rolled the rim to desired lateral thickness and while at the same time the pressure $p^7$ against the peripheral face of the rim portion from the face beaking or face roughing roll K having its rolling face $K^7$ formed as shown, has caused the metal to flow also into the inner region of the rim in the directions of the arrows of the pressure lines for said pressure $p^7$ and has rolled said peripheral face to the beaked or rudimentary form $K^7$ as shown, thereby having rolled said metal in the rim and adjacent web portion simultaneously on all its surfaces by rolls situated in a plane passing laterally through said rim and adjacent web portion and therewith having compressed said metal simultaneously on all its surfaces to uniform and maximum density, or practically so, while at the same time the rim portion has been rolled to said rudimentary form shown for instance in the Figs. 136 and 158. The so rudimentarily formed rim is then rolled, as hereinbefore described, with rolls situated at another point of the rim portion to finished form whereby its metal is still further condensed as and in the manner hereinbefore described for instance with reference to the Figs. 137, 139, 146, 147 and 148, and diagrammatically illustrated in the Fig. 159. In Fig. 159, said so rudimentarily formed rim portion, rolled in accordance with my invention, is shown in dotted lines, and the finished rim and adjacent web portion shown rolled in accordance with my invention during the finishing rolling process to finished form, is shown in heavy lines, and during the finishing rolling process with the rolls $G^1$, $G^2$ and H operating against the rim portion at another point thereof, the web finishing rolls $G^1$, $G^2$ with their web finishing roll parts $g^{136}$, $g^{136}$ roll said inclined faces $f^{18}$, $f^{18}$ to the finished forms $f^{20}$, $f^{20}$, while the peripheral face finishing roll H rolls said beaked or rudimentarily formed peripheral face $K^7$ to the finished form $f^{12}$ and while the edging roll parts $j^{29}$, $j^{29}$ of said rolls $J^1$, $J^2$ (each of which rolls has now been moved somewhat toward the axis of the work-piece as hereinbefore described or as for instance indicated by the distances $f^{24}$, $f^{24}$ in said Figs. 158 and 159) are still operating in contact with the sides $f^{22}$, $f^{23}$ of the rim at another point thereof and are limiting the lateral flow of metal and maintaining the lateral thickness in the rim to which the same has been rolled during the rolling described with reference to Fig. 158; the combined action of said rolls $J^1$, $J^2$, $G^1$, $G^2$ and H during said finishing rolling process roll or form the rim and adjacent web portion to the finished form shown in Fig. 159. Said Figs. 158 and 159 distinctly show and diagrammatically illustrate that the metal in the whole rim portion, rolled in accordance with my invention, is rolled or worked to uniform and maximum density, or practically so, especially in the tread, flange and root of the flange where the strength and resistance to wear is mostly needed. It is, of course, to be understood that in order to produce said results, the rim portion must be rolled first for instance to the rudimentary form as and in the manner described with reference to Fig. 158 before the same is rolled to the finished form shown in the Fig. 159, and that the rolling of the said inclined faces $f^{18}$, $f^{18}$ and the rolling of said beaked peripheral face $K^7$ to their finished forms during the finishing rolling process will not disturb the density of the metal to which it has been compressed during the process described with reference to Fig. 158, but will still more compress the metal, especially so in the tread, flange and root of the flange where the strength and resistance to wear is mostly needed, as can easily be seen from said Fig. 159.

From the foregoing it will now also be observed that, in rolling for instance car wheels with the edging and web rolling rolls formed as herein shown and as and for the purpose described with reference to Figs. 95, 96, 136 and 140, and diagrammatically illustrated in Figs. 158 and 159, and with the lateral thickness or width of said tread or face rolling roll K being the same as the lateral thickness or width which the rim portion of the car wheel is to have when finished, as is for instance shown in the Figs. 136 and 140 and diagrammatically illustrated in Fig. 158, thereby, and with said roll K formed as shown and as and for the purpose herein described with reference to Figs. 136, 140, 146, 147, 148 and diagrammatically illustrated in Figs. 158 and 159 and with the rolls $J^1$, $J^2$ in said Figs. 136 and 158 formed as shown and as and for the purpose above described with reference to the Figs. 95, 96, 136, 158 and 159, or with the rolls $J^3$, $J^4$ in said Fig. 140 formed as shown and as and for the purpose above described, and with all said three rolls for instance $J^1$, $J^2$ and K situated in a plane passing laterally through the work-piece at one side of its axis, the metal in the peripheral face and the whole rim portion of the work-piece or car wheel is rolled or worked continually, during the rolling or forming of the rim portion to rudimentary form, upon all its surfaces simultaneously with said three rolls so formed and so situated as beforesaid and as shown for instance in the Figs. 136, 140 and 158, and in then rolling the so rudimentarily formed rim to finished form, as and for the purpose for instance described with reference to Figs. 95, 96, 158 and 159 and, which to my knowledge, together with the result obtained thereby as for instance above described with reference to Figs. 95, 96, 136, 140, 146, 147, 148, 158 and 159, was never done or accomplished before in rolling car wheels, whereby the metal in said peripheral face and the whole rim portion is uniformly condensed to its maximum, or practically so, thereby giving the metal in said peripheral face and in the whole rim portion its due maximum and uniform strength and its due maximum and uniform resistance to wear; and, as any surplus of metal in the work-piece can be worked during the rolling process for instance into the inner rim and adjacent web portion, the said peripheral face and the whole rim portion of the car wheel can also be rolled, by my rolling process smooth on all its surfaces to the desired form without leaving a raised circular portion or fin, which would have to be removed afterward by turning, or other costly means.

The parts in connection with the edging and web rolling roll $J^1$ at the other side of the work piece, are as before said, similar to the like parts connected with the edging and web rolling roll $J^2$ at this side of the work piece. At a suitable distance from the inner ends of said edging and web rolling rolls, the said shafts J J are supported and guided by adjustable bearings located in the aforesaid guide pieces $J^8$ $J^8$, one for each roll, as shown in said Figs. 17 and 72. Each of said guide pieces $J^8$ $J^8$, is formed at its lower side with a circular segmentally shaped guide block which is formed concentric with the said vertical shaft $J^{18}$, as shown, and, therewith is supported and guided by its circular segmentally shaped guide bearing $J^{153}$ which is also formed concentric with said vertical shaft $J^{18}$, and which bearing is provided with the adjustable guide pressure plate $J^{154}$ adjusted by the adjusting set screws $J^{155}$, as shown; therefore each of said guide pieces $J^8$ $J^8$ with the end part of its said shaft J supported therein, as shown, is moved in its said guide bearing $J^{153}$ forward and backward in a circular path described from the center of said vertical shaft $J^{18}$, and thereby, by the other end part of its said shaft J, the aforesaid oscillating frame by its said housings $J^{10}$ and $J^{11}$ which are supporting said other end part of said shaft J, as shown, is also swung forward or backward, such as the case may be, on its trunnions $J^{138}$ and $J^{17}$ which are central or coaxial with the said vertical shaft $J^{18}$; therefore, said edging and web rolling rolls, when moved laterally toward or away from the work piece, move each in a circular path described from the center of said vertical shaft $J^{18}$.

With reference to Fig. 17, $J^{123}$ $J^{123}$ are the pressure cylinders, one for each roll as shown, for moving laterally said edging and web rolling rolls toward or away from the work piece, during the rolling process. Each of said cylinders $J^{123}$ $J^{123}$ with its lower and upper sides is firmly fitted, its lower side with the main bed plate part $B^2$ and its upper side with the upper bed plate part as shown, and is also firmly fastened with said bed plates by screws or bolts $J^{124}$, as shown. Each of said cylinders $J^{123}$ $J^{123}$ has a piston $J^{121}$ with a piston rod $J^{120}$ and a piston rod $J^{122}$ passing through the cylinder heads $J^{125}$ and $J^{126}$ at both ends of said cylinder. The piston rod $J^{122}$ at its outer end has firmly fastened thereto the collar $J^{132}$, and from there is provided with a long thread $J^{131}$ over which is fitted a threaded adjustable nut $J^{129}$ made in halves and firmly held together and to the piston rod by the screws $J^{130}$, as shown; this nut $J^{129}$ can be adjusted from one end to the other of said thread $J^{131}$, and with the end of the extension $J^{128}$ of the packing box gland forms a stop for the forward stroke of the piston, and by adjusting said nut $J^{129}$ forward or backward, as the case may require, the forward stroke of the piston is regulated, and thereby the desired limit of the lateral forward movement of its edging and web rolling roll $J^2$ toward the work piece is adjusted. The piston rod $J^{120}$ at its outer end has fastened thereto with a key, the cross head $J^{109}$ as shown, and from there is provided with a long thread $J^{119}$ over which is fitted the threaded adjustable nut $J^{117}$ made in halves and firmly held together and to the said piston rod by the screws $J^{118}$, as shown. Said nut $J^{117}$ can be adjusted from one end to the other end of said thread $J^{119}$, and with the end of the extension $J^{127}$ of the packing box gland forms a stop for the return or pull back stroke of this piston, and by adjusting said nut $J^{117}$ forward or backward, as the case may be, the return or pull back stroke of said piston is regulated, and thereby the desired limit of the lateral pull back movement of its edging and web rolling roll $J^2$ away from the work piece is adjusted.

Said cross head $J^{109}$ is formed with a fork shaped end to which is fastened the journal pin $J^{108}$, and near the upper and lower outer sides of said cross head $J^{109}$ said journal pin is reduced and extended. Each of said upper and lower extended and reduced ends of said journal pin $J^{108}$ is provided with a slide block $J^{156}$ which has attached thereto slide bearings $J^{157}$ $J^{157}$; said bearings being fitted to the bearing surfaces of the upper and lower guide parts $J^{111}$ $J^{111}$ and $J^{112}$ $J^{112}$ which forms the guides for said cross head $J^{109}$. Said upper and lower guide parts $J^{111}$ $J^{111}$ and $J^{112}$ $J^{112}$ are fitted with separating pieces $J^{158}$ as shown, and are firmly held and fastened together and to the brackets $J^{114}$ and $J^{115}$ by rods or bolts $J^{113}$, as shown; and said brackets $J^{114}$ and $J^{115}$ are firmly fastened to the main bed plate part $B^2$, as shown. $J^{53}$ is a two armed or fork shaped crank provided with the journal or crank pins $J^{106}$ and $J^{107}$ which are firmly fastened with both ends to both the arms of said crank $J^{53}$. Said crank $J^{53}$ has its hub part made in halves which are firmly held together and to the vertical shaft $J^{50}$ with the keys $J^{51}$ and bolts $J^{52}$, as shown. Said cross head $J^{109}$ is connected to said crank $J^{53}$ by the connecting rod $J^{110}$; that is, said connecting rod $J^{110}$ is connected with one end to the cross head pin $J^{108}$ and with its other end to the journal pin $J^{107}$ of said crank $J^{53}$, as shown; said crank with its other journal pin $J^{106}$ being connected to the said guide piece $J^8$ by its connecting rod $J^{105}$; that is, said connecting rod $J^{105}$ with its one end which is formed with the journal part $J^{104}$ is connected to the bearing in said guide piece $J^8$, and with its other end is connected to the other journal pin $J^{106}$ of said crank $J^{53}$, as shown; thereby, when said piston rod $J^{122}$ comes to its said adjusted stop formed by said nut $J^{129}$ and the end of said extension $J^{128}$ as shown in said Fig. 17, then said edging and web rolling roll $J^2$ is at the end of its adjusted lateral forward movement toward the work piece, as shown, and when said other piston rod $J^{120}$ with its said nut $J^{117}$ comes against the end of said other extension $J^{127}$, then said edging and web rolling roll $J^2$ is at the end of its adjusted lateral pull back movement away from the work piece.

Said vertical shaft $J^{50}$, see Figs. 2, 5, and 17, is formed at its upper end with a journal which is firmly supported in a bearing $J^{73}$ located in the upper bed plate part $C^4$, and below said crank $J^{53}$ said vertical shaft $J^{50}$ has a journal which is firmly supported in a bearing $J^{76}$ located in the main bed plate part $B^2$. At its lower end the vertical shaft $J^{50}$ is also formed with a journal which is firmly supported in a bearing, similar to $G^{74}$, and located in the lower sole or base plate part $A^3$, and the total weight of said vertical shaft with its cranks $J^{53}$ and $J^{54}$ is supported on the lower end of said vertical shaft $J^{50}$ by a ball thrust bearing which is similar to $G^{75}$. Figs. 6 and 7 illustrate in detail the said bearing $J^{76}$ removed from the said bed plate part $B^2$; Fig. 6 being a plan view thereof, and Fig. 7 a vertical central section through $y$—$y$ Fig. 6. The bearing part $J^{76}$ is made in halves, as shown and is provided at its opposite sides with the segmental pressure blocks $j^{30}$ $j^{30}$ and the wedge shaped parts $j^{31}$ $j^{31}$, which are located between said parts $J^{76}$ and $j^{30}$, as shown; the circular surfaces of said pressure blocks $j^{30}$ $j^{30}$ form the pressure surfaces against the opposite sides of the similar shaped hole in the said bed plate part $B^2$; and if after wear, the bearing requires adjustment, a sheet liner or liners may be put between said bearing part $J^{76}$ and wedge shaped parts $j^{31}$. The segmentally shaped plates $j^{32}$ $j^{32}$ are bolted against the lower side of the bed plate part $B^2$ by means of screws $j^{33}$, as shown, to keep said bearing parts in their proper positions. Figs. 8 and 9 illustrate in detail said upper bearing $J^{73}$ removed from the upper bed plate part $C^4$.

Fig. 8 is a sectional plan view thereof, and Fig. 9 is a vertical central section through $x$—$x$ Fig. 8 with part of the shaft $J^{50}$. The bearing part $J^{73}$ is made in halves as shown and is provided at diametrically opposite points with the segmentally shaped pressure blocks $j^{34}$ $j^{34}$ and the wedge shaped parts $j^{35}$ $j^{35}$ which are located between said parts $J^{73}$ and $j^{34}$, as shown, and at diametrically opposite points in a plane at right angles to that in which the blocks $j^{34}$ $j^{34}$ and parts $j^{35}$ $j^{35}$ are located, the bearing part $J^{73}$ is provided with segmentally shaped parts $j^{36}$, of which there is only one shown, the other being below the end collar $j^{38}$ in Fig. 8, to be hereinafter referred to. Each of said parts $j^{36}$ has a key way $j^{37}$, as shown, for feathers fastened to the bore of said upper bed plate part $C^4$, and thereby prevent said bearing parts from turning in the bore of said upper bed plate part $c^4$; the circular or cylindrical surfaces of said parts $j^{34}$ $j^{34}$ and $j^{36}$ $j^{36}$ fit into the cylindrical shaped hole in the said upper bed plate part $C^4$, and if after wear the bearings require adjustment, a sheet liner or liners may be put between said parts $J^{73}$ and $j^{35}$; and end collar $j^{38}$ is bolted against the upper side of the upper bed plate part $C^4$ by means of screws $j^{39}$ as shown, to keep said bearing parts in their proper position and at the same time serve as a lubricating pan, as shown.

To said vertical shaft $J^{50}$ and above said bearing in said lower sole or base plate part $A^3$, is also firmly fitted and fastened the crank $J^{54}$ in the same manner as said crank $J^{53}$. This crank $J^{54}$ at the end of its arms is provided with a journal pin $J^{57}$ to which is connected one end of the rod $J^{62}$, see Fig. 2, which is connected with its other end to the journal pin $J^{66}$ of the hereinbefore described loose rocking crank consisting of said halves $J^{64}$ and $J^{65}$ which are held together and to the journal on the hereinbefore described vertical shaft $H^{67}$ by the bolts, as shown and supported on the aforesaid ball thrust bearing, as shown in the Fig. 4.

To the journal pin $J^{71}$ of said rocking crank $J^{65}$ is connected one end of the rod $J^{72}$ which rod is connected with its other end to the journal pin $T^{57}$ of the crank $T^{54}$, which crank is firmly fastened to the vertical shaft $T^{50}$ to which is also firmly fastened the other crank $J^{53}$ for the said other roll $J^1$ at the other side of the work piece, in the same manner as are the cranks $J^{54}$ and $J^{53}$ fastened to the vertical shaft $J^{50}$ at the said this side of the work piece, as described, and said other crank $J^{53}$ is connected in the same manner and with similar parts with said roll $J^1$ and said other cylinder $J^{123}$ for the other side of the work piece, as above described for the like parts for this side of the work piece; and the whole pressure device described for moving roll $J^2$ laterally toward or away from the work piece, is similar to the device for moving said roll $J^1$ laterally against or away from the work piece at the other side of the work piece.

*Edging and web rolling rolls; lateral movement and pressure equalizing device; said rolls are also named edging and web reducing rolls.*

As above described and illustrated by Figs. 1, 2, 4, 5 and 17; the herein named edging and web rolling roll $J^2$ located at the said this side of the work piece and connected with the parts described to the said crank $J^{54}$ on said vertical shaft $J^{50}$, is, from said crank $J^{54}$, as shown in said Fig. 2, also connected by the rod $J^{62}$, loose rocking crank $J^{64}$, $J^{65}$, and rod $J^{72}$ to the crank $T^{54}$ on the vertical shaft $T^{50}$, and from said other crank $J^{53}$ mounted on the same said shaft $T^{50}$, is connected with the herein named edging and web rolling roll $J^1$ located at the other side of the work piece, by parts which as before said, are similar to the like parts described for the roll $J^2$ at this side of the work piece; and thereby equalizing the lateral movement and pressure of said edging and web rolling rolls against the work piece; that is for instance,—with the rods $J^{62}$ and $J^{72}$ connected as shown in said Fig. 2, said edging and web rolling rolls $J^1$ and $J^2$ are moved laterally toward or away from the work piece at both sides thereof, together, that is,—each the same distance.

For some articles, it is required that each of said edging and web rolling rolls be moved toward and away from the work piece independently of the other; for instance, as before described and illustrated in the Figs. 140 to 142 inclusive, wherein it is required that each one of the edging and web rolling rolls $J^3$ $J^4$ in Fig. 140 and $J^5$ $J^6$ in Fig. 142 be moved toward and away from the work piece independently, and in such case, the said rods $J^{62}$ and $J^{72}$ are disconnected; for instance,—the rods $J^{62}$ and $J^{72}$ are disconnected at one end from their journal pins $J^{57}$ and $T^{57}$ and are swung on their other end journals $J^{63}$ and $J^{71}$ into the position indicated by the dotted lines for $J^{62}$ and $J^{72}$, and in this position, the rods are supported at one of their ends by the crank $J^{64}$—$J^{65}$ and at their other ends by brackets (not shown) placed on the foundation walls D, see Fig. 2.

Said edging and web rolling rolls, as said, are located, one at this side of the work piece and the other at the other side thereof, as shown, and are driven as before described and shown, and by the means fully described and shown; said edging and web rolling rolls with their lateral moving device, may be moved laterally, either together or independently of each other, and their lateral movements against the work piece may also be stopped at the pressure end of said lateral moving device at any desired lateral position of said roll or rolls from the work piece; or, said edging and web rolling rolls may be retained at any desired lateral position, either together or independently of each other; and said edging and web rolling rolls with said tread or face rolling roll, if so desired form also a stop at or near the work piece to the lateral movement toward the work piece of said edging and web rolling rolls, and thereby will also assist in turning or driving said tread or face rolling roll; and, with their shifting device, said edging and web rolling rolls may be moved during the rolling process in either direction between their shifting limits and between the center or hub part and the rim part or periphery of the work piece, or may be moved during the rolling process forward and backward to their shifting limits as often as may be desired, or may be moved to any position between their shifting limits; or may be retained at any desired position between their shifting limits; or may be operated in such a manner that any one of said edging and web rolling rolls may be retained in any position between the shifting limits, and the other while operating on the work piece may be shifted to any point or to any distance between the shifting limits forward or backward or forward and backward as often as may be desired, such as the case may require, or the distance for shifting forward and backward can be adjusted in both said shifting directions from the shifting limit to any point between said shifting limits, and the operation of said edging and web rolling roll or rolls against the work piece may be commenced or may be stopped at any one end of said adjusted shifting distance, or at any point between said adjusted shifting distance; and, between said adjustable shifting distance, by means of adjustable indicating device, said edging and web rolling roll or rolls, during the operation with the work piece on its piercers or work supporting centers, can be set to any desired radius from the center of the work piece at which their operation against the work piece should be commenced; or, any desired position of said roll or rolls between said shifting distance, from the center of the work piece, at which position the shifting operation of said roll or rolls against the work piece may be retained or may be stopped, will be indicated by means of said adjustable indicating device. Said shifting and said lateral movements of each one or of both said edging and web rolling rolls may either be done at the same time or different times. The means for driving said rolls is such that the main driving shaft or the finishing side of the apparatus or mill may be retained at one speed and the edging and web rolling rolls or the roughing side of the apparatus or mill may be run at various speeds; and that said edging and web rolling rolls or the said roughing side of the apparatus or mill, may also be connected to or disconnected from the main driving shaft or from the finishing side of the apparatus or mill, also that said edging and web rolling rolls or the roughing side of the apparatus or mill may be run in either direction, such as may be desired.

*Additional rolling examples.*

A car wheel, or other article, may also be rolled, as for instance described in the following:—The properly heated blank or work-piece F, for instance of the form shown in Fig. 119, having been pierced and centered as before described or the piercing may be done either before or after the hub is formed or may be done during the process of forming or shaping the hub portion, is ready to be rolled and dished, for instance, into a car wheel having the form or shape shown at $F^2$ in Fig. 137. The said web reducing roll parts $j^{28}$ $j^{28}$ of both the edging and web rolling rolls $J^1$ $J^2$ may commence operating against both sides of the work-piece F, first forming the hub part in the following manner with the said tread or face finishing roll H against the work-piece F. Both the rolls $J^1$ $J^2$ with their said web reducing roll parts commence operating each against each side of the work-piece F and on the point $f^5$ thereon, and from there are operating against the work-piece at each side thereof in the direction of the dotted line $f^5$—$f^6$, and thereon are moving at each side of the work-piece from $f^5$ to $f^6$ until the said rolls $J^1$ $J^2$ are in the position indicated by the dotted lines, and during the time that said rolls $J^1$ $J^2$ move with their said web reducing roll parts at each side of the work-piece from $f^5$ to $f^6$, the said web reducing roll part $j^{28}$ of each roll, with its side which is next to the hub, is operating against the work piece and makes the metal therein flow toward the hub to form the hub part as shown by the dotted lines, and with their other sides which are toward the periphery of the work-piece, both said web reducing roll parts $j^{28}$ $j^{28}$ of both rolls $J^1$ $J^2$ are not pressing against the work piece F in this described method or manner of operation, and therefore, all the metal which during said operation is removed from around the hub part and which is sectionally indicated by the dotted lines at both sides of the work piece for part of said web reducing roll parts $j^{28}$ $j^{28}$, is practically wholly used in forming said hub; and with the before described piercers or work supporting centers

E⁶ E⁶ with the said shoulders e³⁰ e³⁰ with which is limited the lateral flow of the metal in the hub part during said operation in forming the hub part and with the end parts of said rolls J¹, J² limiting the radial outward flow of said metal, the ends of the hub part may be formed flat and to the desired gage for the length of the hub and the hub rolled or formed smooth on all its surfaces, as in the Fig. 143. Then when the hub part is so finished, the said edging and web rolling rolls J¹ J² are moved, as and by the means herein before described, from the hub part toward the rim part, or are moved forward and backward as often as desired, and thus make the metal flow in the proper direction and roll or form the web part to its desired thickness and, when said rolls J¹, J² are in the positions shown for instance in the Fig. 136 the inner faces of the rim portion have been rolled or formed to said rudimentary form, as and for the purpose hereinbefore described with reference to the Figs. 95, 96, 158 and 159 and during this operation any lateral flow of the metal is limited by said edging roll parts $j^{29}$ $j^{29}$, and also during this operation, the tread or face rolling roll K, formed for instance as shown in said Figs. 136 or 158, is limiting the radial flow of metal and is operating against the peripheral face of the work-piece to beak the same, as and for the purpose herein described with reference to the Figs. 146, 147, 148, 158 and 159. Said roll K in conjunction with said rolls J¹, J² rolls the peripheral face of said work-piece to the beaked shape shown for instance in said Figs. 136 or 158; and, then with said rolls J¹, J² still operating with their roll parts $j^{29}$, $j^{29}$ in contact with the work-piece in the positions shown for instance in the Figs. 136 or 158, or with said rolls moved somewhat toward the axis of the workpiece as before described or as for instance indicated by the distances $f^{24}$, $f^{24}$ in Figs. 158 and 159 and with said roll K in the same position shown for instance in Figs. 136 or 158, or with said roll K pulled back somewhat, the herein named web finishing rolls G¹, G² and tread or face finishing roll H commence operation against the work piece F¹ and the dishing process may be commenced at the same time and roll and dish the work piece to the form or shape of the car wheel at F² shown in the Fig. 137; and, when so completely rolled and dished, the said rolls J¹ J² and G¹ G² and H, may still be operating against the wheel to its finish, whereby the wheel is made perfectly true and to balance and to gage or gages and its tread and flange surfaces made harder and smoother and more durable; then, all the rolls and piercers or work supporting centers are pulled back, whereby said work supporting centers are entirely removed from the so finished car wheel as and by the means before described, and the wheel removed and replaced with a new properly heated blank or work piece, and then the above described operation repeated, all as and by the means before described. In forming the said web part, the said edging and web rolling rolls J¹ J², instead of reducing the web part to its required thickness during one movement from the hub part to the rim part, may be moved forward and backward between the hub part and the rim part as often as may be desired.

In rolling for instance the peripheral face of car wheels or similar articles first to a beaked or rudimentary shape simultaneously with the rolling or forming the rim portion to the rudimentary form shown for instance in Figs. 136 and 158 and as and for the purpose hereinbefore described with reference to the Figs. 95, 96, 136, 158 and 159, and then to the finished form; the tread or face rolling roll K with its peripheral face formed for instance as shown in Figs. 136 or 158, &c., or a similar face, serves to beak the peripheral face of the car wheel before rolling the same to finished form, that is, serves to preliminarily roll the peripheral face of the wheel to beaked or rudimentary shape, for instance, to forms such as shown in the Figs. 146, 147 or 148, or to other rudimentary forms; such preliminary action being herein termed "beaking". During such beaking and rolling or forming process the metal in the whole rim portion of the work-piece or wheel is worked continually and simultaneously upon all its surfaces, which gives the metal forming the tread, flange, and the whole rim portion of the wheel the required uniform strength and density absolutely necessary for maximum and uniform resistance to wear. After this beaking action is completed, the finishing roll or rolls are brought into action and roll out of said beaked or rudimentarily formed peripheral face the finished shape of the tread and flange of the wheel and roll the same to its desired finished diameter as, for instance, shown by the dotted lines $f^{12}$ for said finished peripheral face in Figs. 146, 147 and 148, and diagrammatically illustrated in the Figs. 158 and 159, whereby the metal in the tread and flange and the whole rim portion is still further condensed. The wheel thus rolled or formed in accordance with my invention has its metal uniformly condensed to its maximum where it is subjected to greatest strain and wear and at the point heretofore considered the weakest.

Said blank or work piece, when put into the apparatus or mill will, in most cases, have a proper volume or weight, which will be somewhat more than the volume or weight in the completely finished wheel or other article, but for like wheels or like articles, the ingot, bloom, blank or other work piece will each have practically the same volume or weight; and, in forming or finishing said hub part from the central or hub part of an ingot, bloom, blank or other work piece having a thickness which for instance is less than the length of the hub of the finished wheel or other article is to be, the location of said point $f^5$ in Fig. 119, from the center of the blank or work piece, may be determined from the thickness of the said central or hub part of such blank or work piece and from the desired metal in the hub part, or as practice may require, for instance;—for blanks or work pieces of such description, the distance from the center of the blank or work piece to said point $f^5$ will be greater and the operation for forming the hub part in such case, may be done as herein before described and shown in Fig. 143; or, the thickness of the blank or work piece necessary for so forming or finishing the hub part may be determined from the desired metal in the hub part, and during the rolling process, the diameter of the blank or work piece, may either be increased, decreased, or may remain about the same, for instance;—if a blank or work piece F, such as shown in Fig. 119, is of a thickness and diameter necessary to make up the proper volume or weight in the finished article, but its diameter is less than the diameter of the finished wheel or other article is to be, then in such case, the said diameter of such blank or work piece will be increased during the rolling process; or for instance,—if a blank or work piece is of a thickness and diameter necessary to make up the proper volume or weight in the finished article, but its diameter is greater than the diameter of the finished wheel or other article is to be, then in that case, said diameter of said blank or work piece will be decreased during the rolling process; or for instance, if a blank or work piece is of the thickness and diameter necessary to make up the proper volume or weight in the finished article, but its diameter is the same or approximately the same as the diameter of the finished wheel or other article is to be, then in that case, the said diameter of the blank or work piece will remain about the same during the rolling process.

In rolling, for instance, the peripheral surface of a car wheel, blank or work piece with the herein named tread or face rolling roll K having a rolling surface, for instance as, $K^2$, the said roll K and the said tread or face finishing roll H may be moved against or away from the work piece or wheel, independently of each other, as herein before described, and in rolling, for instance, the peripheral surface of a car wheel, blank or other work piece, with the herein named tread or face rolling roll K having a rolling surface, for instance as $K^1$, the said roll K and the tread or face finishing roll H may be moved together or in unison against or away from the work piece or wheel, that is,—the tread or face rolls K and H may be moved against or away from the work piece or wheel, each the same distance, as herein before described.

When rolling for instance the peripheral face of a car wheel or work-piece with the herein named tread or face rolling roll K, having its rolling face for instance as shown at $K^2$ in Fig. 136 or $K^7$ in Fig. 158, simultaneously with the rolling or forming of the marginal or rim portion of said work-piece with said edging and web rolling rolls $J^1$, $J^2$, &c., as and in the manner hereinbefore described, the work-piece is first rolled to the form or shape shown by $F^1$ in Figs. 136 or 158, wherein the inner peripheral faces of its rim have been rolled to rudimentary form, as and for the purpose hereinbefore described with reference to the Figs. 95, 96, and diagrammatically illustrated in Figs. 158 and 159, and its outer peripheral face rolled to beaked form, as and for the purpose hereinbefore described with reference to the Figs. 146, 147, 148, 158 and 159. The said inner peripheral faces of the rim with adjacent web portion and said beaked peripheral face of the work-piece or wheel are then rolled to finished forms with the herein named web finishing rolls for instance $G^1$, $G^2$ or $G^0$, $G^0$ or $G^3$, $G^4$ and tread or face finishing roll H, as for instance shown in the Figs. 137, 139, 141 or 159. The metal in the flange, tread and the whole rim, where the strength of the wheel is most needed, is thus worked to practically uniform and maximum density, thereby giving to these parts by so rolling them, the greatest possible strength and most efficient wearing surface, which result has not heretofore been accomplished to my knowledge by any other known process for rolling car wheels.

In Fig. 120 is shown, for instance, a wheel center $F^2$, such as used for instance in tired car wheels, it being rolled and dished to the form or shape shown in a similar manner as before described; therein is illustrated also the herein named tread or face rolling roll K having the rolling surface $K^3$ as shown and the herein named tread or face finishing roll H having the rolling surface $H^2$ as shown. In this case, all the rolls, that is the rolls in each set, may be moved together or in unison as before shown and described.

In Fig. 138 is shown, for instance, a previously finished and worn car wheel supported by the said piercers or work supporting centers $E^2$ $E^2$ as before described, and thereon, the said worn wheel, of which the worn flange and tread parts and rim and web parts are indicated by the dotted lines, is rolled for instance larger in diameter to the size and form or shape of the finished re-rolled wheel indicated by F². The center portion $e^{36}$ (see Fig. 44) of each of said piercers or work supporting centers E² E² is in this case for instance being forced into the bore of the hub of said worn car wheel to make said bore larger, while at the same time said annular flange $e^{35}$ (see Fig. 44) of each of said piercers or work supporting centers is forced over the outer peripheral portion or diameter of said hub, as shown in said Fig. 138. Such previously finished and worn wheel, if desired, may also be re-rolled to a smaller diameter, or be rolled true to the same worn diameter or to any larger diameter, such larger diameter of course being limited by the metal in such previously finished or worn wheel. In the Fig. 139 is shown, for instance, an undished wheel F² rolled to the form or shape F² in a similar manner as before described, but without the dishing, as shown.

In the Figs. 140 and 141, is shown for instance a work piece or wheel having its web part formed wholly at one side thereof; in Fig. 140 is shown the first rolling of the ingot, bloom or wheel blank to the form or shape, indicated by F¹, and therein, the one edging and web rolling roll J³ formed wholly conical as shown, is moved to the position shown and therein retained while the other roll J⁴, as before described, is forming or is finishing the hub part and the web part and together with the tread or face rolling roll K having for instance the rolling surface K² is rolling the work piece to the form or shape indicated by F¹, wherein the inner peripheral face of its rim has been rolled to rudimentary form, as and for the purpose hereinbefore described with reference to the Figs. 95, 96 and 158, and its outer peripheral face rolled to beaked or rudimentary form, as and for the purpose hereinbefore described with reference to the Figs. 146, 147, 148, 158 and 159. The roll J³ is then moved to the position shown in Fig. 141, and the web finishing roll G³ formed as shown is moved toward the work piece F¹ into position against the side of the tread or face finishing roll H, as shown, and said roll G³ is retained in this position during its operation against the work piece while the other web finishing roll G⁴ is moved as before described toward and against the work piece F¹ and operating against the inner sides of the web and rim parts and at the same time with the tread or face finishing roll H and with the edging and web rolling rolls J³ J⁴ in the position shown in Fig. 141, the wheel is rolled and is dished, as before described, to the finished form or shape F² shown in said Fig. 141.

In Fig. 142 is shown, for instance, a work piece or article formed with a hole, as shown, by means of which it is supported on the piercers or work supporting centers E⁶, E⁶, as shown, which centers are, for instance, formed with the hereinbefore described shoulders $e^{30}$ $e^{30}$ for limiting the lateral flow of the metal in the hub part during the operation in forming or finishing said hub part. Said work piece during the rolling process is rolled into a pipe flange or into any other article having the shape F², as shown in said figure and therein, the one edging and web rolling roll J⁵ and the one web finishing roll G⁵, both formed wholly conical as shown, are moved to the position shown and therein retained while the other edging and web rolling roll J⁶, formed as shown, is as before described finishing the hub part and then only the web or flange part as shown, and the other web finishing roll G⁶, also formed wholly conical, is moved as before described toward and against the work piece and operating against its side, as shown, and at the same time with the rolling surface H³ of the tread or face finishing roll H, the said pipe flange or other like shaped article is rolled to the finished form or shape F² shown in Fig. 142. When during the rolling process, said roll J⁶ approaches the position shown in said Fig. 142, then the said tread or face rolling roll K is pulled back into the position shown and therein is not operating against the work piece, but may be used if so desired, as a stop to limit the lateral movement of the roll J⁶ against the work piece, as herein before described.

The herein before shown and described device for indicating the diameters of the ingot, bloom, blank, work piece or wheel, during the rolling process, may be used with said tread or face rolls K and H, whether said rolls are moved into and out of operative positions with said ingot, bloom, blank, work piece or wheel, together or independently of each other.

In the operation of centering or of piercing and centering, and of rolling and of dishing according to my novel method, with my novel apparatus or mill, the properly heated ingot, bloom, blank or other work piece, by means of the raising, lowering and retaining device, is held and retained in a position wherein its outer portion or periphery is central or coaxial, or approximately coaxial, with the piercers or work supporting centers and therewith centered or pierced and centered, and during this process, said raising, lowering and retaining device is lowered out of the way as shown in Fig. 18, after which the said ingot, bloom, blank or other work piece may be completely rolled and while the same revolves may be dished or not, as may be desired, to the form or shape of a car wheel, disk wheel, pipe flange or to the form or shape of any other suitable desired article, such for instance as herein disclosed or similar thereto, and when so completely rolled and dished or not dished, all the rolls and piercers or work supporting centers are pulled back, whereby said piercers or work supporting centers are entirely removed from the so completely rolled car wheel or other article, leaving nothing but the so completed car wheel or other completely finished article on the raising, lowering and retaining device, which has again been raised to its proper position to receive said completely rolled car wheel or other article and therewith it will then be raised to the position indicated by the dotted lines in Fig. 4, after which said car wheel or other article is removed from the apparatus or mill and is exchanged for another properly heated ingot, bloom, blank or other work piece, after which the above described operation is repeated.

The advantages of my invention are many and will be appreciated by those skilled in the art. Some of said advantages are for instance,—instead of it being necessary, in making, for instance, a car wheel out of a properly heated blank or other work piece of proper diameter and thickness, such as shown for instance in Figs. 124 and 119; first by piercing and centering and by roughing out the hub and part of the web with a special apparatus; and second, by forming roughly the web, rim, flange and tread part with another special apparatus; and third, by forming to the finish the hub, web, rim, flange and tread without dishing with still another special apparatus; and fourth, by dishing with still another special apparatus; and fifth, by removing the work supporting center part with still another special apparatus; said piercing and centering and forming the whole car wheel complete, including the dishing and the removing of the work supporting centers, may all be done by my novel method and novel devices or means, with one heat and in one operation with my novel apparatus or mill. In removing the blank or other work piece or wheel during each of said five operations from one such apparatus and placing the same into another, much time is required and it also requires that the blank, work piece or wheel be reheated several times, which is very expensive. For instance, if a blank or work piece is removed from one apparatus into another, it loses much of its heat during such time and if such forming or shaping is partly or wholly done, for instance, with dies or with any other tools having large surfaces which are comparatively cold to the work piece or wheel coming in contact therewith and during such forming or shaping process, the work piece or wheel will lose still more of its heat, and therefore, after about only two such removals and processes, the work piece or wheel may have to be reheated. With my novel method and apparatus or mill the car wheels or other articles may be completely rolled and be dished from properly heated ingots, blooms, blanks or other work pieces, which may also be centered or pierced and centered, and all the centering or the piercing and centering and the rolling and the dishing and the removing of the piercers or work supporting centers may all be performed by my novel method and novel devices or means with one heat and in one operation with my novel apparatus or mill, and therewith, in rolling, for instance, such articles as car wheels, the metal therein, in the flange, tread and the whole rim portion, where the strength of the wheel is mostly needed, may be worked to maximum density and thereby give to said parts the greatest possible strength and most efficient wearing surface; whereby is reduced enormously the cost of operation in the manufacture or in the making of car wheels or other articles, the product is cheapened and the output increased; or for instance, any previously formed blank or work piece formed by any method or means into any suitable desired form or shape, such for instance as herein disclosed, or similar thereto, and being properly heated and having the proper volume or weight for the desired finished article, may be taken into my apparatus or mill and therewith rolled and dished or not, as may be desired, and finished to the desired form or shape of any of the bodies or articles as herein described or to the form or shape of any other suitable desired article, such for instance as herein disclosed or similar thereto; or for instance, any ingot, casting of steel or of wrought metal or of any other metal or material suitable for rolling having any desired suitable form or shape, such for instance as herein disclosed or similar thereto, and being properly heated and having the proper volume or weight for the desired finished body or article, may be taken into my apparatus or mill and therewith rolled and dished or not dished and finished to the desired form or shape of any of the bodies or articles as herein described or to the form or shape of any other suitable desired article such for instance as herein disclosed or similar thereto; or for instance, car wheels, disk wheels, pipe flanges, other similar articles or any other desired articles such for instance as herein disclosed or similar thereto, may be centered or be pierced and centered, and be rolled and be dished or be not dished, as may be desired, with either the use of all the rolls or with only the use of the herein said rolls of either of the herein named finishing side or of the herein named roughing side of my novel apparatus or mill; or for instance, all the various performances required in the making of such bodies or articles as herein described, from properly heated ingots, blooms, blanks or other work pieces, may either be all performed with one heat and in one operation of my novel apparatus or mill, or, each of such performances may be done singly or separately, as such may be desirable, for instance, in supplying stock or in making up stock for articles of which the exact finished shape is at the time not known, or for rolling and finishing with my apparatus or mill such articles which have been formed or only partly formed by other means; as for instance, ingots, blooms, blanks or other work pieces may only be centered or pierced and centered, and then be removed from my apparatus or mill, and therewith may be partly or completely rolled and be dished or not, at some future time; or, ingots, blooms, blanks or other work pieces may be centered or pierced and centered, and be only rough rolled or be rolled to any desired form or shape and be then removed from my apparatus or mill, and therewith be rolled and be dished or not, to their desired finished form or shape at some future time; or, such bodies or articles as herein described or any other similar desired articles, which may not be required to be dished, or wherein the dishing is required to be done at some future time, may in my apparatus or mill be centered or pierced and centered and completely rolled to their proper form or shape without the dishing; or, for instance, the rolling, forming or shaping of a hub portion as and in the manner herein described for instance with reference to Figs. 119, 136, 140 and 143, whereby a hub can be rolled, formed or shaped and can be formed smooth on all its surfaces to its desired form without leaving a raised portion or fin which would have to be removed afterward by turning or other costly means; or for instance, the rolling or forming the inner peripheral face or faces of the marginal or rim portion of the work-piece or wheel sufficiently conical or sufficiently inclined, as and for the purpose hereinbefore described for instance with reference to Figs. 95, 96, 158 and 159, and then rolling the metal or part of the metal forming said so sufficiently conically rolled inner peripheral face or faces into another portion of the work-piece or wheel, as and for the purpose hereinbefore described and diagrammatically illustrated with the Figs. 158 and 159; or for instance, the rolling of the total peripheral face of the work-piece or wheel, first to beaked or rudimentary form, as and for the purpose herein described for instance with reference to Figs. 136, 146, 147, 148, 158 and 159 and then rolling the so beaked or rudimentarily formed peripheral face to desired finished form, as and for the purpose herein described for instance with reference to Figs. 146, 147, 148 and diagrammatically illustrated with the Figs. 158 and 159; or for instance, such bodies or articles as herein described or any other similar desired articles which were previously finished or partly finished in my apparatus or mill or which were previously finished or partly finished by any other means, but which were not dished, may be put into my apparatus or mill and therewith, while such article revolves, be dished to any desired dish, and if so required, may also be rolled true after the dishing is done; or, such bodies or articles as herein described or any other similar desired articles which were previously finished in my apparatus or mill or which were previously finished by any other means and which were either dished or not and which were either bored and fitted or forced to their axles or shafts or which were not bored, may be put into my apparatus or mill and therewith rolled true or rolled to a different size and therewith, while such article revolves, may also be dished to any desired dish or be not dished, and if bored, such bore may also be made smaller in diameter so it may again be bored to its original diameter and be again fitted to the same place on its axle or shaft; or, ingots, blooms, blanks or other work pieces which may have been previously centered or pierced and centered and which may also have or not have the hub portion formed by any method or means or which may also have or not have been formed into any of the aforesaid forms or shapes by any method or means, may be taken into my novel apparatus or mill and therewith be rolled and be dished or not, as may be desired, to their desired form or shape; or for instance, the piercers or work-supporting centers, by constant and continuous pressure means described, can also automatically clamp the hub or center portion of the work-piece firmly between them and with their axles revolve with the blank or other work-piece while the same at its hub or center portion is also automatically firmly clamped laterally, and during the centering or piercing and centering process and also during the dishing, or rolling and dishing or undishing process, said piercers or work-supporting centers with the hub or center portion of the work-piece so automatically and firmly clamped laterally between them, are moved in the direction of their axes forward or backward, such as the case may require, whereby, car wheels or other circular bodies will be rolled and dished, or undished and rolled, and thereby and with the aid of said indicating devices or with the aid of said adjustable stops, car wheels or other circular bodies will be rolled and dished, &c., perfectly true, smooth and to balance and to the desired gage or gages, and when the tread and flange or peripheral face of the car wheel or other circular body being rolled reaches its desired finished diameter, then said finished diameter will automatically be retained during any further rolling of the car wheel or other body, or during any further operation against said car wheel or other body; or for instance; by the means of said raising, lowering or retaining device, whereby the ingot, bloom, blank or other work-piece is brought into and retained in such position wherein its outer portion or periphery is central or coaxial, or approximately so, with the piercers or work-supporting centers to thereby permit of its being centered or pierced and centered in the center, or approximately in the center, of its outer portion or periphery, and after said work-piece is so centered or pierced and centered or during said centering or piercing and centering process, said device is lowered away from the work-piece and is retained in said lowered position away from the work-piece until said work-piece or finished article is to be removed from the apparatus or mill, when said device is again raised to receive said work-piece or finished article and remove the same from the apparatus or mill; or for instance, by the means of the cooling device, whereby the center or supporting surface or surfaces of the work-piece in contact with said piercers or centers are cooled to give to said supporting surface or surfaces a harder supporting resistance; or for instance, with the face roll K having its peripheral rolling face formed as and for the purpose herein described with reference to Figs. 146, 147, 148, 158 and 159 and having its lateral thickness or width the same as is the lateral thickness or width which the outer or rim portion of the car wheel or other article which is to be rolled from a work-piece is to have when finished and with the edging and web rolling rolls J¹, J², &c., being formed as and for the purpose hereinbefore described for instance with reference to Figs. 95, 96, 158 and 159 and as for instance shown in Figs. 136 and 140, &c., thereby, with said roll K and with said edging and web rolling rolls J¹ J² in said Fig. 136 formed as shown and as and for the purpose herein described or, with said roll K and with said edging and web rolling rolls J³ J⁴ in said Fig. 140 formed as shown and as and for the purpose herein described, the metal in the peripheral face and the whole rim portion of a car wheel or other article is rolled or worked continually during the rolling process upon all its surfaces simultaneously with said three rolls formed as shown for instance in said Figs. 136 and 140, and thereby, the metal in the peripheral face and the whole rim portion of a car wheel or other article is condensed uniformly to its maximum whereby is given to said metal in said peripheral face and rim portion its due maximum and uniform strength and its due maximum and uniform resistance to wear and thereby when the work-piece or wheel is finished by my finishing process to its desired form said peripheral face and the whole rim portion is also rolled smooth on all its exposed surfaces to the desired form or shapes without leaving a raised circular portion or fin which is to be removed afterward by turning or other costly means; or for instance, during the rolling according to my invention, any surplus of metal in a heated work-piece may be forced during the rolling process to flow either into the inner portion of the rim or into the web portion adjacent the rim, or into both; or may be forced to flow into any other portion or portions of the wheel or other object, without leaving a raised circular portion or fin anywhere on the finished rolled wheel or other finished rolled object, which circular portion or fin would have to be removed afterward by turning or other costly means; or for instance, the novel driving means and the arrangement thereof enables the main driving gears and their shafts to be located below the floor and out of the way and it also enables each set of the driving rolls to be run in either direction and at various speeds relative to the other set, and also that either set may be disconnected from the main driving shaft.

My said novel devices or means and my novel apparatus or mill wherein said devices or means are systematically arranged, may be operated in many ways different from those herein described and still be within the scope of my invention as defined in the claims, and it is to be understood that within the scope of the appended claims I do not desire to limit myself to the operation of said devices or means and of the said apparatus or mill as herein described, as such are only a few examples for the purpose of illustrating the manner or way by which my novel method for centering or for piercing and centering properly heated ingots, blooms, blanks or other work-pieces and therefrom completely rolling or rolling and dishing such bodies or articles, as herein described, or other similar bodies or articles or any other desired article such for instance as herein disclosed or similar thereto and for dishing, undishing or redishing the same while the same revolves and for removing the piercers or work supporting centers, may all be carried out with my novel apparatus or mill.

While the apparatus or mill, in the manufacture or making of such articles as herein described, or other articles, may mostly be used in rolling or forming such articles with the use of all the rolls and with the centering or piercing and centering and the dishing or dishing and rolling device and with the raising, lowering and retaining device, as herein described and shown for instance in Figs. 1 and 104 to 106 inclusive, and 119, 120, and 136 to 142 inclusive, and therewith may give best results, I do not desire to limit myself to such apparatus or mill having all the rolls and the other aforesaid devices, as efficient apparatuses or mills can be made for instance with only such rolls, and with or without the dishing device, and with or without the raising, lowering and retaining device, as for instance described and illustrated in Figs. 107 to 118 inclusive, wherewith such articles as herein described or other articles may be satisfactorily made with or without the dishing; as for instance, in Figs. 107 to 109 inclusive is illustrated a car wheel which is rolled with only the use of the three rolls as shown, that is, with the herein named edging and web rolling rolls $J^1$ $J^2$ and the tread or face rolling roll K and therewith the rim portion of said car wheel is also supported during the dishing or rolling and dishing process, and while said car wheel revolves it is dished to the form or shape $F^2$ in Fig. 108, in the same manner with the dishing device shown in the Figs. 104 and 106 inclusive, and without the dishing the car wheel would have the form or shape $F^1$ in Fig. 107; or for instance, in Figs. 110 to 112 inclusive, is illustrated a car wheel which is rolled with only the use of the four rolls as shown, that is—with the herein named edging and web rolling rolls $J^1$ $J^2$, the tread or face rolling roll K and the tread or face finishing roll H and with said rolls $J^1$ $J^2$ and K the rim portion of said car wheel is also supported during the dishing or rolling and dishing process, and while said car wheel revolves it is dished to the form or shape $F^2$ in Fig. 111, in the same manner with the dishing device shown in Figs. 104 to 106 inclusive, and without the dishing device the car wheel would have the form or shape $F^1$ in Fig. 110; or for instance, in Figs. 113 to 115 inclusive is illustrated a car wheel which is rolled from an ingot, bloom or other work piece having the form or shape F in Fig. 113 before being put into the apparatus or mill and therewith rolled with only the use of the three rolls as shown, that is—with the herein named web finishing rolls $G^1$ $G^2$ and the tread or face finishing roll H and therewith the rim portion of said car wheel is also supported during the dishing or rolling and dishing process and while said car wheel revolves it is dished to the form or shape $F^2$ in Fig. 114 in the same manner with the dishing device shown in the Figs. 104 to 106 inclusive, and without the dishing device the car wheel would have the form or shape about like $F^1$ in the Fig. 110, or—if the web finishing rolls would have the shape as $G^0$ $G^0$ in Fig. 139, then the car wheel would have about the form or shape as shown at $F^2$ in Fig. 139; or for instance—in Figs. 116 to 118 inclusive, is illustrated a car wheel which is rolled from an ingot, bloom or other work piece having the form or shape F in Fig. 116 before being put into the apparatus or mill and therewith rolled with only the use of the five rolls as shown, that is— with the herein named web finishing rolls $G^1$ $G^2$, the tread or face finishing roll H and the herein named edging and web rolling rolls $J^5$ $J^5$ (which latter in this case may either be loose or driven) and therewith the rim portion of said car wheel is also supported during the dishing or rolling and dishing process and while said car wheel revolves it is dished to the form or shape $F^2$ in Fig. 117, in the same manner with the dishing device shown in the Figs. 104 to 106 inclusive, and without the dishing device the car wheel would have the form or shape about like $F^1$ in Fig. 110, or if the web finishing rolls would have the shape as $G^0$ $G^0$ in the Fig. 139, then the car wheel would have about the form or shape as $F^2$ in Fig. 139.

It is further to be understood that I also do not desire to limit myself to pressure cylinders as herein shown and described, as efficient apparatuses or mills can be made and be useful, wherein, instead of the herein shown and described double acting pressure cylinders for moving the rolls into and out of operative position with the work piece and with their adjustable stops for limiting their strokes as desired, any other form of pressure cylinder or any other suitable means may be used.

It is also further to be understood that I do not desire to limit myself, as shown for instance in said Fig. 17, to the amount of inclination or angle formed by the shafts J J of said edging and web rolling rolls $J^1$ $J^2$, nor to the diameter of said rolls $J^1$ $J^2$, shown for instance in said Fig. 17, as efficient apparatuses or mills may be made and be useful, wherein such said inclination or angle may be made much greater, for instance as great as is the inclination or angle formed by the shafts G G of the web finishing rolls $G^1$ $G^2$ shown in Fig. 10, and the diameter of said rolls $J^1$ $J^2$ made for instance much smaller than is shown in said Fig. 17.

Where in the specification and claims the word "coaxial" or "coaxially" is used with reference to the centering, or piercing or penetrating and centering, and to the positioning a work-piece, &c., it is intended to mean "coaxial or approximately coaxial," &c.

Where in the specification and claims the words "ingot, bloom or blank" are used, it is intended to mean the work-piece to be operated upon, and the word "work-piece" is used herein in a broad sense and is intended to include an ingot, bloom, blank, car wheel or any other unfinished or completely finished circular, or approximately circular, object adapted to be rolled, rerolled, reworked or reformed either to entirely change its shape, or only partly change its shape or outline, or to change its dimensions in whole or part, as described. In other words "work-piece" means any circular, or approximately circular, object to be operated upon.

Where in the specification and claims the words "sufficiently conical" or "sufficiently inclined" are used with reference to the said inner rolling or operating portions of the web reducing roll parts $j^{28}$, $j^{28}$ of said edging and web rolling rolls, for instance $J^1$, $J^2$, or with reference to the inner peripheral face or faces of the marginal or rim portion of a work-piece or wheel or other object, it is intended to mean the inclination of said inner rolling or operating portions of said web reducing roll parts $j^{28}$, $j^{28}$ formed so as to cause the metal, during the rolling or forming of said rim portion, to flow in the proper directions to assure compression of the metal in said rim portion to uniform or to practically uniform density, as distinctly illustrated in Fig. 158 and as hereinbefore fully described with reference to said Fig. 158.

The foregoing description and accompanying drawings set forth in detail the method and devices or means and apparatus or mill wherein said devices or means are systematically arranged, and also modifications thereof, all embodying my invention, but many modifications and changes in the construction and arrangement of the parts may still be made without departing from my invention, as defined in the claims.

I claim as my invention:—

1. In an apparatus or mill of the kind described, a pair of alined work-supporting axles rotatably supported, combined with interchangeable piercers adapted to be detachably secured to adjacent ends of said axles and support a work-piece therebetween.

2. In an apparatus or mill of the kind described, means for rotatably supporting a work-piece at its central portion comprising a pair of alined rotatable axles having work-supporting centers whose opposing faces are flat, and pins extending from said flat surfaces and adapted to pierce the work-piece as and for the purpose described.

3. In an apparatus or mill of the kind described, means for rotatably supporting a work-piece at its central portion comprising a pair of alined rotatable axles having work-supporting centers whose supporting faces are flat, and piercers extending from one of said flat supporting surfaces and adapted to pierce the work-piece as and for the purpose described.

4. In an apparatus or mill of the kind described, alined work-supporting axles arranged at opposite sides of a work-piece and having piercers secured to adjacent ends thereof adapted to pierce or penetrate and support a work-piece therebetween, each of said adjacent ends of said axles being reduced in diameter to form a shoulder and each of said piercers having a central bore of two different diameters to form a shoulder bearing against the shouldered end of its coöperating axle, and means for securely holding said piercers to said axles.

5. In an apparatus or mill of the kind described, alined work-supporting axles arranged at opposite sides of a work-piece and having piercers at adjacent ends thereof, each of said adjacent ends of said axles being reduced in diameter to form a shoulder and each of said piercers having a central bore of two different diameters to form a shoulder bearing against the shouldered end of its coöperating axle.

6. In an apparatus or mill of the kind described, means for centrally piercing or centering a work-piece comprising a pair of alined rotatable axles having piercers at adjacent ends adapted to pierce or penetrate said work-piece and support the work-piece while rolled or operated upon, said piercers being suitably formed and having circumferential flanges to limit the extent of penetration of said piercers into the work-piece.

7. In an apparatus or mill of the kind described, means for piercing or penetrating and rotatably supporting a work-piece comprising a pair of alined and rotatably supported piercers, said piercers being suitably formed and having circumferential flanges to limit the extent of penetration of said piercers into said work piece.

8. In an apparatus or mill of the kind described, means for piercing or penetrating a work-piece comprising a pair of alined rotatable piercers or work-supporting centers, said piercers or work-supporting centers being suitably formed, one of said piercers or work-supporting centers having a circumferential flange to limit the extent of its penetration into said work-piece.

9. In an apparatus or mill of the kind described, means for centrally supporting a work-piece during the process of rolling or forming a hub portion thereon, said means comprising a pair of alined piercers or work-supporting centers having circumferential flanges to limit the lateral flow of metal during the process of rolling or forming said hub, and each of said flanges having a diameter which at most is the same as the diameter which said hub is to have at its end.

10. In an apparatus or mill of the kind described, means for centrally supporting a work-piece and for limiting the lateral or outward end flow of metal at the center or hub portion of the work-piece during the process of forming or shaping said hub portion, said means comprising a pair of alined work-supporting centers, one of said work-supporting centers having a circumferential flange spaced from the side of the supported work-piece serving as the means for limiting the said lateral or outward end flow of metal.

11. In an apparatus or mill of the kind described, means for centrally supporting a work-piece and for limiting the lateral or outward end flow of metal at the central or hub portion of the work-piece during the process of forming or shaping said central or hub portion, said means being adapted to so act against the work-piece within a circle which is at most the same as the diameter which said central or hub portion of the work-piece is to have at its end.

12. In an apparatus or mill of the kind described, means for centrally piercing or penetrating and rotatably supporting a work-piece comprising a pair of alined rotatable axles having piercers at adjacent ends, said piercers being tapered and having circumferential flanges to limit the extent of penetration of said piercers into the work-piece.

13. An apparatus or mill of the kind described having means to centrally engage and pierce or penetrate a work-piece to any desired depth or depths with the same length of piercer or piercers.

14. An apparatus or mill of the kind described having means to engage and pierce or penetrate a work-piece at the center of its outer portion or periphery and rotatably support the same at its central portion, and rolls adapted to act against said work-piece.

15. In an apparatus or mill of the kind described, the combination of means for centrally piercing or penetrating and supporting a work-piece having piercers provided with circumferential flanges spaced from the sides of the supported work-piece, a pair of oppositely arranged edging and web reducing rolls adapted to work against opposite sides of the work-piece from its peripheral portion toward its center or hub portion to reduce the thickness of the same within a certain circular region from its peripheral portion toward its center or hub portion and thereby to cause the metal to flow toward the axis or hub-portion of the work-piece and laterally against the said circumferential flanges.

16. In an apparatus or mill of the kind described, the combination of means for centrally piercing or penetrating and supporting a work-piece having a piercer at one side provided with a circumferential flange spaced from the side of the supported work-piece, a pair of rolls adapted to work against opposite sides of the work-piece, one of said rolls being adapted to act against the work-piece from its peripheral portion toward its center or hub portion to reduce the thickness of the same within a certain circular region from its marginal or peripheral portion toward its center or hub-portion and thereby to cause the metal to flow toward the axis or hub-portion of the work-piece and laterally against the circumferential flange of said piercer.

17. In an apparatus or mill of the kind described, means for piercing or penetrating and rotatably supporting a work-piece at its central portion so that the work-piece while so supported can be rolled or operated upon at its hub or center portion or anywhere from its hub or center portion toward its periphery, and means for axially moving said work-piece while so supported.

18. In an apparatus or mill of the kind described, the combination with a movable support to be brought into action only for positioning the work-piece so as to permit the work-piece to be pierced or centered at its opposite sides or ends in the direction of its axis, of a pair of piercing or work-supporting axles arranged in alinement at opposite sides of said work-piece, a power or pressure device for each axle for moving the same longitudinally toward and from said work-piece, and means for positively regulating the extent of movement of said axles.

19. In an apparatus or mill of the kind described, a pair of work supporting and dishing or piercing axles arranged in alinement at opposite sides of a work-piece and in line with the axis of the work-piece, said axles being adapted for piercing or penetrating and for supporting the work-piece so as to permit the work-piece while so supported to be dished, a power or pressure device for each axle for moving said axles longitudinally against or into and from said work-piece for moving said axles and together simultaneously in one direction.

20. In an apparatus or mill of the kind described, a rotatable piercing axle arranged in alinement with the axis of the work-piece, a power or pressure device for moving said axle longitudinally against or into and away from said work-piece.

21. In an apparatus or mill of the kind described, means at each side of a work-piece operable independent of each other for piercing or penetrating and rotatably supporting a work-piece.

22. In an apparatus or mill for rolling car wheels or other circular bodies, means for rotatably supporting a work-piece, and constant power or pressure means for axially moving said work-piece while so supported.

23. In an apparatus or mill of the kind described, rotatable means for piercing or penetrating and supporting a work-piece, and means for axially moving said work-piece while so supported.

24. In an apparatus or mill of the kind described, a device for laterally piercing or penetrating a work-piece at opposite sides of its central portion while the same is supported in a vertical plane, combined with means to bear against the work-piece for limiting the extent to which said device may pierce or penetrate the work-piece.

25. In an apparatus or mill of the kind described, a device for centrally piercing a rotating work-piece and for axially moving said work-piece or its hub or center portion while so piercing the same.

26. In an apparatus or mill of the kind described, a device for piercing or penetrating a work-piece, said piercing or penetrating device also rotatably supporting the work-piece axially and automatically moving said work-piece while so supported.

27. In an apparatus or mill of the kind described, a device combined with power or pressure means for centering or piercing and centering a work-piece, and raising and lowering means adapted for temporarily positioning and retaining the work-piece in proper position so as to permit the same to be centered or pierced and centered in the direction of its axis.

28. In an apparatus or mill of the kind described, a device for centrally piercing or penetrating a rotatably supported work-piece at opposite sides or ends thereof in the direction of its axis to equal or different depths.

29. In an apparatus or mill of the kind described, a device for centrally piercing a rotating work-piece at one side thereof.

30. In an apparatus or mill of the kind described, a device for centrally piercing or penetrating a work-piece at one side thereof and having rotatable axles which rotatably support the work-piece.

31. In an apparatus or mill of the kind described, a pair of alined axles having piercers or work-supporting centers at adjacent ends adapted to engage and to pierce or center a work-piece positioned therebetween and also support the same, and means adapted to be brought into action for so positioning said work-piece and to be moved out of action after or during said piercing or penetrating operation so as to clear the work-piece.

32. In an apparatus or mill of the kind described, a device for supporting a work-piece to permit of its being rotated and dished or undished or redished and constant power or pressure means to move said device longitudinally for dishing, undishing or redishing said work-piece.

33. In an apparatus or mill of the kind described, means to rotatably support and pierce a work-piece comprising longitudinally and independently movable axles having piercing means adapted to engage and pierce the work-piece centrally at opposite sides or ends thereof and rotatably support the same.

34. An apparatus or mill of the kind described having means to rotatably support a work-piece comprising alined rotatable axles arranged at opposite sides of the work-piece, and a power or pressure mechanism for each of said axles for moving said axles longitudinally together or independent of each other for centering or piercing and centering said work-piece.

35. In an apparatus or mill for rolling car wheels or other circular bodies, the combination of means adapted to be brought into action for positioning and retaining a work-piece in proper position to permit the same to be pierced or centered at its opposite sides or ends in the direction of its axis and to be moved out of action after or during said piercing or centering operation so as to clear the work-piece, a pair of piercing and work-supporting axles arranged at opposite sides of the work-piece for piercing or centering the same while so retained in said position, and power or pressure mechanism operatively connected with each of said axles for axially moving the same as desired.

36. In an apparatus or mill of the kind described, a pair of alined rotatable piercing and work-supporting axles movable toward and from each other, and means to limit the extent of movement of each piercing and work-supporting axle to cause said axles to pierce or center a work-piece at opposite sides or ends thereof to equal or different depths.

37. In an apparatus or mill of the kind described, the combination with a device for piercing and supporting a work-piece, of power or pressure means operatively connected with said piercing and work-supporting device, and adjustable means operatively connected with said power or pressure means to limit the extent of movements of said piercing and work-supporting device to pierce or center the work-piece at opposite sides thereof to equal or different depths.

38. In an apparatus or mill of the kind described, the combination with a device for piercing and supporting a work-piece, of power or pressure means operatively connected with said piercing and work-supporting device, and adjustable means operatively connected with said power or pressure means to limit the extent of movement of said piercing and work-supporting device for regulating the depth of piercing or centering the work-piece at one side.

39. In an apparatus or mill of the kind described, the combination with a support, of a pair of alined supporting heads axially movable toward and from each other, a piercing or work-supporting axle freely rotatable in each supporting head, and means to limit the extent of said axial movement of each supporting head to cause the end parts of said piercing axles to penetrate a work-piece at opposite sides thereof to equal or different depths.

40. In an apparatus or mill of the kind described, rotatable work-supporting centers for piercing or penetrating and supporting a work-piece, a power or pressure device coöperating with each of said work-supporting centers, a rod or shaft with each pressure device with a threaded portion, and an adjustable nut threaded onto the threaded portion of each rod or shaft and adapted to engage a stationary portion of the said power or pressure device to limit the longitudinal or axial movement of its coöperating work-supporting center toward the work-piece or with the work-piece.

41. In an apparatus or mill of the kind described, rotatable work-supporting centers for piercing or centering and supporting a work-piece, a power or pressure device coöperating with each of said work-supporting centers, a rod or shaft with each power or pressure device provided with a threaded portion, a removable distance sleeve secured to and slidable on each rod or shaft, and an adjustable nut threaded onto the threaded portion of each rod or shaft and bearing against said sleeve and together with said sleeve being adapted to engage a stationary portion of said power or pressure device to limit the longitudinal or axial movement of its coöperating work-supporting center away from the work-piece or with the work-piece.

42. In an apparatus or mill of the kind described, a pair of alined supporting heads, a pair of rotatably supported piercing or work-supporting axles having piercing or work-supporting means at adjacent ends and carried by said supporting heads and arranged in alinement, said supporting heads being longitudinally movable to carry or force said adjacent end means of said work-supporting axles in contact with a work-piece for supporting the same, a power or pressure device for each supporting head, a rod or shaft with each power or pressure device extending from opposite ends of said power or pressure device, one end of each rod or shaft being connected with its coöperating supporting head to move the same and between said head and its coöperating power or pressure device having a threaded portion, and an adjustable nut on the threaded portion of each rod or shaft adapted to engage the adjacent end part of said power or pressure device to limit the longitudinal or axial movement of its coöperating supporting axle away from the work-piece or with the same, said rods or shafts having also at their other ends adjustable nuts adapted to engage the adjacent end parts of the other ends of said power or pressure devices to limit the longitudinal or axial movements of said work-supporting axles toward the work-piece or with the same.

43. In an apparatus or mill of the kind described, a pair of alined supporting heads, a pair of rotatably supported piercing or work-supporting axles having piercing or work-supporting means at adjacent ends and carried by said supporting heads and arranged in alinement, said supporting heads being longitudinally movable together in either direction and toward and from each other and carry or force said piercing or work-supporting means of said supporting axles against or into opposite sides of a work-piece for supporting or for piercing and supporting the same, a power or pressure device for each supporting head, a rod or shaft with each power or pressure device extending from opposite ends of said power or pressure device, one end of each rod or shaft being connected with its coöperating supporting head to move the same and the other ends of said rods or shafts having adjustable nuts to engage the adjacent outer end parts of said power or pressure devices to limit the longitudinal or axial movements of said supporting axles toward the work-piece or with the work-piece.

44. In an apparatus or mill of the kind described, a pair of alined and rotatably supported piercing or work-supporting axles having piercing or work-supporting means at adjacent ends and adapted to engage and centrally support a work-piece therebetween, power or pressure means coöperating with each piercing or work-supporting axle, said power or pressure means being provided with adjustable stops adapted to engage stationary portions of said power or pressure means or of the apparatus or mill to automatically limit the longitudinal movements of each supporting axle in either direction.

45. In an apparatus or mill of the kind described, means for piercing or centering a work-piece comprising a pair of alined supporting heads arranged at opposite sides of a work-piece having piercers or work-supporting centers at opposite ends, and means detachably interposed between said work-piece and said supporting heads to prevent the penetration of said piercers or work-supporting centers into the work-piece beyond desired depths.

46. In an apparatus or mill of the kind described, means for piercing or centering a work-piece comprising a pair of alined supporting heads at opposite sides of the work-piece and having inclined ends facing the sides of said work-piece and provided with alined piercers or work-supporting centers at said inclined ends, pressure or power means, and wedge shaped collars adapted to be interposed between said work-piece and the inclined ends of said work-supporting heads to compel said pressure or power means operatively connected therewith to force the piercers or work-supporting centers at opposite sides of the work-piece to pierce or penetrate said work-piece to desired depth or depths.

47. In an apparatus or mill of the kind described, means for piercing or penetrating a work-piece comprising a pair of alined supporting heads arranged at opposite sides of the work-piece and movable in a line parallel to the axis of the work-piece, a pair of alined axles rotatable in said supporting heads, piercers or work-supporting means at adjacent ends of said axles, and means detachably interposed between said work-piece and supporting heads to prevent the penetration of said piercers or work-supporting means into the work-piece beyond certain limits.

48. In an apparatus or mill of the kind described, means for piercing or centering a work-piece comprising a pair of alined supporting heads arranged at opposite sides of the work-piece and having inclined ends facing the sides of said work-piece, a pair of alined axles in said supporting heads, piercers or work-supporting centers secured to adjacent ends of said axles, pressure or power means, and wedge shaped collars of different thicknesses adapted to be interposed between said work-piece and the inclined ends of said work-supporting heads to compel said pressure or power means operatively connected therewith to force the piercers or work-supporting centers at opposite sides of the work-piece to penetrate said work-piece to unequal depths.

49. In an apparatus or mill of the kind described, means for piercing or centering a work-piece comprising a pair of alined work-supporting heads arranged at opposite sides of the work-piece and having inclined ends facing the sides of said work-piece, a pair of alined axles in said work-supporting heads, piercers or work-supporting centers secured to adjacent ends of said axles, and wedge shaped collars adapted to be interposed between said work-piece and the inclined ends of said work-supporting heads to govern the extent of penetration of said piercers or work-supporting centers into the work-piece.

50. In an apparatus or mill of the kind described, means for piercing or centering a work-piece comprising a pair of alined work-supporting heads arranged at opposite sides of the work-piece and having inclined ends facing the sides of said work-piece, a pair of alined axles in said work-supporting heads, piercers or work-supporting centers secured to adjacent ends of said axles, and wedge shaped collars interposed between said work-piece and the inclined ends of said work-supporting heads to govern the extent of penetration of said piercers or work supporting centers into the work-piece, each of said collars having a handle for rotating the same and a pair of stop pins adapted to engage opposite sides of the cooperating work-supporting head to limit the rotary movement of the collar.

51. In an apparatus or mill of the kind described, means for piercing or centering a work-piece comprising a pair of longitudinally movable alined axles arranged at opposite sides of the work-piece and having piercers at adjacent ends adapted to penetrate the work-piece at opposite sides and support the same, each piercer having a circumferential flange to limit the penetration thereof into the work-piece.

52. In an apparatus or mill for rolling car wheels or other circular bodies, a device for diametrically compressing the hub of a work-piece and supporting the work-piece around said hub comprising a shaft or axle having female work-supporting means secured thereon at its one end, said work-supporting means having a suitably formed center portion and an annular flange surrounding and separated from said suitably formed center portion by an annular intervening space, and power or pressure means operatively connected with said device.

53. In an apparatus or mill for rolling car wheels or other circular bodies, means for positioning a work-piece so as to permit the same to be pierced or centered at its opposite sides or ends in the direction of its axis, and rotatable means for so piercing or centering said work-piece and rotatably supporting the same.

54. In an apparatus or mill of the kind described, rotatable means for piercing or penetrating a work-piece, supporting the same and axially moving said work-piece while supporting and piercing or penetrating the same.

55. In an apparatus or mill of the kind described, a dishing and rotatable work-supporting device adapted for centrally piercing or penetrating and supporting a work-piece and dishing the work-piece while rotating.

56. An apparatus or mill of the kind described having means to rotatably support a work-piece comprising alined rotatable piercing axles arranged at opposite sides of the work-piece to pierce or penetrate and support the work-piece, and power or pressure mechanism for moving said piercing axles longitudinally and independent of each other to pierce or penetrate said work-piece.

57. An apparatus or mill of the kind described having means to engage, to center and to compress the outer or peripheral face or faces of the hub of a car wheel or other work-piece to make its center bore smaller and support said work-piece around said peripheral face or faces of its said hub so as to permit the work-piece while so supported to be rolled anywhere except at its hub portion, and rolls adapted to so act against said work-piece as desired.

58. An apparatus or mill for rolling car wheels or other circular bodies having rotatable female centers to engage and rotatably support a work-piece at the outer peripheral surfaces of its hub, so as to permit the work-piece while so supported to be rolled anywhere except at its hub portion, and rolls adapted to so act against the work-piece as desired and to rotate and roll the work-piece.

59. In an apparatus or mill for rolling car wheels or other circular bodies, a device for centering the hub of a car wheel or other work-piece around the outer peripheral surface or surfaces of said hub, comprising rotatable female dies wherein said work-piece is supported around the outer peripheral surface or surfaces of its hub so as to permit the work-piece while so supported to be rolled anywhere except at its hub portion or to be dished, undished or redished.

60. In an apparatus or mill for rolling car wheels or other circular bodies, a device for diametrically compressing the hub of a work-piece and rotatably supporting the same so as to permit the work-piece while so supported to be rolled anywhere except at its hub portion or to be dished or undished or redished, said device comprising rotatably supported female dies surrounding the outer peripheral part or parts of said hub, means for moving said dies and forcing them over the said outer peripheral part or parts of said hub to compress said hub to a smaller diameter and make its hole or bore smaller in diameter.

61. In an apparatus or mill of the kind described, the combination with a support having opposite guide-pieces arranged in alinement longitudinally, of a pair of alined supporting heads longitudinally movable in said guide-pieces, a power or pressure device operatively connected with each of said supporting heads to move the same longitudinally, alined piercers or work-supporting axles rotatable in said heads and adapted to centrally support a work-piece between their adjacent end parts.

62. In an apparatus or mill of the kind described, the combination with a support, of a pair of alined guide-pieces on said support having guide-grooves therein and each guide-groove having its side walls inclined in the same direction, a piercing or work-supporting head longitudinally movable in each guide-piece and having a dove-tailed base portion, a guide pressure plate bearing against one side of said dove-tailed base portion and provided with transversely elongated bolt holes, bolts passing through said bolt holes, a wedge-piece interposed between said guide-pressure plate and the adjacent side wall of said guide-groove, means for forcing said wedge-pieces downward, and means for retaining said wedge-pieces in adjusted position.

63. In an apparatus or mill of the kind described, the combination with a support, of a pair of alined guide-pieces on said support having guide-grooves therein, a supporting head longitudinally movable in each of said guide-pieces and having a guide portion at its base, a guide pressure plate at one side of said guide-portion, a wedge-piece held between said guide pressure plate and the adjacent wall of the guide-groove, means to adjust said wedge-piece to move said guide pressure plate in proper contact with said supporting head, and piercing or work-supporting axles rotatable in said supporting heads and adapted to support a work-piece therebetween.

64. In an apparatus or mill of the kind described, the combination with a support, of a guide-piece on said support having a guide-groove therein with its side walls inclined in the same direction, a work-supporting head longitudinally movable in said guide-piece and having a dove-tailed base portion, a guide pressure plate bearing against one side of said dove-tailed base portion and provided with a laterally extending flange bearing against the top of said guide piece, and means for adjustably securing said guide pressure plate in said guide-groove and against one side of said dove-tailed base portion.

65. In an apparatus or mill of the kind described, a pair of alined and longitudinally movable supporting heads arranged at opposite sides of a work-piece and provided with a pair of alined piercing or work-supporting means rotatably mounted in said heads and adapted to pierce or center a work-piece and support the same so as to permit the work-piece while so supported to be rolled and dished during the rolling and dishing processes, a power or pressure device for each supporting head for moving said heads axially toward and from each other for piercing or centering said work-piece and for moving said heads together in one direction for dishing said work-piece, a rod or shaft with each power or pressure device extending from opposite ends of said power or pressure device, one end of each rod or shaft being connected with its coöperating supporting head to move the same and having a threaded portion adjacent said head provided with an adjustable nut, a removably fitted distance sleeve on said rod or shaft having one end in contact with said adjustable nut and being adapted to coöperate with said nut and engage with its other end the adjacent stationary end part of said power or pressure device to limit as desired the pull-back movement of its coöperating supporting head away from the work-piece or with the same, said distance sleeve being also adapted to be removed from its rod or shaft to permit said nut to come against the said stationary end part of said power or pressure device and cause the rod or shaft to move back to the end of its maximum axial movement, thus causing the said head to be moved out of way when exchanging rolls, each of said rods or shafts being also provided at its outer end with an adjustable nut to engage the adjacent stationary end part of the other end of said power or pressure device to limit as desired the movement of its coöperating supporting head toward or with the work-piece.

66. In an apparatus or mill of the kind described, the combination with a support, of a pair of supporting heads on said support, a pair of rotatably supported piercing or work-supporting axles having piercing or work-supporting means at adjacent ends and carried by said supporting heads and arranged in alinement, said supporting heads being longitudinally movable toward and from each other to carry or to force said piercing or work-supporting means of said axles into or against a work-piece for supporting the same, a power or pressure device for each supporting head, a rod or shaft with each power or pressure device extending from opposite ends of said power or pressure device, one end of each rod or shaft being connected with its coöperating supporting head for moving the same and having a threaded portion between said head and its power or pressure device, an adjustable nut on the threaded portion of each rod or shaft, and removable distance sleeves between said nuts and said power or pressure devices, said rods or shafts having also at their other ends adjustable nuts adapted to engage the adjacent stationary ends of the power or pressure devices.

67. In an apparatus or mill of the kind described, a pair of alined supporting heads arranged at opposite sides of a work-piece and longitudinally movable toward and from each other and together in one direction, a pair of alined piercing or work-supporting axles rotatably supported and carried by said supporting heads, independently acting power or pressure means operatively connected to each supporting head for so moving the same as desired.

68. In an apparatus or mill of the kind described, a pair of alined and longitudinally movable supporting heads arranged at opposite sides of a work-piece and provided with a pair of alined piercing or work-supporting axles in line with the axis of the work-piece, power or pressure means connected to each supporting head for moving said supporting heads longitudinally toward and from the work-piece or with the work-piece, said power or pressure means being provided with adjustable means adapted to limit as desired the longitudinal movements of said supporting heads.

69. In an apparatus or mill of the kind described, a supporting head at one side of a work-piece arranged for longitudinal movements in the direction of a line at right angles with the side of the work-piece and provided with a dishing or work-supporting axle in line with the axis of the work-piece, power or pressure means movable in the direction of said longitudinal movements and coöperating with said supporting head, said power or pressure means being provided with adjustable means adapted to limit the longitudinal movements of said supporting head.

70. In an apparatus or mill of the kind described, a work-supporting head at one side of a work-piece arranged for longitudinal movements in a line parallel to the axis of the work-piece and being provided with means for centrally supporting said work piece to permit of its being rotated, and means for so moving said supporting head.

71. In an apparatus or mill of the kind described, a pair of alined supporting heads at opposite sides of a work-piece arranged for longitudinal movements in a line parallel to the axis of the work-piece and provided with a piercing or work supporting axle in line with the axis of the work piece, power or pressure means connected to each of said supporting heads for moving said supporting heads longitudinally toward and from the work-piece or together in either direction.

72. In an apparatus or mill of the kind described, a pair of alined supporting heads at opposite sides of a work-piece arranged for longitudinal movements in a line at right angles with the sides of the work-piece and being provided with means for centrally supporting said work-piece to permit of its being rotated, and means for so moving said supporting heads while said work-piece is so supported.

73. In an apparatus or mill of the kind described, a pair of work-supporting heads arranged at opposite sides of a work-piece, each of said heads having a bearing or bearings and being chambered at one end to provide a shoulder, a plate removably held to said chambered end, piercing or work-supporting axles rotatable in the bearings of said heads and having piercers or work-supporting centers at adjacent ends and enlargements between their ends bearing against said shoulders of said heads, and anti-friction thrust bearings between said enlargements and said plates.

74. In an apparatus or mill of the kind described, a supporting head arranged at one side of a work-piece and having a bearing or bearings in line with the axis of the work-piece, said head being chambered at one end to provide a shoulder, a plate removably held to said chambered end, a dishing or work-supporting axle rotatably supported in the bearing or bearings of said head and having a piercer or work-supporting center at its outer end and an enlargement between its ends bearing against said shoulder of said head, and an anti-friction thrust bearing between said enlargement and said plate.

75. In an apparatus or mill of the kind described, a pair of work-supporting heads arranged in alinement and longitudinally movable toward and from each other, each of said heads having a bearing or bearings and being chambered at one end to provide a shoulder, a plate removably held to said chambered end, piercing or work-supporting axles rotatable in the bearings of said heads and having piercers or work-supporting centers at adjacent ends and enlargements between their ends bearing against said shoulders of said heads, and anti-friction thrust bearings between said enlargements and said end plates.

76. In an apparatus or mill of the kind described, the combination with a support, of a pair of work-supporting heads arranged in alinement and longitudinally movable toward and from each other, each of said heads having a bearing or bearings and being chambered at one end to provide a shoulder, a plate removably held to said chambered end, work-supporting axles rotatable in the bearings of said heads and having piercers or work-supporting centers at adjacent ends and enlargements between their ends bearing against said shoulders of said heads, and anti-friction thrust bearings between said enlargements and said end plates.

77. In an apparatus or mill of the kind described, a pair of alined rotatable piercing or work-supporting axles having piercing or work-supporting means at adjacent ends and adapted to engage and centrally support a work-piece placed between said piercing or work-supporting means, a power or pressure device coöperating with each work-supporting axle, a rod or shaft with each power or pressure device extending from opposite ends of said power or pressure device, and adjustable stops on the said rods or shafts adjacent each stationary end of the power or pressure devices to limit the longitudinal movements of said rods or shafts, said work-supporting axles being operatively connected with said rods or shafts.

78. In an apparatus or mill of the kind described, a pair of alined piercing or work-supporting axles having piercers or work-supporting centers at adjacent ends to engage and pierce or penetrate a work-piece therebetween and support the same so as to permit the work-piece while so supported to be dished or undished, a pair of edging and web reducing rolls at opposite sides of the work-piece positioned in a plane passing laterally through the work-piece at one side of said work-supporting axles and adapted to engage said work-piece from the sides, a pair of shaping or finishing rolls at opposite sides of the work-piece positioned in a plane passing laterally through the work-piece at another side of said work-supporting axles and also adapted to engage said work-piece from the sides, and means for moving said work-supporting axles toward and from each other and for moving said axles and the hub or center portion of the work-piece while so supported simultaneously together in either direction to dish or undish the work-piece while the work-piece is rotated and its marginal portion engaged by at least one pair of said rolls.

79. In an apparatus or mill of the kind described, the combination of a pair of alined axles having piercers or work-supporting centers at adjacent ends for supporting a work-piece to permit of its being rotated, a pair of side rolls at opposite sides of the work-piece positioned in a plane passing laterally through the work-piece at one side of a plane passing centrally through the work-piece and being laterally movable against and away from the sides of the work-piece and being lengthwise movable between the center portion and marginal portion or periphery of the work-piece to form or roll the hub, web and rim of a car wheel or other body, a pressure roll adapted to act against the peripheral face of the work-piece and positioned between said pair of side rolls, means for laterally moving said pair of side rolls against or away from the sides of the work-piece, means for positively rotating at least one of said pair of side rolls, means for moving said pair of side rolls lengthwise between the center-portion and marginal portion or periphery of the work-piece, and means for moving said alined axles together in one direction to dish or undish the car wheel or other body while the same is rotated and is laterally supported at its marginal or peripheral portion.

80. In an apparatus or mill of the kind described, rotatable female dies or female centers for supporting a work-piece around the outer peripheral face or faces of its hub so as to permit the work-piece while so supported to be dished or undished or redished, power or pressure means operatively connected with said female dies and adapted to compress the outer peripheral face or faces of said hub when centering the work-piece, means for rolling the work-piece to desired form or shape and rotating the same, said power or pressure means being also adapted to effect dishing or undishing or redishing of the work-piece while the work-piece is so centrally supported and rotated and while the marginal portion of the work-piece is being laterally supported and retained by said rolling means.

81. In an apparatus or mill of the kind described, the combination of means for centrally piercing or centering and supporting a work-piece, for rolling said work-piece and for dishing said work-piece while the same is rotating, comprising a pair of piercing or work-supporting members arranged at opposite sides of the work-piece and longitudinally movable toward and from each other and together in either direction, side and peripheral face rolls adapted for acting against the sides and peripheral face of the work-piece to roll the same to desired shape or form, and means for moving said piercing or work-supporting members toward each other for piercing or centering the work-piece and together in one direction for dishing, undishing or redishing the work-piece while the same is rolled or rotated with at least one of said rolls, said rolls being also adapted to act against the work-piece after dishing the same to roll the same as desired.

82. In an apparatus or mill of the kind described, a pair of alined axles having piercers or work-supporting centers at adjacent ends adapted to engage and pierce or penetrate a work-piece positioned therebetween and support the same, means for so positioning said work-piece, means for axially moving said work-piece while so supported, means for rolling the work-piece to desired form or shape, and means to withdraw the piercers or work-supporting centers from the work-piece and to move said rolling means out of contact with the work-piece to permit of removing the work-piece or finished work from the apparatus or mill.

83. In an apparatus or mill of the kind described, a pair of alined rotatable axles longitudinally movable toward and from each other and together in either direction and being arranged at opposite sides of a work-piece with their axes in alinement and in line with the axis of the work-piece and having means at adjacent ends adapted to pierce or center the work-piece and support the work-piece, means for rolling the work-piece, and means to withdraw the piercing and work-supporting means from the work-piece and to move said rolling means out of contact with the work-piece to permit of removing the work-piece or finished object from the apparatus or mill.

84. In an apparatus or mill for rolling car wheels or other circular bodies, the combination with mechanism to rotatably support a work-piece, of mechanism for raising and lowering the work-piece and for removing the same from and for placing the same into the apparatus or mill and also for positioning and retaining the work-piece in proper position to permit the same to be centrally pierced or centered at its opposite sides or ends in the direction of its axis by said work-supporting mechanism, and rolls adapted to act against said work-piece.

85. In an apparatus or mill for rolling car wheels or other circular bodies, alined and oppositely-arranged work-supporting heads carrying piercers or work-supporting centers having their axes coincident, and a device to temporarily support the work-piece at its peripheral portion and to position and retain the work-piece while so supported in proper position to permit said piercers or work-supporting centers to centrally engage the same at its opposite sides in the direction of its axis.

86. An apparatus or mill for rolling car wheels or other circular bodies comprising alined piercing or work-supporting members arranged at opposite sides or ends of a work-piece, and mechanism arranged in a plane between said work-supporting members and adapted to be moved from a position beneath said work-supporting members to a position above said work-supporting members and being also adapted to position and retain the work-piece centrally so that the center line or axis of the outer portion or periphery of the work-piece is in line or approximately in line with the axes of said piercing or work-supporting members to permit the work-piece to be centrally operated upon by said piercing or work-supporting members at its opposite sides or ends in the direction of its axis.

87. In an apparatus or mill for rolling car wheels or other circular bodies alined and oppositely arranged, work-supporting means for piercing or centering and supporting a work-piece, and mechanism adapted to be brought into action to position the the work-piece so as to permit said work-supporting means to centrally engage the work-piece at its opposite sides or ends in the direction of its axis and adapted to be moved out of action to clear the work-piece when the latter is so engaged by said supporting means.

88. In an apparatus or mill for rolling car wheels or other circular bodies, alined and oppositely arranged work-supporting means for piercing or centering and supporting a work-piece to be operated on while so supported, raising, lowering and retaining mechanism arranged in a plane between said work-supporting means and adapted to be raised to a position above said work-supporting means to receive the work-piece and place and retain the same in proper position between said work-supporting means so as to permit said work-piece to be pierced or centered by said work-supporting means at its opposite sides or ends in the direction of its axis and, said raising, lowering and retaining mechanism being also adapted to receive the finished article and raise the same to a position above said work-supporting means to be removed from the apparatus or mill.

89. In an apparatus or mill of the kind described, the combination of means for centrally supporting a work-piece to permit of its being rotated, and a tread or peripheral face roll pivotally supported to permit lateral movement and adapted to act against the peripheral face of said work-piece and being movable toward and against and from said peripheral face.

90. In an apparatus or mill for rolling car wheels or other circular bodies, the combination of means for supporting a work-piece in a position immovable in the direction of a line at right angles with the axis of the work-piece to permit the work-piece to be rotated, means for rotating said work-piece, and a peripheral face roll adapted to act against and roll the peripheral face of said work-piece and having at its marginal portion a lateral thickness or total width which is the same as is the lateral thickness or width which the rim or marginal portion of the car wheel or other body which is to be rolled from said work-piece is to have.

91. In an apparatus or mill of the kind described, the combination with a support, of a guide piece fastened to said support, a supporting-head guided for longitudinal movement in said guide piece, a forked arm pivotally secured to said supporting head to swing laterally thereon, and a peripheral face roll mounted for oscillation in said forked arm and adapted to act against the peripheral face of a work-piece.

92. In an apparatus or mill of the kind described, means for supporting a work-piece to permit of its being rotated, a tread or peripheral face rolling device adapted to act against the peripheral face of the work-piece and comprising a supporting head movable toward and from the peripheral face of said work piece, a vertical pin secured to said supporting head, a forked arm mounted on said pin for lateral oscillating movement, means to limit the extent of lateral movement of said forked arm, and a tread or peripheral face roll rotatably supported in said forked arm.

93. In an apparatus or mill of the kind described, means for rotatably supporting a work-piece, means for rotating the work-piece, a peripheral face rolling device adapted to act against the peripheral face of the work-piece and comprising a supporting head, a pivot or pin having its axis in a plane passing circumferentially through the work-piece and being secured to said supporting head, an arm mounted on said pivot or pin for swinging or oscillating movement thereon, and a tread or peripheral face roll rotatably supported by said arm.

94. In an apparatus or mill of the kind described, a tread or peripheral face rolling device comprising a supporting head having a removable head plate, a pivot pin secured to said supporting head, an arm mounted on said pivot pin to permit of swinging, means for positioning said arm lengthwise on said pivot pin, and a tread or peripheral face roll rotatably mounted on said arm.

95. In an apparatus or mill of the kind described, the combination with a horizontal base having horizontally spaced bed-plates, a pair of horizontally arranged piercing or work-supporting members arranged in alinement between said bed-plates and adapted to engage a work-piece with adjacent ends and support the same, rolls with their shafts horizontally arranged between said bed plates and engaging the work-piece, a slidable head guided for movement between said bed-plates toward and from the peripheral face of said work-piece, a power or pressure device connected with said slidable head to move the same, and a tread or peripheral face shaping or finishing roll rotatable in said head and adapted to act against the peripheral face of said work-piece.

96. In an apparatus or mill of the kind described, means for rotatably supporting a work-piece, means for rotating said work-piece, and means for shaping or finishing the peripheral face of said work-piece comprising a supporting head, a center pin arranged transversely in said supporting head, a roller bearing surrounding said center pin, and a shaping or face finishing roll surrounding said roller bearing and adapted to act against the peripheral face of the work-piece.

97. In an apparatus or mill of the kind described, the combination with means for centrally and rotatably supporting a work-piece, of means for rotating said work-piece, and a peripheral face shaping or face finishing device comprising a supporting head, a hollow center-pin arranged transversely in said supporting head and serving as a lubricating receptacle and having also lateral lubrication ducts therein, an inner roller bearing ring surrounding said hollow center pin and having lubrication ducts registering with those of said center pin, an outer roller bearing ring surrounding said inner roller bearing ring, a series of anti-friction rollers interposed between said bearing rings and supplied with lubricating material from said lubricating receptacle, and a face shaping or face finishing roll surrounding said outer roller-bearing ring and rotating therewith, said roll being adapted to act against the peripheral face of said work-piece.

98. An apparatus or mill for rolling car wheels or other circular bodies comprising means to rotatably support a work-piece, rolls adapted to act against said work-piece at diametrically opposite points, and one of said rolls being pivotally supported to permit lateral movement.

99. An apparatus or mill for rolling car wheels or other circular bodies comprising means for rotatably supporting a work-piece, means for cooling said supporting means, a side roll or rolls for rotating said work-piece, and rolls adapted to act against and roll the peripheral face of said work-piece at opposite sides of a plane passing axially through the center of said work-piece.

100. An apparatus or mill for rolling car wheels or other circular bodies comprising means to rotatably support a work-piece, a roll or rolls rotating said work-piece, pressure rolls adapted to act together or independent of each other against and rolling the peripheral face of said work-piece at opposite points thereof, and one of said pressure rolls being pivotally supported to permit lateral movement.

101. An apparatus or mill of the kind described, comprising means to rotatably support a work-piece, means for cooling the supporting surface or surfaces of said work-piece in contact with said supporting means, a side roll or rolls for rotating said work-piece, and rolls adapted to act against the peripheral face of said work-piece at different points thereof.

102. An apparatus or mill for rolling car wheels or other circular bodies, comprising means to rotatably support a work-piece, means for firmly and automatically clamping the hub or center portion of said work-piece axially between said supporting means and for axially moving said work-piece or its center portion while so supported and so axially clamped.

103. In an apparatus or mill of the kind described, the combination with means for supporting a work-piece to permit of its being rotated, means for cooling said supporting means, a side roll or rolls for rotating said work-piece, and a pair of face or tread rolls adapted to act against the peripheral face of said work-piece at different points.

104. In an apparatus or mill for rolling car wheels or other circular bodies, the combination with means for rotatably supporting a work-piece at its central portion to permit of its being rotated, a longitudinally movable side roll or rolls adapted to rotate said work-piece, and a pair of face or tread rolls adapted to act together or alternately against the peripheral face of said work-piece at opposite points.

105. An apparatus or mill of the kind described comprising a freely rotatable axle or axles provided with means to support a work-piece, means for cooling said work-piece at its supporting surface or surfaces in contact with said supporting means, and a roll for acting against the peripheral face of said work-piece.

106. In an apparatus or mill of the kind described, rotatable means for centrally and rotatably supporting a work-piece in a position immovable in the direction of a line at right angles with the axis of the work-piece, means for cooling said supporting means, a roll or rolls for rotating said work-piece, and a roll for acting against the peripheral face of said work-piece.

107. In an apparatus or mill for rolling car wheels or similar objects, means for rotatably supporting a work-piece, and rolling means for rolling the peripheral face of the work-piece to beaked form preparatory to rolling said face to finished form, said rolling means comprising a beaking roll for rolling the peripheral face of the work-piece to beaked or rudimentary form, said beaking roll being so formed so that when said face is rolled to beaked or rudimentary form the portion of said face at its one end is rolled straight or cylindrical or approximately so and, the portion of said face at its other end where the flange of the car wheel is to be formed is rolled straight or cylindrical or approximately so and of larger diameter than said other end portion and, the portion of said face between said two end portions is rolled concave or conical, or approximately so, preparatory to rolling said face to finished form.

108. In an apparatus or mill for rolling car wheels or similar objects, means for rotatably supporting a car wheel blank or work-piece, and rolling means for rolling the peripheral face of the work-piece to beaked form preparatory to rolling said face to true finished form, said rolling means comprising a beaking roll adapted to act against the peripheral face of the work-piece and being formed so as to compress the metal of the rim or marginal portion of the work-piece and to roll the peripheral face of the work-piece to beaked or to approximately the finished form preparatory to rolling said peripheral face to true finished form.

109. In an apparatus or mill for rolling car wheels or other circular bodies, the combination of means for supporting a work-piece to permit of its being rotated, a roll or rolls to rotate said work-piece, and a beaking roll pivotally supported to permit oscillating movement and adapted to act against the peripheral face of said work-piece, the marginal portion of said beaking roll having a lateral thickness or total width which is the same as is the lateral thickness or width which the marginal or rim portion of the car wheel or other body which is to be rolled from said work-piece is to have.

110. In an apparatus or mill for rolling car wheels or other circular bodies, the combination of means for supporting a work-piece to permit of its being rotated, a roll or rolls to rotate said work-piece, a beaking roll adapted to act against and roll the peripheral face of said work-piece as and for the purpose described and being pivotally supported to permit lateral oscillating movement, means for moving said roll toward or away from the work-piece, and means to retain said roll in any desired radial distance from the axis of the work-piece during the rolling or operating process.

111. In an apparatus or mill of the kind described, means for rotatably supporting a work-piece, combined with a beaking roll arranged to act against the peripheral face of the work-piece at one side of a plane passing axially through the center of the work-piece and adapted to roll said peripheral face to beaked or rudimentary form preparatory to rolling said peripheral face to finished form, and a face shaping or face finishing roll arranged at the other side of said plane and adapted to act against said so beaked or rudimentarily formed peripheral face of said work-piece to roll said peripheral face to finished form.

112. In an apparatus or mill of the kind described, a positively driven roll or rolls to rotate and roll a work-piece, combined with a beaking roll formed as shown in Fig. 136 or as diagrammatically shown in Fig. 158 or approximately so and arranged to act against the peripheral face of the work-piece at one point, and a face shaping or face finishing roll adapted to act against the so beaked peripheral face of said work-piece at another point.

113. In an apparatus or mill of the kind described, a positively driven roll or rolls to rotate a work-piece, combined with a beaking roll adapted to act against the peripheral face of said work-piece and formed so as to roll said face partly cylindrical and partly concave or conical, and a face shaping or face finishing roll adapted to act against said so beaked rolled peripheral face and formed so as to roll said face to desired true form or shape.

114. In an apparatus or mill of the kind described, a positively driven side roll or rolls adapted to rotate a rotatably supported car wheel blank or other work-piece and roll the same as and where desired, combined with a beaking roll arranged to act against the peripheral face of the car wheel blank or other work-piece at one side of its axis and formed so as to roll the portion of said face, where the flange of the car wheel is to be formed, straight or approximately straight and of larger diameter than the other portion or portions of said face and, the portion of said face adjacent said straight or approximately straight portion concave or conical or approximately so, and a face shaping or face finishing roll arranged at another side of said axis and adapted to act against said so beaked rolled peripheral face of said car wheel blank or other work-piece and formed so as to roll said face to desired finished form.

115. In an apparatus or mill of the kind described, means for rotatably supporting a car wheel blank, combined with a beaking roll adapted to act against the peripheral face of said car wheel blank and formed so as to roll the portion of said face at its one end straight or cylindrical or approximately so and, the portion of said face at its other end straight or approximately straight and of larger diameter than said first-mentioned end portion and, the portion of said face between said two end portions concave or conical, and a face shaping or face finishing roll adapted to act against said so beaked rolled peripheral face and formed so as to roll said face into the flanged tread of a car wheel.

116. In an apparatus or mill of the kind described, the combination of means for supporting a work-piece to permit of its being rotated, a face beaking roll and a face finishing roll, said face rolls being adapted to act against the peripheral face of the work-piece at diametrically opposite points, said beaking roll having its peripheral face extending across its total width or lateral thickness of its marginal portion and which width or lateral thickness is the same as the lateral thickness or width which the marginal or rim portion of the wheel or other circular object which is to be rolled from said work-piece is to have, means to move each of said rolls against and away from the work-piece, and means to retain either one or both rolls at any desired radial distance from the axis of the work-piece during the operating or rolling process.

117. An apparatus or mill of the kind described comprising axially movable means to rotatably support a work-piece, means for cooling said supporting means, a pair of side rolls arranged at opposite sides of the work-piece and adapted to act against and rotate the work-piece, a face roll positioned between said pair of rolls and adapted to act against the peripheral face of the work-piece, means for moving said face roll toward and away from the work-piece, and means to retain said face roll at any desired radial distance from the axis of the work-piece during the operating or rolling process.

118. An apparatus or mill for rolling car wheels or other circular bodies comprising a pair of face rolls acting together or alternately against the peripheral face of a work-piece, one of said face rolls having at its marginal portion a lateral thickness or width which is the same as is the lateral thickness or width which the rim or marginal portion of the wheel or other body which is to be rolled from said work-piece is to have, two pairs of side rolls, each pair having its rolls arranged at opposite sides of the work-piece, said two pairs of side rolls having their shafts inclined to the sides of the work-piece and being adapted to act together or alternately against the work-piece, each pair of said side rolls having one of said face rolls positioned between the same, one pair of said side rolls being axially movable and having each an edging roll part and a web rolling roll part of larger diameter than the edging roll part and, said edging roll parts of said one pair of said side rolls extending over the sides of the marginal or rim portion at opposite sides of the work-piece or car wheel or other body and also over and against part of the opposite sides of said one face roll which has said lateral thickness or width to roll in contact with said one face roll and, said web rolling roll parts of said one pair of said side rolls being formed adjacent said edging roll parts and adapted to reduce or roll the web portion of the work-piece to desired thickness and having their inner rolling or operating portions formed sufficiently conical so that the face of each of said conically formed portions is sufficiently inclined from its lateral apex toward the inner end of its roll so as to be adapted to roll with said rolls the inner circumferential faces of the rim portion of the work-piece sufficiently inclined outwardly toward the peripheral face of the work-piece so as to cause the metal to flow in the proper direction to assure compression of the metal in the rim portion to uniform or to practically uniform density, substantially as described, and means for positively driving at least one of the rolls in each pair of said side rolls.

119. An apparatus or mill of the kind described comprising means to rotatably support a work-piece in a position immovable in the direction of a line at right angles with the axis of the work-piece, means for cooling said supporting means, and face and side rolls for acting respectively against the peripheral face and sides of the work-piece to roll the work-piece to the desired width and to desired diameter, the peripheral face roll or rolls being movable independently of said side roll or rolls.

120. An apparatus or mill of the kind described, comprising axially independently movable work-supporting means, means for automatically clamping a work-piece at its center portion between said work-supporting means and automatically keeping the work-piece in said clamped condition during the operating process, and a roll or rolls adapted to act against the work-piece to roll the same to desired form or shape.

121. An apparatus or mill of the kind described, comprising means to rotatably support a work-piece so as to permit the work-piece while so supported to be dished, and means to dish the work-piece as desired while the same is rotating.

122. An apparatus or mill of the kind described, comprising means to centrally and rotatably support a work-piece so as to permit the work-piece while so supported to be dished or undished, and means adapted to dish or undish the work-piece as desired while the work-piece is so supported and is rotating.

123. An apparatus or mill of the kind described, comprising means to centrally and rotatably support a work-piece so as to permit the work-piece while so supported to be dished or undished, means for rotating said work-piece, and means adapted for dishing and for undishing said work-piece as desired while the same is rotating and so supported.

124. An apparatus or mill of the kind described, comprising means to centrally support a work-piece so as to permit the work-piece while so supported to be rotated and be undished or dished, means for rotating said work-piece and laterally engaging the marginal portion of the work-piece, and means for moving both said supporting and marginal engaging means in opposite directions in lines parallel or approximately parallel with the axis of the work-piece to undish or dish said work-piece during rotation while the work-piece is so centrally supported.

125. An apparatus or mill of the kind described, comprising means to rotatably support a work-piece so as to permit the work-piece while so supported to be undished or dished, means for undishing or dishing the work-piece while the same is so rotatably supported and is rotating including means for laterally supporting and retaining the marginal portion of the work-piece.

126. An apparatus or mill of the kind described, comprising means to centrally and rotatably support a work-piece so as to permit the work-piece while so supported to be undished or redished, means to undish or redish the work-piece while the same is so supported and is rotating including means for rotating the work-piece and laterally supporting and retaining the marginal portion of the work-piece.

127. An apparatus or mill of the kind described, comprising means to centrally and rotatably support a work-piece while dishing or undishing or redishing the work-piece while the same is rotated and while its center or hub portion is moved axially while its marginal portion is laterally supported and retained, means to rotate said work-piece and laterally support and retain the marginal portion of said work-piece when dishing or undishing or redishing the same, and means for axially moving said central supporting means together with said hub or center portion of the work-piece when dishing or undishing or redishing the work-piece to the desired axial position of its hub or center portion in relation to its marginal portion while said work-piece is rotating and its marginal portion laterally supported and retained against axial movement of its hub or center portion.

128. In an apparatus or mill for rolling car wheels or other circular objects, a dishing device comprising means to rotatably support a circular object so as to permit the object while so supported to be dished or undished or redished, power or pressure means to axially move the center portion of the object while the same is so supported and is rotating, means for rotating the object while dishing or undishing or redishing the object, and means for laterally supporting and retaining the marginal portion of the object while dishing or undishing or redishing the object.

129. In an apparatus or mill for rolling car wheels or other circular objects, a dishing device comprising means to centrally and rotatably support a circular object and dish the same while rotating, and means for rotating said object at its marginal portion and laterally supporting and retaining said marginal portion while dishing the object.

130. In an apparatus or mill for rolling car wheels or other circular objects the combination with a dishing device comprising means to centrally and rotatably support a circular object and dish the same while rotating, of means to rotate the object and to laterally support and retain the marginal portion of the object, and means for axially moving said central supporting means together with the hub or center portion of the object when dishing the object to desired dish while the marginal portion of the object is supported and retained against said axial movement of said hub or center portion.

131. In an apparatus or mill of the kind described, a pair of power or pressure devices, a rod or shaft with each power or pressure device; extending from opposite ends of said power or pressure device, work-supporting heads spaced from each other and longitudinally movable in alinement and operatively connected with said power or pressure devices so as to be moved thereby, a pair of alined work-supporting axles having piercers or work-supporting centers at adjacent ends and carried by said supporting heads and adapted to engage and centrally pierce or center a work-piece and support the same, rolls adapted to act against said work-piece, and adjustable nuts on said rods or shafts to limit as desired the longitudinal movements of said work-supporting axles.

132. In an apparatus or mill of the kind described, a pair of power or pressure devices, a rod or shaft with each power or pressure device operatively connected with said power or pressure device and extending from opposite ends thereof, a pair of alined work-supporting heads spaced from each other and longitudinally movable in alinement, said supporting heads being arranged at opposite sides of a work-piece and operatively connected with the inner ends of said rods or shafts of said power or pressure devices to be moved thereby, an adjustable stop provided on each rod or shaft to limit its pull-back movement away from the work-piece or with the work-piece, a pair of alined piercing or work-supporting axles arranged in said work-supporting heads and having centers or piercers at adjacent ends adapted to engage and pierce or center a work-piece and support the same, rolls adapted to act against said work-piece, and adjustable stops provided on said rods or shafts to limit as desired the movement of said work-supporting axles.

133. In an apparatus or mill of the kind described, a pair of alined work-supporting heads arranged at opposite sides of a work-piece and provided with a pair of alined work-supporting axles having piercers or work-supporting means at adjacent ends to centrally support a work-piece thereon so as to permit the work-piece while so supported to be rolled and dished or undished, power or pressure means operatively connected with each work-supporting head for moving said work-supporting heads with their axles and piercers or work-supporting means and the hub or center portion of the work-piece longitudinally together in the same direction for dishing or undishing said work-piece while the same is rotated and while the marginal portion of the work-piece is laterally supported and retained, and rolls adapted to act against the marginal or peripheral portion of the work-piece to rotate the same during dishing or redishing and also adapted to support and retain the marginal portion of the work-piece laterally against said longitudinal movement of its hub or center portion during the dishing or undishing of the work-piece.

134. In an apparatus or mill of the kind described, a pair of alined work-supporting axles having piercers or work-supporting means at adjacent ends to engage and centrally support a work-piece therebetween so as to permit the work-piece while so supported to be dished or undished or redished, and dishing means including said axles for dishing or undishing or redishing the work-piece as desired, power or pressure means for moving said axles and piercers or work-supporting means and the hub or center portion of said work-piece longitudinally together in the same direction when dishing or undishing or redishing said work-piece, said power or pressure means being provided with adjustable stops to limit the movements of said work-supporting axles when dishing or undishing or redishing said work-piece.

135. In an apparatus or mill of the kind described, a pair of alined work-supporting heads arranged at opposite sides of a work-piece and longitudinally movable toward and from each other and together in either direction, a work-supporting axle rotatably supported by said work-supporting heads for centrally supporting the work-piece between said supporting heads, means for dishing the work-piece including power or pressure means operatively connected with each work-supporting head for longitudinally moving said work-supporting heads simultaneously together in the same direction in a line parallel to the axis of said supporting axle when dishing said work-piece while the same is rotated, and side rolls adapted to act against the marginal portion of the work-piece and rotate the work-piece and also laterally support and retain the marginal portion of the work-piece when so dishing the same.

136. In an apparatus or mill of the kind described, an axially movable work-supporting head arranged at one side of a work-piece and provided with a dishing or work-supporting axle in line with the axis of the work-piece and being rotatably supported in said work-supporting head for centrally supporting the work-piece, means for dishing or undishing or redishing the work-piece including power or pressure means operatively connected to said work-supporting head for axially moving the same together with the hub or center portion of the work-piece while the marginal portion of the work-piece is supported and retained against said axial movement of said hub or center portion when dishing or undishing or redishing the work-piece while the same is rotated, and a roll or rolls adapted to act against the said marginal portion of the work-piece and rotate the work-piece and also laterally support and retain the marginal portion of the work-piece against said axial movement of said hub or center portion.

137. In an apparatus or mill of the kind described, a device for dishing a work-piece including means to centrally and rotatably support said work-piece so as to permit the same while so supported to be dished, means to rotate said work-piece, and means to laterally support and retain the marginal portion of said work-piece while its hub or center portion is moved axially into dished position during said dishing process.

138. In an apparatus or mill for rolling car wheels or other circular objects, a device for moving the hub or center portion of a work-piece or wheel or other object axially from the position of a dished work-piece into the position of an undished work-piece or wheel or other object, or vice versa, side rolls and a peripheral face roll respectively engaging the marginal and peripheral portions of the work-piece to surround or partly surround said marginal and peripheral portions in a transverse plane, and rotate the work-piece and support and retain the marginal portion of the work-piece against said axial movement of said center portion.

139. In an apparatus or mill of the kind described, a device for undishing a work-piece comprising means to centrally and rotatably support the work-piece so as to permit the work-piece while so supported to be undished, power or pressure means for axially moving said supporting means as desired for undishing said work-piece, and means to rotate said work-piece at its marginal portion and laterally support and retain said marginal portion when undishing the work-piece.

140. In an apparatus or mill of the kind described, a device for dishing or undishing or redishing a work-piece comprising means to centrally and rotatably support the work-piece so as to permit the work-piece while so supported to be dished or undished or redished, power or pressure means to axially move said supporting means as desired for dishing or undishing or redishing said work-piece, and a roll or rolls to rotate said workpiece at its marginal portion and to laterally support and retain said marginal portion when dishing or undishing or redishing the work-piece.

141. An apparatus or mill of the kind described, comprising means to centrally and rotatably support a work-piece so as to permit the work-piece while so supported to be rolled and dished, rolls adapted to act against said work-piece to rotate and roll the same where desired, and means adapted for dishing said work-piece while the same is so supported and rotated, said rolls being formed so as to surround or partly surround the marginal portion of the work-piece in a transverse plane and roll the marginal portion or the marginal and peripheral portions of the work-piece after the dishing of said work-piece.

142. An apparatus or mill of the kind described, comprising means to centrally and rotatably support a work-piece to be undished and rolled, a roll or rolls adapted to act against said work-piece to roll and rotate the same, and means for undishing said work-piece while the same is so supported and is being rolled or rotated, said roll or rolls being formed so as to permit the same to act also against said work-piece after the same is undished, and roll the work-piece where desired to desired shape or form and thereby also give its peripheral face a harder resistance for wear.

143. An apparatus or mill of the kind described, comprising means to rotatably support a work-piece to be undished and rolled and redished, a roll or rolls adapted to act against the work-piece to roll and rotate the same, means for moving the hub or center portion of the work-piece axially while the work-piece is so rotatably supported and while the marginal portion of the work-piece is being laterally supported and retained against said axial movement of said hub or center portion for undishing or for redishing the work-piece while the same is rotating, said roll or rolls being formed so as to permit the same to act also against the work-piece after the work-piece is undished to rotate and to roll the same as and where desired and also to act against the work-piece after the same is redished to roll the marginal portion or the marginal and peripheral portions of the work-piece, said roll or rolls also supporting and retaining the said marginal portion of the work-piece laterally against said axial movement of said hub or center portion while the work-piece is being undished or is being redished.

144. An apparatus or mill of the kind described comprising means to centrally and rotatably support a work-piece, means for externally and internally cooling said supporting means, and a side roll or rolls adapted to act against said work-piece from opposite sides to roll the work-piece where desired to desired form or shape.

145. An apparatus or mill of the kind described comprising a freely rotatable supported axle or axles provided with means to support a work-piece, and means for externally cooling the supporting means of said axle or axles.

146. In an apparatus or mill of the kind described, axially movable means for centrally supporting a work-piece so as to permit the work-piece while so supported to be dished or undished or redished, and means for cooling said supporting means.

147. An apparatus or mill of the kind described, comprising means to centrally and rotatably support a work-piece otherwise free for action thereon, means for firmly and automatically clamping the hub or center portion of the work-piece axially between said central supporting means and for axially moving said work-piece or its hub or center portion while the work-piece is so centrally and rotatably supported and so automatically clamped, and rolls engaging the sides and peripheral face of said work-piece to cause the same to rotate and be rolled where desired into desired form or shape.

148. An apparatus or mill of the kind described, comprising an axially movable support centrally engaging a work-piece and movable in a line parallel to the axis of the work-piece, a pair of side rolls at opposite sides of the work-piece positioned in a plane passing laterally through the work-piece at one side of its axis and arranged with their axes inclined to each other, each of said rolls acting independent of the other against the work-piece, and means for positively driving at least one of said rolls.

149. An apparatus or mill of the kind described, comprising an axially movable support provided with a rotatable axle having means for centrally engaging a work-piece, means for cooling said support, and a pair of longitudinally movable side rolls arranged at opposite sides of the work-piece with their axes parallel or inclined to each other, each roll acting against one side of said work-piece.

150. In an apparatus or mill of the kind described, the combination with means for centrally supporting a work-piece to permit of its being rotated, of means for moving said work-piece axially while so centrally supported, a pair of longitudinally movable roll shafts arranged with their axes inclined to and at opposite sides of a plane passing circumferentially through the work-piece, rolls at the adjacent ends of said roll shafts adapted to contact with the sides of the work-piece, and means for positively rotating at least one of said roll shafts so as to cause the work-piece to rotate by frictional contact of said rolls thereagainst.

151. In an apparatus or mill of the kind described, in combination, means for centrally and rotatably supporting a work-piece in a position immovable in the direction of a line at right angles with the axis of the work-piece, means for moving said work-piece or its center portion axially while so supported, and a pair of roll shafts having rolls frictionally engaging opposite sides of the work-piece to cause the latter to rotate and to roll the work-piece into the desired form or shape.

152. In an apparatus or mill of the kind described, the combination with means to centrally support a work-piece to permit of its being rotated, of a pair of longitudinally movable and positively driven roll shafts having rolls adapted to act against the work-piece from opposite sides, means for positively rotating said roll shafts, and means for moving each of said rolls into or out of operative position or retaining both or either one of said rolls in any desired position against the work-piece.

153. An apparatus or mill of the kind described comprising a freely rotatable supported axle or axles having means to support a work-piece, means for externally cooling the supporting means of said axle or axles, and rolls for acting against said work-piece.

154. An apparatus or mill of the kind described, comprising a freely rotatable axle or axles provided with means to centrally support a work-piece, means for cooling said supporting means at the point or points of contact with the work-piece and also for cooling the work-piece at its supporting surface or surfaces at which it is in contact with said supporting means, and rotating rolls for rolling said work-piece to desired form or shape.

155. An apparatus or mill of the kind described, comprising a pair of alined oppositely-arranged work supporting heads at opposite sides of a work-piece movable toward and from each other and together in either direction, a pair of alined axles carried by said supporting heads and having means at adjacent ends to support the work-piece at its hub or center portion, means for axially moving the hub or center portion of the work-piece while the work-piece is so centrally supported and is being rotated and while the marginal portion of the work-piece is being supported and retained against said axial movement of said hub or center portion, and rolls for frictionally engaging the work-piece to rotate and to roll the work-piece where desired to desired form or shape.

156. In an apparatus or mill of the kind described, means for rotatably supporting a work-piece, power or pressure means for automatically moving said work-piece axially as desired while so supported, and rolls for acting against said work-piece to rotate and roll the same where desired into desired form or shape.

157. An apparatus or mill of the kind described, comprising a freely rotatable supported axle or axles having means to centrally support a work-piece otherwise free for action thereon, means for externally cooling the supporting means of said axle or axles, means for internally cooling said axle or axles, and rolls for engaging the sides and peripheral face of said work-piece to cause the same to rotate and be rolled where desired into the desired form or shape.

158. In an apparatus or mill of the kind described, axially movable means for centrally and rotatably supporting a work-piece in a position immovable in the direction of a line at right angles with the axis of the work-piece, means for moving said work-piece or its center portion axially while so supported, and rolls adapted to act against said work-piece.

159. In an apparatus or mill of the kind described, movable means for centrally and rotatably supporting a work-piece in a position immovable in the direction of a line at right angles with the axis of the work-piece, means for cooling said work-supporting means, and rolls adapted to act against exposed portions of said work-piece.

160. An apparatus or mill of the kind described comprising rotatable and axially adjustable means to support a work-piece centrally in a position immovable in the direction of a line at right angles with the axis of the work-piece, means for cooling said supporting means, and rolls for acting against said work-piece.

161. In an apparatus or mill for rolling car wheels or other circular bodies, the combination of means to receive and position and retain a work-piece in proper position to permit the work-piece to be operated on at its opposite sides or ends of its central or hub portion in the direction of its axis, mechanism to centrally engage said work-piece at its opposite sides or ends in the direction of its axis while the same is so positioned and retained, and rolls for acting against said work-piece at the sides and peripheral face thereof to roll the same.

162. An apparatus or mill of the kind described, comprising means to centrally support a work-piece, a web roll at each side of said work-piece at one side of a plane passing axially through the center of the work-piece for acting against the work-piece, means for positively driving at least one of said web rolls, a shaping or finishing roll at each side of the work-piece at the other side of said plane for acting against the work-piece, and means for positively driving at least one of said finishing rolls.

163. An apparatus or mill of the kind described, comprising means to rotatably support a work-piece, a pair of web reducing rolls positioned at opposite sides of the work-piece in a plane passing laterally through the work-piece at one side of its axis and arranged with their axes or extended axes parallel or inclined to the sides or ends of the work-piece and being axially movable in lines parallel or approximately parallel with the sides or ends of the work-piece and being adapted to act against the work-piece, means for positively driving one of or both said web reducing rolls, a pair of shaping or finishing rolls positioned at opposite sides of the work-piece in a plane passing laterally through the work-piece at another side of its axis and arranged with their axes inclined to each other and adapted to act against the work-piece, means for positively driving one of or both said finishing rolls, and means for laterally swinging each of said rolls into and out of operative position.

164. An apparatus or mill of the kind described, comprising means to rotatably support a work-piece, a pair of axially movable edging or side rolls at opposite sides of the work-piece arranged with their axes or extended axes parallel or inclined to the sides or ends of the work-piece and being adapted to act against the work-piece at one side of its axis, a pair of shaping or finishing rolls at opposite sides of the work-piece adapted to act against the work-piece at another side of its axis, means for positively driving at least one of said edging and one of said finishing rolls, and means for swinging or moving each of said rolls laterally into and out of operative position.

165. An apparatus or mill of the kind described comprising means to centrally support a work-piece, an edging roll at each side of the work-piece adapted to act against the work-piece at one side of a plane passing axially through the center of the work-piece, a shaping or finishing roll at each side of the work-piece adapted to act against the work-piece at the other side of said plane, and means for positively driving at least one of said edging rolls and one of said finishing rolls.

166. An apparatus or mill of the kind described, comprising means to rotatably support a work-piece, a pair of axially movable edging and web rolls at opposite sides of said work-piece positioned in a plane passing transversely through the work-piece at one side of a plane passing centrally through the work-piece, said rolls having edging roll portions and web rolling portions and being adapted to act with their edging roll portions against the portion of the work-piece between the web rolling portions of said rolls and the periphery of the work-piece, and with their web rolling portions being adapted to roll the web portion of the work-piece to desired thickness and to roll the inner circumferential faces $f^{18}$, $f^{18}$ of the marginal portion of the work-piece sufficiently inclined outwardly toward the peripheral face of the work-piece so as to cause the metal to flow in the proper direction to assure compression of the metal in the marginal or rim portion of the work-piece to uniform or to practically uniform density substantially as described with reference to Fig. 158, means for positively driving one of or both said edging and web rolls, a pair of shaping or finishing rolls at opposite sides of the work-piece positioned in a plane passing transversely through the work-piece at the other side of the plane passing centrally through the work-piece and adapted to roll said inner circumferential faces and the adjacent web portion of the work-piece to desired finished form substantially as described with reference to Fig. 159, means for positively driving one of or both said shaping or finishing rolls, and means for swinging or moving each or each pair of said rolls laterally into and out of operative position.

167. An apparatus or mill of the kind described, comprising means to centrally support a work-piece, an axially movable edging and web roll at each side of said work-piece at one side of a plane passing diametrically through the work-piece, said rolls having edging roll portions and web rolling portions and being adapted to act with their edging roll portions against the portion of the work-piece between the web rolling portions of said rolls and the periphery of the work-piece and with their web rolling portions being adapted to roll the web of the work-piece from the hub part to the inner circumferential faces of the marginal or rim portion of the work-piece to desired thickness and to roll the inner circumferential faces of the marginal or rim portion of the work-piece to the sufficiently inclined form $f^{18}$, $f^{18}$ substantially described with reference to Fig. 158, means for positively driving one of or both said edging and web rolls, a shaping or finishing roll at each side of the work-piece at the other side of said plane and adapted to roll said inner circumferential faces and the adjacent web portion of the work-piece to desired finished form, and means for positively driving one of or both said finishing rolls.

168. In an apparatus or mill of the kind described, the combination of means for centrally supporting a work-piece so as to freely rotate with the work-piece, an edging and web roll and a shaping or finishing roll at each side of the work-piece and in contact with the work-piece, means for swinging said rolls laterally against and away from the work-piece, means for positively rotating said rolls or at least one of said edging and web rolls and one of said shaping or finishing rolls, and means for axially adjusting or axially moving said rolls.

169. In an apparatus or mill of the kind described, the combination of means for centrally supporting a work-piece so as to freely rotate with the work-piece, an axially movable edging and web roll and a shaping or finishing roll at each side of the work-piece adapted to act in contact with the work-piece, means for positively driving said rolls or at least one of said edging and web rolls and one of said finishing rolls, means for swinging said rolls laterally against and away from the work-piece, and means for moving said edging and web rolls in lines parallel or approximately parallel with a plane passing circumferentially through the work-piece.

170. In an apparatus or mill of the kind described, means to roll a work-piece comprising a pair of axially movable edging and web rolls at opposite sides of the work-piece arranged with their axes or extended axes parallel or inclined to a plane passing circumferentially through the work-piece and positioned at one side of a plane passing centrally through the work-piece and being adapted to act against the work-piece, a pair of shaping or web finishing rolls adapted to act against opposite sides of the work-piece and positioned at the other side of the plane passing centrally through the work-piece, rotatable shafts supporting said rolls, means for positively driving the rotatable shafts for one of or both said edging and web rolls and for one of or both said shaping or web finishing rolls, a face shaping roll adapted to contact with the peripheral face of the work-piece and arranged between the shafts of said edging and web rolls, said face shaping roll having a lateral thickness or width at its marginal portion which is the same as is the lateral thickness or width which the marginal or rim portion of the wheel or other article which is to be rolled from said work-piece is to have, a face shaping or face finishing roll adapted to contact with the peripheral face of the work-piece and arranged between the shafts of said shaping or web finishing rolls, means for moving both or either one of said face rolls into or out of contact with the work-piece, and means for moving any or all of the other rolls into or out of contact with the work-piece.

171. In an apparatus or mill of the kind described, means for supporting a work-piece, and a roll arranged with its axis inclined to the side of the work-piece and acting against the side of said work-piece and radially movable between the center portion and the periphery of said work-piece to reduce the thickness of metal where desired and to cause the metal in said work-piece to flow alternately toward both the center and periphery of the work-piece.

172. In an apparatus or mill of the kind described, means for rotatably supporting a work-piece on rotatable and axially independently movable work-supporting means, and a roll acting against said work-piece from the side and thereto radially movable to reduce the thickness of metal from the center portion to the periphery or peripheral portion of said work-piece and to cause the metal to flow toward the center or periphery or both the center and periphery of the work-piece.

173. In an apparatus or mill of the kind described, means for centrally and rotatably supporting a work-piece, and a positively driven roll rotating and acting against said work-piece from the side and thereto radially movable to cause the metal to flow toward the center or periphery or alternately toward the center and the periphery of the work-piece.

174. In an apparatus or mill of the kind described, means for centrally and rotatably supporting a work-piece, a roll acting against each side of said work-piece at one side of its axis and movable toward and from the periphery or marginal portion thereof to reduce the thickness of the metal and cause the same to flow alternately toward the center and periphery of the work-piece to form alternately the hub and rim of a wheel or similar article, and means for positively driving at least one of said rolls.

175. In a device for rolling bodies of the kind described, the combination of a longitudinally movable roll shaft having a roll at one end and being supported for said longitudinal movement, means for swinging or moving said roll laterally against and from the side of the work-piece, power or pressure means operatively connected with said shaft to move the same longitudinally with its roll in the direction between the hub or center portion and the periphery of the workpiece, and means for limiting the movements of said shaft lengthwise in either or both directions.

176. In a device for rolling bodies of the kind described, the combination of a longitudinally movable roll shaft having a roll at one end thereof and being supported for said longitudinal movement, means for positively rotating said shaft, a power or pressure piston operatively connected with said shaft to move the same lengthwise, and means for limiting the movement of said shaft lengthwise in either or both directions.

177. In an apparatus or mill of the kind described, the combination with means to centrally and rotatably support a work-piece adapted to be rolled with a peripheral flange or rim, of a roll adapted to act against the side of the work-piece and movable lengthwise in either direction between the center portion and the periphery of the work-piece, said roll having a convexly formed peripheral face to rotate and to roll or form as desired said flange or rim.

178. In an apparatus or mill of the kind described, means for centrally supporting a work-piece, and a roll having its axis inclined to the side of the work-piece acting against the side of said work-piece and thereto radially movable in the direction from the periphery toward the center portion of said work-piece to cause the metal to flow toward the center of the work-piece.

179. In an apparatus or mill of the kind described, means for rotatably supporting a work-piece, means for axially moving said work-piece, and a roll acting against the side of said work-piece and thereto radially movable toward the center of the work-piece to cause the metal to flow toward the center of the work-piece.

180. In an apparatus or mill of the kind described, means for rolling a work-piece, a roll having its axis inclined to the side of the work-piece acting against the side of said work-piece and thereto radially movable in the direction toward the periphery of said work-piece and in contact with said work-piece to cause the metal to flow toward the periphery thereof, and said roll being formed at the lateral apex of its peripheral face with a curved or convexial surface adjacent to a surface tangentially to said convexial surface and at an acute angle with the axis of said roll as and for the purpose described.

181. In an apparatus or mill of the kind described, means for rolling a work-piece, a roll acting against the side of said work-piece and thereto radially movable in the direction toward the center of said work-piece and in contact with said work-piece to cause the metal to flow toward the center thereof, and said roll being formed at the lateral apex of its peripheral face with a curved or convexial surface adjacent to a surface tangentially to said convexial surface and at an acute angle with the axis of said roll as and for the purpose described.

182. In an apparatus or mill of the kind described, means for rolling a work-piece, a roll having its axis inclined to the side of the work-piece acting against the side of said work-piece and thereto radially movable alternately toward the center and the periphery of said work-piece and in contact with said work-piece to alternately cause the metal thereof to flow toward the center and the periphery of the work-piece, and said roll being formed at the lateral apex of its peripheral face with a curved or convexial surface adjacent to a surface tangentially to said convexial surface and at an acute angle with the axis of said roll as and for the purpose described.

183. In an apparatus or mill of the kind described, means for centrally and rotatably supporting a work-piece in a position immovable in the direction of a line at right angles with the axis of the work-piece, means for axially moving said work-piece while the same is so supported, and a peripheral face roll adapted to act against said work-piece to cause the metal thereof to flow toward the center and diminish the diameter of the work-piece, said face roll having a lateral thickness or width at its marginal portion which is the same as is the lateral thickness or width which the marginal portion of the object which is to be rolled from said work-piece is to have.

184. In an apparatus or mill of the kind described, means for centrally and rotatably supporting a work-piece in a position immovable in the direction of a line at right angles with the axis of the work-piece, means for cooling said supporting means, and a positively driven roll for acting against the side of said work-piece.

185. In an apparatus or mill of the kind described, means for centrally supporting a work-piece, rolls at opposite sides of the work-piece arranged with their axes inclined to each other and acting against opposite sides of said work-piece and thereto radially movable alternately in the directions toward and from the periphery thereof to reduce the thickness of the metal and cause the same to flow alternately toward the center and periphery to form alternately the hub and rim of a wheel or similar article.

186. In an apparatus or mill of the kind described, means for centrally supporting a work-piece, and rolls at opposite sides of the work-piece with their axes inclined to each other and arranged to act against the sides of said work-piece and thereto movable in the direction toward the periphery thereof to cause the metal to flow toward the periphery and increase the diameter of the work-piece, and means for positively driving at least one of said rolls.

187. In an apparatus or mill of the kind described, alined rotatable means for supporting a work-piece, alined supporting heads in which said rotatable work-supporting means are mounted, said supporting heads being movable in a line parallel to the axis of the work-piece and otherwise immovable, and axially movable rolls arranged to act against the work-piece to cause the metal to flow toward the periphery and increase the diameter of the work-piece.

188. An apparatus or mill of the kind described, comprising a work-piece centrally supported and a pair of rolls arranged with their axes inclined to each other and movable laterally toward and from said work-piece and longitudinally between the edge and central portion of said work-piece, and means for positively driving at least one of said rolls.

189. In an apparatus or mill of the kind described, the combination with means for centrally supporting a work-piece to permit of its being rotated, a pair of positively driven and lengthwise movable shafts inclined to each other and to the sides of the work-piece and having rolls at their ends adjacent to the work-piece, means for moving said rolls lengthwise alternately in both directions between the center portion and the periphery of said work-piece, and means for laterally swinging said shafts bodily from fixed points a distance from the work-piece so as to move said rolls toward and from the sides of the work-piece in a circular path.

190. In an apparatus or mill of the kind described, means for centrally and rotatably supporting a work-piece, side rolls arranged at opposite sides of the work-piece to act against the work-piece to cause the metal thereof to flow laterally to increase the width or thickness of a portion or portions of the work-piece, and means for positively driving one or more of said side rolls.

191. In an apparatus or mill of the kind described, means for rolling a work-piece comprising a roll adapted to act against one side of the work-piece and longitudinally movable, a roll adapted to act independent of the first mentioned roll against the other side of the work-piece and longitudinally movable to reduce the thickness of the work-piece and cause the metal to flow in desired direction, and means for positively driving at least one of said rolls.

192. In an apparatus or mill of the kind described, means for centrally supporting a work-piece, a roll at one side of the work-piece positioned in a plane passing laterally through the work-piece at one side of a plane passing centrally through the work-piece and adapted to act against the work-piece from said one side and thereto radially movable, and a roll at the other side of the work-piece positioned in the plane passing laterally through the work-piece at the same side of the plane passing centrally through said work-piece and adapted to act against the work-piece from the other side and thereto radially movable to reduce where desired the thickness of the work-piece, and means for positively driving at least one of said rolls.

193. In an apparatus or mill of the kind described, means for rotatably supporting a work-piece, rolls adapted to act against opposite sides of the work-piece, means for positively driving at least the roll on one side of the work-piece, means for moving said rolls lengthwise, and means for retaining the roll on one side of the work-piece in any position while moving the roll on the other side thereof for reducing the thickness of the work-piece where desired and forming or rolling the same into desired form or shape.

194. In an apparatus or mill of the kind described, means for rotatably supporting a work-piece, rolls at opposite sides of the work-piece positioned in a plane passing laterally through the work-piece at one side of a plane passing centrally through the work-piece and adapted to act against the work-piece from opposite sides, means for positively driving at least the roll at one side of the work-piece, means for moving said rolls lengthwise, and means for retaining the roll on one side of the work-piece in any desired position while moving the roll on the other side of the work-piece for reducing its thickness and forming or rolling the work-piece where desired.

195. In an apparatus or mill of the kind described, means for rotatably supporting a work-piece, rolls adapted to act against opposite sides of the work-piece at one side of its axis, means for swinging or moving said rolls laterally against or from the sides of the work-piece, means for moving said rolls lengthwise alternately in both directions between the center portion and the periphery of the work-piece, and means for retaining the roll on one side of the work-piece in any desired position against the work-piece while moving the roll on the other side thereof for forming or rolling the work-piece.

196. In an apparatus or mill of the kind described, means for supporting a work-piece to permit of its being rotated, rolls adapted to act against opposite sides of the work-piece at one side of its axis, means for swinging or moving said rolls laterally against and from the sides of the work-piece, means for moving said rolls lengthwise in either direction between the center portion and the periphery of the work-piece, means for positively driving at least the roll on one side of the work-piece and means for moving said rolls either together or independent of each other.

197. In an apparatus or mill of the kind described, the combination with means for supporting a work-piece, of a pair of roll shafts arranged with their axes inclined to each other and having rolls thereon adapted to engage the sides of the work-piece, means for positively driving said roll shafts, means for moving said roll shafts lengthwise together or independent of each other so as to move said rolls in either direction between the center portion and periphery of the work-piece and alternately toward and from the marginal portion or periphery of the work-piece, and means for swinging said roll shafts laterally toward and from the sides of the work-piece either together or independent of each other.

198. In an apparatus or mill of the kind described, the combination of means to roll a work-piece, a tread or peripheral face shaping roll adapted to act against the peripheral face of the work-piece and having at its marginal portion a lateral thickness or total width which is the same as is the lateral thickness or width which the marginal or peripheral portion of the object which is to be rolled from said work-piece is to have, and axially movable oppositely-positioned edging and web rolls at opposite sides of the work-piece arranged with their axes parallel or inclined to the sides or ends of the work-piece and adapted to act against the work-piece from opposite sides, said rolls being also laterally movable against and away from the work-piece and having the edging roll portions thereof extending over the sides of the marginal or rim portion of said work-piece or object at opposite sides thereof and also over part of the opposite sides of said peripheral face shaping roll and adapted to so roll in contact with said peripheral face shaping roll, and said face shaping roll being movable independently of said side rolls.

199. In an apparatus or mill of the kind described, the combination of means for rolling a work-piece, a pair of side rolls at opposite sides of the work-piece positioned in a plane passing laterally through the work-piece at one side of a plane passing centrally through said work-piece and arranged with their axes parallel or inclined to the sides or ends of the work-piece and adapted to act against said work-piece from opposite sides, a tread or peripheral face roll positioned between said pair of side rolls and adapted to act against the peripheral face of the work-piece, and each of said side rolls having an edging roll part and a web rolling part of larger diameter than said edging roll part and, said edging roll part having its peripheral rolling or operating face formed substantially straight and the edging roll parts of said rolls being adapted to act against the portion of the work-piece between said web rolling parts and the periphery of the work-piece and also extend over part of the opposite side faces of said face roll to come or roll in contact with said peripheral face roll and, said web rolling parts of said rolls being formed adjacent said edging roll parts and adapted to reduce or roll the web portion of the work-piece to desired thickness and with their inner rolling or operating portions roll and form the inner circumferential faces $f^{18}$, $f^{18}$ in Fig. 158 of the marginal or rim portion of the work-piece to the form shown in Figs. 136 or 158, said web rolling parts having their said inner rolling or operating portions formed sufficiently conical so that the face of each of said conically formed portions is sufficiently inclined from its lateral apex toward the inner end of its roll so as to be adapted to roll with said side rolls the said inner circumferential faces of the marginal or rim portion of the work-piece sufficiently inclined outwardly toward the peripheral face of the work-piece to cause the metal to flow in the proper direction to assure compression of the metal in said rim portion to uniform or to practically uniform density, substantially as described with reference to Fig. 158.

200. In an apparatus or mill of the kind described, the combination of means for rolling a work-piece, a tread or peripheral face roll adapted to act against the peripheral face of the work-piece and being formed so as to roll said face straight or cylindrical or approximately so at one end and the portion of said face at its other end straight or approximately straight and of larger diameter than said first-mentioned end portion and, the portion of said face between said two end portions concave or conical or approximately so, and web rolls adapted to act against opposite sides of the work-piece and each having part of its actual operating face extended, the extended portions of said web rolls extending over and against part of the opposite sides of said tread or peripheral face roll and adapted to so roll in contact with said tread or peripheral face roll.

201. In an apparatus or mill of the kind described, the combination of a tread or peripheral face roll, and axially adjustable or axially movable web and inner rim rolls adapted to act against the work-piece from opposite sides and each being provided adjacent to its inner rim-operating face with a straight peripheral faced extension, the extensions of said last-mentioned rolls extending over and against part of the opposite sides of said peripheral face roll and being adapted to so roll in contact with said peripheral face roll.

202. In an apparatus or mill of the kind described, the combination of a peripheral face roll adapted to act against the peripheral face of the work-piece, and axially and laterally movable side rolls having their peripheral operating faces formed substantially straight to act laterally against the sides of the work-piece from opposite sides and each having its peripheral face extended, the extended portions of said side rolls extending over and against part of the opposite side faces of said peripheral face roll and being adapted to so roll in contact with said peripheral face roll.

203. In an apparatus or mill of the kind described, means for centrally supporting a work-piece, a pair of axially movable side rolls adapted to act against opposite sides of the work-piece at one side of its axis and arranged with their axes parallel or inclined to a plane passing circumferentially through the work-piece, a peripheral face roll adapted to act against the peripheral face of the work-piece at the other side of its axis, and means for positively driving one of or both said side rolls.

204. An apparatus or mill of the kind described comprising means to rotatably support a work-piece to be rolled into a car wheel, a pair of axially movable side rolls having their shafts parallel or inclined to a plane passing circumferentially through the work-piece and adapted to act against said work-piece from opposite sides to form or shape alternately the hub, web and rim portions of a car wheel, a face roll adapted to act against the peripheral face of said work-piece and together with said side rolls to form or shape the peripheral face or flanged tread portion of said wheel, and means for positively driving one of or both said side rolls.

205. In an apparatus or mill of the kind described, the combination of a pair of alined axles having piercers or work-supporting centers at adjacent ends by which a work-piece to be rolled or formed into a car wheel is adapted to be held for rotation, a pair of side rolls arranged at opposite sides of the work-piece and lengthwise movable between the center portion and the periphery of the work-piece to shape or form the web, hub and rim of the said car wheel, a pressure shaping roll adapted to act against the peripheral face of the work-piece between said pair of side rolls, a pressure finishing roll adapted to act against the peripheral face of said work-piece at a point opposite said pressure shaping roll, means for dishing the work-piece while the same is rotated, and means for moving said alined axles together in one direction to dish the work-piece while same is rotated and is laterally supported at its marginal or peripheral portion against the force or pressure caused by said dishing process.

206. In an apparatus or mill of the kind described, the combination of a pair of alined axles having piercers or work-supporting centers at adjacent ends by which a work-piece is adapted to be held for rotation and for dishing, said work-piece having a hub, rim and web, a pair of side rolls arranged at opposite sides of the work-piece and adapted to act against part of the web and against the inner peripheral surface of the rim, a pressure roll positioned between said side rolls and adapted to act against the peripheral face of the work-piece, means for positively rotating at least one of said side rolls, and a device for dishing the work-piece while the same is so rotatably held and is rotated by at least one of said side rolls including means for axially moving said alined axles and the hub or center portion of the work-piece simultaneously together in one direction while the marginal portion of the work-piece is supported and retained by one or more of said rolls against said axial movement of said hub or center portion.

207. In an apparatus or mill of the kind described, the combination of a pair of alined axles having piercers or work-supporting means at adjacent ends by which a partly formed car wheel is adapted to be held for rotation so as to permit the car wheel while so held for rotation to be undished and redished, a pair of oppositely-arranged edging or side rolls extending over and across the side faces of the rim portion of said car wheel at opposite sides thereof and adapted to act against said opposite side faces of the rim of said partly formed car wheel at one side of said work-supporting means, a pair of oppositely arranged side rolls adapted to act against opposite sides of part of the web and against the inner peripheral surfaces of said rim at another side of said work-supporting means, a pressure roll adapted to act against the peripheral face of said partly formed car wheel between said last-mentioned pair of side rolls, means for positively driving at least said last-mentioned pair of side rolls, and means for undishing or redishing or for undishing and redishing said car wheel while the same is so rotatably held and is rotated by at least said last-mentioned pair of side rolls including means for axially moving said alined axles and the hub or center portion of the car wheel simultaneously together in one direction while the marginal portion of the car wheel is supported and retained by one or more of said side rolls 208. In an apparatus or mill for rolling car wheels or other circular bodies, a device for reworking a car wheel or similar body having a hub, said device comprising rotatable female centers adapted to engage and support said car wheel at its opposite sides around the outer peripheral surface or surfaces of its hub so as to permit said car wheel while so supported to be rolled or operated upon anywhere except at its hub portion, and rolls arranged and adapted to rotate and to so act against said car wheel where desired.

209. In an apparatus or mill for rolling car wheels or other circular bodies, a device for reworking a car wheel or similar body having a hub, said device comprising alined and freely rotatable female centers or dies arranged at opposite sides of said car wheel, power or pressure means operatively connected to each of said freely rotatable female dies and adapted to move said dies axially, said dies being adapted while so axially moved to be forced by said power or pressure means over the outer peripheral surface or surfaces of the hub of said car wheel to compress said hub and make its hole smaller in diameter and to support said car wheel, and rolls adapted and arranged to rotate and to act against said car wheel anywhere except at its hub portion.

210. In an apparatus or mill for rolling car wheels or other circular bodies, a device for reworking a car wheel or similar body having a hub, said device comprising a pair of freely rotatable work-supporting centers arranged at opposite sides of said car wheel and having their axes arranged in alinement and in line with the axis of said car wheel and adapted to support said car wheel therebetween, one of said centers being formed as a female center or die and adapted to engage and support said car wheel around the outer peripheral surface of its hub, and rolls adapted and arranged to rotate and to act against said car wheel anywhere except at its hub portion.

211. In an apparatus or mill of the kind described, a device for undishing and reworking and redishing a dished car wheel or similar body having a hub portion, comprising a pair of suitably formed rotatable work-supporting centers arranged at opposite sides of said car wheel and having their axes arranged in alinement and in line with the axis of the said car wheel and adapted to support said car wheel therebetween, power or pressure means operatively connected with said work-supporting centers for moving said centers with the hub or center portion of said car wheel axially together in the direction of the axis of said car wheel when undishing and when redishing said car wheel, said power or pressure means being also adapted to effect undishing and redishing of said car wheel while the same is rotated, rolls adapted and arranged to rotate said car wheel and roll the same where desired to the desired form or shape and to laterally support and retain the marginal portion of said car wheel against said axial movement of said hub or center portion during the undishing and redishing process of said car wheel.

212. In an apparatus or mill for rolling car wheels or other circular bodies, a device for undishing and reworking and redishing a dished car wheel or similar body having a hub portion, said device comprising a pair of freely rotatable work-supporting female centers or dies arranged at opposite sides of said car wheel and having their axes arranged in alinement and in line with the axis of said car wheel, power or pressure means operatively connected with said centers or dies for moving the same axially, said centers or dies being adapted to be forced by said power or pressure means over the outer peripheral face or faces of said hub portion of the car wheel for supporting the car wheel during the undishing and rolling and redishing processes, said power or pressure means being also adapted for moving said centers with the hub portion of said car wheel axially together in either direction for undishing and for redishing said car wheel while the same is so centrally supported and is being rotated and while the marginal portion of said car wheel is being laterally supported and retained against the undishing and against the redishing force or pressure caused by said axial movement of said hub portion, and rolls for rotating said car wheel and rolling the same where desired to desired form or shape.

213. In an apparatus or mill of the kind described, means for undishing and reworking and redishing a dished car wheel comprising rotatable and longitudinally movable work-supporting means arranged at opposite sides of the car wheel for supporting the car wheel during the operation thereon, means for rotating the car wheel, power or pressure means for moving said rotatably arranged supporting means with the hub portion of said car wheel together axially in one direction for undishing the car wheel while the car wheel is rotated and while the marginal portion of the car wheel is being laterally supported and retained against said axial movement of said hub portion during the undishing process, rolls adapted to act against the car wheel where desired and roll the same to desired form or shape, said power or pressure means being also adapted for moving said rotatable supporting means with the hub portion of said car wheel together axially in the desired direction for redishing the car wheel to its desired dish while the car wheel is being rotated and while the marginal portion of the car wheel is being laterally supported and retained against said axial movement of said hub portion during said redishing process.

214. In an apparatus or mill of the kind described, the combination with means for supporting a work-piece to permit of its rotating, of a pair of edging and web rolls acting against opposite sides of said work-piece, a power or pressure device coöperating with each roll, and equalizing mechanism interposed between said power or pressure devices to cause them to act with equal pressure against opposite sides of the work-piece.

215. In an apparatus or mill of the kind described, the combination with means for supporting a work-piece to permit of its being rotated, of a pair of side rolls at opposite sides of the work-piece positioned in a plane passing laterally through the work-piece at one side of a plane passing centrally through said work-piece and acting against said work-piece, a power or pressure device coöperating with each roll, and equalizing mechanism interposed between said rolls to cause them to move and act with equal pressure against the work-piece, and means for disconnecting either one or both said rolls from said equalizing mechanism without disconnecting said rolls from said power or pressure devices.

216. In an apparatus or mill of the kind described, the combination with means for rotatably supporting a work-piece, a pair of edging and web rolls or side rolls at opposite sides of the work-piece at one side of its supporting means and acting against said work-piece from opposite sides, a power or pressure device coöperating with each roll, and equalizing mechanism interposed between said power or pressure devices provided with means to cause said rolls to act together or independent of each other against opposite sides of the work-piece.

217. In an apparatus or mill of the kind described, the combination with means for supporting a work-piece to permit of its rotating, of a pair of shaping or finishing rolls acting against opposite sides of said work-piece, a power or pressure device coöperating with each of said rolls, and equalizing power or pressure transmitting mechanism interposed between said power or pressure devices to cause said rolls to act with equal pressure against opposite sides of the work-piece.

218. In an apparatus or mill of the kind described, the combination with means for supporting a work-piece to permit of its rotating, of a pair of tread or face rolls acting against the peripheral face of said work-piece at different points, a power or pressure device for each roll coöperating therewith, and equalizing power or pressure transmitting mechanism interposed between said power or pressure devices to cause said rolls to act with equal pressure against said work-piece.

219. In an apparatus or mill of the kind described, the combination with means to centrally support a work-piece, of a pair of roll shafts having rolls thereon, a power or pressure piston for each roll shaft having a piston-rod provided with a cross head equipped with trunnions extending from opposite sides thereof, pressure blocks fitting onto said trunnions, means of connection between said roll shafts and said piston-rods, a pair of rock shafts having each a crank secured thereto provided with forked ends straddling said cross heads and said pressure blocks, and equalizing mechanism between said pair of rock shafts to cause said rolls to be moved to the same extent and to be applied with equal pressure against said work-piece.

220. In an apparatus or mill of the kind described, the combination with means to rotatably support a work-piece, a pair of rolls adapted to act against the work-piece, a power or pressure device for each one of said rolls operatively connected with said roll, said power or pressure devices being adapted to hold or to move said rolls into operative position against the work-piece or to move said rolls out of operative position or away from the work-piece, a pair of rock shafts arranged in operative positions with said power or pressure devices, each of said rock shafts being provided with two cranks, one of said cranks connecting its rock shaft with its coöperating power or pressure device, and equalizing means connected to the said other cranks of said rock shafts connecting said two rock shafts with said equalizing mechanism and which equalizing mechanism cause said rolls to be moved to the same extent and to be applied with equal pressure against the work-piece.

221. In an apparatus or mill of the kind described, the combination with means to rotatably support a work-piece, a pair of rolls adapted to act against the work-piece, a power or pressure device operatively connected with both said rolls, said power or pressure device being adapted to hold or to move said rolls into operative position against the work-piece and to move said rolls out of operative position or away from the work-piece, a pair of rock shafts arranged in operative position to said rolls, each of said rock shafts being provided with two cranks, one of said cranks connecting its rock shaft with its coöperating roll, one of said rock shafts being also provided with means for connecting said rock shaft with said power or pressure device, and equalizing or moving means connected to said other cranks of said rock shafts connecting said two rock shafts and cause said rolls to be moved to the same extent and be applied with equal pressure against the work-piece.

222. In an apparatus or mill of the kind described, the combination with means for supporting a work-piece to permit of its rotating, of a pair of side rolls acting against said work-piece from opposite sides, and power or pressure mechanism including an equalizing device to cause said rolls to act in unison and with equal pressure against the work-piece, and means for disconnecting either or both rolls from said equalizing device without disconnecting said rolls from said power or pressure mechanism.

223. In an apparatus or mill of the kind described, means for supporting a work-piece to permit of its being rotated, two pairs of side rolls adapted for acting against said work-piece, means for positively driving one or more of said side rolls, a power or pressure device or devices for feeding or holding said rolls forcibly against said work-piece to roll the same where desired to desired form or shape, and means for moving said pairs of side rolls in pairs together or independent of each other or for moving each side roll independent of the other.

224. In an apparatus or mill of the kind described, the combination with a rotatable and lengthwise movable support, of a shaft mounted on said support and having a roll at one end thereof, means for rotating said shaft, a cylinder located above said shaft, a piston within said cylinder having a piston-rod and means of connection between said piston-rod and said shaft to move said shaft lengthwise in the direction of its axis, a cylinder secured to said support, a piston within said cylinder, and connection between said last-mentioned piston and said shaft to swing the same laterally.

225. In an apparatus or mill of the kind described, an oscillating frame comprising a suitable frame having alined bearings, a rotatable and longitudinally movable roll shaft journaled in said bearings and having a roll at one end extending from said oscillating frame, means to support said oscillating frame, and means to advance or retreat said roll.

226. In an apparatus or mill of the kind described, an oscillating frame comprising a suitable frame having alined bearings, a rotatable and lengthwise movable roll shaft journaled in said bearings and having a roll at one end extending from said oscillating frame, means connected with said roll shaft to move the same lengthwise, means for positively driving said roll shaft, and means to swing said roll shaft with its roll laterally.

227. In an apparatus or mill of the kind described, an oscillating frame comprising a suitable frame having alined bearings, a rotatable and lengthwise movable roll shaft journaled in said bearings and having a roll at one end extending from said oscillating frame, power or pressure means located on said oscillating frame and operatively connected with said roll shaft for moving said roll shaft lengthwise in the direction of its axis, and means to swing said roll shaft with its roll laterally.

228. In an apparatus or mill of the kind described, an oscillating frame comprising a suitable frame having alined bearings, a rotatable and lengthwise movable roll shaft journaled in said bearings and having a roll at one end extending from said oscillating frame, power or pressure means located on said oscillating frame and operatively connected with said roll shaft for moving said roll shaft lengthwise, adjustable means connected with said power or pressure means to limit the extent of movements of said roll shaft lengthwise in either or both directions, means to positively rotate said roll shaft, and means to swing said roll shaft with said oscillating frame laterally.

229. In an apparatus or mill of the kind described, the combination with a support, of a roll shaft on said support arranged for rotary and laterally swinging movements, a power or pressure piston also on said support and having a piston-rod, a two-armed crank pivotally connected to said support, a connecting rod pivotally connecting said two-armed crank with said piston-rod, a guide piece to guide said roll shaft and laterally movable and through which said roll shaft is passed, and a connecting rod connecting said guide piece with said two-armed crank at another suitable point of said two-armed crank.

230. In an apparatus or mill of the kind described, the combination with a support, of a rocking shaft journaled in said support, a crank secured to said rocking shaft and provided with two journal pins, a power or pressure piston on said support having a piston-rod, cross-head guides carried by said support, a cross head slidable in said guides and secured to said piston-rod, a connecting rod pivotally connecting said cross head with one of the journal pins of said crank secured to said rocking shaft, a roll shaft arranged for rotatable and oscillating movement, a guide piece to guide said roll shaft and laterally movable and through which said roll shaft is passed, means for guiding said guide piece in its said lateral movements, and a connecting rod connecting said guide piece with the other journal pin of said crank secured to said rocking shaft.

231. In an apparatus or mill of the kind described, the combination of a roll shaft arranged for swinging movement, a power or pressure device including a piston and piston-rod, a cross head connected to said piston-rod and having a journal pin or pins fastened therein, cross-head guide or guides arranged in operative position to said cross head, slide block or blocks on said cross head longitudinally movable in said cross-head guide or guides, and connections between said cross head and said roll shaft to cause the same to swing laterally.

232. In an apparatus or mill of the kind described, the combination with a frame or support, of an oscillating frame mounted thereon, a vertical shaft passing through the oscillating trunnion of said oscillating frame and having a bevel gear thereon, a pair of housings on said oscillating frame, a horizontally disposed shaft extending through said housings and having a bevel gear thereon arranged to permit longitudinal movement of said shaft therein and meshing with the bevel gear on said vertical shaft, a power or pressure device for oscillating said oscillating frame to cause said horizontal shaft to swing through an arc of a circle, a power or pressure device located on said oscillating frame and connected with said horizontal shaft to move the same longitudinally, and a roll at one end of said horizontal shaft.

233. In an apparatus or mill of the kind described, the combination with a support, of housings carried by said support and having bearings secured to said housings, a roll shaft rotatable and also longitudinally movable in said bearings of said housings and having a roll at one end thereof and a threaded portion at its other end, an adjustable nut secured to said threaded portion, a cylinder located above said shaft, a piston within said cylinder having a piston-rod with adjustable stops thereon, and a lever pivotally secured at its one end to one of said housings and at its other end having connection with said piston-rod, said lever being connected between its said ends with said roll shaft.

234. In an apparatus or mill of the kind described, the combination of an oscillating frame, a roll shaft journaled to rotate and also being longitudinally movable in bearings on said oscillating frame and having a roll at one end, a cylinder supported above said roll shaft on said oscillating frame, a piston within said cylinder having a piston-rod extending through opposite ends thereof, said piston-rod having threaded portions at or near its ends, an adjustable nut on each of said threaded portions, and means of connection between said piston-rod and said roll shaft to cause the latter to move longitudinally.

235. In an apparatus or mill of the kind described, the combination of a rotatable and also lengthwise movable roll shaft having a roll at its one end, a cross head near its other end, a power or pressure piston having a piston-rod, a cross head attached to said piston rod, and a lever connected with the cross head on said roll shaft and with the cross head of said piston-rod for moving said roll shaft lengthwise.

236. In an apparatus or mill of the kind described, the combination with suitable bearings, of a roll shaft rotatable and also longitudinally movable in said bearings, a roll at one end of said shaft, means for positively driving said roll shaft, a cross head at the other end of said shaft adapted to move said shaft lengthwise in either direction, a power or pressure piston and means of connection between said power piston and said cross head for moving said roll shaft lengthwise in either direction.

237. In an apparatus or mill of the kind described, the combination with a stationary frame, an oscillating frame supported by said stationary frame for oscillating movement and comprising a lower member and an upper member and alined housings between said lower and upper members and secured thereto, bearings in said housings, a rotatable and lengthwise movable roll shaft passing through said bearings and having a roll at one end and a bevel gear between said housings in which said shaft is slidably arranged, a shaft at right angles to said roll shaft and journaled centrally in said oscillating frame, a bevel gear secured to said right angled shaft and in mesh with the bevel gear on said roll shaft, a power or pressure device surmounting said oscillating frame, and connection between said power device and said roll shaft to cause the latter to be moved longitudinally.

238. In an apparatus or mill of the kind described, a rolling device comprising an oscillating frame, bearings in said oscillating frame, means for oscillating said oscillating frame, a cylinder surmounting said oscillating frame, a piston within said cylinder having a piston-rod extending through opposite ends of said cylinder and provided with a threaded portion at its one end, a cross head secured to its other end, said piston rod having also a threaded portion adjacent said cross-head, an adjustable nut on each of the threaded portions of said piston rod for limiting the stroke or strokes of said piston rod in either direction, a link having one of its ends pivotally connected to said cross-head, a lever having one end thereof pivotally connected to the other end of said link, a link pivotally connecting the other end of said lever with said oscillating frame, a rotatable and also lengthwise movable roll shaft mounted in the bearings of said oscillating frame and having a roll at one end, means for positively rotating said roll shaft, and a cross-head on said roll shaft to which said lever is connected at a point between its ends for moving said roll shaft lengthwise in either direction.

239. In an apparatus or mill of the kind described, the combination with a suitable frame supporting an oscillating frame, of an oscillating frame on said suitable frame, a segmental guide bearing on said suitable frame, a guide piece adapted to travel in said guide bearing, a rotatable and also lengthwise movable roll shaft journaled in said oscillating frame and passing through said guide piece and also journaled therein, means for positively driving said roll shaft, means for moving said roll shaft lengthwise, and a power or pressure device connected with said guide piece to swing said guide piece and said roll shaft and said oscillating frame laterally.

240. In an apparatus or mill of the kind described, the combination with a suitable support, of an oscillating frame on said support, a drive shaft passing lengthwise through the central part of the oscillating pivot or trunnion of said oscillating frame and coaxial with said trunnion, a roll shaft journaled in said oscillating frame and having a roll at one end, means for transmitting motion from said drive shaft to said roll shaft, a segmental guide bearing on said support and concentric with the axis of said drive shaft, a guide piece in said guide bearing and through which said roll shaft is passed and is journaled therein, and a power or pressure device connected with said guide-piece.

241. In an apparatus or mill of the kind described, the combination with a support, of an oscillating frame on said support and comprising an upper member having an oscillating trunnion, a lower member having an oscillating trunnion which is journaled in a bearing of said support and a pair of housings having alined bearings and being movable or adjustable toward and from each other in the direction of the axes of said alined bearings, a rotatable and also lengthwise movable roll shaft journaled in said bearings, means positively to rotate said roll shaft, a power or pressure piston connected with said roll shaft to move the same lengthwise, a tie or supporting member connecting the upper trunnion of said oscillating frame with said support, and said upper trunnion of said oscillating frame being journaled in a bearing of said tie or supporting member.

242. In an apparatus or mill of the kind described, the combination with a main frame having a bearing, an oscillating frame having its oscillating trunnion journaled in said bearing and comprising a pair of housings, a drive shaft coaxial with the axis of the oscillating trunnion of said oscillating frame, a bevel gear on said drive shaft, a rotatable and also lengthwise movable roll shaft journaled in said housings and having a roll at one end, power or pressure mechanism for moving said lengthwise movable roll shaft lengthwise in said housings, power or pressure mechanism for oscillating said oscillating frame with said roll shaft, a bevel gear on said lengthwise movable roll shaft and arranged to rotate the latter and permit longitudinal movement therein of said lengthwise movable roll shaft, the bevel gear of said drive shaft being in mesh with the bevel gear of said lengthwise movable roll shaft, and roller or ball thrust-bearings between said last-mentioned bevel gear and said housings.

243. In an apparatus or mill of the kind described, the combination with a main frame, of an oscillating frame supported thereon and comprising a lower frame member, an upper frame member and spaced housings between said lower and upper frame members and connected therewith, a cylinder mounted on said upper oscillating frame member, a piston within said cylinder, a lengthwise movable roll shaft, journaled in said housings and having a roll at one end, a cross head at its other end, a pair of levers pivotally connected between their ends to said cross head, a link connection between one end of said levers and said oscillating frame, and a link connection between the other end of said levers and said piston-rod.

244. In an apparatus or mill of the kind described, the combination with the main bed-plate and the upper bed-plate, of an oscillating frame journaled in said main bed-plate and situated between said main and upper bed-plates, a drive shaft passing through the oscillating journal of said oscillating frame and coaxial with said oscillating journal, a bevel gear secured to said drive shaft, an anti-friction bearing interposed between said bevel gear on said drive shaft and said oscillating frame, and a roll shaft journaled in said oscillating frame and having a roll at one end and a bevel gear between its ends in mesh with the bevel gear on said drive shaft.

245. In an apparatus or mill of the kind described, the combination with a main frame, of bearing plates secured to said main frame, an oscillating frame journaled in said main frame and having a pair of housings provided with bearings and having bearing plates on its under side in contact with the bearing plates on said main frame, a drive shaft passing lengthwise through and journaled coaxial with the oscillating journal part or pivot of said oscillating frame, a bevel gear secured to said drive shaft, a roll shaft journaled in the bearings of said housings of said oscillating frame, and a bevel gear on said roll shaft meshing with the bevel gear on said drive shaft.

246. In an apparatus or mill of the kind described, the combination with a main frame, of an oscillating frame having its oscillating journal or pivot journaled in said main frame and having a pair of housings provided with bearings, an anti-friction bearing interposed between said main frame and said oscillating frame and being coaxial with the oscillating journal of said oscillating frame, a drive shaft journaled lengthwise in said oscillating journal of said oscillating frame and coaxial with said oscillating journal, a bevel gear secured to said drive shaft, a roll shaft journaled in the bearings of said housings of said oscillating frame, and a bevel gear on said roll shaft meshing with the bevel gear on said drive shaft.

247. In an apparatus or mill of the kind described, the combination with a main frame, of bearing plates secured to the main frame, an oscillating frame journaled in said main frame having a pair of housings provided with bearings and having bearing plates on its under side in contact with the bearing plates on said main frame and an anti-friction bearing-means arranged between said main frame and the said under side of said oscillating frame and coaxial with said oscillating journal of said oscillating frame, a drive shaft journaled lengthwise in said oscillating journal of said oscillating frame and coaxial with said oscillating journal, a bevel gear secured to said drive shaft, a roll shaft journaled in the bearings of said housings of said oscillating frame, and a bevel gear on said roll shaft meshing with the bevel gear on said drive shaft.

248. In an apparatus or mill of the kind described, the combination with a main frame and a top frame connected with said main frame, of an oscillating frame arranged between said main and top frames and journaled in said main and top frames, a drive shaft passing lengthwise through the oscillating journal of said oscillating frame and coaxial with said oscillating journal, a lengthwise movable roll shaft journaled in said oscillating frame, means to positively drive said roll shaft from said drive shaft, power mechanism for moving said roll shaft lengthwise, and power mechanism for swinging said roll shaft with its oscillating frame laterally.

249. In an apparatus or mill of the kind described, an oscillating frame comprising a suitable frame having alined bearings and being hinged to a pivot pin at its one end and having a roll at its other free end, a positively driven roll shaft journaled in said bearings of said oscillating frame and having said roll at its end, said frame being adapted to be oscillated on said pivot pin, said pivot pin being situated sidewise with its axis or extended axis a distance back from said roll and also sidewise with its said axis or extended axis a distance from one side of the axis or extended axis of said roll shaft, and means for oscillating said oscillating frame.

250. In an apparatus or mill of the kind described, a roll shaft having a roll at its end, said roll being adapted to act against a work-piece, said shaft being arranged to oscillate on a pivot-pin, said pivot-pin being situated sidewise with its axis or extended axis at a distance back from said roll and also sidewise with its said axis or extended axis a distance from one side of the axis or extended axis of said roll shaft, means to positively rotate said roll shaft, and means to advance or retreat the roll end of said shaft.

251. In an apparatus or mill of the kind described, an oscillating support comprising a suitable support having alined bearings and being hinged to a pivot-pin, a roll shaft journaled in said alined bearings and having a roll at one end, said pivot-pin being situated at a distance back from said roll and also sidewise with its said axis or extended axis a distance to one side of the axis or extended axis of said roll shaft, and means to advance or retreat the roll end of said oscillating support.

252. In an apparatus or mill of the kind described, the combination with a main frame, of a pair of oscillating frames pivotally secured at one of their ends to said main frame, a pair of power or pressure pistons having piston-rods extending therefrom, connecting rods pivotally connecting the other ends of said oscillating frames with said piston-rods, roll shafts arranged with their axes inclined to each other and journaled in bearings in said oscillating frames and in bearings on said main frame, each of said roll shafts comprising two portions, means for rotating said roll shafts, and a universal coupling for each roll shaft between its said two portions permitting one portion thereof to swing at an angle to the other.

253. In an apparatus or mill of the kind described, means to rotatably support a work-piece to be operated on, rolls at opposite sides of the work-piece adapted to act against the work-piece, a shaft carrying each roll, means for positively driving at least one of said shafts, an oscillating frame in which each of said shafts is journaled, and power or pressure means to advance or retreat the roll-ends of said oscillating frames.

254. In an apparatus or mill of the kind described, means to rotatably support a work-piece to be operated on, a roll adapted to act against the work-piece from the side, a shaft carrying said roll, an oscillating frame in which said shaft is journaled, means for positively driving said shaft, and means to advance or retreat said roll with the roll-end of said oscillating frame.

255. In an apparatus or mill of the kind described, means to rotatably support a work-piece to be operated on while so supported, rolls at opposite sides of the work-piece adapted to operate upon the work-piece from opposite sides, a shaft carrying each of said rolls, an oscillating frame in which each of said shafts is journaled, means to advance or retreat the roll ends of said oscillating frames with said rolls, and means for positively driving at least one of said shafts.

256. In an apparatus or mill of the kind described, the combination with a frame, of means for supporting a work-piece arranged for rotation, a pair of roll shafts arranged with their axes inclined to each other and having shaping or finishing rolls at adjacent ends adapted to act against said work-piece from opposite sides, means for positively driving at least one of said rolls, each roll shaft comprising two sections connected by universal couplings comprising two oppositely arranged forked heads connected by telescoping members and coöperating forked heads on the two sections of the said roll shaft, an oscillating frame for each section of the roll shafts bearing the roll having bearings in which they are journaled, and means for oscillating said frames.

257. In an apparatus or mill of the kind described, the combination with a main frame, of means for supporting a work-piece arranged for rotation, a pair of positively driven roll shafts inclined to each other and having rolls at one of their ends adapted to act against the work-piece, means for positively driving said roll shafts at their other ends, each of said shafts comprising two sections connected by universal couplings including a telescoping joint and one of said two sections being journaled in bearings on an oscillating frame and the other of said two sections being journaled in fixed bearings on said main frame, means for supporting said telescoping joint and carrying the same, oscillating frames pivotally connected at one of their ends to said main frame at points between and to one side of the axis or extended axis of said roll shafts, segmental guide bearings on said main frame in which the other ends of said oscillating frames are guided, each of said segmental guide bearings being arranged concentric with the axis of its oscillating frame pivot, bearings in each of said oscillating frames in which said one section of said roll shafts are journaled, fixed bearings on said main frame in which said other sections of said roll shafts are journaled, and power or pressure devices for swinging said oscillating frames laterally to move said rolls toward, against and from the work-piece.

258. In an apparatus or mill of the kind described, the combination with a main frame, of means for supporting a work-piece, a pair of oscillating frames arranged at opposite sides of a plane passing circumferentially through the work-piece and pivotally connected to said main frame at points which will permit the free ends of said oscillating frames to swing during the operating process practically parallel to the axis of the work-piece, segmental guide bearings for guiding said oscillating frames at their free ends near the work-piece, roll shafts journaled in said oscillating frames and arranged with their axes inclined to each other, each having a part provided with a socket and a part provided with an end portion removably held in said socket, a roll at the end of each shaft adjacent the work-piece, and a power or pressure device coacting with each oscillating frame to swing the same laterally.

259. In an apparatus or mill of the kind described, the combination with a frame, of means for supporting a work-piece for rotation, a pair of oscillating frames arranged in planes at opposite sides of the work-piece and having one of their ends pivotally connected to said frame so as to permit their other or free ends to swing during the operating process practically parallel to the axis or extended axis of the work-piece, a curved guide-bearing for each oscillating frame having the pivot of the oscillating frame as its center, a pair of positively driven roll shafts journaled obliquely in said oscillating frames and diverging from the work-piece, each roll shaft having a roll adapted to act against the work-piece, means for positively rotating said roll shafts, and means for adjusting said roll shafts lengthwise.

260. In an apparatus or mill of the kind described, the combination with a frame, of means for supporting a work-piece for rotation, a pair of oscillating frames pivotally secured at one of their ends to said frame, a positively driven roll shaft arranged obliquely in each of said oscillating frames, said shafts having rolls adapted to act against the work-piece from opposite sides, bearings in said oscillating frames in which said roll shafts are journaled, each roll shaft having threaded portions at opposite sides of one of its bearings, an adjustable nut on each of said threaded portions adapted to adjust its roll shaft lengthwise in the bearings of its oscillating frame and to impinge against opposite sides of said bearing, means to rotate said roll shafts, and means to oscillate said frames on their pivotal points or pivot-pins.

261. In an apparatus or mill of the kind described, an oscillating frame hinged at one end and having a connecting pin near its other end, a power or pressure piston having a piston-rod, a connecting rod connecting said connecting pin with said piston-rod to swing said oscillating frame laterally, a roll shaft journaled obliquely in said oscillating frame, and said oscillating frame hinge being situated so that its axis or extended axis is laterally at a distance from one side of the axis or extended axis of said roll shaft.

262. In an apparatus or mill of the kind described, the combination with a frame, of means for supporting a work-piece for rotation, a pair of roll shafts arranged obliquely and having a part thereof journaled on said frame, an oscillating frame for each roll shaft to which the other part of said shaft is journaled, said shafts having rolls at points beyond the free ends of said oscillating frames, means for imparting positive rotary motion to the portions of said shafts journaled on said frame, universal couplings between the two portions of each shaft including a telescoping portion for positively driving the parts of said roll shafts journaled on said oscillating frames, and means for oscillating said oscillating frames to swing said rolls toward and from the work-piece, said telescoping portions of the universal couplings admitting longitudinal movement of one portion of each shaft relative to the other when oscillating said oscillating frames.

263. In an apparatus or mill of the kind described, the combination with means for rotatably supporting a work-piece, of an oscillating frame pivotally secured at one end, a roll shaft journaled in said oscillating frame and having a roll adapted to act against said work-piece, a power or pressure piston having a piston-rod, a cross head secured to said piston-rod having adjustable guide blocks, a guide bracket in which said cross head is guided, a hollow journal pin in said cross head, a connecting rod connecting said cross head with said oscillating frame and provided at one end with a half bearing to contact with the external surface of said hollow cross head-pin, pull back pieces secured to said end of said connecting rod and having alined holes therein, a journal pin passing through the holes of said pull back pieces and said hollow journal pin and being adapted for the pull back motion of said oscillating frame and for disconnecting said connecting rod from said cross head.

264. In an apparatus or mill of the kind described, the combination with a frame comprising two horizontally spaced bed-plates, of means for supporting a work-piece for rotation, an oscillating frame situated between said bed-plates and pivotally connected thereto at one of its ends, said oscillating frame having a segmental guide or slide block at its other or free end, a segmental guide-bearing on the bed-plate beneath said oscillating frame for said segmental guide or slide block to support said oscillating frame at its free end, a pressure plate on the under side of the bed-plate above the free end of said oscillating frame bearing against the upper side of said oscillating frame at its free end, a positively driven roll shaft journaled in said oscillating frame and having a roll adapted to act against the work-piece as desired, and means for swinging said oscillating frame.

265. In an apparatus or mill of the kind described, the combination with a frame, of a pair of oscillating frames pivotally secured at one of their ends to said frame, power or pressure devices connected with said oscillating frames to swing the same laterally, roll shafts journaled in bearings in said oscillating frames, means for driving at least one of said roll shafts, and rolls at the adjacent ends of said roll shafts adapted to act against a work-piece from opposite sides, the pivot pins on which said oscillating frames swing being arranged sidewisely a distance from the work-piece and a distance to one side of the axis or extended axis of their coöperating roll shafts.

266. In an apparatus or mill of the kind described, the combination with a frame, of a pair of oscillating frames pivotally secured at one of their ends to said frame, a roll shaft rotatable in each of said oscillating frames, each of said oscillating frames having its pivot situated sidewisely with its axis or extended axis at a distance from one side of the axis or extended axis of the roll shaft in said oscillating frame, means for adjusting said roll shafts in their bearings lengthwise, and a power or pressure device detachably connected with each of said oscillating frames to swing the same laterally and permit of moving them out of the way to render the inner parts of the apparatus or mill accessible.

267. In an apparatus or mill of the kind described, the combination with means to rotatably support a work-piece, of a tread or face roll adapted to act against and roll the peripheral face of the work-piece to desired form, a power or pressure device or devices adapted to move and press said face roll and the work-piece against each other so as to cause the rolling of said peripheral face to desired form and diameter, and an indicating device for indicating the diameter and the changing diameters of said peripheral face of the work-piece by means of an indicating finger or pointer coöperating with said device and traveling with said movement or movements caused by said power or pressure device or devices during the rolling process.

268. In an apparatus or mill of the kind described, the combination with means to centrally support a work-piece, of means to rotate said work-piece, a face roll adapted to act against the peripheral face of the work-piece to reduce the diameter thereof, and an indicating device for indicating the progressively diminishing diameters of said peripheral face of the work-piece by means of an indicating finger or pointer coöperating with said device and traveling with the movement or movements causing said progressively diminishing diameters during the rolling process.

269. In an apparatus or mill of the kind described, the combination with means to centrally support a work-piece, of means to rotate the work-piece, rolls adapted to act against said work-piece to increase or to reduce the diameter thereof, and indicating means operatively connected with said rolls and traveling with the feeding movements of said rolls so as to indicate at a glance the diameter or the increasing or diminishing diameters of the work-piece during the rolling process.

270. In an apparatus or mill of the kind described, the combination with means to centrally support a work-piece, of means to rotate the work-piece, a peripheral face roll adapted to engage the peripheral face of the work-piece to limit the radial flow of metal toward the periphery of the work-piece and form the peripheral face of the work-piece to its desired form or shape, adjustable means to position said roll to desired radial distance from the axis of the work-piece, and indicating means operatively connected with said roll whereby said position of said face roll is at a glance or at once determined or indicated.

271. In an apparatus or mill of the kind described, the combination with a frame, of means for centrally supporting a work-piece for rotation, a tread or face roll adapted to act against the peripheral face of the work-piece, a power or pressure device having a piston provided with a piston-rod, means of connection between said piston-rod and said tread or face roll to cause the latter to move toward and from the work-piece and also with either the circumferential reduction or circumferential enlargement of said work-piece, a graduated segment fixedly supported, an indicating finger coacting with said graduated segment, and operative connection between said indicating finger and said piston-rod to cause said indicating finger to move along the graduations of said segment to indicate at a glance or at once said circumferential reduction or circumferential enlargement of said work-piece.

272. In an apparatus or mill of the kind described, the combination with means for supporting a work-piece, of a roll adapted to act against the peripheral face of said work-piece, a power or pressure device including a piston and piston-rod operatively connected with said roll and serving to hold or to force said roll against the work-piece, an arm secured to said piston-rod, a bell crank pivotally secured to a fixed point, a link connecting one arm of said bell crank with the arm on said piston-rod, a pivoted pointer moving through an arc of a circle, a shaft to which said pointer is secured, a crank on said shaft, a link connecting the other arm of said bell crank with said crank and a graduated segment along which the pointer travels to indicate at a glance or at once the position of said roll against said work-piece.

273. In an apparatus or mill of the kind described, the combination with means to centrally support a work-piece, of a pair of roll shafts having rolls at opposite sides of a work-piece adapted to act against the work-piece from opposite sides, means to positively rotate said shafts, means to move said shafts longitudinally, and means to indicate the radial position of the rolls from the axis of the work-piece while in operation.

274. In an apparatus or mill of the kind described, the combination with means for centrally supporting a work-piece, of a roll located at each side of said work-piece, a positively driven shaft supporting each of said rolls and journaled to rotate and move lengthwise, means for positively rotating said shaft, a power or pressure device operatively connected with each shaft to move the same lengthwise, means for limiting the lengthwise movement of said shaft, and a gage to each of said shafts coacting therewith to indicate when the end of any predetermined lengthwise movement of said shaft is reached.

275. In an apparatus or mill of the kind described, an edging or web rolling device comprising a rotatable and positively driven and longitudinally movable shaft, a roll at one end of said shaft, a guide piece through which said shaft is passed, and a gage adjustable in said guide piece and having an indicating point coacting with the longitudinal movement of said shaft as and for the purpose set forth.

276. In an apparatus or mill of the kind described, a rotatable and longitudinally movable roll shaft, driving mechanism for positively rotating said shaft, a power or pressure device operatively connected with said shaft to move the same lengthwise, and one or more indicating devices coacting with the lengthwise movement of said shaft whereby the desired longitudinal movement or movements of said shaft is indicated or is determined at a glance or at once.

277. In an apparatus or mill of the kind described, a frame work or bed-plate, centering or piercing devices arranged with their axes parallel to and supported by said bed-plate comprising two alined piercing or work-supporting means adapted to pierce or center a work-piece and support the same, a power or pressure device for each of said piercing or work-supporting means arranged with its axis parallel to and fastened to said bed-plate, rolls adapted to act against the sides and peripheral face of said work-piece, and a power or pressure device for each of said rolls arranged with its axis parallel to and fastened to said bed-plate and serving to forcibly feed or hold said rolls against the work-piece to roll the same where desired to the desired shape or form, and means for positively rotating one or more of the rolls acting against the sides of said work-piece.

278. In an apparatus or mill of the kind described, the combination of a frame having a main bed-plate and bed-plates above and below said main bed-plate, means for rigidly connecting said bed-plates together, work-supporting means, rolls positioned between the upper bed-plate and said main bed-plate, equalizing mechanism for causing the rolls acting in pairs against a work-piece to act with equal pressure, and driving mechanism for the rotating rolls, said equalizing mechanism and driving mechanism being mainly located between said main bed-plate and the lower bed-plate.

279. In an apparatus or mill of the kind described, the combination with means for centrally supporting a work-piece, of rolls acting against said work-piece, a bed-plate or bed-plate portion at one side of which said work-supporting means and rolls are arranged with their axes parallel to said bed-plate or bed-plate portion, and driving mechanism for the rotating rolls mainly at the other side of said bed-plate or bed-plate portion and arranged with its axis parallel to said bed-plate or bed-plate portion.

280. In an apparatus or mill of the kind described, the combination with means for rotatably supporting a work-piece, of rolls acting against said work-piece, a bed-plate or bed-plate portion at one side of which said work-supporting means and rolls are located, equalizing mechanism for causing the rolls acting in pairs against the work-piece to act with equal pressure, and driving means for the rotating rolls, said equalizing mechanism and said driving means being mainly located at the other side of said bed-plate or bed-plate portion.

281. In an apparatus or mill of the kind described, means for supporting a work-piece to permit of its being rotated, side rolls adapted for acting against said work-piece, one or more of said side rolls being adapted to be positively driven, a power or pressure device or devices for feeding or holding said rolls forcibly against said work-piece to roll the same where desired to desired form or shape, a main driving shaft, and a device or devices interposed between said rolls and said main driving shaft for rotating said positively rotating rolls in either direction.

282. In an apparatus or mill of the kind described, means for supporting a work-piece to permit of its being rotated, rolls adapted for acting against said work-piece from the sides, one or more of said rolls being adapted to be positively driven, a power or pressure device or devices for feeding or holding said rolls forcibly against said work-piece to cause the same to rotate and to roll the same where desired to desired form or shape, a main driving shaft, and mechanism interposed between said rolls and said main driving shaft for driving said positively rotating rolls at different speeds.

283. In an apparatus or mill of the kind described, means for supporting a work-piece to permit of its being rotated, rolls adapted for acting in pairs against said work-piece, one or more of said rolls being adapted to be positively driven, a power or pressure device or devices for feeding or holding said rolls forcibly against said work-piece to cause the same to rotate and to roll or form the same to desired form or shape, means for positively driving the positively rotating rolls comprising a main driving shaft and an intermediate driving shaft driven from said main driving shaft, and means provided on said driving shafts for disconnecting any pair of said rotating rolls from said driving shaft.

284. An apparatus or mill for rolling car wheels or other circular bodies comprising axially movable means at each side of a work-piece provided with rotatable axles to support the work-piece, power or pressure means for axially moving said work-supporting means toward and from the work-piece or with the same, and rolls adapted to roll the work-piece.

285. An apparatus or mill for rolling car wheels or other circular bodies comprising means for centrally supporting a work-piece to permit of its being rotated and dished, power or pressure means for dishing the work-piece while the same is so supported and is being rotated, means for rotating and rolling the work-piece when desired and laterally supporting and retaining the marginal portion of the work-piece against the axial movement of the hub or center portion of the work-piece while dishing the same.

286. An apparatus or mill for rolling car wheels or other circular bodies comprising axially movable piercing or penetrating and work-supporting means at each side of a work-piece for piercing or penetrating and for centrally supporting the work-piece to permit of its being rotated, power or pressure means for axially moving said supporting means against or into and away from the work-piece or with the same, and rolls adapted to roll the work-piece.

287. An apparatus or mill for rolling car wheels or other circular bodies comprising means for rotatably supporting a work-piece so as to permit the work-piece while so supported to be dished or undished, power or pressure means for axially moving the hub or center portion of the work-piece into a dished or undished position while the work-piece is so supported and is being rotated, and rolls for rotating and rolling the work-piece where desired to desired form or shape and, said rolls also laterally supporting and retaining the marginal portion of the work-piece against said axial movement of its hub or center portion.

288. An apparatus or mill for rolling car wheels or other circular bodies comprising means for piercing or centering and supporting a work-piece to permit of its being rotated and dished or undished, power or pressure means for axially moving said supporting means toward and from each other or together in one direction, rolling means for rotating and rolling said work-piece, and means for effecting dishing or undishing of the work-piece through the combined action of said rolling means and said means for axially moving said supporting means, said rolling means being also adapted for laterally supporting and retaining the marginal portion of the work-piece against the axial movement of its hub or center portion while undishing or dishing the work-piece.

289. In an apparatus or mill for rolling car wheels or other circular bodies, two sets of rolls, one set of said two sets of rolls being adapted to roll the work-piece where desired to desired form or shape of a rudimentary car wheel or other circular rudimentary body and the other set of said two sets of rolls being adapted to roll said so rudimentarily formed work-piece into the form of the desired finished rolled car wheel or other finished rolled body, and means for positively driving two or more of said rolls.

290. In an apparatus or mill for rolling car wheels or other circular bodies, two rolls or two sets of rolls adapted to first roll and reduce or rough the work-piece to rudimentary form and then roll the so rudimentarily formed work-piece to desired finished form, and means for positively driving one or more of said rolls.

291. In an apparatus or mill for rolling car wheels or other circular bodies, a roughing roll adapted to rough out the work-piece as desired and a shaping or finishing roll adapted to roll said roughed work-piece to desired finished form or shape.

292. In an apparatus or mill for rolling car wheels or other circular bodies comprising means for piercing or centering and supporting a work-piece, means adapted to rotate and roll said work-piece where desired to desired form or shape, and means adapted to receive the work-piece, and place and retain the work-piece in proper position to permit of its being centrally pierced or centered by said piercing or centering and supporting means and to receive the work-piece or the finished wheel or other finished body and raise the same to a position above the rolls to be removed from the apparatus or mill.

293. In an apparatus or mill for rolling car wheels or other circular bodies, means for centrally supporting a work-piece, means for rolling the work-piece, and constant pressure means for effecting a relative movement of said supporting means and said rolling means parallel or practically parallel with the axis or extended axis of the work-piece.

294. In an apparatus or mill for rolling car wheels or other circular bodies, means for rolling a work-piece, and means at opposite sides of the work-piece adapted for acting simultaneously against the hub or center portion and against the marginal portion of said opposite sides to effect a movement of the hub or center portion, or of the marginal portion of said work-piece in either direction parallel or practically parallel with the axis or extended axis of the work-piece while retaining one of said portions against such movement.

295. In an apparatus or mill for rolling car wheels or other circular bodies, means to support a work-piece so as to permit a relative movement of the central and marginal portions of the work-piece while so supported, means for rolling the work-piece, and means at opposite sides of the work-piece adapted to act to effect a relative movement of said supporting means and said rolling means parallel or approximately parallel to the axis or extended axis of said work-piece.

296. In an apparatus or mill for rolling car wheels or other circular bodies, a pair of alined and axially movable supporting means arranged at opposite sides of a work-piece to support the work-piece so as to permit an axial movement of the hub or center portion of the work-piece while the marginal portion of the work-piece is retained against said axial movement, and power or pressure means for each of said supporting means to axially move said supporting means for effecting an axial movement of said work-piece or of the hub or center portion of said work-piece by actuation of either one of said power or pressure means.

297. An apparatus or mill of the kind described, having means to rotatably support a work-piece comprising alined axles arranged at opposite sides of the work-piece, and a power or pressure mechanism for each of said axles for moving said axles longitudinally together in the same direction by actuation of either one of said power or pressure mechanisms.

298. In an apparatus or mill for rolling car wheels or other circular bodies, a pair of alined axially movable means for centrally supporting a work-piece so as to permit rolling or forming of the center or hub portion of the work-piece while so supported and for limiting the lateral flow of the metal in the center or hub portion of the work-piece during the process of rolling or forming said center or hub portion, and means for rolling or forming said hub portion.

299. In an apparatus or mill of the kind described, rolling means for rolling or forming a hub on a work-piece, and a pair of axially movable means for centrally supporting the work-piece and for limiting the lateral flow of metal at the hub portion during the process of rolling or forming said hub.

300. In an apparatus or mill of the kind described, means for rolling or forming a hub on a work-piece, and a pair of members adapted to centrally engage the work-piece at opposite sides thereof, one of said members having a circumferential flange to limit the lateral flow of metal of the work-piece at its hub portion when rolling or forming said hub.

301. In an apparatus or mill of the kind described, rolling means for rolling or forming a hub on a work-piece, and a pair of members adapted to centrally engage the work-piece at opposite sides thereof, each of said members having a circumferential flange to limit the lateral flow of metal at the hub portion of the work-piece when rolling or forming said hub.

302. In an apparatus or mill for rolling car wheels or other circular bodies, means for rolling or forming a hub or a supported work-piece, and a pair of supporting members engaging opposite sides of the work-piece and supporting the same, one of said members having a stop-portion spaced from the side of the supported work-piece to limit the lateral flow of metal of the work-piece at its hub portion when rolling or forming said hub.

303. In an apparatus or mill for rolling car wheels or other circular bodies, means for forming or rolling a hub on a supported work-piece, and a pair of supporting members engaging opposite sides or ends of the center or hub portion of the work-piece and supporting the same, each of said members having a stop-portion spaced from the side or end of the center or hub portion of said supported work-piece to limit the lateral flow of metal of the work-piece at its hub portion when forming or rolling said hub.

304. In an apparatus or mill for rolling car wheels or other circular bodies, a device for diametrically compressing the hub of a work-piece and also for supporting the work-piece around said hub so as to permit the work-piece while so supported to be rolled anywhere except at its hub portion or to be dished or undished or redished, said device comprising a shaft or axle having a head formed with an annular flange adapted to so support the work-piece, the inner peripheral face of said flange being inclined to the axis of the work-piece.

305. In an apparatus or mill of the kind described, a device for diametrically compressing the hub of a work-piece and also for supporting the work-piece around said hub, comprising a freely rotatable shaft or axle having a hollow head adapted to so support the work-piece, the interior of said head being gradually enlarged in the direction of the work-piece.

306. In an apparatus or mill for rolling car wheels or other circular bodies, a device for centrally supporting a work-piece provided with freely rotatable means for the purpose only of diametrically compressing the hub portion of the work-piece and supporting the latter.

307. In an apparatus or mill for rolling car wheels or other circular bodies, a pair of oppositely arranged side rolls adapted to work against opposite sides of the work-piece and being axially movable to travel toward and away from the axis or center portion of the work-piece.

308. In an apparatus or mill for rolling car wheels or other circular bodies, a pair of oppositely arranged side rolls to work against opposite sides of a supported car wheel or other work-piece and being axially movable to travel from the center portion toward the periphery or past the periphery of said car wheel or other work-piece, or vice versa, said side rolls being also laterally movable to travel against and away from the opposite sides of said car wheel or other work-piece.

309. In an apparatus or mill for rolling car wheels or other circular bodies, a face roll adapted to act against the peripheral face of a work-piece and having its peripheral face extending across its full width or lateral thickness and having its said width or lateral thickness equaling that which the marginal or peripheral portion of the finished work-piece is to have, a pair of oppositely arranged side rolls adapted to work against the work-piece from opposite sides and being axially movable to travel from the center portion toward the periphery or past the periphery of said work-piece, or vice versa, said side rolls being also laterally movable to travel against and away from the sides of said work-piece, said side rolls are also adapted to roll across and in contact with the lateral edges or lateral faces of the marginal or peripheral portion of said work-piece and also across and in contact with part of the opposite sides of said face roll, and said face roll being positioned between said pair of side rolls.

310. In an apparatus or mill for rolling car wheels, means for rotatably supporting a work-piece, a face beaking roll, a face finishing roll, said face rolls being arranged to act against the peripheral face of the work-piece at different points, and each of said face rolls having its peripheral face extending across its total width or lateral thickness of its marginal portion and which width or lateral thickness equals that which the marginal or rim portion of the finished work-piece is to have, oppositely positioned side rolls arranged in pairs and provided with extended portions, each pair of said side rolls being arranged so as to have one of said face rolls positioned therebetween, said face rolls being also arranged to permit the opposite sides or part of the opposite sides of their said marginal portions to act in contact with the extended portions of said side rolls, said side rolls being laterally movable to travel against and away from the opposite sides of the work-piece, said side rolls or one pair of said side rolls being also axially movable to travel from the center portion toward the periphery or past the periphery of the work-piece, or vice versa, and said face rolls being movable independently of said side rolls.

311. In an apparatus or mill for rolling car wheels or other circular bodies, a supporting head movable toward and from the peripheral face of a rotatably supported work-piece, an arm on said supporting head, a face roll rotatably mounted on said arm and adapted to roll against the peripheral face of a supported work-piece, the opposite side faces of said face roll being adapted to act for gaging the lateral thickness or width which the marginal or rim portion of the car wheel or finished work-piece is to have, and a pair of side rolls adapted for rolling in contact with the work-piece and also in contact with part of the side faces of said face roll.

312. In an apparatus or mill for rolling car wheels, a face beaking roll adapted to roll against the peripheral face of a supported work-piece and being formed so as to roll said face straight or cylindrical or approximately so at its one end and so as to roll the portion of said face at its other end where the flange of the car wheel is to be formed straight or cylindrical or approximately so and of larger diameter than said first-mentioned end portion and the portion of said face between said two end portions concave or conical or approximately so, the opposite side faces of said face roll being adapted to act for gaging the lateral thickness or width which the marginal or rim portion of the car wheel or finished work-piece is to have, and means at opposite sides of the work-piece to confine the lateral flow of metal in the marginal or rim portion of said car wheel or work-piece within the limits defined by the sides of said face roll.

313. In an apparatus or mill for rolling car wheels, means for centrally and rotatably supporting a work-piece in a position immovable in the direction of a line at right angles to the axis of the work piece, a face roll adapted to roll against the peripheral face of the so supported work-piece, the opposite side faces of said face roll being adapted to act for gaging the lateral thickness or width which the marginal or rim portion of the car wheel or finished work-piece is to have, and means at opposite sides of the work-piece extending across the opposite side faces of the marginal or rim portion of the work-piece and also over and against part of the opposite side faces of said face roll to confine the lateral flow of metal in the marginal or rim portion of said work-piece.

314. In an apparatus or mill for rolling car wheels or other circular bodies, means for dishing, undishing or redishing a car wheel or other circular object while the object is rotated comprising one member centrally engaging said object at one side thereof so as to permit the object while so centrally engaged to be dished or undished or redished and another member or members marginally engaging the object at the other side thereof so as to permit the object while so marginally engaged to be dished or undished or redished, said members being relatively movable parallel or practically parallel to the axis or extended axis of the object while so engaging the object at its opposite sides.

315. In an apparatus or mill for rolling car wheels or other circular objects, means for rotating a circular object, and means for dishing, undishing or redishing said circular object while the object is rotated comprising two members, one of said members centrally engaging said object at one side thereof so as to permit the object while so centrally engaged to be dished or undished or redished and the other of said members marginally engaging the object at the other side thereof so as to permit the object while so marginally engaged to be dished or undished or redished, said members being relatively movable parallel or practically parallel to the axis or extended axis of the object while so engaging the object at its opposite sides and while the object is rotated.

316. In an apparatus or mill for rolling car wheels or other circular objects, means for dishing, undishing or redishing a circular object while the object is rotated comprising two members, one of said members centrally engaging said object at one side thereof so as to permit the object while so centrally engaged to be dished or undished or redished and the other of said members marginally engaging the object at the other side thereof so as to permit the object while so marginally engaged to be dished or undished or redished, one of said members being movable parallel to the axis or extended axis of said object while so engaging the object at its one side and while the other of said members is retained against the other side of the object.

317. In an apparatus or mill for rolling car wheels or other circular objects, means for rotating a circular object, and means for dishing, undishing or redishing said circular object while the object is rotated comprising two members, one of said members marginally engaging said object at one side thereof so as to permit the object while so marginally engaged to be dished or undished or redished and the other of said members centrally engaging said object at the other side thereof so as to permit the object while so centrally engaged to be dished or undished or redished, the member centrally engaging said object at its one side being movable axially while so engaging the object and while the object is rotated and the member marginally engaging the object at its other side being retained in its position in contact with the marginal portion of the object.

318. In an apparatus or mill for rolling car wheels, means for rotating a circular object, and means for dishing, undishing or redishing said circular object while the object is rotated comprising two members, one of said two members centrally engaging said object at one side thereof so as to permit the object while so centrally engaged to be dished or undished or redished and the other of said members marginally engaging the object at the other side thereof so as to permit the object while so marginally engaged to be dished or undished or redished, and one of said members while so engaging the object being movable in a direction parallel to the axis or extended axis of the object while the object is rotated and the other of said members while so engaging the object being retained against said movement.

319. In an apparatus or mill for rolling car wheels or other circular bodies from a blank or work-piece, means engaging the marginal portion of a rotatably supported work-piece, and means for axially moving the hub or central portion of said work-piece while the work-piece is rotated and while the marginal portion of said work-piece is retained by said marginal engaging means against said axial movement of said hub or central portion.

320. In an apparatus or mill for rolling car wheels, means for centrally and rotatably supporting a work-piece in a position immovable in the direction of a line at right angles with the axle of the work-piece, three rolls with their axes situated in a plane passing radially and laterally through the work-piece or practically so, one of said three rolls being a face roll adapted to act against the peripheral face of the work-piece, said face roll having its peripheral face extending across its total width or lateral thickness of its marginal portion and which total width or lateral thickness is the same as is the lateral thickness or width which the marginal or rim portion of the car wheel or similar object which is to be rolled from said work-piece is to have, the remaining rolls being a pair of oppositely arranged side rolls adapted to act against said work-piece from opposite sides and having said face roll positioned between them, said side rolls having edging roll parts which extend across the side faces of the marginal or rim portion of said work-piece, wheel or other object and also over and against part of the opposite sides of said face roll, and means for positively driving at least one of said side rolls.

321. In an apparatus or mill of the kind described, an indicating device for indicating the movements of a roll operating against a work-piece, comprising a fixed graduated part, a movable part traveling along said graduated part, and means for indicating on said graduated part when the desired operation is completed.

322. In an apparatus or mill of the kind described, means for rolling a work-piece to desired form or shape, and means indicating the movement or movements of said rolling means.

323. In an apparatus or mill for rolling car wheels, a roll adapted to act against the peripheral face of a supported work-piece, said roll being supported so as to permit lateral movement of the same.

324. In an apparatus or mill for rolling car wheels or other circular bodies, a device adapted to act against opposite sides or ends of a work-piece at its center portion for firmly and automatically clamping the hub or center portion of the work-piece axially and retaining the hub or center portion of the work-piece in said clamped condition continually during the operating process and also for axially moving said work-piece or the hub or center portion of said work-piece while so axially clamped.

325. In an apparatus or mill for rolling car wheels, a peripheral face rolling device comprising a supporting head movable toward and from the peripheral face of a supported work-piece, an arm on said supporting head, and a peripheral face roll rotatably mounted on said arm.

326. In an apparatus or mill for rolling car wheels, a peripheral face rolling device comprising a supporting head movable toward and from the peripheral face of a supported work-piece, a forked arm on said supporting head, and a peripheral face roll rotatably mounted in the open end of said forked arm, said work-piece being rotatably supported in a fixed central position.

327. In an apparatus or mill for rolling car wheels or other circular bodies, a rolling device comprising a rotatably mounted shaft arranged with its axis inclined to the side of a supported work-piece and having a roll at its one or free end adapted to roll or act against the work-piece from the side, said shaft comprising two sections, one of said sections having said roll thereon and with its roll end being laterally movable to travel against and away from the work-piece, an oscillating support having a bearing or bearings in which said last mentioned section is journaled, a fixed or stationary bearing or bearings in which the other section of said shaft is journaled, and means for connecting said two sections comprising a fixed journal or bearing at each of the opposed ends of said two sections and a part or parts between and pivotally connected to said fixed journals or bearings, said part or parts being capable of being axially shortened or lengthened between said fixed journals or bearings and also being capable or free to swing laterally at an angle or angles to each of said two sections, during the rolling or operating process, said fixed journals or bearings being arranged with their axes at right angles to the axes of said section.

328. In an apparatus or mill for rolling car wheels or other circular bodies, a rolling device comprising a rotatably mounted shaft, said shaft comprising two sections, one of said sections being arranged with its axis inclined to the side of a supported work-piece and having a roll at its free end adapted to roll or act against the work-piece from the side, the roll end of said section being laterally movable to travel against and away from the work-piece, an oscillating support having a bearing or bearings in which said last mentioned section is journaled, a fixed or stationary bearing or bearings in which the other section of said shaft is journaled, and means for connecting said two sections comprising a fixed journal or bearing at each of the opposed ends of said two sections and a connecting element between and pivotally connected to said fixed journals or bearings, said connecting element being capable of being axially shortened or lengthened between said fixed journals or bearings and also being capable or free to swing laterally at each of the opposed ends of said two sections, during the rolling or operating process, said fixed journals or bearings being arranged with their axes at right angles to the axes of their coöperating section.

329. In an apparatus or mill for rolling car wheels or other circular bodies, a rolling device comprising a rotatably mounted shaft, said shaft comprising two sections, one of said sections being arranged with its axis inclined to the side of a supported work-piece and having a roll at its free end adapted to roll or act against the work-piece, an oscillating support having a bearing or bearings in which said last mentioned section is journaled, a fixed or stationary bearing or bearings in which the other section of said shaft is journaled, and means pivotally connecting the opposed ends of said two sections to fixed points at each of the opposed ends of said two sections comprising a connecting element pivotally connected to said fixed points, said connecting element being capable of being shortened or lengthened axially between the two fixed points of said two sections and also being capable or free to swing laterally on each of said fixed points, during the rolling or operating process.

330. In an apparatus or mill for rolling car wheels or other circular bodies, a rotatably supported roll shaft having a roll at its free end adapted to roll or operate against a supported work-piece, said shaft comprising two sections and having a fixed point at each of the opposed ends of said two sections, and a part or parts between and pivotally connected to said fixed points connecting said two sections and being capable of being axially shortened and lengthened between said fixed points and also being capable or free to swing laterally at each of the opposed ends of said two sections, during the rolling or operating process.

331. In an apparatus or mill for rolling car wheels or other circular bodies, a device for supporting a work-piece so as to permit the work-piece while so supported to be rotated and be dished or undished or redished, and means to move said device longitudinally for dishing, undishing, redishing, or laterally positioning said work-piece.

In testimony whereof, I have hereunto set my hand.

LOUIS F. DIETER.

Witnesses:
JOHN A. L. BECKER,
E. H. CRAWFORD.